US010613808B2

United States Patent
Bernstein et al.

(10) Patent No.: US 10,613,808 B2
(45) Date of Patent: Apr. 7, 2020

(54) SYSTEMS, DEVICES, AND METHODS FOR DYNAMICALLY PROVIDING USER INTERFACE CONTROLS AT A TOUCH-SENSITIVE SECONDARY DISPLAY

(71) Applicant: Apple Inc., Cupertino, CA (US)

(72) Inventors: Jeffrey Traer Bernstein, San Francisco, CA (US); Duncan R. Kerr, San Francisco, CA (US); John B. Morrell, Los Gatos, CA (US); Lawrence Y. Yang, Bellevue, WA (US); Eric Lance Wilson, San Jose, CA (US); Adam S. Meyer, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 89 days.

(21) Appl. No.: 15/273,627

(22) Filed: Sep. 22, 2016

(65) Prior Publication Data

US 2017/0010847 A1    Jan. 12, 2017

Related U.S. Application Data

(63) Continuation of application No. 15/113,779, filed as application No. PCT/US2015/012694 on Jan. 23, 2015.

(Continued)

(51) Int. Cl.
*G06F 3/14* (2006.01)
*G06F 1/16* (2006.01)
(Continued)

(52) U.S. Cl.
CPC ............ *G06F 3/1423* (2013.01); *G06F 1/165* (2013.01); *G06F 1/1613* (2013.01);
(Continued)

(58) Field of Classification Search
None
See application file for complete search history.

(56) References Cited

U.S. PATENT DOCUMENTS

| 3,956,745 A | 5/1976 | Ellis |
| 6,111,527 A | 8/2000 | Susel |

(Continued)

FOREIGN PATENT DOCUMENTS

| CN | 101382842 A | 3/2009 |
| CN | 101571785 A | 11/2009 |

(Continued)

OTHER PUBLICATIONS

Wagner et al., U.S. application filed on Apr. 15, 2014, titled "Device, Method, and Graphical User Interface for Navigating and Displaying Content in Context", 140 pages.

(Continued)

*Primary Examiner* — Tuan S Nguyen
(74) *Attorney, Agent, or Firm* — Morgan, Lewis & Bockius LLP

(57) ABSTRACT

A method is performed at a computing system with a first housing that includes a primary display and a second housing at least partially containing (i) a physical keyboard and a touch-sensitive secondary display ("TSSD") that is distinct from the primary display. The method includes: displaying, on the primary display, a first user interface for an application and displaying, on the TSSD, a first set of affordances corresponding to a first portion of the application. The method further includes: detecting a swipe gesture on the TSSD. If the swipe gesture was performed in a first direction, the method includes: displaying a second set of affordances corresponding to the first portion on the TSSD. If the swipe gesture was performed in a second direction substantially perpendicular to the first direction, the method (Continued)

includes: displaying a third set of affordances corresponding to a second portion of the application on the TSSD.

30 Claims, 81 Drawing Sheets

Related U.S. Application Data

(60) Provisional application No. 62/104,023, filed on Jan. 15, 2015, provisional application No. 61/930,663, filed on Jan. 23, 2014.

(51) Int. Cl.

| | | |
|---|---|---|
| *G06F 3/023* | (2006.01) | |
| *G06F 3/0488* | (2013.01) | |
| *G06F 3/048* | (2013.01) | |
| *G06F 3/01* | (2006.01) | |
| *G06F 3/041* | (2006.01) | |
| *G06F 3/0482* | (2013.01) | |
| *G06F 3/0481* | (2013.01) | |
| *G06F 3/0484* | (2013.01) | |
| *G06F 3/0485* | (2013.01) | |
| *G06F 3/02* | (2006.01) | |
| *G09G 5/12* | (2006.01) | |

(52) U.S. Cl.
CPC ............ *G06F 1/1662* (2013.01); *G06F 3/016* (2013.01); *G06F 3/021* (2013.01); *G06F 3/0238* (2013.01); *G06F 3/048* (2013.01); *G06F 3/0412* (2013.01); *G06F 3/0482* (2013.01); *G06F 3/0485* (2013.01); *G06F 3/04817* (2013.01); *G06F 3/04845* (2013.01); *G06F 3/04883* (2013.01); *G06F 3/04886* (2013.01); *G09G 5/12* (2013.01); *G09G 2354/00* (2013.01)

(56) References Cited

U.S. PATENT DOCUMENTS

| | | | |
|---|---|---|---|
| 6,396,483 | B1 | 5/2002 | Hiller |
| 9,369,635 | B1 | 6/2016 | Hilla |
| 9,521,375 | B2* | 12/2016 | Beaumier .............. G07F 11/002 |
| 2002/0191029 | A1 | 12/2002 | Gillespie et al. |
| 2004/0004604 | A1 | 1/2004 | Numano |
| 2004/0108968 | A1 | 6/2004 | Finke-Anlauff |
| 2004/0239615 | A1 | 12/2004 | Firebaugh et al. |
| 2006/0052885 | A1 | 3/2006 | Kong |
| 2008/0207273 | A1 | 8/2008 | Huo |
| 2008/0320410 | A1 | 12/2008 | Whytock et al. |
| 2009/0265628 | A1 | 10/2009 | Bamford et al. |
| 2009/0271723 | A1 | 10/2009 | Matsushima et al. |
| 2009/0315867 | A1 | 12/2009 | Sakamoto et al. |
| 2010/0149101 | A1 | 6/2010 | Guo et al. |
| 2010/0265182 | A1 | 10/2010 | Ball et al. |
| 2010/0275163 | A1 | 10/2010 | Gillespie et al. |
| 2011/0047459 | A1* | 2/2011 | Van Der Westhuizen .................... G06F 1/1692 715/702 |
| 2011/0314405 | A1* | 12/2011 | Turner .................. G06F 3/0238 715/773 |
| 2012/0068933 | A1 | 3/2012 | Larsen |
| 2012/0235912 | A1 | 9/2012 | Laubach |
| 2013/0050135 | A1 | 2/2013 | Stewart et al. |
| 2013/0332836 | A1 | 12/2013 | Cho |
| 2014/0075373 | A1 | 3/2014 | Jitkoff et al. |
| 2014/0082548 | A1 | 3/2014 | Wu et al. |
| 2014/0157209 | A1* | 6/2014 | Dalal ..................... G06F 3/017 715/863 |
| 2014/0164997 | A1* | 6/2014 | Lee ..................... G06F 3/04883 715/810 |
| 2014/0184471 | A1 | 7/2014 | Martynov et al. |
| 2014/0232671 | A1 | 8/2014 | Chaudhri |
| 2014/0380239 | A1 | 12/2014 | Kang |
| 2015/0339031 | A1 | 11/2015 | Zeinstra et al. |
| 2015/0378546 | A1 | 12/2015 | Osborne et al. |
| 2017/0010771 | A1 | 1/2017 | Bernstein et al. |
| 2017/0010846 | A1 | 1/2017 | Bernstein et al. |
| 2017/0315704 | A1 | 11/2017 | Shaw et al. |
| 2018/0032203 | A1 | 2/2018 | Sepulveda et al. |
| 2019/0220134 | A1 | 7/2019 | Sepulveda et al. |
| 2019/0220135 | A1 | 7/2019 | Sepulveda et al. |

FOREIGN PATENT DOCUMENTS

| | | |
|---|---|---|
| CN | 101876879 A | 11/2010 |
| CN | 102405453 A | 4/2012 |
| CN | 102934052 A | 2/2013 |
| CN | 106445184 A | 2/2017 |
| EP | 2 660 692 A1 | 11/2013 |
| JP | H 10124217 A | 5/1998 |
| JP | 2001-344092 A | 12/2001 |
| JP | 2009-258667 A | 11/2009 |
| JP | 2010-009534 A | 1/2010 |
| JP | 2010-066918 A | 3/2010 |
| JP | 2010-108088 A | 5/2010 |
| JP | 2010-129051 A | 6/2010 |
| JP | 2011-018085 | 1/2011 |
| JP | 2012-003508 A | 1/2012 |
| JP | 2013-532334 A | 8/2013 |
| JP | 2017-504128 A | 2/2017 |
| WO | WO 2015/112868 A1 | 7/2015 |

OTHER PUBLICATIONS

Office Action, dated May 8, 2017, received in Danish Patent Application No. 201670555, which corresponds with U.S. Appl. No. 15,113,779, 3 pages.
Office Action, dated Nov. 16, 2017, received in Danish Patent Application No. 201670555, which corresponds with U.S. Appl. No. 15,113,779, 2 pages.
Office Action, dated May 8, 2017, received in Danish Patent Application No. 201670559, which corresponds with U.S. Appl. No. 15/113,779, 4 pages.
Office Action, dated May 29, 2017, received in European Patent Application No. 15702935.6, which corresponds with U.S. Appl. No. 14/113,779, 9 pages.
Notice of Allowance, dated Nov. 13, 2017, received in Japanese Patent Application No. 2016-548096, which corresponds with U.S. Appl. No. 14/113,779, 5 pages.
Office Action, dated Jun. 2, 2017, received in Japanese Patent Application No. 2016-158867, which corresponds with U.S. Appl. No. 15/113,779, 6 pages.
Extended European Search Report, dated Dec. 7, 2016, received in European Patent Application No. 16181866.1, which corresponds with U.S. Appl. No. 15/113,779, 10 pages.
Notice of Allowance, dated Feb. 12, 2018, received in Danish Patent Application No. 201670555, which corresponds with U.S. Appl. No. 15/113,779, 2 pages.
Notice of Allowance, dated Feb. 12, 2018, received in Danish Patent Application No. 201670559, which corresponds with U.S. Appl. No. 15/113,779, 2 pages.
Office Action, dated Nov. 16, 2017, received in Danish Patent Application No. 201670559, which corresponds with U.S. Appl. No. 15/113,779, 2 pages.
Summons to Attend Oral Proceedings, dated Jan. 8, 2018, received in European Patent Application No. 15702935.6, which corresponds with U.S. Appl. No. 14/113,779, 18 pages.
Office Action, dated Jan. 29, 2018, received in European Patent Application No. 16181866.1, which corresponds with U.S. Appl. No. 15/113,779, 11 pages.
Patent, dated Dec. 8, 2017, received in Japanese Patent Application No. 2016-548096, which corresponds with U.S. Appl. No. 14/113,779, 3 pages.
Office Action, dated Feb. 5, 2018, received in Japanese Patent Application No. 2016-158867, which corresponds with U.S. Appl. No. 15/113 779, 5 pages.

(56) References Cited

OTHER PUBLICATIONS

Office Action and Search Report, dated Oct. 26, 2016, received in Danish Patent Application No. 201670555, which corresponds with U.S. Appl. No. 15/113,779, 10 pages.
Office Action and Search Report, dated Oct. 18, 2016, received in Danish Patent Application No. 201670559, which corresponds with U.S. Appl. No. 15/113,779, 9 pages.
International Search Report and Written Opinion, dated Apr. 8, 2015, received in International Patent Application No. PCT/US2015/012694, which corresponds with U.S. Appl. No. 15/113,779, 14 pages.
International Preliminary Report on Patentability, dated Jul. 26, 2016, received in International Patent Application No. PCT/US2015/012694, which corresponds with U.S. Appl. No. 15/113,779, 9 pages.
Response to Pending Examination Report for PA 201670555, "Systems, Devices, and Methods for Dynamically Providing User Interface Controls at A Touch-Sensitive Secondary Display", https://onlineweb.dkpto.dk/Dokumenter2017/227/09194227.pdf, Nov. 7, 2017, 161 pages.
Office Action, dated Aug. 13, 2018, received in U.S. Appl. No. 15/113,779, 23 pages.
Office Action, dated Dec. 5, 2018, received in Chinese Patent Application No. 201580005665.4, which corresponds with U.S. Appl. No. 15/113,779, 6 pages.
Office Action, dated Jun. 15, 2018 received in Chinese Patent Application No. 201610840116.5, which corresponds with U.S. Appl. No. 15/113,779, 5 pages.
Patent, dated Oct. 11, 2018, received in Danish Patent Application No. 201670555, which corresponds with U.S. Appl. No. 15/113,779, 3 pages.
Intention to Grant, dated Aug. 16, 2018, received in European Patent Application No. 16181866.1, which corresponds with U.S. Appl. No. 15/113,779, 5 pages.
Patent, dated Jun. 29, 2018, received in Japanese Patent Application No. 2016-158867, which corresponds with U.S. Appl. No. 15/113,779, 3 pages.
Final Office Action, dated Jan. 22, 2019, received in U.S. Appl. No. 15/113,779, 25 pages.
Office Action, dated May 14, 2019, received in U.S. Appl. No. 15/113,779, 22 pages.
Notice of Allowance, dated Oct. 9, 2019, received in U.S. Appl. No. 15/113,779, 20 pages.
Office Action, dated Jul. 9, 2019, received in Chinese Patent Application No. 201580005665.4, which corresponds with U.S. Appl. No. 15/113,779, 4 pages.
Office Action, dated Sep. 30, 2019, received in Chinese Patent Application No. 201580005665.4, which corresponds with U.S. Appl. No. 15/113,779, 3 pages.
Notice of Allowance, dated Apr. 2, 2019, received in Chinese Patent Application No. 201610840116.5, which corresponds with U.S. Appl. No. 15/113,779, 3 pages.
Patent, dated May 17, 2019, received in Chinese Patent Application No. 201610840116.5, which corresponds with U.S. Appl. No. 15/113,779, 6 pages.
Patent, dated Jan. 23, 2019, received in European Patent Application No. 16181866.1, which corresponds with U.S. Appl. No. 15/113,779, 3 pages.
Office Action, dated Apr. 9, 2019, received in Japanese Patent Application No. 2018-116341, which corresponds with U.S. Appl. No. 15/113,779, 7 pages.
Office Action, dated Feb. 8, 2019, received in U.S. Appl. No. 15/275,298, 16 pages.
Final Office Action, dated Jul. 3, 2019, received in U.S. Appl. No. 15/275,298, 16 pages.
IOS 11 Updates, "Demo of iOS 9 Apps: Search, Siri, Photies App", https://youtube.be.EBnXMM1X6xA, Jun. 12, 2015, 2 pages.
MSAppliedSciences, "DisplayCover", https:/youtube/OSFlvml0Sso, Aug. 20, 2015, 2 pages.

MSAppliedSciences, "UIST Student Innovation Contest 2010 Concept", https:/youtube/ojusRO38Tdc, Aug. 9, 2010, 3 pages.
YouTube, "Steve Jobs Introduces the iPad—2010 (full)", https://www.youtube.com/watch?v=zZtWlSDvb_k, May 5, 2015, 2 pages.
Office Action, dated Dec. 13, 2019, received in Japanese Patent Application No. 2018-116341, which corresponds with U.S. Appl. No. 15/113,779, 5 pages.
Office Action, dated Aug. 10, 2018, received in U.S. Appl. No. 15/655,707, 15 pages.
Innovation Patent, dated Sep. 19, 2017, received in Australia Patent Application No. 2017100879, which corresponds with U.S. Appl. No. 15/655,707, 1 page.
Office Action, dated Feb. 1, 2019, received in Australia Patent Application No. 2017302420, which corresponds with U.S. Appl. No. 15/655,707, 6 pages.
Notice of Acceptance, dated Jul. 15, 2019, received in Australia Patent Application No. 2017302420, which corresponds with U.S. Appl. No. 15/655,707, 3 pages.
Certificate of Grant, dated Nov. 14, 2019, received in Australia Patent Application No. 2017302420, which corresponds with U.S. Appl. No. 15/655,707, 4 pages.
Office Action, dated Aug. 25, 2017, received in Chinese Patent Application No. 201710632979.8, which corresponds with U.S. Appl. No. 15/655,707, 3 pages.
Office Action, dated Oct. 10, 2017, received in Danish Patent Application No. 2017-70561, which corresponds with U.S. Appl. No. 15/655,707, 9 pages.
Office Action, dated Mar. 14, 2018, received in Danish Patent Application No. 2017-70561, which corresponds with U.S. Appl. No. 15/655,707, 3 pages.
Office Action, dated Oct. 31, 2018, received in Danish Patent Application No. 2017-70561, which corresponds with U.S. Appl. No. 15/655,707, 5 pages.
Intention to Grant, dated Jan. 2, 2019, received in Danish Patent Application No. 2017-70561, which corresponds with U.S. Appl. No. 15/655,707, 2 pages.
Notice of Allowance, dated Feb. 7, 2019, received in Danish Patent Application No. 2017-70561, which corresponds with U.S. Appl. No. 15/655,707, 2 pages.
Patent, dated Apr. 3, 2019, received in Danish Patent Application No. 2017-70561, which corresponds with U.S. Appl. No. 15/655,707, 5 pages.
Office Action, dated Jun. 27, 2019, received in European Patent Application No. 17745225.7, which corresponds with U.S. Appl. No. 15/655,707, 6 pages.
Office Action, dated Sep. 2, 2019, received in Japanese Patent Application No. 2019-503292, which corresponds with U.S. Appl. No. 15/655,707, 7 pages.
Office Action, dated Jun. 6, 2019, received in Korean Patent Application No. 2019-7004584, which corresponds with U.S. Appl. No. 15/655,707, 6 pages.
Notice of Allowance, dated Oct. 24, 2019, received in Korean Patent Application No. 2019-7004584, which corresponds with U.S. Appl. No. 15/655,707, 5 pages.
Office Action, dated Jul. 31, 2019, received in U.S. Appl. No. 16/361,109, 13 pages.
Notice of Allowance, dated Dec. 18, 2019, received in U.S. Appl. No. 16/361,109, 5 pages.
Office Action, dated Aug. 13, 2019, received in U.S. Appl. No. 16/361,122, 13 pages.
Notice of Allowance, dated Dec. 5, 2019, received in U.S. Appl. No. 16/361,122, 9 pages.
International Search Report and Written Opinion, dated Jan. 2, 2018, received in International Patent Application No. PCT/US2017/041959, which corresponds with U.S. Appl. No. 15/655,707, 15 pages.
International Preliminary Report on Patentability, dated Jan. 29, 2019, received in International Application No. PCT/US2017/041959, which corresponds with U.S. Appl. No. 15/655,707, 9 pages.
Notice of Allowance, dated Jan. 15, 2020, received in U.S. Appl. No. 15/113,779, 8 pages.

(56) References Cited

OTHER PUBLICATIONS

Notice of Allowance, dated Feb. 3, 2020, received in Chinese Patent Application No. 201580005665.4, which corresponds with U.S. Appl. No. 15/113,379, 3 pages.
Intention to Grant, dated Jan. 16, 2020, reeived in European Patent Application No. 17745225.7, which corresponds with U.S. Appl. No. 15/655,707, 8 pages.
Patent, dated Jan. 7, 2020, received in Korean Patent Application No. 2019-7004584, which corresponds with U.S. Appl. No. 15/655,707, 4 pages.

* cited by examiner

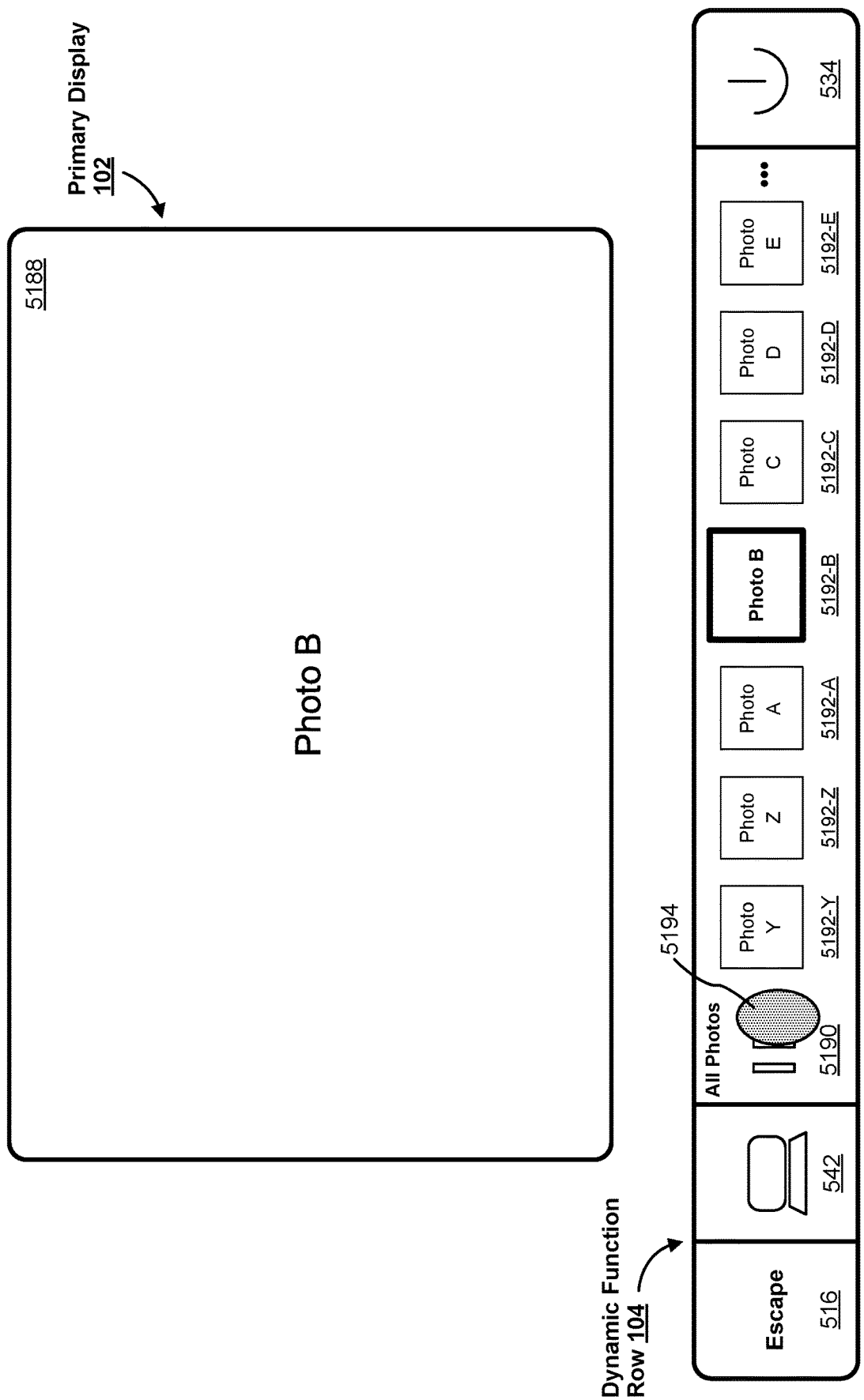

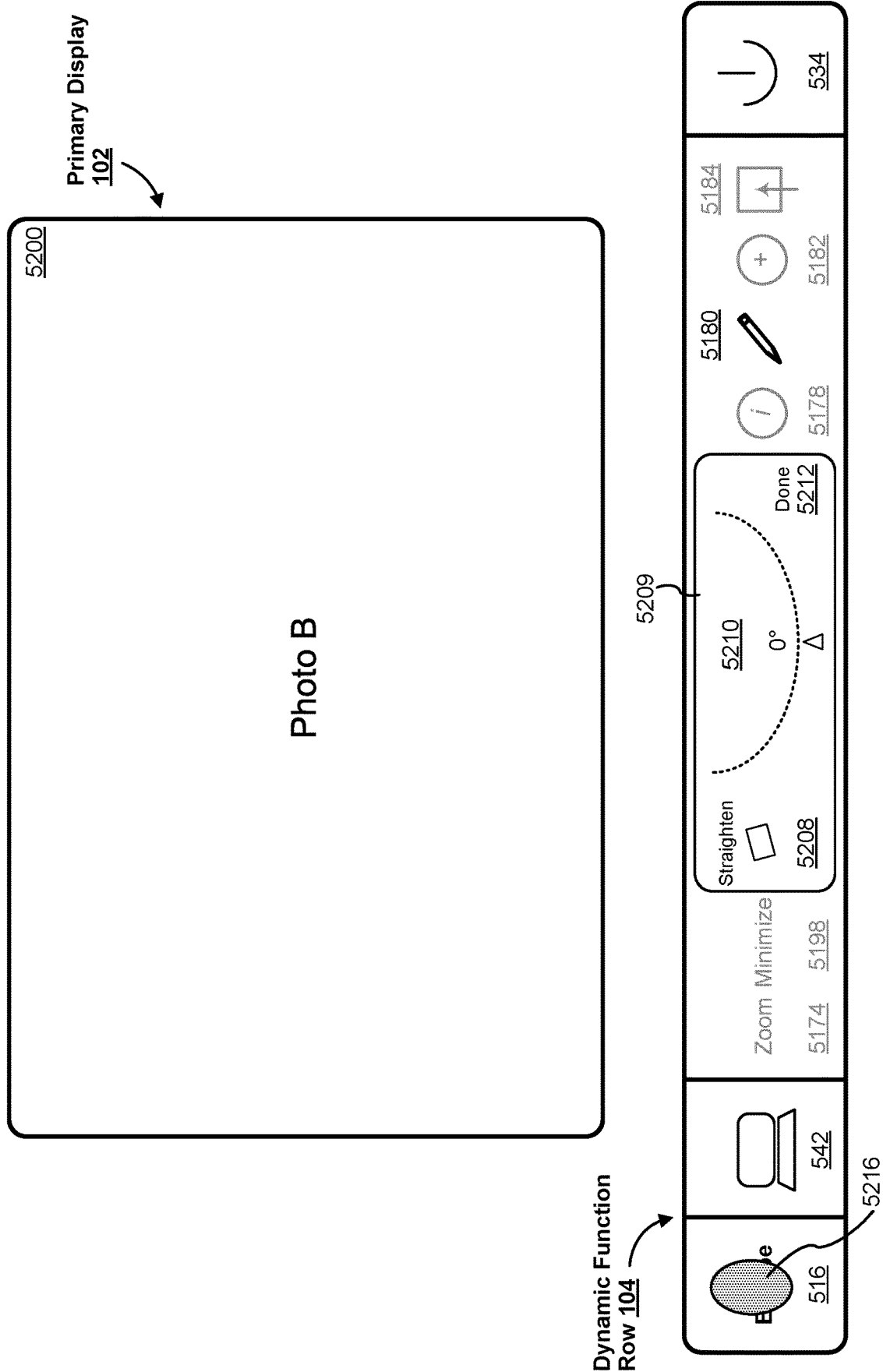

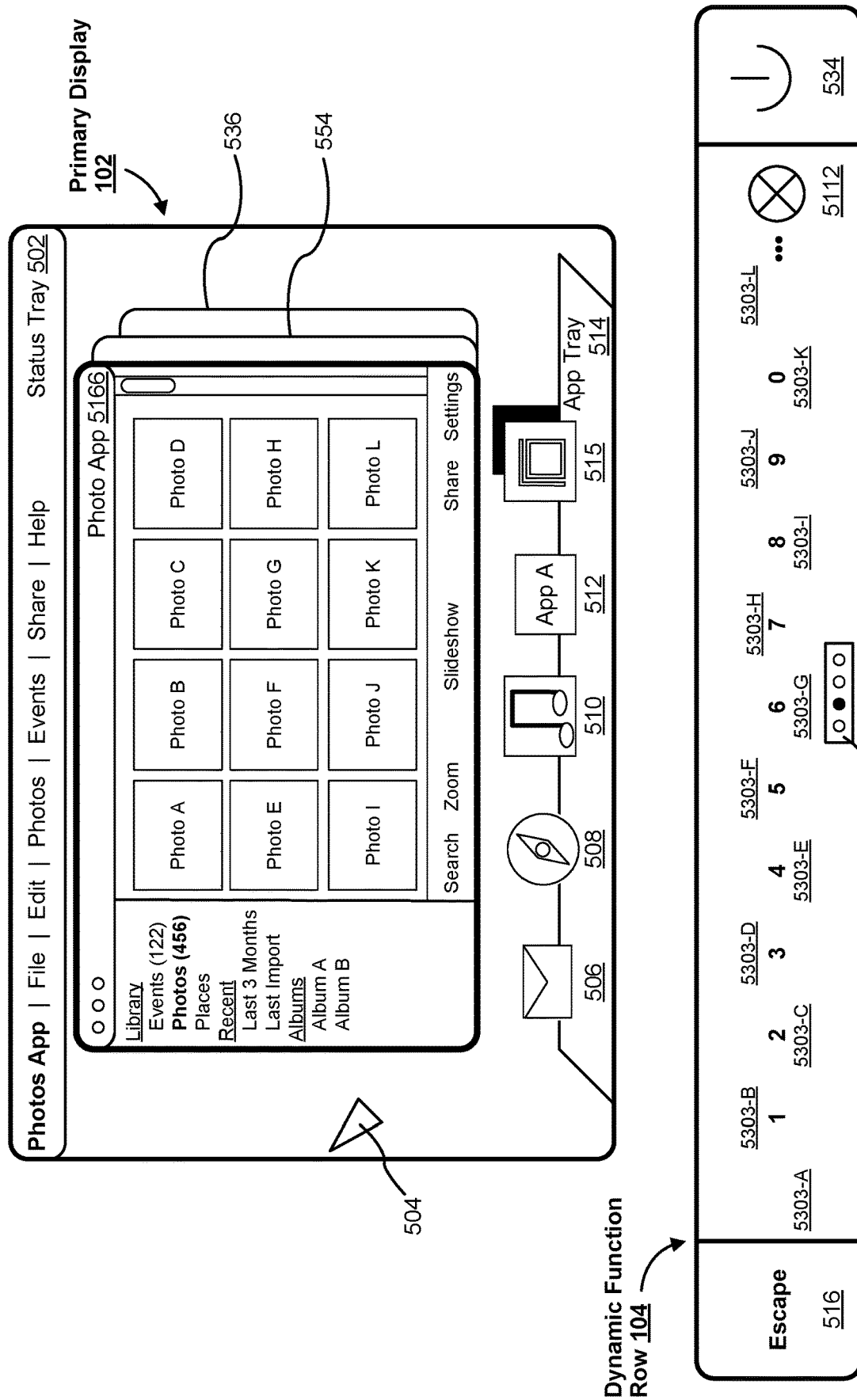
Figure 5AAA

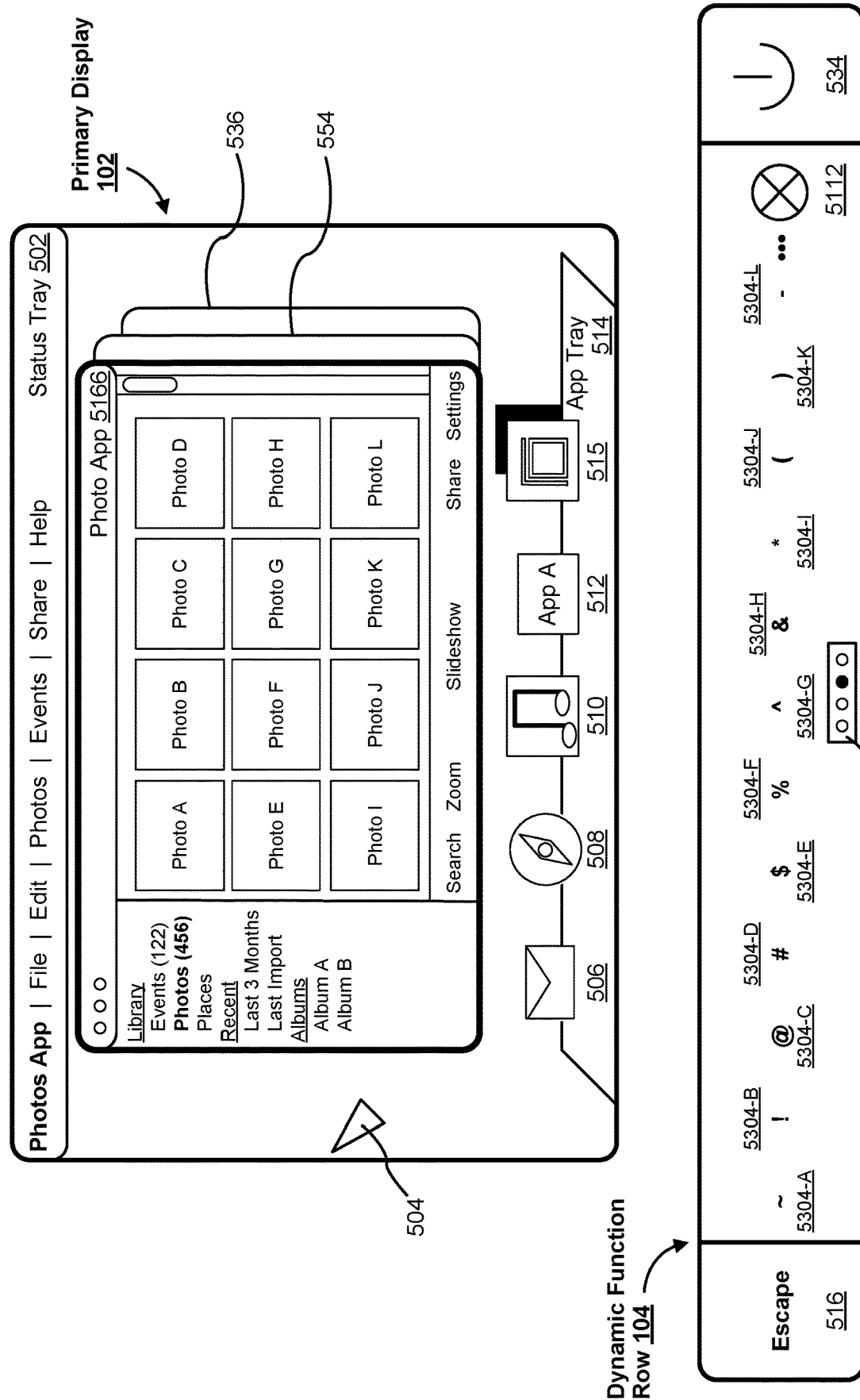

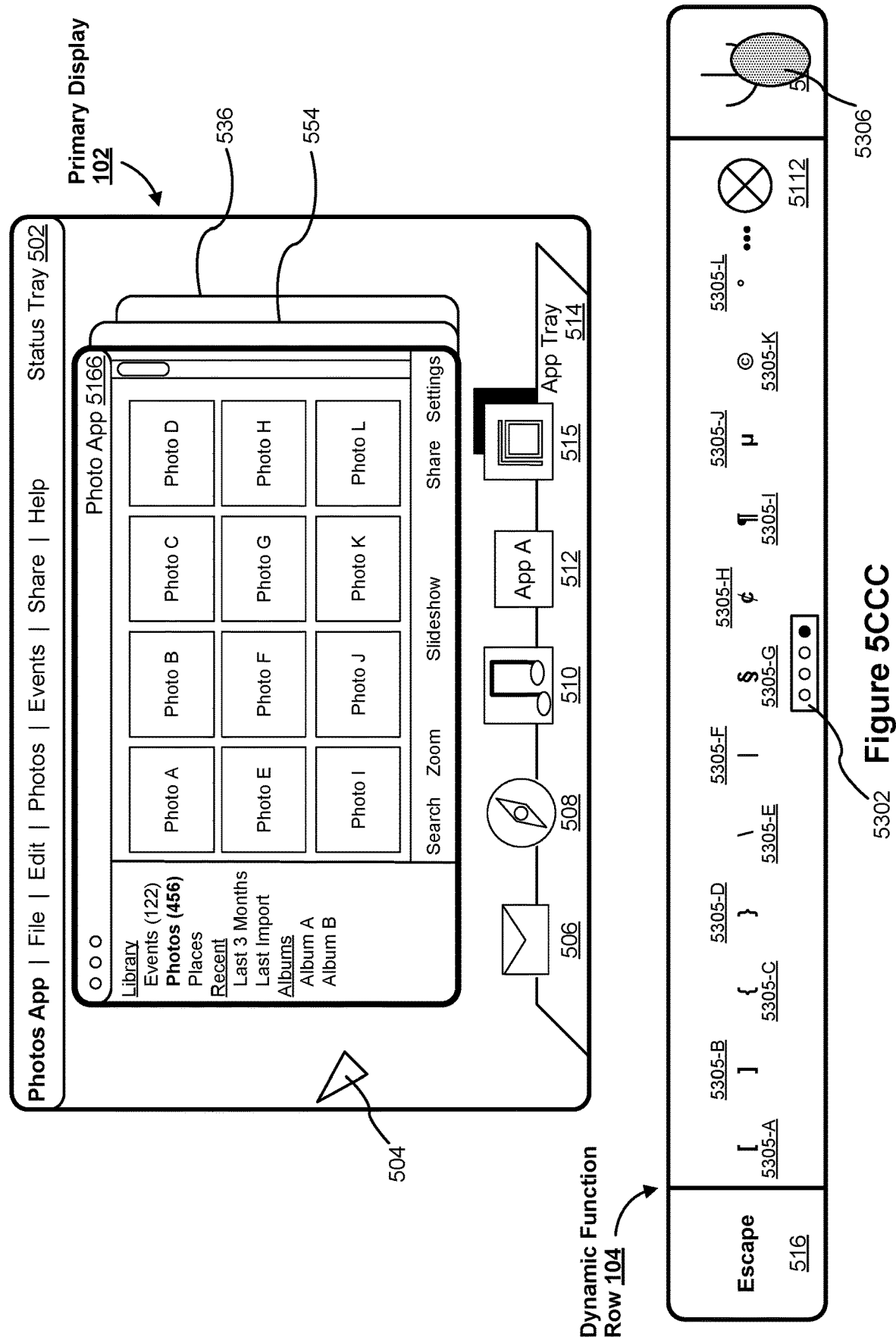

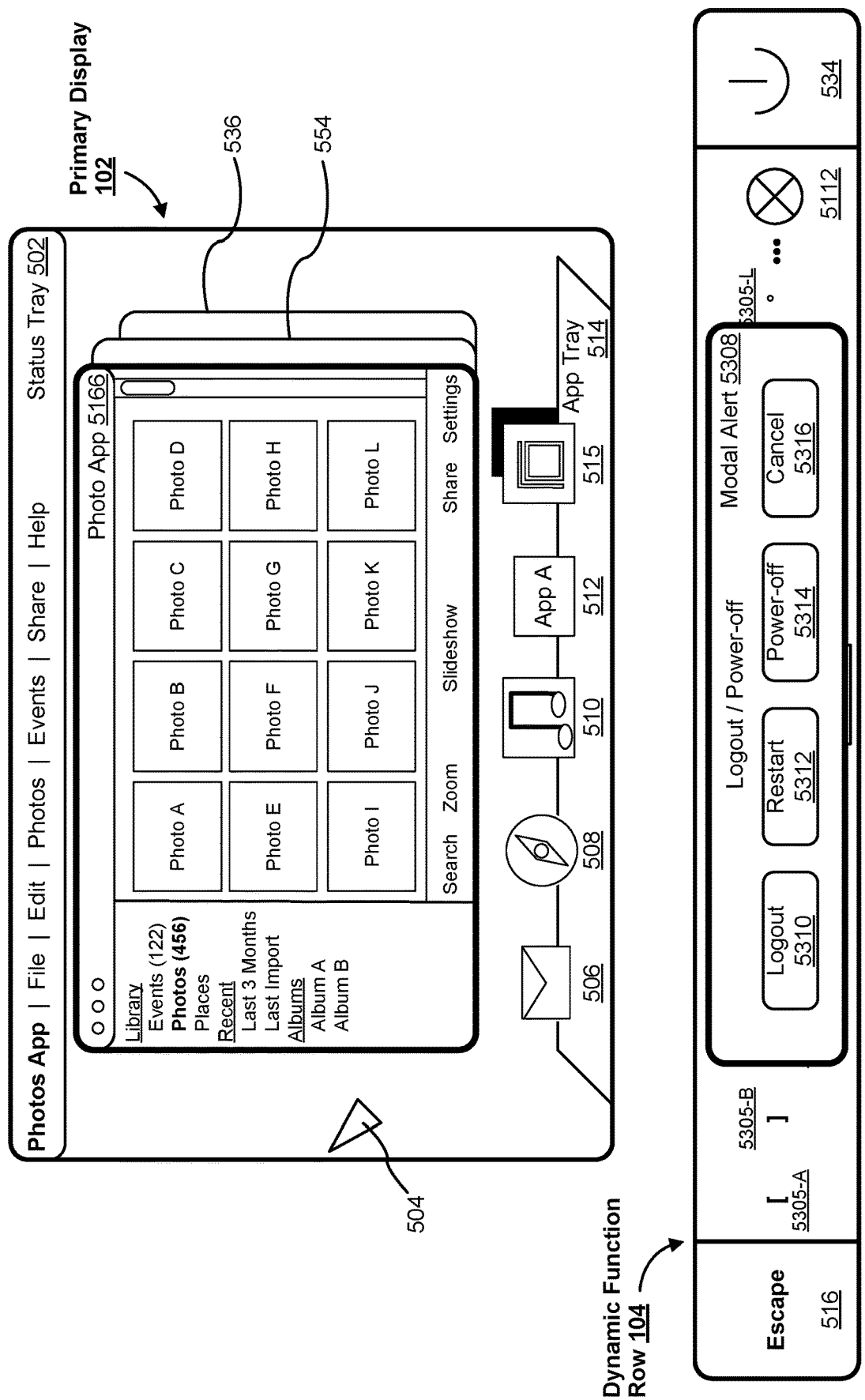
Figure 5DDD

600

```
┌─────────────────────────────────────────────────────────────────────┐
│ At a computing system comprising a processor, a primary display, memory, │─602
│ and a housing at least partially containing a physical input mechanism and a │
│ touch screen display adjacent to the input physical mechanism:      │
│                                                                     │
│     Display a first user interface on the primary display, the first user │
│ interface comprising one or more user interface elements            │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│  │ The computing system further comprises:                       │──604
│  │     (i) A primary computing device comprising the primary display, the │
│  │ processor, the memory, and primary computing device communication │
│  │ circuitry; and                                                │
│  │                                                               │
│  │     (ii) A input device comprising the housing, the touch screen │
│  │ display, the physical input mechanism, and input device communication │
│  │ circuitry for communicating with the primary computing device │
│  │ communication circuitry, where the input device is distinct and separate │
│  │ from the primary computing device                             │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│  │ The physical input mechanism comprises a plurality of physical keys │──606
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│  │         The physical input mechanism comprises a touch pad     │──608
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────────────┘
                                   │
                                   ▼
┌─────────────────────────────────────────────────────────────────────┐
│ Identify an active user interface element among the one or more user interface │──610
│         elements that is in focus on the primary display            │
└─────────────────────────────────────────────────────────────────────┘
                                   │
                                   ▼
┌─────────────────────────────────────────────────────────────────────┐
│ Determine whether the active user interface element that is in focus on the │──612
│  primary display is associated with an application executed by the computing │
│                                system                               │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│  │ The application is executed by the processor in the foreground of the first │──614
│  │                         user interface                        │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────────────┘
                  │                              │
                  ▼                              ▼
                 (A)                            (B)
```

Figure 6A

In accordance with a determination that the swipe gesture was performed in a second direction substantially perpendicular to the first direction, display a third set of one or more affordances corresponding to the application on the touch screen display, where the third set of one or more affordances is distinct from the second set of one or more affordances, and where the third set of one or more affordances corresponds to a second portion of the application that is distinct from the first portion of the application ⎯714

The second portion is displayed on the primary display in a compact view within the first user interface prior to detecting the swipe gesture, and ⎯716

After detecting the swipe gesture, the portion is displayed on the primary display in an expanded view within the first user interface in accordance with the determination that the swipe gesture was performed in the second direction substantially perpendicular to the first direction The first portion is one of a menu, tab, folder, tool set, or toolbar of the application, and ⎯718

The second portion is one of a menu, tab, folder, tool set, or toolbar of the application

After displaying the third set of one or more affordances on the touch screen display: ⎯720

Detect a user input selecting the first portion on the first user interface; and In response to detecting the user input:

Cease to display the third set of one or more affordances on the touch screen display, where the third set of one or more affordances corresponds to the second portion of the application; and Display the second set of one or more affordances, where the second set of one or more affordances corresponds to the first portion of the application

802 — At a computing system comprising a processor, a primary display, memory, and a housing at least partially containing a physical input mechanism and a touch screen display adjacent to the input physical mechanism:

Display, on the primary display in a normal mode, a first user interface for an application executed by the computing system, the first user interface comprising at least a first set of one or more affordances associated with the application

↓

804 — Detect a user input for displaying at least a portion of the first user interface for the application in a full-screen mode on the primary display

806 — The user input for displaying at least the portion of the first user interface for the application in full-screen mode on the primary display is at least one of a touch input detected on the touch screen display and a control selected within the first user interface on the primary display

↓

808 — In response to detecting the user input:

Cease to display the first set of one or more affordances associated with the application in the first user interface on the primary display;

Display, on the primary display in the full-screen mode, the portion of the first user interface for the application; and Automatically, without human intervention, display, on the touch screen display, a second set of one or more affordances for controlling the application, where the second set of one or more affordances correspond to the first set of one or more affordances

810 — The second set of one or more affordances is the first set of one or more affordances

812 — The second set of one or more affordances include controls corresponding to the full-screen mode

814 — The second set of one or more affordances includes at least one system-level affordance corresponding to at least one system-level functionality

SYSTEMS, DEVICES, AND METHODS FOR DYNAMICALLY PROVIDING USER INTERFACE CONTROLS AT A TOUCH-SENSITIVE SECONDARY DISPLAY

RELATED APPLICATIONS

This application is a continuation of U.S. patent application Ser. No. 15/113,779, filed Jul. 22, 2016, which is a national phase entry of International Application No. PCT/US15/12694, filed Jan. 23, 2015, which claims priority to U.S. Provisional Application Ser. No. 62/104,023, filed Jan. 15, 2015, and to U.S. Provisional Application Ser. No. 61/930,663, filed Jan. 23, 2014, each of which is hereby incorporated by reference in its entirety.

TECHNICAL FIELD

The disclosed embodiments relate to keyboards and, more specifically, to improved techniques for receiving input via a dynamic input and output (I/O) device.

BACKGROUND

Conventional keyboards include any number of physical keys for inputting information (e.g., characters) into the computing device. Typically, the user presses or otherwise movably actuates a key to provide input corresponding to the key. In addition to providing inputs for characters, a keyboard may include movably actuated keys related to function inputs. For example, a keyboard may include an "escape" or "esc" key to allow a user to activate an escape or exit function. In many keyboards, a set of functions keys for function inputs are located in a "function row." Typically, a set of keys for alphanumeric characters is located in a part of the keyboard that is closest to the user and a function row is located is a part of the keyboard that is further away from the user but adjacent to the alphanumeric characters. A keyboard may also include function keys that are not part of the aforementioned function row.

With the advent and popularity of portable computing devices, such as laptop computers, the area consumed by the dedicated keyboard may be limited by the corresponding size of a display. Compared with a peripheral keyboard for a desktop computer, a dedicated keyboard that is a component of a portable computing device may have fewer keys, smaller keys, or keys that are closer together to allow for a smaller overall size of the portable computing device.

Conventional dedicated keyboards are static and fixed in time regardless of the changes on a display. Furthermore, the functions of software application displayed on a screen are typically accessed via toolbars and menus that a user interacts with by using a mouse. This periodically requires the user to switch modes and move the location of his/her hands between keyboard and mouse. Alternatively, the application's functions are accessed via complicated key combinations that require memory and practice. As such, it is desirable to provide an I/O device and method that addresses the shortcomings of conventional systems.

SUMMARY

The embodiments described herein address the above shortcomings by providing dynamic and space efficient I/O devices and methods. Such devices and methods optionally complement or replace conventional input devices and methods. Such devices and methods also reduce the amount of mode switching (e.g., moving one's hands between keyboard and mouse, and also moving one's eyes from keyboard to display) required of a user and produce a more efficient human-machine interface.

In accordance with some embodiments, a method of updating a dynamic input and output device is performed at a computing system comprising a processor, a primary display, memory, and a housing at least partially containing a physical input mechanism and a touch screen display adjacent to the physical input mechanism (e.g., portable computing system 100, FIG. 1A-1B). In some embodiments, the housing is separate and distinct from the primary display (e.g., desktop computing system 200, FIGS. 2A-2C). In other embodiments, the housing is separate and distinct from the processor, the primary display, and the memory (e.g., desktop computing system 200, FIGS. 2A-2C). In some embodiments, the method includes: displaying a first user interface on the primary display, the first user interface comprising one or more user interface elements; identifying an active user interface element among the one or more user interface elements that is in focus on the primary display; and determining whether the active user interface element that is in focus on the primary display is associated with an application executed by the computing system. In accordance with a determination that the active user interface element that is in focus on the primary display is associated with the application executed by the computing system, the method includes displaying a second user interface on the touch screen display, including: (A) a first set of one or more affordances corresponding to the application; and (B) at least one system-level affordance corresponding to at least one system-level functionality.

Some embodiments provide a different method including: displaying, on the primary display, a first user interface for an application executed by the computing system; displaying, on the touch screen display, a second user interface, the second user interface comprising a first set of one or more affordances corresponding to the application, where the first set of one or more affordances corresponds to a first portion of the application; and detecting a swipe gesture on the touch screen display. In accordance with a determination that the swipe gesture was performed in a first direction, the method includes displaying a second set of one or more affordances corresponding to the application on the touch screen display, where at least one affordance in the second set of one or more affordances is distinct from the first set of one or more affordances, and where the second set of one or more affordances also corresponds to the first portion of the application. In accordance with a determination that the swipe gesture was performed in a second direction substantially perpendicular to the first direction, the method includes displaying a third set of one or more affordances corresponding to the application on the touch screen display, where the third set of one or more affordances is distinct from the second set of one or more affordances, and where the third set of one or more affordances corresponds to a second portion of the application that is distinct from the first portion of the application. An examples of a different portions of the first user interface include the menu of file controls 5288 associated with the photo application in FIG. 5XX and the menu of edit controls 5296 associated with the photo application in FIG. 5YY.

Other embodiments provide a different method including: displaying, on the primary display in a normal mode (i.e., non-full-screen mode), a first user interface for the application executed by the computing system, the first user interface comprising a first set of one or more affordances associated with the application; and detecting a user input for displaying at least a portion of the first user interface for the application in a full-screen mode on the primary display. In response to detecting the user input, the method includes: ceasing to display the first set of one or more affordances associated with the application in the first user interface on the primary display; displaying, on the primary display in the full-screen mode, the portion of the first user interface for the application; and automatically, without human intervention, displaying, on the touch screen display, a second set of one or more affordances for controlling the application, where the second set of one or more affordances correspond to the first set of one or more affordances.

In some embodiments, the method includes: displaying, on the primary display, a first user interface for an application executed by the computing system; displaying, on the touch screen display, a second user interface, the second user interface comprising a set of one or more affordances corresponding to the application; and detecting a notification. In response to detecting the notification, the method includes concurrently displaying, in the second user interface, the set of one or more affordances corresponding to the application and at least a portion of the detected notification on the touch screen display, where the detected notification is not displayed on the primary display.

In other embodiments, the method includes: displaying, on the primary display, a user interface, the user interface comprising one or more user interface elements; identifying an active user interface element of the one or more user interface elements that is in focus on the primary display, where the active user interface element is associated with an application executed by the computing system; in response to identifying the active user interface element that is in focus on the primary display, displaying, on the touch screen display, a set of one or more affordances corresponding to the application; and detecting a user input to move a respective portion of the user interface. In response to detecting the user input, and in accordance with a determination that the user input satisfies predefined action criteria, the method includes: ceasing to display the respective portion of the user interface on the primary display; ceasing to display at least a subset of the set of one or more affordances on the touch screen display; and displaying, on the touch screen display, a representation of the respective portion of the user interface.

In accordance with some embodiments, an electronic device is provided that includes a primary display unit (e.g., primary display 102, FIGS. 1A and 2A-2D) configured to display information, a physical input unit configured to receive user inputs, a touch screen display unit (e.g., dynamic function row 104, FIGS. 1A-1B and 2A-2D) configured to display information, a touch-sensitive surface unit configured to receive user touch inputs on the touch screen display unit, and a processing unit coupled to the primary display unit, the physical input unit, the touch screen display unit, and the touch-sensitive surface unit. The processing unit is configured to: cause display of a first user interface on the primary display unit, the first user interface comprising one or more user interface elements; identify an active user interface element among the one or more user interface elements that is in focus on the primary display unit; and determine whether the active user interface element that is in focus on the primary display unit is associated with an application executed by the processing unit. In accordance with a determination that the active user interface element that is in focus on the primary display is associated with the application executed by the computing system, the processing unit is configured to cause display of a second user interface on the touch screen display unit, including: (A) a first set of one or more affordances corresponding to the application; and (B) at least one system-level affordance corresponding to at least one system-level functionality.

Some embodiments provide a processing unit configured to: cause display of a first user interface on the primary display unit for an application executed by the processing unit; cause display of a second user interface on the touch screen display unit, the second user interface comprising a first set of one or more affordances corresponding to the application, where the first set of one or more affordances corresponds to a first portion of the application; and detecting a swipe gesture on the touch-sensitive surface unit. In accordance with a determination that the swipe gesture was performed in a first direction, the processing unit is configured to cause display of a second set of one or more affordances corresponding to the application on the touch screen display unit, where at least one affordance in the second set of one or more affordances is distinct from the first set of one or more affordances, and where the second set of one or more affordances also corresponds to the first portion of the application. In accordance with a determination that the swipe gesture was performed in a second direction substantially perpendicular to the first direction, the processing unit is configured to cause display of a third set of one or more affordances corresponding to the application on the touch screen display unit, where the third set of one or more affordances is distinct from the second set of one or more affordances, and where the third set of one or more affordances corresponds to a second portion of the application that is distinct from the first portion of the application.

Other embodiments provide a processing unit configured to: cause display of a first user interface for the application executed by the processing unit on the primary display unit in a normal mode, the first user interface comprising a first set of one or more affordances associated with the application; and detect a user input for displaying at least a portion of the first user interface for the application in a full-screen mode on the primary display unit. In response to detecting the user input, the processing unit is configured to: cease to display the first set of one or more of affordances associated with the application in the first user interface on the primary display unit; cause display of the portion of the first user interface for the application in the full-screen mode on the primary display unit; and automatically, without human intervention, cause display of a second set of one or more affordances for controlling the application on the touch screen display unit, where the second set of one or more affordances correspond to the first set of one or more affordances.

In some embodiments, the processing unit is configured to: cause display of a first user interface, on the primary display unit, for an application executed by the processing unit; cause display of a second user interface, on the touch screen display unit, the second user interface comprising a set of one or more affordances corresponding to the application; and detect a notification. In response to detecting the notification, the processing unit is configured to cause concurrent display of, in the second user interface on the touch screen display unit, the set of one or more affordances corresponding to the application and at least a portion of the detected notification, where the detected notification is not displayed on the primary display unit.

In other embodiments, the processing unit is configured to: cause display of a user interface, on the primary display unit, the user interface comprising one or more user interface elements; identify an active user interface element of the one or more user interface elements that is in focus on the primary display unit, where the active user interface element is associated with an application executed by the computing system; in response to identifying the active user interface element that is in focus on the primary display, cause display of a set of one or more affordances corresponding to the application on the touch screen display unit; and detect a user input to move a respective portion of the user interface. In response to detecting the user input, and in accordance with a determination that the user input satisfies predefined action criteria, the processing unit is configured to: cease to display the respective portion of the user interface on the primary display unit; cease to display at least a subset of the set of one or more affordances on the touch screen display unit; and cause display of a representation of the respective portion of the user interface on the touch screen display unit.

In accordance with some embodiments, a computing system includes a processor, a primary display, memory storing one or more programs, and a housing at least partially containing a physical input mechanism and a touch screen display adjacent to the physical input mechanism; the one or more programs are configured to be executed by the processor and include instructions for performing or causing performance of the operations of any of the methods described herein. In accordance with some embodiments, a non-transitory computer readable storage medium has stored therein instructions which when executed by a processor of a computing system with a primary display and a housing at least partially containing a physical input mechanism and a touch screen display adjacent to the physical input mechanism; cause the computing system to perform or cause performance of the operations of any of the methods referred described herein. In accordance with some embodiments, a graphical user interface on a computing system that includes a processor, a primary display, memory storing one or more programs, and a housing at least partially containing a physical input mechanism and a touch screen display adjacent to the physical input mechanism; the one or more programs are configured to be executed by the processor and include instructions for displaying or causing display of one or more of the elements displayed in any of the methods described above, which are updated in response to user inputs, as described in any of the methods described herein. In accordance with some embodiments, a computing system includes: a primary display; a housing at least partially containing a physical input mechanism and a touch screen display adjacent to the physical input mechanism; and means for performing or causing performance of the operations of any of the methods described herein. In accordance with some embodiments, an information processing apparatus, for use in a computing system with a primary display and a housing at least partially containing a physical input mechanism and a touch screen display adjacent to the physical input mechanism; includes means for performing or causing performance of the operations of any of the methods described herein.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures.

FIGS. 6A-6D are a flowchart of a method of updating a dynamic input and output device, in accordance with some embodiments.

FIGS. 7A-7C are a flowchart of a method of updating a dynamic input and output device, in accordance with some embodiments.

FIGS. 8A-8B are a flowchart of a method of maintaining functionality of an application while in full-screen mode, in accordance with some embodiments.

DESCRIPTION OF EMBODIMENTS

Figure 7A:
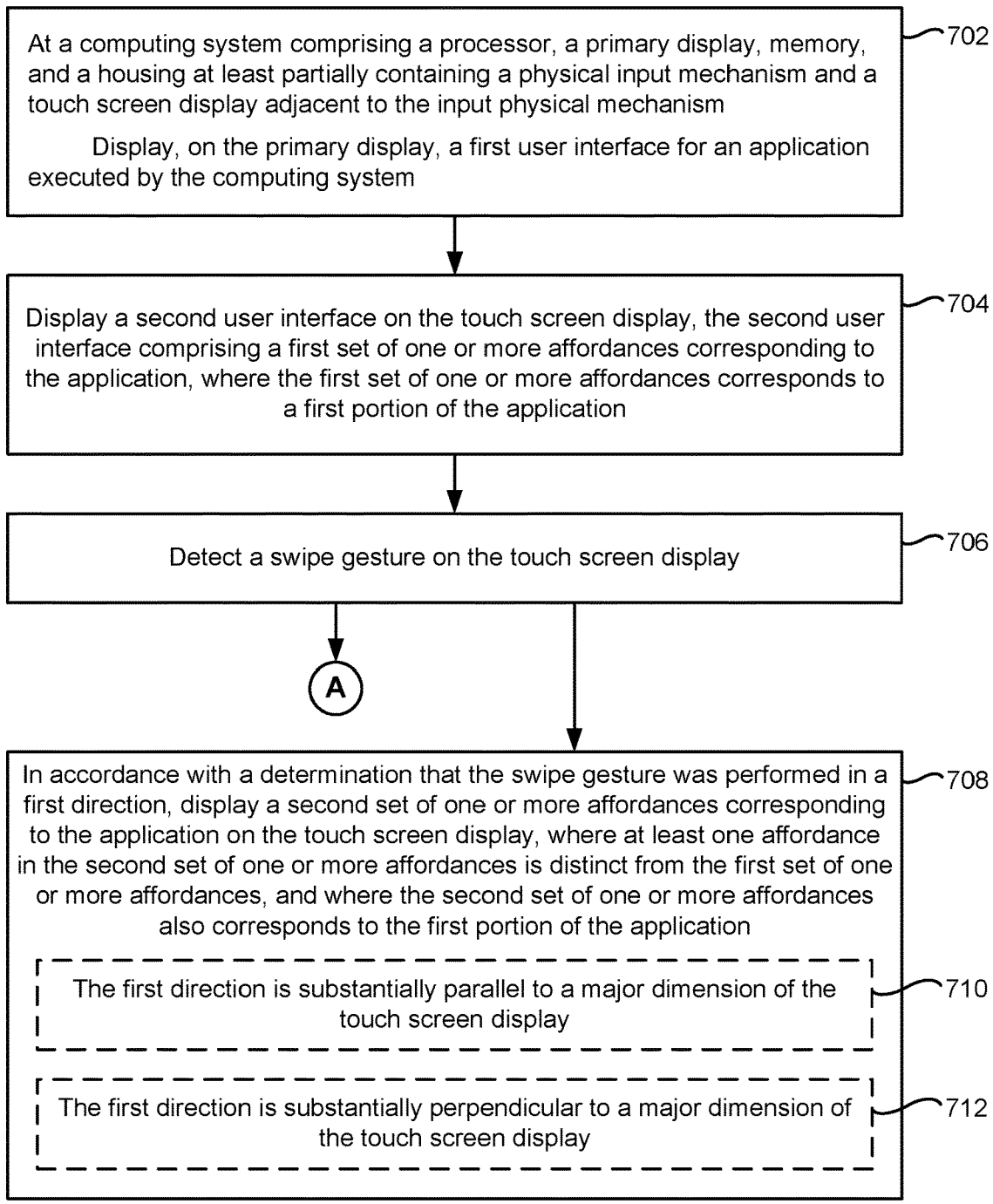
Figure 7C:
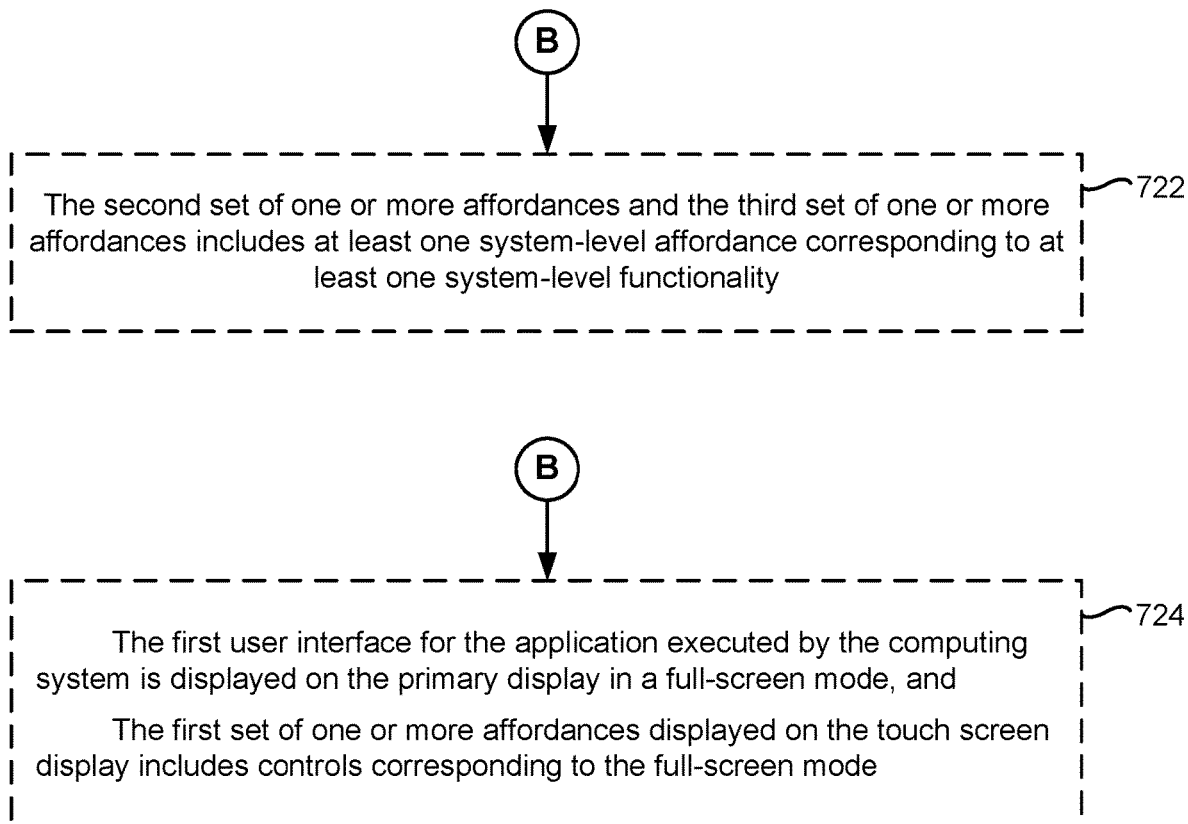
Figure 8B:
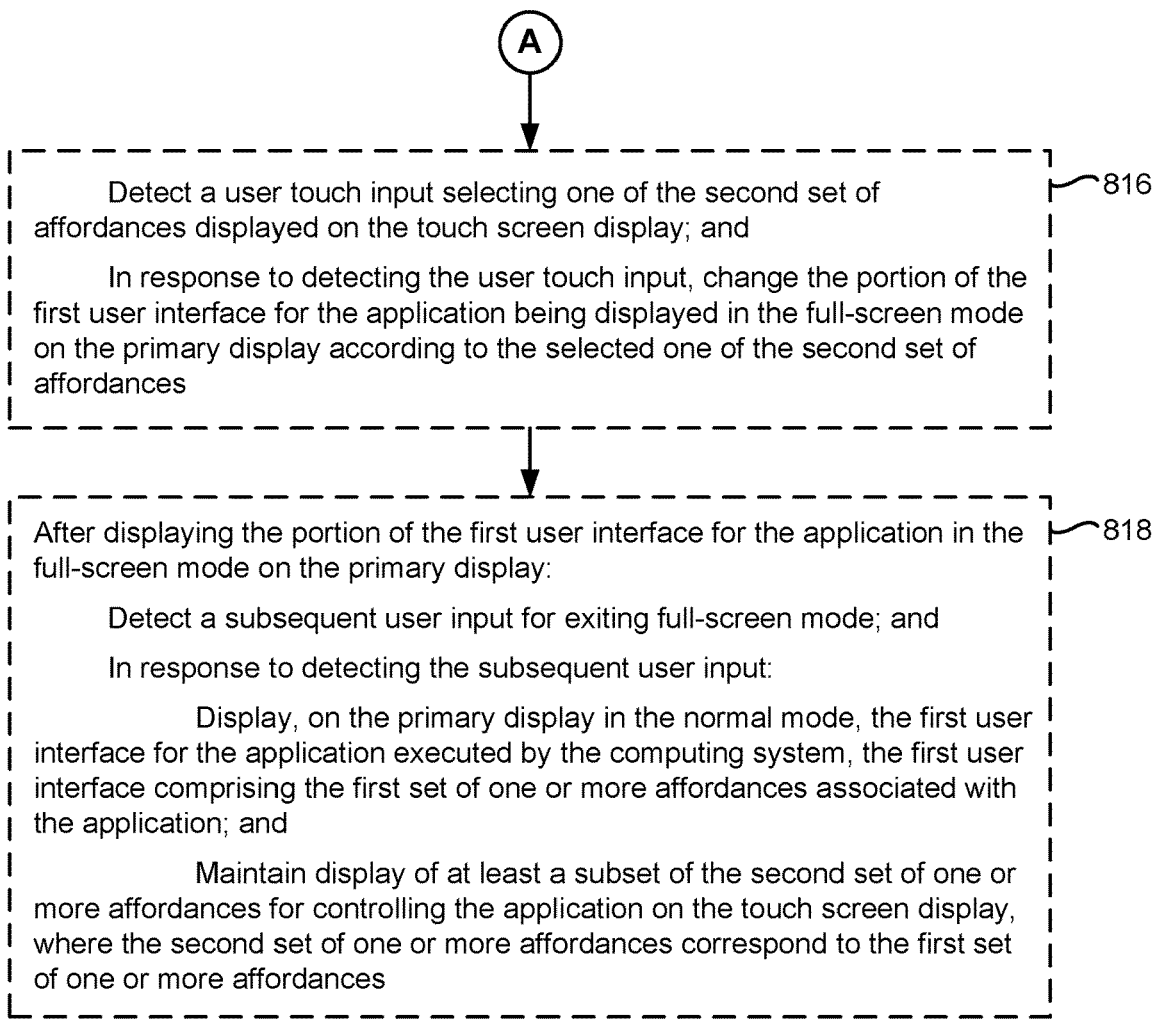
Figure 9A:
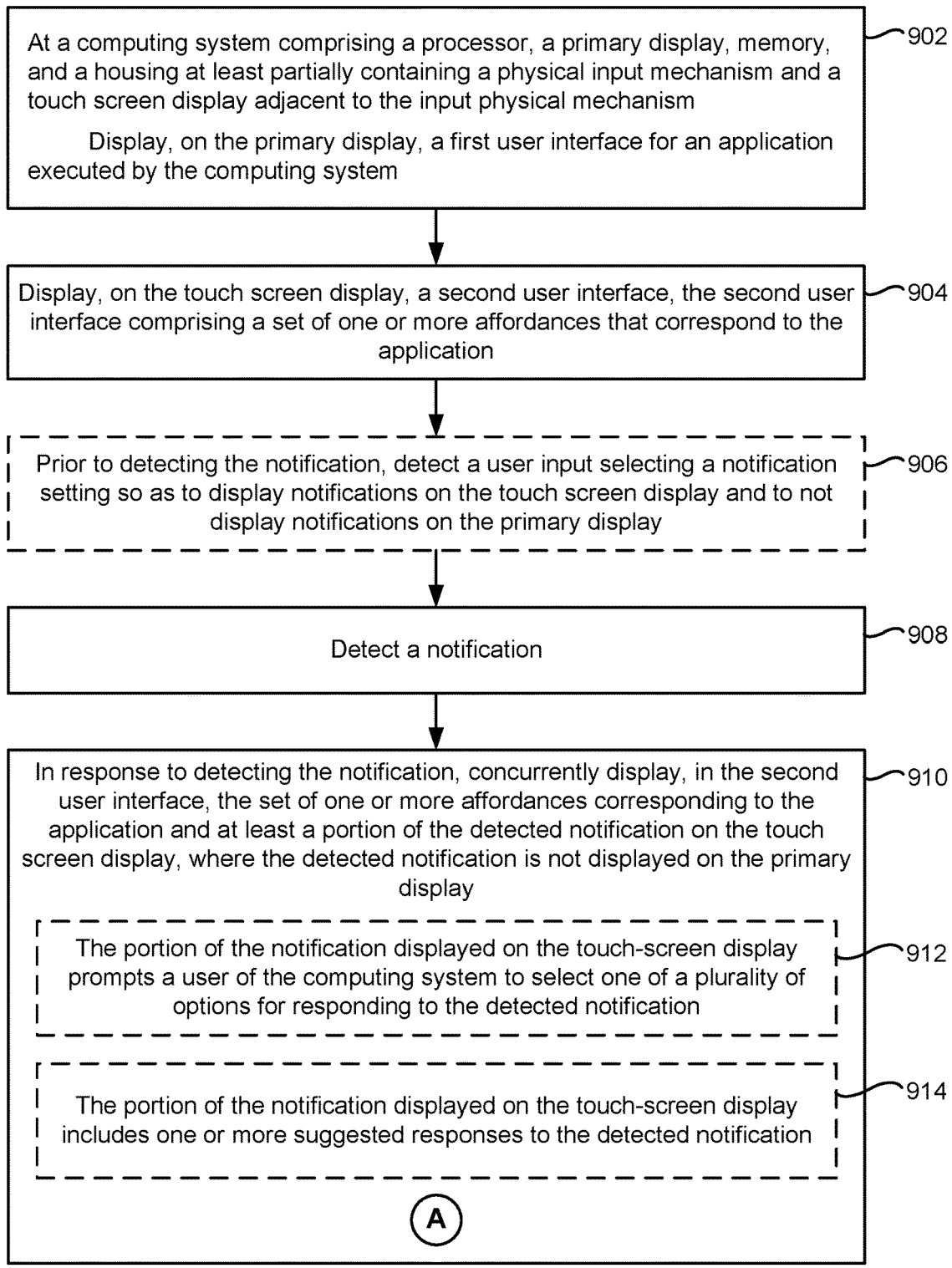
FIGS. 9A-9B are a flowchart of a method of displaying notifications on a touch screen display, in accordance with some embodiments.
Figure 9B:
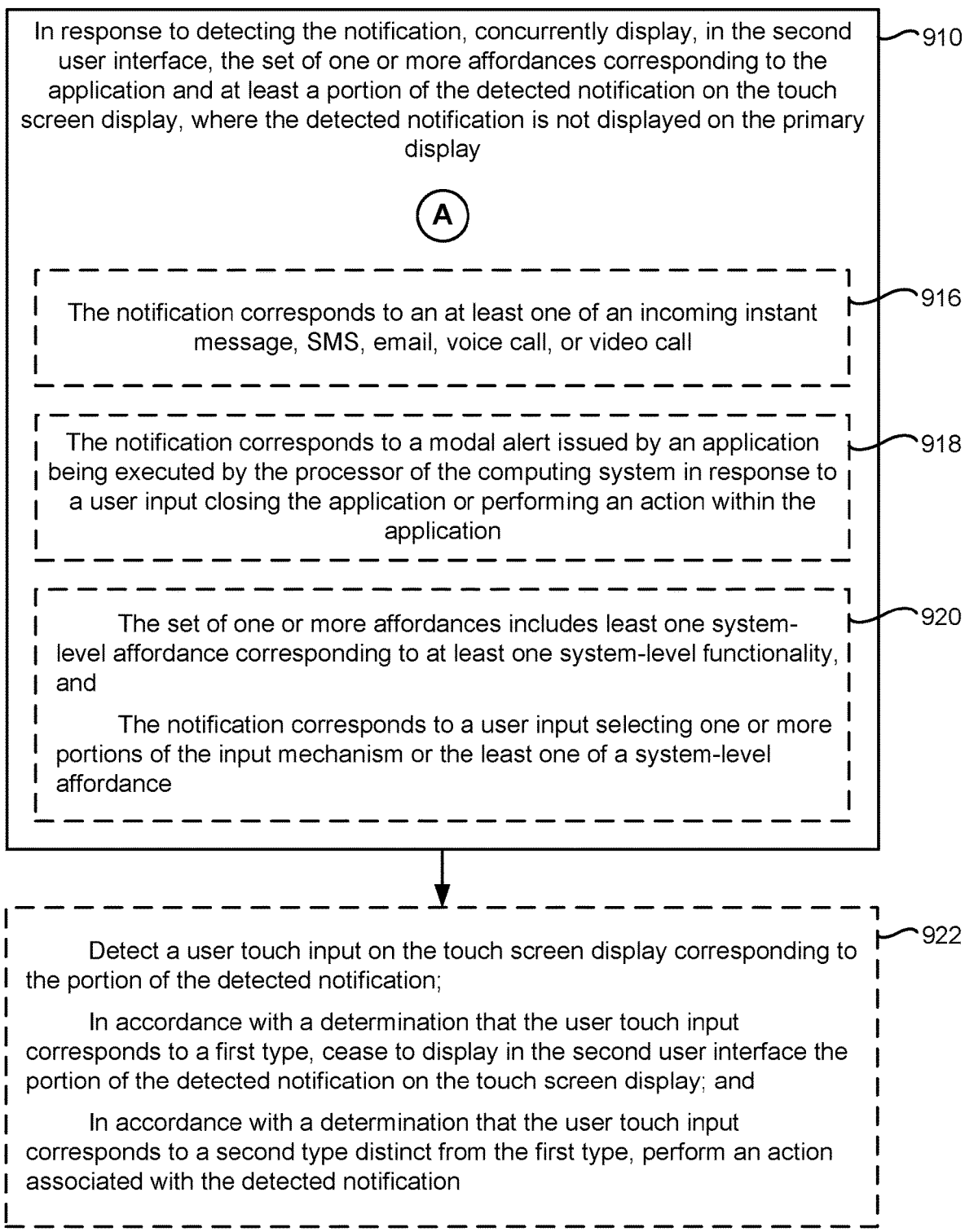
Figure 10A:
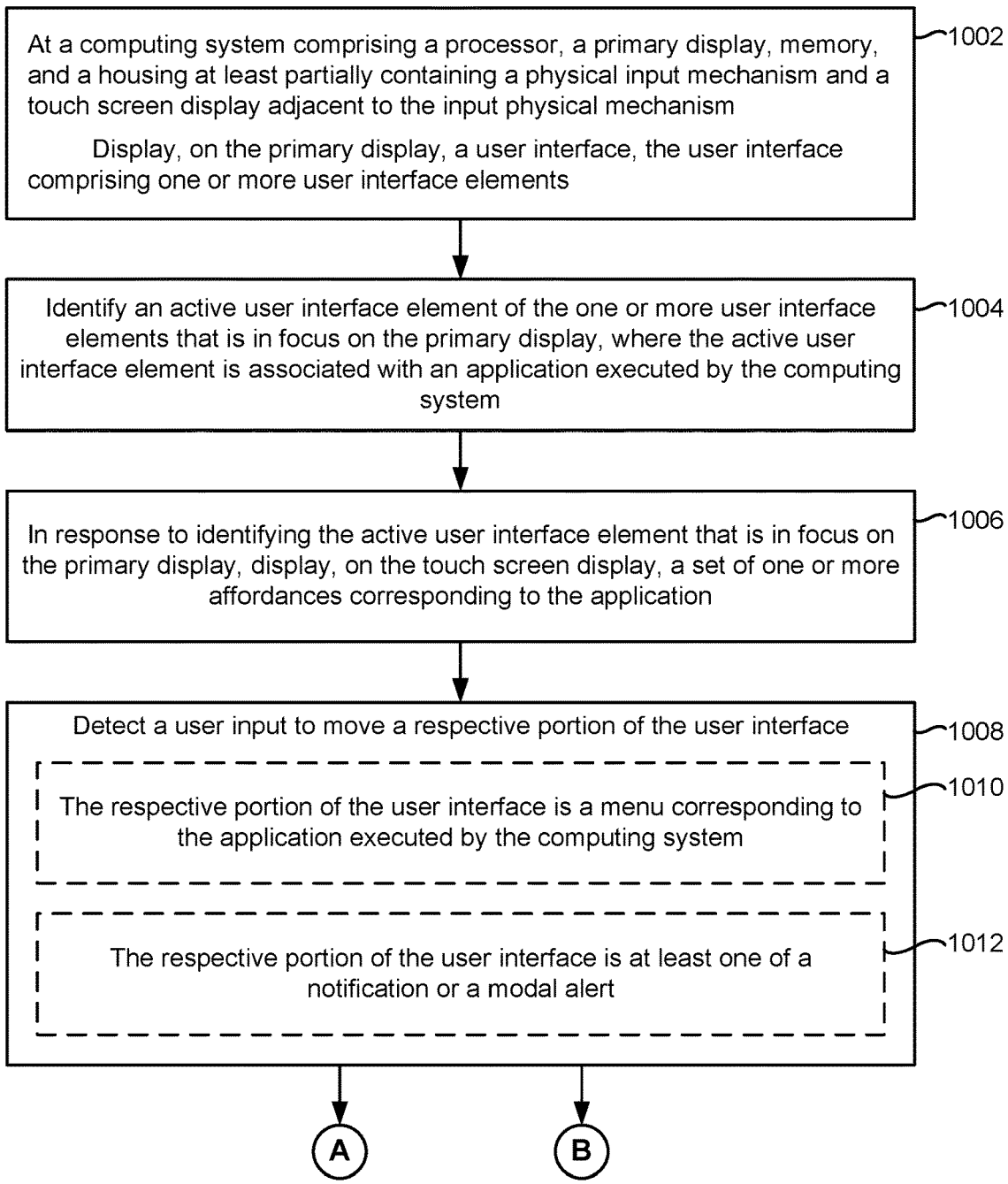
FIGS. 10A-10C are a flowchart of a method of moving user interface portions, in accordance with some embodiments.
Figure 10B:
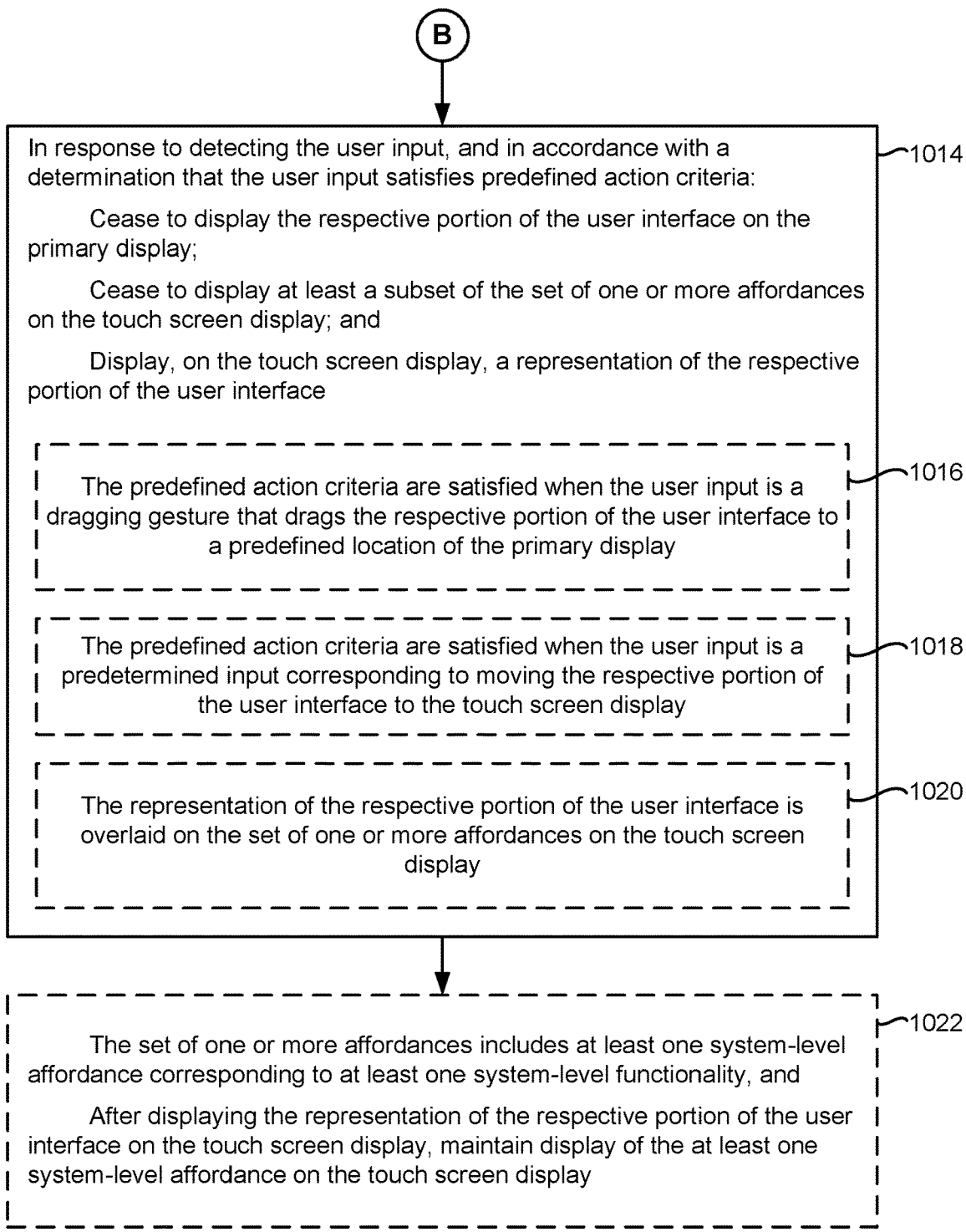
Figure 10C:
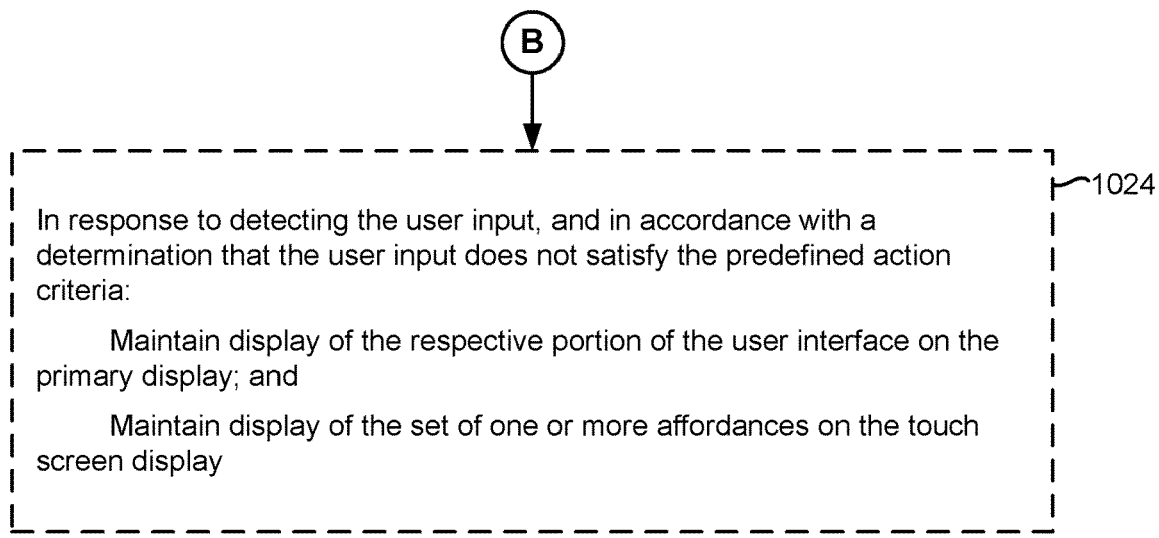

FIGS. 1A-1B, 2A-2D, 3A-3B, and 4 provide a description of example devices. FIGS. 5A-5DDD illustrate example user interfaces for updating a dynamic input and output device. FIGS. 6A-6D are a flowchart of a method 600 of updating a dynamic input and output device. FIGS. 7A-7C are a flowchart of a method 700 of updating a dynamic input and output device. FIGS. 8A-8B are a flowchart of a method 800 of maintaining functionality of an application while in full-screen mode. FIGS. 9A-9B are a flowchart of a method 900 of displaying notifications on a touch screen display. FIGS. 10A-10C are a flowchart of a method 1000 of moving user interface portions. The user interfaces in FIGS. 5A-5DDD are used to illustrate the methods and/or processes in FIGS. 6A-6D, 7A-7C, 8A-8B, 9A-9B, and 10A-10C.

Example Devices and Systems

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
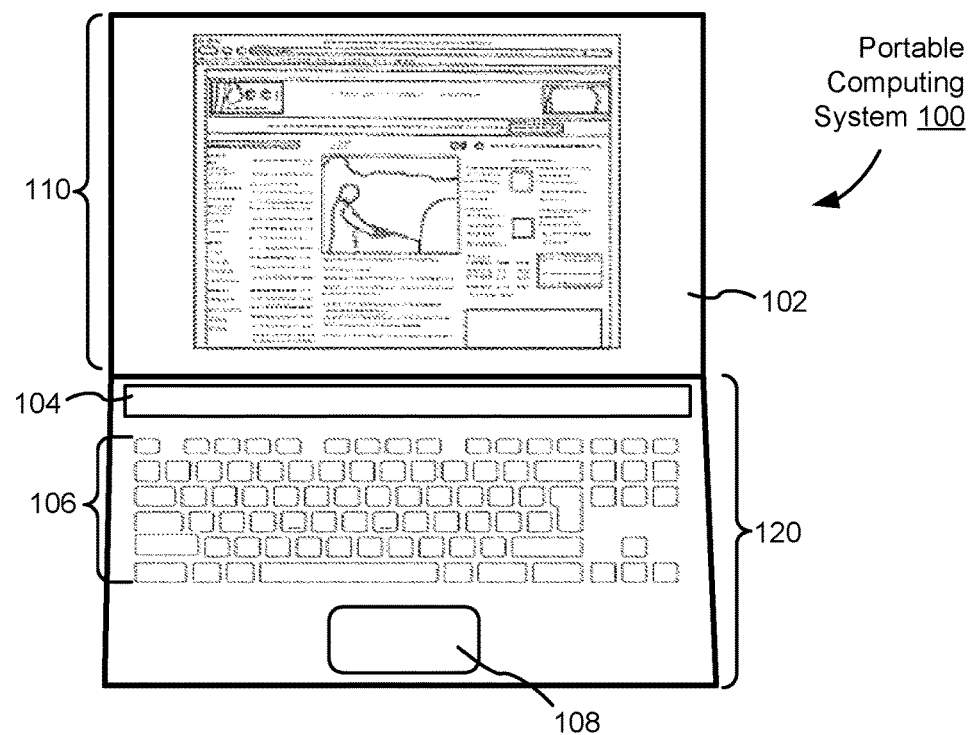
FIG. 1A is an illustrative diagram of a portable computing system (e.g., a laptop computer), in accordance with some embodiments.
Figure 1B:
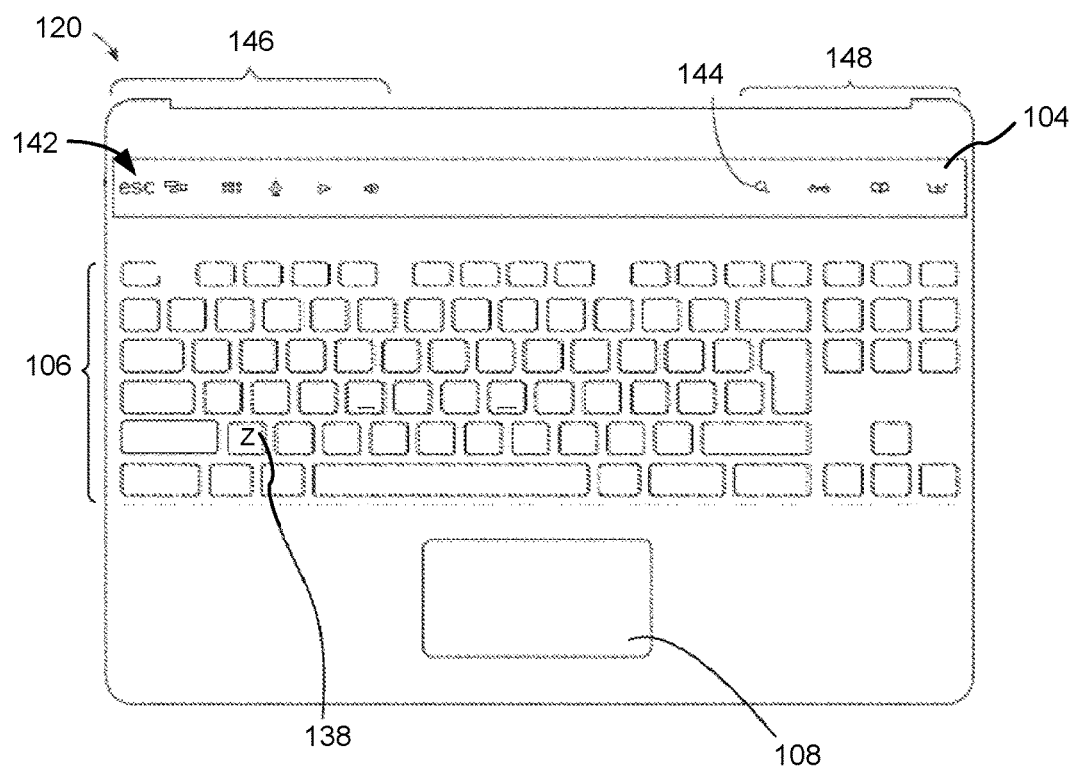
FIG. 1B is an illustrative diagram of a body portion of the portable computing system in FIG. 1A, in accordance with some embodiments.

FIG. 1A is an illustrative diagram of a portable computing system 100, in accordance with some embodiments. Portable computing system 100 may be, for example, a laptop computer, such as a MACBOOK® device, or any other portable computing device. Portable computing system 100 includes: (A) a display portion 110 with a primary display 102; and (B) a body portion 120 with a dynamic function row 104, a set of physical (i.e., movably actuated) keys 106, and a touch pad 108 partially contained within a same housing. Display portion 110 is typically mechanically, electrically, and communicatively coupled with body portion 120 of portable computing system 100. For example, portable computing system 100 may include a hinge, allowing display portion 110 to be rotated relative to body portion 120. Portable computing system 100 includes one or more processors and memory storing one or more programs for execution by the one or more processors to perform any of the embodiments described herein. In some embodiments, dynamic function row 104, which is described in more detail with reference to FIG. 1B, is a touch screen display using resistive sensing, acoustic sensing, capacitive sensing, optical sensing, infrared sensing, or the like to detect user touch inputs and selections. In some embodiments, primary display 102 of display portion 110 is also a touch screen display.

FIG. 1B is an illustrative diagram of body portion 120 of portable computing system 100 in accordance with some embodiments. Body portion 120 include a set of physical keys 106, a dynamic function row 104, and a touch pad 108 partially contained within a same housing. In some embodiments, dynamic function row 104, which is a touch screen, replaces a function row of the set of physical keys 106 allowing the space consumed by the set of physical keys 106 to be reduced, allowing for a smaller overall body portion 120 or allowing other portions, such as touch pad 108, to be larger. In some embodiments, dynamic function row 104 is approximately 18 inches in length relative to a major dimension of the set of physical keys 106. Although called a "row" for ease of explanation, in some other embodiments, the touch screen comprising dynamic function row 104 in FIG. 1A may take any other form such as a square, circle, a plurality of rows, column, a plurality of columns, a plurality of separate sectors, or the like. Although FIGS. 1A-1B show dynamic function row 104 replacing the function row of the set of physical keys 106, in some other embodiments, dynamic function row 104 may additionally and/or alternatively replace a numpad section, editing/function section, or the like of the set of physical keys 106.

Each physical key of the set of physical keys 106 has at least one associated input. The input may be a printable character, non-printable character, function, or other input. The input associated with a physical key may be shown by a letter, word, symbol, or other indicia shown (e.g., printed) on the surface of the key in Latin script, Arabic characters, Chinese characters, or any other script. For example, the particular physical key indicated at 138 is associated with alphabetic character "z" as indicated by the letter z shown on the key. In another example, a physical key labeled with the word "command" may be associated with a command function. For example, the set of physical keys 106 is associated with a QWERTY, Dvorak, or other keyboard layouts with alphanumeric, numeric, and/or editing/function sections (e.g., standard, extended, or compact) according to ISO/IEC 9995, ANSI-INCITS 154-1988, JIS X 6002-1980, or other similar standards.

A signal corresponding to an input associated with a physical key may be received by the processor of portable computing system 100 (or computing device 202 in FIGS. 2A-2D or peripheral keyboard 206 in FIGS. 2A-2B) when a key has been activated by a user. In an illustrative example, each key of the set of physical keys 106 includes two plates and a spring. A user may activate a key by pressing down on the key, which compresses the spring. When the spring is compressed, the two plates may come into contact, allowing electric current to flow through the connected plates. An input corresponding to the key may be provided to a processor in response to the flow of the current through the connected plates. For example, in response to activation of one of the set of keys 106 of peripheral keyboard 206 in FIG. 2C, an input corresponding to the activated key is provided to computing device 202. It will be recognized that other systems for movably actuated keys could be used.

In some embodiments, dynamic function row 104 is a touch screen display that displays one or more user-selectable symbols 142 (sometimes also herein called "user interface elements," "user interface components," "affordances," "buttons," or "soft keys"). For example, dynamic function row 104 replaces the function row keys on a typical keyboard. A user may select a particular one of the one or more user-selectable symbols 142 by touching a location on the touch screen display that corresponds to the particular one of the one or more user-selectable symbols 142. For example, a user may select the user-selectable symbol indicated by magnifying glass symbol 144 by tapping dynamic function row 104 such that the user's finger contacts dynamic function row 104 at the position of the magnifying glass indicator 214. In some embodiments, a tap contact or a tap gesture includes touch-down of a contact and lift-off of the contact within a predetermined amount of time (e.g., 250 ms or the like). In some embodiments, the touch screen display of dynamic function row 104 is implemented using resistive sensing, acoustic sensing, capacitive sensing, optical sensing, infrared sensing, or the like to detect user inputs and selections.

When a user selects a particular one of the one or more user-selectable symbols 142, a signal corresponding to the particular one of the one or more user-selectable symbols 142 is generated by dynamic function row 104. For example, when a user taps "esc" on dynamic function row 104, dynamic function row 104 transmits a signal indicating a user input corresponding to an escape function to the processor of portable computing system 100 (or computing device 202 in FIGS. 2A-2D, or the processor of peripheral keyboard 206 in FIGS. 2A-2B, or the processor of first input mechanism 212, FIG. 2C or the processor of second input mechanism 222, FIG. 2D).

Figure 2A:
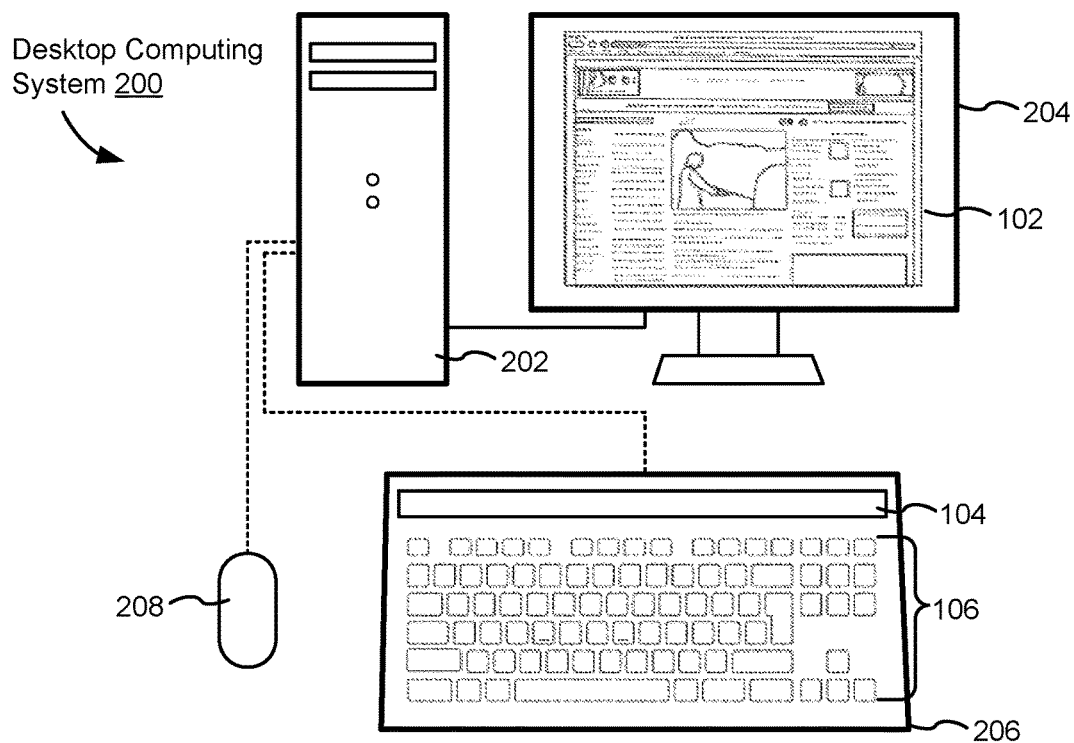
FIG. 2A is an illustrative diagram of a first implementation of a desktop computing system, in accordance with some embodiments.
Figure 2B:
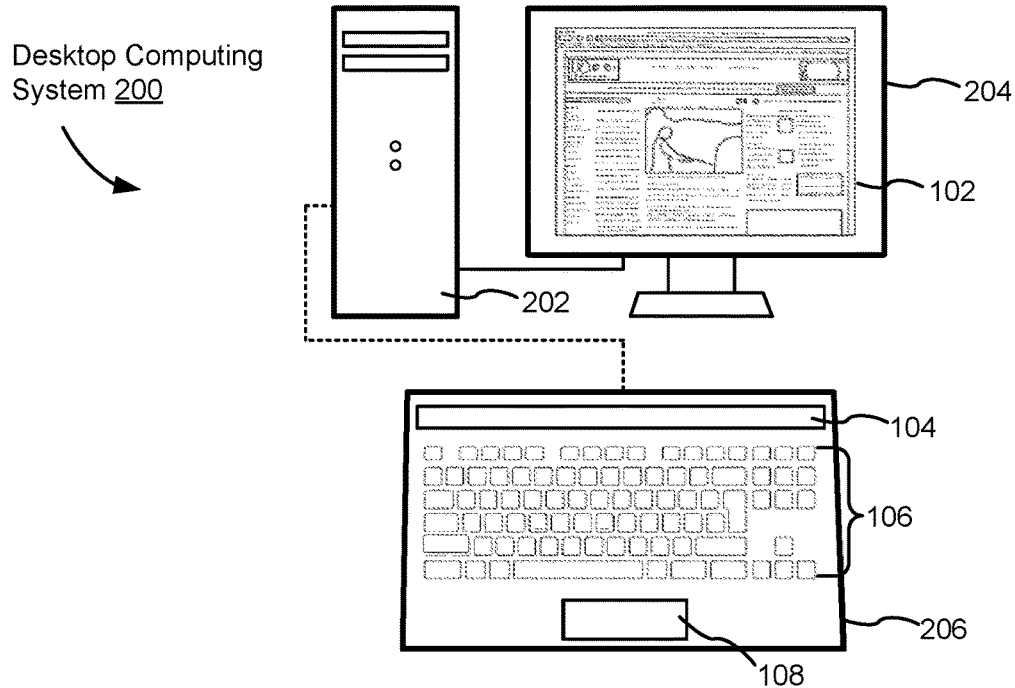
FIG. 2B is an illustrative diagram of a second implementation of a desktop computing system, in accordance with some embodiments.
Figure 2C:
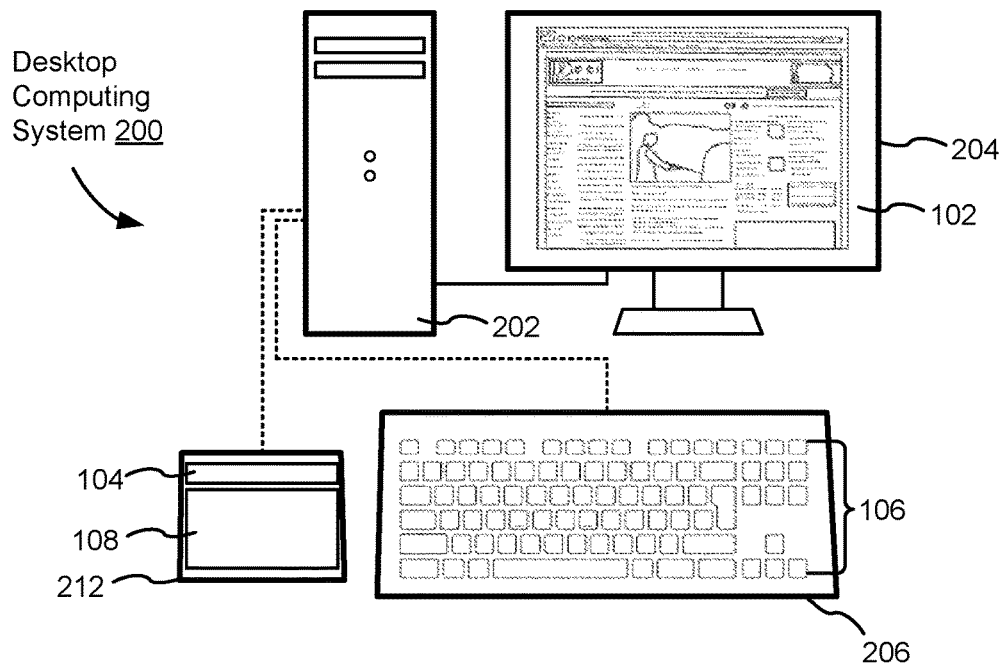
FIG. 2C is an illustrative diagram of a third implementation of a desktop computing system, in accordance with some embodiments.
Figure 2D:
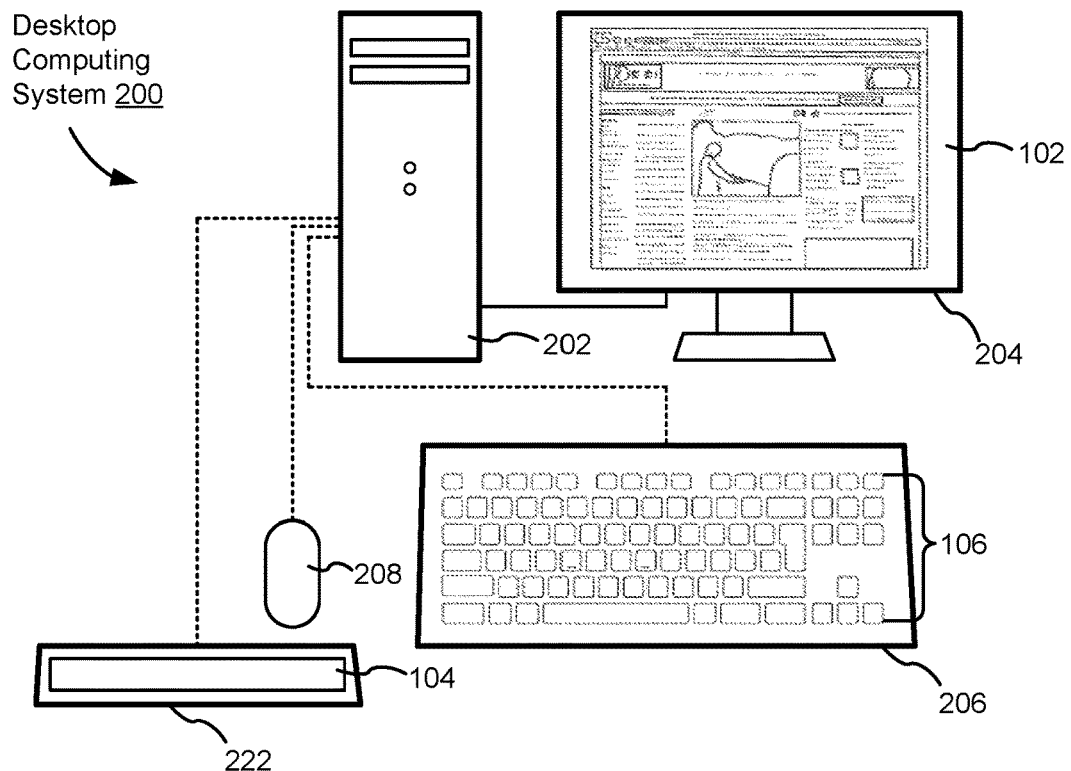
FIG. 2D is an illustrative diagram of a fourth implementation of a desktop computing system, in accordance with some embodiments.

In some embodiments, when a particular one of the one or more user-selectable symbols 142 is selected, dynamic function row 104 transmits a signal corresponding to a position on the touch screen display where the particular one of the one or more user-selectable symbols 142 is displayed, to the processor of portable computing system 100 (or computing device 202 in FIGS. 2A-2D, or the processor of peripheral keyboard 206 in FIGS. 2A-2B, or the processor of first input mechanism 212, FIG. 2C or the processor of second input mechanism 222, FIG. 2D). For example, dynamic function row 104 may transmit a signal including a position value (0 to 20) depending on the position on the touch screen display of the particular one of the one or more user-selectable symbols 142 that was selected. In the illustrative example of FIG. 1B, the "esc" symbol may have a position value of 0, magnifying glass symbol 144 may have a position value of 16, and so on. A processor of portable computing system 100 (or computing device 202 in FIGS. 2A-2D, or the processor of peripheral keyboard 206 in FIGS. 2A-2B, or the processor of first input mechanism 212, FIG. 2C, or the processor of second input mechanism 222, FIG. 2D) may receive the signal indicating the position value of the selected user-selectable symbol and interpret the position value using contextual information, such as an element of a graphical user interface displayed on primary display 102 of display portion 110 (or peripheral display device 204, FIGS. 2A-2D) that is currently active or that has focus.

Each of the one or more user-selectable symbols 142 may include an indicator, such as a symbol (e.g., a magnifying glass symbol as shown at 144), an abbreviated word (e.g., "esc"), an unabbreviated word, a character, an image, an animated image, a video, or the like. In some embodiments, a respective one of the one or more user-selectable symbols 142 is capable of receiving user input(s).

An input may be associated with each of the one or more user-selectable symbols 142. The input may be a function, character, numerical value, and the like. A respective one of the one or more user-selectable symbols 142 may include an indicator that corresponds to the input for the respective one of the one or more user-selectable symbols 142. For example, in FIG. 1B, the user-selectable symbol with the abbreviated word "esc" indicates to the user that an escape function is associated with the user-selectable symbol. A function associated with the one or more user-selectable symbols 142 may be activated when the user selects a user-selectable symbol. For example, an escape function may be activated when a user selects the user-selectable symbol with the indicator "esc." Activation of the function may have different effects depending on the current state of portable computing system 100 (or computing device 202 in FIGS. 2A-2D). For example, when a dialog box is open on primary display 102 of display portion 110 (or peripheral display device 204, FIGS. 2A-2D), activating an escape function on dynamic function row 104 may close the dialog box. In another example, when a game application is being executed by a processor of portable computing system 100 (or computing device 202 in FIGS. 2A-2D), activating an escape function on dynamic function row 104 may pause the game.

In some embodiments, functions may be associated with combinations of movably actuated keys and/or user-selectable symbols. For example, simultaneous actuation of a command key and "c" key (i.e., command+c) may be associated with a "copy" function. In another example, simultaneous actuation of the command key and selection of the user-selectable symbol with the indicator "esc" (i.e., command+esc) may activate a function to open a particular application such as a media player application. In yet another example, simultaneous selection of two user-selectable symbols (e.g., the user-selectable symbol with the indicator "esc" and the user-selectable symbol 144 with the magnifying glass indicator) may result in activation of a function, such as a specialized search function.

In some embodiments, a first subset 146 of the one or more user-selectable symbols 142 of dynamic function row 104 may be associated with one group of functions and a second subset 148 of the one or more user-selectable symbols 142 of function row 104 may be associated with a second group of functions. For example, the user-selectable symbols in first subset 146 may be global functions (e.g., system-level functions or affordances), and the user-selectable symbols in second subset 148 may be application-specific functions. As such, the user-selectable symbols in first subset 148 change when the focus shifts from a first element of a graphical user interface displayed on primary display 102 (e.g., a first window corresponding to an Internet browser application) to a second element of the graphical user interface (e.g., a second window corresponding to an e-mail application). In contrast, the user-selectable symbols in first subset 146 are maintained when the focus shifts from the first element of the graphical user interface to the second element of the graphical user interface.

In some embodiments, the user-selectable symbols in second subset 148 are determined based on an active user interface element display on primary display 102 that is in focus. In some embodiments, the term "in focus" can refer to the active element of the user interface (e.g., a window associated with an application, a particular toolbar or menu associated with an application, or the operating system) that is currently in the foreground and actively running or is controllable by input received from a user of the computing system such as a key press, mouse click, voice command, gestural motion, or the like.

In some embodiments, the first subset 146 of the one or more user-selectable symbols 142 corresponding to global user-selectable symbols occupies a first area of dynamic function row 104 (e.g., the left half of dynamic function row 104), and the second subset set 148 of the one or more user-selectable symbols 142 occupies a second area of dynamic function row 104 (e.g., the right half of dynamic function row 104). It will be realized that other proportions of function row 104 may be allocated to the first subset 146 and the second subset 148. In some embodiments, when no application has focus, the second area of dynamic function row 104 may not include any user-selectable symbols. In some embodiments, dynamic function row 104 includes three or more subsets of user-selectable symbols. In some embodiments, dynamic function row 104 includes a single set of user-selectable symbols that are not divided into subsets. While a single row of user-selectable symbols are shown in dynamic function row 104 in FIG. 1B, it will be recognized that dynamic function row 104 may include multiple rows of user-selectable symbols.

In some embodiments, the change in focus changes which element of the graphical user interface displayed on primary display 102 of display portion 110 (or peripheral display device 204, FIGS. 2A-2D) is active and which element will receive user input. The user input may be received from a keyboard, mouse, touch pad, or other user input device. Additionally and/or alternatively, in some embodiments, the change in focus changes an element that is shown in the foreground of a graphical user interface displayed on primary display 102 of display portion 110 (or peripheral display device 204, FIGS. 2A-2D).

In some embodiments, the change in focus occurs in response to user input, for example, in response to user selection of an element of a graphical user interface (e.g., a different window) displayed on primary display 102 of display portion 110 (or peripheral display device 204, FIGS. 2A-2D) or in response to user selection of a user-selectable symbol (e.g., one of the affordances/symbols displayed on dynamic function row 104). The user selection may be a key stroke, a mouse click, a mouse over, a command+tab input, or the like. In some embodiments, the change in focus occurs in response to a determination by an operating system of portable system 100 (or computing device 202 in FIGS. 2A-2D). For example, when a user closes an application window that has focus, the operating system may give focus to a different application, such as an application that had focus prior to the closed application window. In another example, when a user closes an application window that has focus, the operating system may give focus to a dialog box prompting the user to save changes made to a document via the application.

In some embodiments, the change in focus may be a change from one element associated with an application to another element associated with the same application (e.g., from an e-mail composition window of an e-mail application to an inbox list window of an e-mail application or from one tab of an Internet browser application to another tab of an Internet browser application). In some embodiments, the change in focus may be a change from an element associated with one application to an element associated with another application (e.g., from an Internet browser window to an e-mail application window). Further, in some embodiments, the change in focus may be a change from an element associated with an application to an element associated with an operating system, such as a system dialog box, a system setting control (e.g., volume control), a window associated with a file/folder navigation application (e.g., Apple Inc.'s FINDER application), etc. Additionally, focus may also be directed to a dialog box, file directory, setting control (e.g., volume control), or any other element of a graphical user interface for which information can be presented to a user and/or user input can be received.

FIG. 2A is an illustrative diagram of a first implementation of desktop computing system 200 in accordance with some embodiments. Desktop computing system 200 includes a computing device 202, a peripheral display device 204 with primary display 102, a peripheral keyboard 206, and a peripheral mouse 208. Computing device 202 includes one or more processors and memory storing one or more programs for execution by the one or more processors. In some embodiments, peripheral display device 204 may be integrated with computing device 202 such as an iMAC® device. In some embodiments, primary display 102 of peripheral display device 204 is a touch screen display. In FIG. 2A, peripheral display device 204, peripheral keyboard 206, and peripheral mouse 208 are communicatively coupled to computing device 202 via a wired connection, such as USB or PS/2, or via a wireless communication link, using a communication protocol such as Bluetooth, Wi-Fi, or the like. For example, peripheral keyboard 206 is not more than fifteen feet from computing device 202 (e.g. approximately three feet away). In FIG. 2A, peripheral keyboard 206 includes dynamic function row 104 and a set of physical keys 106 at least partially contained within a same housing. In some embodiments, dynamic function row 104, which is described in more detail with reference to FIG. 1B, is a touch screen display. In some embodiments, peripheral keyboard 206 includes one or more processors and memory storing one or more programs that may be executed by the one or more processors of peripheral keyboard 206 to perform any of the embodiments described herein. In some embodiments, peripheral keyboard 206 relays signals indicating user inputs (e.g., key strokes and selections of user-selectable symbols/affordances displayed by dynamic function row 104) to computing device 202.

FIG. 2B is an illustrative diagram of a second implementation of desktop computing system 200 in accordance with some embodiments. In FIG. 2B, desktop computing system 200 includes a computing device 202, a peripheral display device 204 with primary display 102, and a peripheral keyboard 206. In FIG. 2B, peripheral display device 204 and peripheral keyboard 206 are communicatively coupled to computing device 202 via a wired connection, such as USB or PS/2, or via a wireless communication link, using a communication protocol such as Bluetooth, Wi-Fi, or the like. In FIG. 2B, peripheral keyboard 206 includes dynamic function row 104, a set of physical keys 106, and touch pad 108 at least partially contained within a same housing. In some embodiments, dynamic function row 104, which is described in more detail with reference to FIG. 1B, is a touch screen display. In some embodiments, peripheral keyboard 206 includes one or more processors and memory storing one or more programs that may be executed by the one or more processors of peripheral keyboard 206 to perform any of the embodiments described herein. In some embodiments, peripheral keyboard 206 relays signals indicating user inputs (e.g., key strokes, user interactions with touch pad 108, and selections of user-selectable symbols/affordances displayed by dynamic function row 104) to computing device 202.

FIG. 2C is an illustrative diagram of a third implementation of desktop computing system 200 in accordance with some embodiments. In FIG. 2C, desktop computing system 200 includes a computing device 202, a peripheral display device 204 with primary display 102, a peripheral keyboard 206, and a first peripheral input mechanism 212. In FIG. 2C, peripheral display device 204, peripheral keyboard 206, and the first peripheral input mechanism 212 are communicatively coupled to computing device 202 via a wired connection, such as USB or PS/2, or via a wireless communication link, using a communication protocol such as Bluetooth, Wi-Fi, or the like. In FIG. 2C, peripheral keyboard 206 includes a set of physical keys 106, and the first peripheral input mechanism 212 includes dynamic function row 104 and touch pad 108 at least partially contained within a same housing. In some embodiments, dynamic function row 104, which is described in more detail with reference to FIG. 1B, is a touch screen display. In some embodiments, the first peripheral input mechanism 212 includes one or more processors and memory storing one or more programs that may be executed by the one or more processors of the first peripheral input mechanism 212 to perform any of the embodiments described herein. In some embodiments, the first peripheral input mechanism 212 relays signals indicating user inputs (e.g., user interactions with touch pad 108 and user selections of user-selectable symbols/affordances displayed by dynamic function row 104) to computing device 202.

FIG. 2D is an illustrative diagram of a fourth implementation of desktop computing system 200 in accordance with some embodiments. In FIG. 2D, desktop computing system 200 includes a computing device 202, a peripheral display device 204 with primary display 102, a peripheral keyboard 206, a peripheral mouse 208, and a second peripheral input mechanism 222. In FIG. 2D, peripheral display device 204, peripheral keyboard 206, peripheral mouse 208, and the second peripheral input mechanism 222 are communicatively coupled to computing device 202 via a wired connection, such as USB or PS/2, or via a wireless communication link, using a communication protocol such as Bluetooth, Wi-Fi, or the like. In FIG. 2A, peripheral keyboard 206 includes dynamic function row 104 and a set of physical keys 106. In FIG. 2D, peripheral keyboard 206 includes a set of physical keys 106, and the second peripheral input mechanism 222 includes dynamic function row 104 at least partially contained within the housing of the second peripheral input mechanism 222. In some embodiments, dynamic function row 104, which is described in more detail with reference to FIG. 1B, is a touch screen display. In some embodiments, the second peripheral input mechanism 222 includes one or more processors and memory storing one or more programs that may be executed by the one or more processors of the second peripheral input mechanism 222 to perform any of the embodiments described herein. In some embodiments, the second peripheral input mechanism 222 relays signals indicating user inputs (e.g., user selections of user-selectable symbols/affordances displayed by dynamic function row 104) to computing device 202.

Figure 3A:
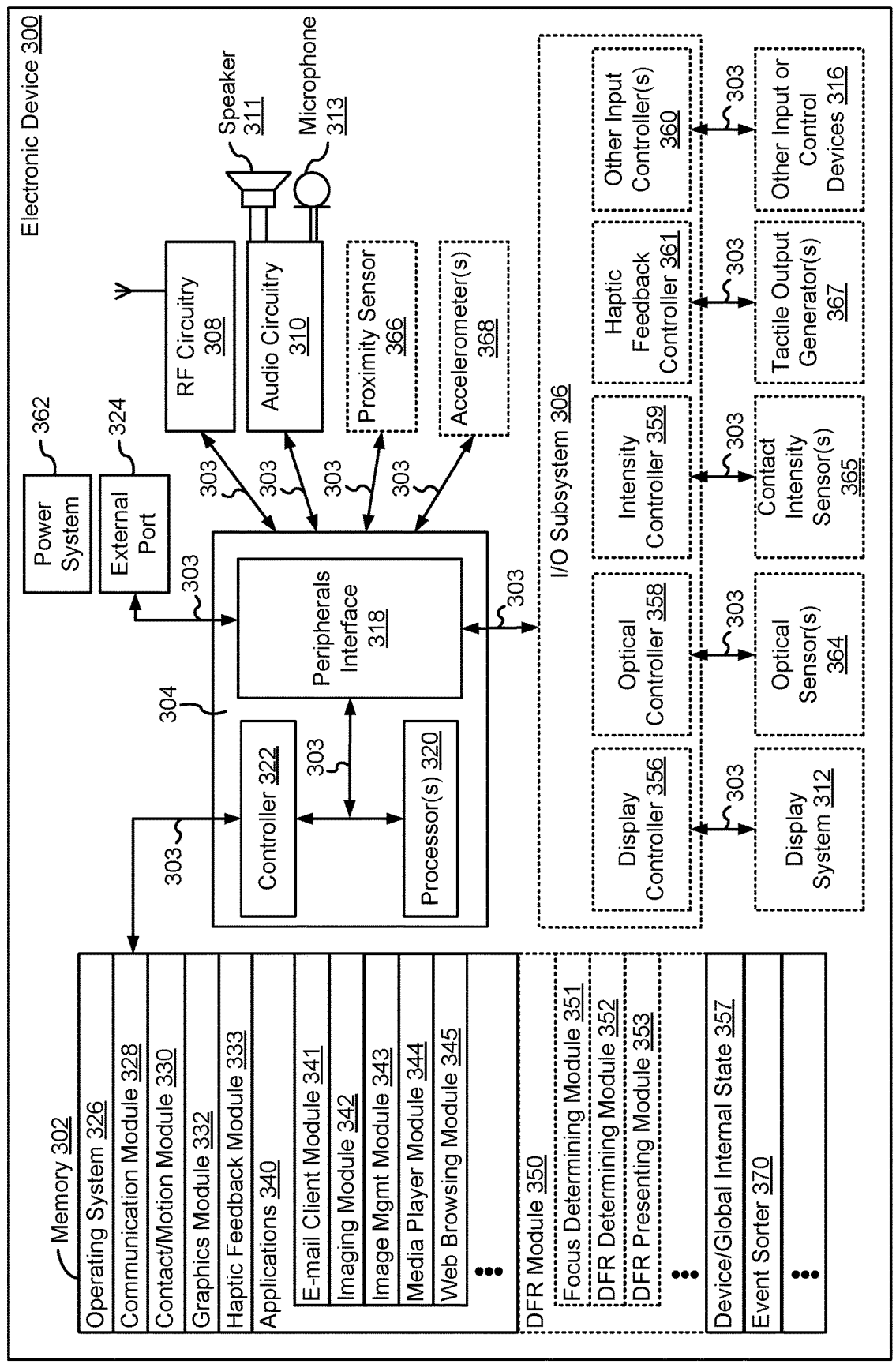
FIG. 3A is a block diagram of an electronic device, in accordance with some embodiments.

FIG. 3A is a block diagram of an electronic device 300, in accordance with some embodiments. In some embodiments, electronic device 300 is a portable electronic device, such as a laptop (e.g., portable computing system 100, FIG. 1A). In some embodiments, electronic device 300 is not a portable device, but is a desktop computer (e.g., computing device 202 of desktop computing system 200, FIGS. 2A-2D), which is communicatively coupled with a peripheral display system (e.g., peripheral display device 204, FIGS. 2A-2D) and optionally a peripheral touch-sensitive surface (e.g., a touch pad 108, FIGS. 2B-2C and/or a touch-sensitive display, such as peripheral display device 204, FIGS. 2A-2D and/or dynamic function row 104, FIGS. 2A-2D).

Electronic device 300 typically supports a variety of applications, such as one or more of the following: a drawing application, a presentation application, a word processing application, a website creation application, a disk authoring application, a spreadsheet application, a gaming application, a video conferencing application, an e-mail application, an instant messaging application, an image management application, a digital camera application, a digital video camera application, a web browser application, and/or a media player application.

The various applications that are executed on electronic device 300 optionally use at least one common physical user-interface device, such as the touch-sensitive surface. One or more functions of the touch-sensitive surface as well as corresponding information displayed by electronic device 300 are, optionally, adjusted and/or varied from one application to the next and/or within an application. In this way, a common physical architecture (such as the touch-sensitive surface) of electronic device 300 optionally supports the variety of applications with user interfaces that are intuitive and transparent to the user.

Electronic device 300 includes memory 302 (which optionally includes one or more computer readable storage mediums), memory controller 322, one or more processing units (CPU(s)) 320, peripherals interface 318, RF circuitry 308, audio circuitry 310, speaker 311, microphone 313, input/output (I/O) subsystem 306, other input or control devices 316, and external port 324. Electronic device 300 optionally includes a display system 312 (e.g., primary display 102 of display portion 110, FIG. 1A and/or dynamic function row 104, FIGS. 1A-1B), which may be a touch-sensitive display (sometimes also herein called a "touch screen" or a "touch screen display"). Electronic device 300 optionally includes one or more optical sensors 364. Electronic device 300 optionally includes one or more intensity sensors 365 for detecting intensity of contacts on a touch-sensitive surface such as touch-sensitive display or a touch pad. Electronic device 300 optionally includes one or more tactile output generators 367 for generating tactile outputs on a touch-sensitive surface such as touch-sensitive display or a touch pad (e.g., touch pad 108, FIGS. 1A-1B). These components optionally communicate over one or more communication buses or signal lines 303.

As used in the specification, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or touch/track pad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that electronic device 300 is only an example and that electronic device 300 optionally has more or fewer components than shown, optionally combines two or more components, or optionally has a different configuration or arrangement of the components. The various components shown in FIG. 3A are implemented in hardware, software, firmware, or a combination thereof, including one or more signal processing and/or application specific integrated circuits.

Memory 302 optionally includes high-speed random access memory and optionally also includes non-volatile memory, such as one or more magnetic disk storage devices, flash memory devices, or other non-volatile solid-state memory devices. Access to memory 302 by other components of electronic device 300, such as CPU(s) 320 and peripherals interface 318, is, optionally, controlled by memory controller 322. Peripherals interface 318 can be used to couple input and output peripherals to CPU(s) 320 and memory 302. The one or more processing units 320 run or execute various software programs and/or sets of instructions stored in memory 302 to perform various functions for electronic device 300 and to process data. In some embodiments, peripherals interface 318, CPU(s) 320, and memory controller 322 are, optionally, implemented on a single chip, such as chip 304. In some other embodiments, they are, optionally, implemented on separate chips.

RF (radio frequency) circuitry 308 receives and sends RF signals, also called electromagnetic signals. RF circuitry 308 converts electrical signals to/from electromagnetic signals and communicates with communications networks and other communications devices via the electromagnetic signals. RF circuitry 308 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 308 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 310, speaker 311, and microphone 313 provide an audio interface between a user and electronic device 300. Audio circuitry 310 receives audio data from peripherals interface 318, converts the audio data to an electrical signal, and transmits the electrical signal to speaker 311. Speaker 311 converts the electrical signal to human-audible sound waves. Audio circuitry 310 also receives electrical signals converted by microphone 313 from sound waves. Audio circuitry 310 converts the electrical signals to audio data and transmits the audio data to peripherals interface 318 for processing. Audio data is, optionally, retrieved from and/or transmitted to memory 302 and/or RF circuitry 308 by peripherals interface 318. In some embodiments, audio circuitry 310 also includes a headset jack. The headset jack provides an interface between audio circuitry 310 and removable audio input/output peripherals, such as output-only headphones or a headset with both output (e.g., a headphone for one or both ears) and input (e.g., a microphone).

I/O subsystem 306 couples the input/output peripherals of electronic device 300, such as display system 312 and other input or control devices 316, to peripherals interface 318.

I/O subsystem 306 optionally includes display controller 356, optical sensor controller 358, intensity sensor controller 359, haptic feedback controller 361, and one or more other input controllers 360 for other input or control devices. The one or more other input controllers 360 receive/send electrical signals from/to other input or control devices 316. The other input or control devices 316 optionally include physical buttons (e.g., push buttons, rocker buttons, etc.), dials, slider switches, joysticks, click wheels, and so forth. In some alternate embodiments, other input controller(s) 360 are, optionally, coupled with any (or none) of the following: a keyboard, infrared port, USB port, and a pointer device such as a mouse. The one or more physical buttons optionally include an up/down button for volume control of speaker 311 and/or microphone 313.

Display system 312 (e.g., primary display 102 of display portion 110, FIG. 1A and/or dynamic function row 104, FIGS. 1A-1B) provides an output interface (and, optionally, an input interface when it is a touch-sensitive display) between electronic device 300 and a user. Display controller 356 receives and/or sends electrical signals from/to display system 312. Display system 312 displays visual output to the user. The visual output optionally includes graphics, text, icons, video, and any combination thereof (collectively termed "graphics"). In some embodiments, some or all of the visual output corresponds to user-interface objects/elements.

In some embodiments, display system 312 (e.g., primary display 102 of display portion 110, FIG. 1A and/or dynamic function row 104, FIGS. 1A-1B) is a touch-sensitive display with a touch-sensitive surface, sensor, or set of sensors that accepts input from the user based on haptic and/or tactile contact. As such, display system 312 and display controller 356 (along with any associated modules and/or sets of instructions in memory 302) detect contact (and any movement or breaking of the contact) on display system 312 and convert the detected contact into interaction with user-interface objects (e.g., one or more soft keys, icons, web pages, or images) that are displayed on display system 312. In one example embodiment, a point of contact between display system 312 and the user corresponds to an area under a finger of the user.

Display system 312 (e.g., primary display 102 of display portion 110, FIG. 1A and/or dynamic function row 104, FIGS. 1A-1B) optionally uses LCD (liquid crystal display) technology, LPD (light emitting polymer display) technology, LED (light emitting diode) technology, or OLED (organic light emitting diode) technology, although other display technologies are used in other embodiments. In some embodiments, when display system 312 is a touch-sensitive display, display system 312 and display controller 356 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with display system 312. In one example embodiment, projected mutual capacitance sensing technology is used, such as that found in the iPHONE®, iPODTOUCH®, and iPAD® from Apple Inc. of Cupertino, Calif.

Display system 312 (e.g., primary display 102 of display portion 110, FIG. 1A and/or dynamic function row 104, FIGS. 1A-1B) optionally has a video resolution in excess of 400 dpi (e.g., 500 dpi, 800 dpi, or greater). In some embodiments, display system 312 is a touch-sensitive display with which the user optionally makes contact using a stylus, a finger, and so forth. In some embodiments, the user interface is designed to work primarily with finger-based contacts and gestures. In some embodiments, electronic device 300 translates the rough finger-based input into a precise pointer/cursor position or command for performing the actions desired by the user.

In some embodiments, in addition to display system 312, electronic device 300 optionally includes a touch pad (e.g., touch pad 108, FIGS. 1A-1B) for activating or deactivating particular functions. In some embodiments, the touch pad is a touch-sensitive area of electronic device 300 that, unlike display system 312, does not display visual output. In some embodiments, when display system 312 is a touch-sensitive display, the touch pad is, optionally, a touch-sensitive surface that is separate from display system 312, or an extension of the touch-sensitive surface formed by display system 312.

Electronic device 300 also includes power system 362 for powering the various components. Power system 362 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Electronic device 300 optionally also includes one or more optical sensors 364 coupled with optical sensor controller 358 in I/O subsystem 306. Optical sensor(s) 364 optionally includes charge-coupled device (CCD) or complementary metal-oxide semiconductor (CMOS) phototransistors. Optical sensor(s) 364 receive light from the environment, projected through one or more lens, and converts the light to data representing an image. In conjunction with imaging module 343, optical sensor(s) 364 optionally capture still images or video. In some embodiments, an optical sensor is located on the front of electronic device 300 so that the user's image is, optionally, obtained for video-conferencing while the user views the other video conference participants on display system 312.

Electronic device 300 optionally also includes one or more contact intensity sensor(s) 365 coupled with intensity sensor controller 359 in I/O subsystem 306. Contact intensity sensor(s) 365 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 365 receives contact intensity information (e.g., pressure information or a proxy for pressure information) from the environment. In some embodiments, at least one contact intensity sensor is collocated with, or proximate to, a touch-sensitive surface (e.g., touch pad 108, FIGS. 1A-1B or display system 312 when it is a touch-sensitive display).

Electronic device 300 optionally also includes one or more tactile output generators 367 coupled with haptic feedback controller 361 in I/O subsystem 306. Tactile output generator(s) 367 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 365 receives tactile feedback generation instructions from haptic feedback module 333 and generates tactile outputs that are capable of being sensed by a user of electronic device 300. In some embodiments, at least one tactile output generator is collocated with, or proximate to, a touch-sensitive surface (e.g., touch pad 108, FIGS. 1A-1B or display system 312 when it is a touch-sensitive display) and, optionally, generates a tactile output by moving the touch-sensitive surface vertically (e.g., in/out of a surface of electronic device 300) or laterally (e.g., back and forth in the same plane as a surface of electronic device 300).

Electronic device 300 optionally also includes one or more proximity sensors 366 coupled with peripherals interface 318. Alternately, proximity sensor(s) 366 are coupled with other input controller(s) 360 in I/O subsystem 306. Electronic device 300 optionally also includes one or more accelerometers 368 coupled with peripherals interface 318. Alternately, accelerometer(s) 368 are coupled with other input controller(s) 360 in I/O subsystem 306.

In some embodiments, the software components stored in memory 302 include operating system 326, communication module 328 (or set of instructions), contact/motion module 330 (or set of instructions), graphics module 332 (or set of instructions), applications 340 (or sets of instructions), and dynamic function row module 350 (or sets of instructions). Furthermore, in some embodiments, memory 302 stores device/global internal state 357 (or sets of instructions), as shown in FIG. 3A. Device/global internal state 357 includes one or more of: active application state, indicating which applications, if any, are currently active and/or in focus; display state, indicating what applications, views or other information occupy various regions of display system 312 (e.g., primary display 102 of display portion 110, FIG. 1A and/or dynamic function row 104, FIGS. 1A-1B) and/or a peripheral display system (e.g., primary display 102 of peripheral display device 204, FIGS. 2A-2D and/or dynamic function row 104, FIGS. 2A-2D); sensor state, including information obtained from various sensors and input or control devices 316 of electronic device 300; and location information concerning the location and/or attitude of electronic device 300.

Operating system 326 (e.g., DARWIN, RTXC, LINUX, UNIX, OS X, WINDOWS, or an embedded operating system such as VXWorks) includes various software components and/or drivers for controlling and managing general system tasks (e.g., memory management, storage device control, power management, etc.) and facilitates communication between various hardware and software components.

Communication module 328 facilitates communication with other devices (e.g., peripheral display device 202, FIGS. 2A-2D; peripheral mouse 208, FIGS. 2A and 2D; peripheral keyboard 206, FIGS. 2A-2B; first peripheral input mechanism 212, FIG. 2C; and/or second peripheral input mechanism 222, FIG. 2D) over one or more external ports 324 and/or RF circuitry 308 and also includes various software components for sending/receiving data via RF circuitry 308 and/or external port 324. External port 324 (e.g., Universal Serial Bus (USB), FIREWIRE, etc.) is adapted for coupling directly to other devices or indirectly over a network (e.g., the Internet, wireless LAN, etc.). In some embodiments, external port 324 is a multi-pin (e.g., 30-pin) connector that is the same as, or similar to and/or compatible with the 30-pin connector used on iPod® devices.

Contact/motion module 330 optionally detects contact with display system 312 when it is a touch-sensitive display (in conjunction with display controller 356) and other touch sensitive devices (e.g., a touch pad or physical click wheel).

Contact/motion module 330 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 330 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 330 also detects contact on a touch pad (e.g., touch pad 108, FIGS. 1A-1B).

In some embodiments, contact/motion module 330 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of electronic device 300). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 330 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (lift off) event.

Graphics module 332 includes various known software components for rendering and causing display of graphics on primary display 102 (e.g., primary display 102 of display portion 110, FIG. 1A or primary display 102 of peripheral display device 204, FIGS. 2A-2D) or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like. In some embodiments, graphics module 332 stores data representing graphics to be used. Each graphic is, optionally, assigned a corresponding code. Graphics module 332 receives, from applications etc., one or more codes specifying graphics to be displayed along with, if necessary, coordinate data and other graphic property data, and then generates screen image data to output to display controller 356.

Haptic feedback module 333 includes various software components for generating instructions used by tactile output generator(s) 367 to produce tactile outputs at one or more locations on electronic device 300 in response to user interactions with electronic device 300.

Applications electronic device 340 optionally include the following modules (or sets of instructions), or a subset or superset thereof:
- e-mail client module 341 (sometimes also herein called "mail app" or "e-mail app") for receiving, sending, composing, and viewing e-mails;
- imaging module 342 for capturing still and/or video images;
- image management module 343 (sometimes also herein called "photo app") for editing and viewing still and/or video images;
- media player module 344 (sometimes also herein called "media player app") for playback of audio and/or video; and
- web browsing module 345 (sometimes also herein called "web browser") for connecting to and browsing the Internet.

Examples of other applications 340 that are, optionally, stored in memory 302 include messaging and communications applications, word processing applications, other image editing applications, drawing applications, presentation applications, JAVA-enabled applications, encryption applications, digital rights management applications, voice recognition applications, and voice replication applications.

In conjunction with one or more of RF circuitry 308, display system 312 (e.g., primary display 102 of display portion 110, FIG. 1A and/or dynamic function row 104, FIGS. 1A-1B), display controller 356, and contact module 330, graphics module 332, e-mail client module 341 includes executable instructions to create, send, receive, and manage e-mail in response to user instructions. In conjunction with image management module 343, e-mail client module 341 makes it very easy to create and send e-mails with still or video images taken with imaging module 342.

In conjunction with one or more of display system 312 (e.g., primary display 102 of display portion 110, FIG. 1A and/or dynamic function row 104, FIGS. 1A-1B), display controller 356, optical sensor(s) 364, optical sensor controller 358, contact module 330, graphics module 332, and image management module 343, imaging module 342 includes executable instructions to capture still images or video (including a video stream) and store them into memory 302, modify characteristics of a still image or video, or delete a still image or video from memory 302.

In conjunction with one or more of display system 312 (e.g., primary display 102 of display portion 110, FIG. 1A and/or dynamic function row 104, FIGS. 1A-1B), display controller 356, contact module 330, graphics module 332, and imaging module 342, image management module 343 includes executable instructions to arrange, modify (e.g., edit), or otherwise manipulate, label, delete, present (e.g., in a digital slide show or album), and store still and/or video images.

In conjunction with one or more of display system 312 (e.g., primary display 102 of display portion 110, FIG. 1A and/or dynamic function row 104, FIGS. 1A-1B), display controller 356, contact module 330, graphics module 332, audio circuitry 310, speaker 311, RF circuitry 308, and web browsing module 347, media player module 345 includes executable instructions that allow the user to download and play back recorded music and other sound files stored in one or more file formats, such as MP3 or AAC files, and executable instructions to display, present or otherwise play back videos (e.g., on primary display 102 of display portion 110, FIG. 1A or primary display 102 of peripheral display device 2014, FIGS. 2A-2B connected via external port 324).

In conjunction with one or more of RF circuitry 308, display system 312 (e.g., primary display 102 of display portion 110, FIG. 1A and/or dynamic function row 104, FIGS. 1A-1B), display controller 356, contact module 330, and graphics module 332, web browsing module 347 includes executable instructions to browse the Internet in accordance with user instructions, including searching, linking to, receiving, and displaying web pages or portions thereof, as well as attachments and other files linked to web pages.

Dynamic function row (DFR) module 350 includes: focus determining module 351, DFR determining module 352, and DFR presenting module 353. In some embodiments, focus determining module 351 is configured to determine an active user interface element that is in focus on the graphical user interface displayed by display system 312 (e.g., primary display 102 of display portion 110, FIG. 1A) or a peripheral display system (e.g., peripheral display device 204, FIGS. 2A-2D). In some embodiments, DFR determining module 352 is configured to determine graphics (e.g., a set of one or more affordances) based on the active user interface element that is in focus. In some embodiments, DFR presenting module 353 is configured to render the graphics determined by DFR determining module 352 on display system 312 (e.g., dynamic function row 104, FIGS. 1A-1B). DFR presenting module 353 includes various known software components for rendering and causing display of graphics on display system 312 (e.g., dynamic function row 104, FIGS. 1A-1B), including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations, and the like. In some embodiments, DFR module 350 includes other modules for: adjusting the sensitivity of dynamic function row 104; adjusting the audible and/or haptic feedback provided by dynamic function row 104; adjusting the settings of affordances and information displayed by dynamic function row 104 (e.g., size, brightness, font, language, and the like); adjusting the current power mode of dynamic function row 104 (e.g., normal and low-power modes); and the like.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 302 optionally stores a subset of the modules and data structures identified above. Furthermore, memory 302 optionally stores additional modules and data structures not described above.

Figure 3B:
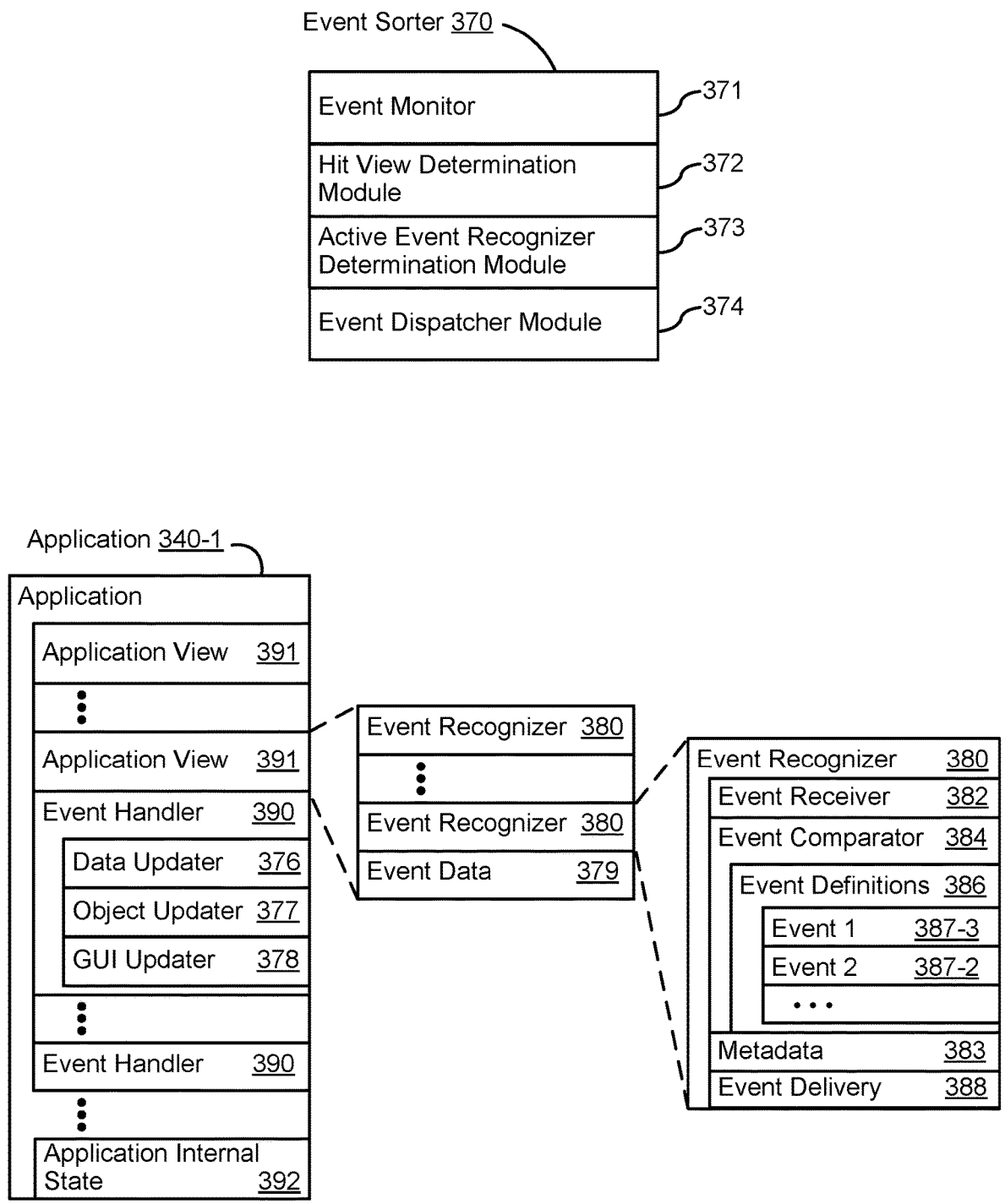
FIG. 3B is a block diagram of components for event handling of FIG. 3A, in accordance with some embodiments.

FIG. 3B is a block diagram of components for event handling of FIG. 3A, in accordance with some embodiments. In some embodiments, memory 302 (FIG. 3A) includes event sorter 370 (e.g., in operating system 326) and an application 340-1 (e.g., any of the aforementioned applications 341, 342, 343, 344, or 345).

Event sorter 370 receives event information and determines the application 340-1 and application view 391 of application 340-1 to which to deliver the event information. Event sorter 370 includes event monitor 371 and event dispatcher module 374. In some embodiments, application 340-1 includes application internal state 392, which indicates the current application view(s) displayed on display system 312 (e.g., primary display 102 of display portion 110, FIG. 1A and/or dynamic function row 104, FIGS. 1A-1B) when the application is active or executing. In some embodiments, device/global internal state 357 is used by event sorter 370 to determine which application(s) is (are) currently active or in focus, and application internal state 392 is used by event sorter 370 to determine application views 391 to which to deliver event information.

In some embodiments, application internal state 392 includes additional information, such as one or more of: resume information to be used when application 340-1 resumes execution, user interface state information that indicates information being displayed or that is ready for display by application 340-1, a state queue for enabling the user to go back to a prior state or view of application 340-1, and a redo/undo queue of previous actions taken by the user.

Event monitor 371 receives event information from peripherals interface 318. Event information includes information about a sub-event (e.g., a user touch on display system 312 when it is a touch-sensitive display, as part of a multi-touch gesture). Peripherals interface 318 transmits information it receives from I/O subsystem 306 or a sensor, such as proximity sensor(s) 366, accelerometer(s) 368, and/or microphone 313 (through audio circuitry 310). Information that peripherals interface 318 receives from I/O subsystem 306 includes information from display system 312 when it is a touch-sensitive display or another touch-sensitive surface (e.g., touch pad 108, FIGS. 1A-1B).

In some embodiments, event monitor 371 sends requests to the peripherals interface 318 at predetermined intervals. In response, peripherals interface 318 transmits event information. In other embodiments, peripheral interface 318 transmits event information only when there is a significant event (e.g., receiving an input above a predetermined noise threshold and/or for more than a predetermined duration).

In some embodiments, event sorter 370 also includes a hit view determination module 372 and/or an active event recognizer determination module 373.

Hit view determination module 372 provides software procedures for determining where a sub-event has taken place within one or more views, when display system 312 displays more than one view, where views are made up of controls and other elements that a user can see on the display.

Another aspect of the user interface associated with an application is a set of views, sometimes herein called application views or user interface windows, in which information is displayed and touch-based gestures occur. The application views (of an application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 372 receives information related to sub-events of a touch-based gesture. When an application has multiple views organized in a hierarchy, hit view determination module 372 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 373 determines which view or views within a view hierarchy should receive a particular sequence of sub-events. In some embodiments, active event recognizer determination module 373 determines that only the hit view should receive a particular sequence of sub-events. In other embodiments, active event recognizer determination module 373 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 374 dispatches the event information to an event recognizer (e.g., event recognizer 380). In embodiments including active event recognizer determination module 373, event dispatcher module 374 delivers the event information to an event recognizer determined by active event recognizer determination module 373. In some embodiments, event dispatcher module 374 stores in an event queue the event information, which is retrieved by a respective event receiver module 382.

In some embodiments, operating system 326 includes event sorter 370. Alternatively, application 340-1 includes event sorter 370. In yet other embodiments, event sorter 370 is a stand-alone module, or a part of another module stored in memory 302, such as contact/motion module 330.

In some embodiments, application 340-1 includes a plurality of event handlers 390 and one or more application views 391, each of which includes instructions for handling touch events that occur within a respective view of the application's user interface. Each application view 391 of the application 340-1 includes one or more event recognizers 380. Typically, an application view 391 includes a plurality of event recognizers 380. In other embodiments, one or more of event recognizers 380 are part of a separate module, such as a user interface kit (not shown) or a higher level object from which application 340-1 inherits methods and other properties. In some embodiments, a respective event handler 390 includes one or more of: data updater 376, object updater 377, GUI updater 378, and/or event data 379 received from event sorter 370. Event handler 390 optionally utilizes or calls data updater 376, object updater 377 or GUI updater 378 to update the application internal state 392. Alternatively, one or more of the application views 391 includes one or more respective event handlers 390. Also, in some embodiments, one or more of data updater 376, object updater 377, and GUI updater 378 are included in an application view 391.

A respective event recognizer 380 receives event information (e.g., event data 379) from event sorter 370, and identifies an event from the event information. Event recognizer 380 includes event receiver 382 and event comparator 384. In some embodiments, event recognizer 380 also includes at least a subset of: metadata 383, and event delivery instructions 388 (which optionally include sub-event delivery instructions).

Event receiver 382 receives event information from event sorter 370. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 384 compares the event information to predefined event or sub-event definitions and, based on the comparison, determines an event or sub-event, or determines or updates the state of an event or sub-event. In some embodiments, event comparator 384 includes event definitions 386. Event definitions 386 contain definitions of events (e.g., predefined sequences of sub-events), for example, event 1 (387-1), event 2 (387-2), and others. In some embodiments, sub-events in an event 387 include, for example, touch begin, touch end, touch movement, touch cancellation, and multiple touching. In one example, the definition for event 1 (387-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (387-2) is a dragging on a displayed object. The dragging, for example, comprises a touch (or contact) on the displayed object for a predetermined phase, a movement of the touch across display system 312 when it is a touch-sensitive display, and lift-off of the touch (touch end). In some embodiments, the event also includes information for one or more associated event handlers 390.

In some embodiments, event definition 387 includes a definition of an event for a respective user-interface object. In some embodiments, event comparator 384 performs a hit test to determine which user-interface object is associated with a sub-event. For example, in an application view in which three user-interface objects are displayed on display system 312, when a touch is detected on display system 312 when it is a touch-sensitive display, event comparator 384 performs a hit test to determine which of the three user-interface objects is associated with the touch (sub-event). If each displayed object is associated with a respective event handler 390, the event comparator uses the result of the hit test to determine which event handler 390 should be activated. For example, event comparator 384 selects an event handler associated with the sub-event and the object triggering the hit test.

In some embodiments, the definition for a respective event 387 also includes delayed actions that delay delivery of the event information until after it has been determined whether the sequence of sub-events does or does not correspond to the event recognizer's event type.

When a respective event recognizer 380 determines that the series of sub-events do not match any of the events in event definitions 386, the respective event recognizer 380 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 380 includes metadata 383 with configurable properties, flags, and/or lists that indicate how the event delivery system should perform sub-event delivery to actively involved event recognizers. In some embodiments, metadata 383 includes configurable properties, flags, and/or lists that indicate how event recognizers interact, or are enabled to interact, with one another. In some embodiments, metadata 383 includes configurable properties, flags, and/or lists that indicate whether sub-events are delivered to varying levels in the view or programmatic hierarchy.

In some embodiments, a respective event recognizer 380 activates event handler 390 associated with an event when one or more particular sub-events of an event are recognized. In some embodiments, a respective event recognizer 380 delivers event information associated with the event to event handler 390. Activating an event handler 390 is distinct from sending (and deferred sending) sub-events to a respective hit view. In some embodiments, event recognizer 380 throws a flag associated with the recognized event, and event handler 390 associated with the flag catches the flag and performs a predefined process.

In some embodiments, event delivery instructions 388 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 376 creates and updates data used in application 340-1. For example, data updater 376 stores a video file used by media player module 344. In some embodiments, object updater 377 creates and updates objects used by application 340-1. For example, object updater 376 creates a new user-interface object or updates the position of a user-interface object. GUI updater 378 updates the GUI. For example, GUI updater 378 prepares display information and sends it to graphics module 332 for display on display system 312 (e.g., primary display 102 of display portion 110, FIG. 1A and/or dynamic function row 104, FIGS. 1A-1B).

In some embodiments, event handler(s) 390 includes or has access to data updater 376, object updater 377, and GUI updater 378. In some embodiments, data updater 376, object updater 377, and GUI updater 378 are included in a single module of an application 340-1 or application view 391. In other embodiments, they are included in two or more software modules.

It shall be understood that the foregoing discussion regarding event handling of user touches on touch-sensitive displays also applies to other forms of user inputs to operate electronic device 300 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 4:
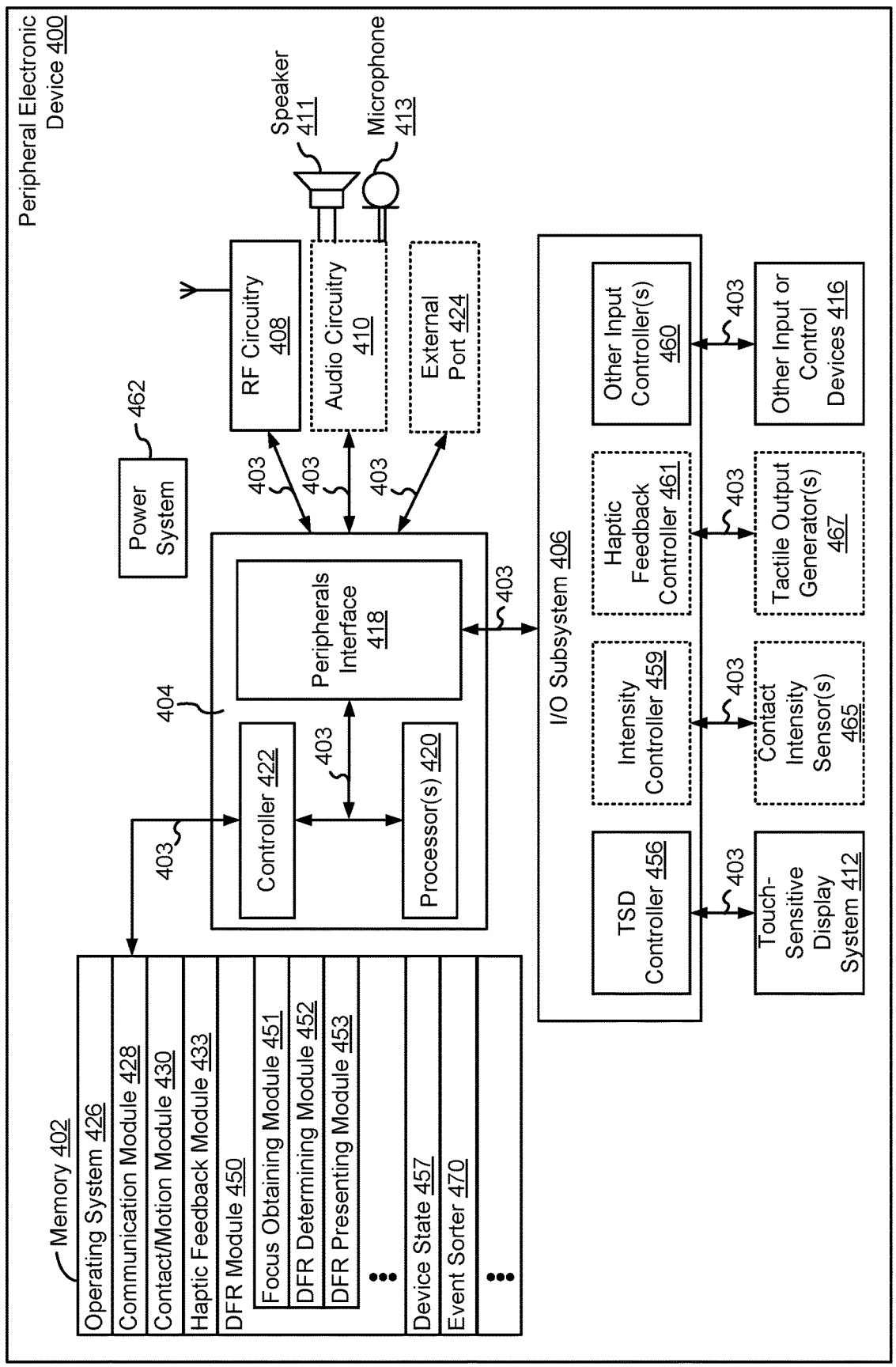
FIG. 4 is a block diagram of a peripheral electronic device, in accordance with some embodiments.

FIG. 4 shows a block diagram of a peripheral electronic device 400, in accordance with some embodiments. In some embodiments, peripheral electronic device 400 is a peripheral input and output device that at least partially contains a dynamic function row 104 and a physical input mechanism, such as a set of physical keys (e.g., the set of physical keys 106, FIGS. 2A-2B) and/or a touch pad (e.g., touch pad 108, FIGS. 2B-2C), within a same housing. Examples of peripheral electronic device 400 includes: peripheral keyboard (e.g., peripheral keyboard 206, FIGS. 2A-2B), a peripheral touch-sensitive surface (e.g., first peripheral input mechanism 212, FIG. 2C), or other peripheral input mechanisms (e.g., second peripheral input mechanism 222, FIG. 2D). Peripheral electronic device 400 is communicatively coupled with computing device 202 (FIGS. 2A-2D). For example, peripheral electronic device 400 is communicatively coupled with computing device 202 via a wired connection, such as USB or PS/2, or via a wireless communication link, using a communication protocol such as Bluetooth, Wi-Fi, or the like. Peripheral electronic device 400 may rely on some of the components or procedures in electronic device 300 (FIG. 3A) or some of these components or procedures may be completed by, located in, or housed by peripheral electronic device 400 instead of electronic device 300.

In some embodiments, peripheral electronic device 400 includes one or more of memory 402 (which optionally includes one or more computer readable storage mediums), memory controller 422, one or more processing units (CPU(s)) 420, peripherals interface 418, RF circuitry 408, audio circuitry 410, speaker 411, microphone 413, input/output (I/O) subsystem 406, other input or control devices 416, and external port 424. Peripheral electronic device 400 includes a touch-sensitive display system 412 (e.g., dynamic function row 104, FIGS. 2A-2D) (sometimes also herein called a "touch-sensitive display," a "touch screen," or a "touch screen display").

Peripheral electronic device 400 optionally includes one or more intensity sensors 465 for detecting intensity of contacts on a touch-sensitive surface such as touch-sensitive display system 412 or a touch pad (e.g., touch pad 108, FIGS. 2B-2C). Peripheral electronic device 400 optionally includes one or more tactile output generators 467 for generating tactile outputs on a touch-sensitive surface such as touch-sensitive display system 412 or a touch pad (e.g., touch pad 108, FIGS. 2B-2C). These components optionally communicate over one or more communication buses or signal lines 403.

Memory 402 optionally includes high-speed random access memory and optionally also includes non-volatile memory, such as one or more magnetic disk storage devices, flash memory devices, or other non-volatile solid-state memory devices. Access to memory 402 by other components of peripheral electronic device 400, such as CPU(s) 420 and peripherals interface 418, is, optionally, controlled by memory controller 422. Peripherals interface 418 can be used to couple CPU(s) 420 and memory 402 to I/O subsystem 406 and other circuitry. The one or more processing units 420 run or execute various software programs and/or sets of instructions stored in memory 402 to perform various functions for peripheral electronic device 400 and to process data. In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with communications networks and other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The wireless communication optionally uses any of a plurality of communications standards, protocols and technologies, including but not limited to near field communication (NFC), Bluetooth, Wireless Fidelity (Wi-Fi) (e.g., IEEE 802.11a, IEEE 802.11b, IEEE 802.11g, and/or IEEE 802.11n), Wi-MAX, or any other suitable communication protocol, including communication protocols not yet developed as of the filing date of this document.

Optional audio circuitry 410, speaker 411, and microphone 413 provide an audio interface between a user and peripheral electronic device 400. Audio circuitry 410 receives audio data from peripherals interface 418, converts the audio data to an electrical signal, and transmits the electrical signal to speaker 411. Speaker 411 converts the electrical signal to human-audible sound waves. Audio circuitry 410 also receives electrical signals converted by microphone 413 from sound waves. Audio circuitry 410 converts the electrical signals to audio data and transmits the audio data to peripherals interface 418 for processing. Audio data is, optionally, retrieved from and/or transmitted to memory 402 and/or RF circuitry 408 by peripherals interface 418. In some embodiments, audio circuitry 410 also includes a headset jack. The headset jack provides an interface between audio circuitry 410 and removable audio input/output peripherals, such as output-only headphones or a headset with both output (e.g., a headphone for one or both ears) and input (e.g., a microphone).

I/O subsystem 406 couples the input/output peripherals of peripheral electronic device 400, such as touch-sensitive display system 412 (e.g., dynamic function row 104, FIGS. 2A-2D), to peripherals interface 418. I/O subsystem 406 optionally includes display controller 456, intensity sensor controller 459, haptic feedback controller 461, and one or more input controllers 460 for other input or control devices 416. The one or more other input controllers 460 receive/send electrical signals from/to other input or control devices 416. The other input or control devices 416 optionally include physical buttons (e.g., push buttons, rocker buttons, etc.), dials, slider switches, joysticks, click wheels, a set of physical keys, a touch pad, and so forth.

Touch-sensitive display system 412 (e.g., dynamic function row 104, FIGS. 2A-2D) provides an input/output interface between peripheral electronic device 400 and a user. Touch-sensitive display (TSD) controller 456 receives and/or sends electrical signals from/to touch-sensitive display system 412. Touch-sensitive display system 412 displays visual output to the user. The visual output optionally includes graphics, text, icons, video, and any combination thereof (collectively termed "graphics"). In some embodiments, some or all of the visual output corresponds to user-interface objects/elements.

Touch-sensitive display system 412 (e.g., dynamic function row 104, FIGS. 2A-2D) includes a touch-sensitive surface, sensor, or set of sensors that accepts input from the user based on haptic and/or tactile contact. As such, touch-sensitive display system 412 and TSD controller 456 (along with any associated modules and/or sets of instructions in memory 402) detect contact (and any movement or breaking of the contact) on touch-sensitive display system 412 and convert the detected contact into signals used to select or control user-interface objects (e.g., one or more soft keys, icons, web pages, or images) that are displayed on touch-sensitive display system 412. In one example embodiment, a point of contact between touch-sensitive display system 412 and the user corresponds to an area of touch-sensitive display system 412 in contact with a finger of the user.

Touch-sensitive display system 412 (e.g., dynamic function row 104, FIGS. 2A-2D) optionally uses LCD (liquid crystal display) technology, LPD (light emitting polymer display) technology, LED (light emitting diode) technology, or OLED (organic light emitting diode) technology, although other display technologies are used in other embodiments. Touch-sensitive display system 412 and TSD controller 456 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 412. In one example embodiment, projected mutual capacitance sensing technology is used, such as that found in the iPHONE®, iPODTOUCH®, and iPAD® from Apple Inc. of Cupertino, Calif.

Touch-sensitive display system 412 (e.g., dynamic function row 104, FIGS. 2A-2D) optionally has a video resolution in excess of excess of 400 dpi (e.g., 500 dpi, 800 dpi, or greater). In some embodiments, the user makes contact with touch-sensitive display system 412 using a stylus, a finger, and so forth. In some embodiments, the user interface is designed to work primarily with finger-based contacts and gestures.

In some embodiments, in addition to touch-sensitive display system 412, peripheral electronic device 400 optionally includes a touch pad (e.g., touch pad 108, FIGS. 2B-2C). In some embodiments, the touch pad is a touch-sensitive area of peripheral electronic device 400 that, unlike touch-sensitive display system 412, does not display visual output. In some embodiments, the touch pad is, optionally, a touch-sensitive surface that is separate from touch-sensitive display system 412, or an extension of the touch-sensitive surface formed by touch-sensitive display system 412.

Peripheral electronic device 400 also includes power system 462 for powering the various components. Power system 462 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Peripheral electronic device 400 optionally also includes one or more contact intensity sensors 465 coupled with intensity sensor controller 459 in I/O subsystem 406. Contact intensity sensor(s) 465 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 465 receives contact intensity information (e.g., pressure information or a proxy for pressure information) from the environment. In some embodiments, at least one contact intensity sensor is collocated with, or proximate to, a touch-sensitive surface (e.g., touch-sensitive display system 412 and/or touch pad 108, FIGS. 2B-2C).

Peripheral electronic device 400 optionally also includes one or more tactile output generators 467 coupled with haptic feedback controller 461 in I/O subsystem 406. Tactile output generator(s) 467 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 465 receives tactile feedback generation instructions from haptic feedback module 433 and generates tactile outputs that are capable of being sensed by a user of peripheral electronic device 400. In some embodiments, at least one tactile output generator is collocated with, or proximate to, a touch-sensitive surface (e.g., touch-sensitive display system 412 and/or touch pad 108, FIGS. 2B-2C) and, optionally, generates a tactile output by moving the touch-sensitive surface vertically (e.g., in/out of a surface of peripheral electronic device 400) or laterally (e.g., back and forth in the same plane as a surface of peripheral electronic device 400).

In some embodiments, the software components stored in memory 402 include operating system 426, communication module 428 (or set of instructions), contact/motion module 430 (or set of instructions), and dynamic function row module 450 (or sets of instructions). Furthermore, in some embodiments, memory 402 stores device state 457 including the display state, indicating what views or other information occupy various regions of touch-sensitive display system 412 (e.g., dynamic function row 104, FIGS. 2A-2D).

Operating system 426 includes various software components and/or drivers for controlling and managing general system tasks (e.g., memory management, storage device control, power management, etc.) and facilitates communication between various hardware and software components.

Communication module 428 facilitates communication with other devices (e.g., computing device 202, FIGS. 2A-2D) over one or more external ports 424 and/or RF circuitry 408 and also includes various software components for sending/receiving data via RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.).

Contact/motion module 430 optionally detects contact with touch-sensitive display system 412 and other touch sensitive devices (e.g., a touch pad or physical click wheel). Contact/motion module 430 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 430 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 430 also detects contact on a touch pad (e.g., touch pad 108, FIGS. 2B-2C).

In some embodiments, contact/motion module 430 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of peripheral electronic device 400). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 430 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (lift off) event.

Haptic feedback module 433 includes various software components for generating instructions used by tactile output generator(s) 467 to produce tactile outputs at one or more locations on peripheral electronic device 400 in response to user interactions with peripheral electronic device 400.

Dynamic function row (DFR) module 450 includes: focus obtaining module 451, DFR determining module 452, and DFR presenting module 453. In some embodiments, focus obtaining module 451 is configured to obtain an indication of an active user interface element that is the current focus of the graphical user interface displayed on primary display 102 of peripheral display device 204 (FIGS. 2A-2D) from computing device 202 (FIGS. 2A-2D). In some embodiments, DFR determining module 452 is configured to determine graphics (e.g., a set of one or more affordances) based on the active user interface element that is current focus. Alternatively, in some embodiments, computing device 202 (FIGS. 2A-2D) determines the graphics (e.g., the set of one or more affordances) based on the active user interface element that is in focus and provides the graphics to peripheral electronic device 400 or a component thereof (e.g., DFR module 450) for display on touch-sensitive display system 412 (e.g., dynamic function row 104, FIGS. 2A-2D). In some embodiments, DFR presenting module 453 is configured to render the graphics determined by DFR determining module 452 (or provided by computing device 202) on touch-sensitive display system 412 (e.g., dynamic function row 104, FIGS. 2A-2D). DFR presenting module 453 includes various known software components for rendering and causing display of graphics on touch-sensitive display system 412, including components for changing the visual impact (e.g., brightness, transparency, saturation, contrast or other visual property) of graphics that are displayed. In some embodiments, DFR module 450 includes other modules for: adjusting the sensitivity of dynamic function row 104; adjusting the audible and/or haptic feedback provided by dynamic function row 104; adjusting the settings of affordances and information displayed by dynamic function row 104 (e.g., size, brightness, font, language, and the like); adjusting the current power mode of dynamic function row 104 (e.g., normal and low-power modes); and the like.

In some embodiments, memory 402 includes event sorter 470 (e.g., in operating system 426). In some embodiments, event sorter 470 performs the same functions as event sorter 370 (FIG. 3B) and includes a subset or superset of the modules, procedures, and instructions of event sorter 370 (FIG. 3B). As such, event sorter 470 will not be described for the sake of brevity.

It should be appreciated that peripheral electronic device 400 is only an example and that peripheral electronic device 400 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Each of the above identified modules correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

User Interfaces and Associated Processes

Attention is now directed towards embodiments of user interfaces ("UIs") and associated processes that may be implemented by portable computing system 100 (FIG. 1A) or desktop computing system 200 (FIGS. 2A-2D). In some embodiments, primary display 102 is implemented in display portion 110 of portable computing system 100 (FIG. 1A). Alternatively, in some embodiments, primary display 102 is implemented in peripheral display device 204 (FIGS. 2A-2D). In some embodiments, dynamic function row 104 is a touch-sensitive display implemented in body portion 120 of portable computing system 100 (FIGS. 1A-1B). Alternatively, in some embodiments, dynamic function row 104 is a touch-sensitive display implemented in peripheral keyboard 206 (FIGS. 2A-2B), first input mechanism 212 (FIG. 2C), or second input mechanism 222 (FIG. 2D).

FIGS. 5A-5DDD illustrate example user interfaces for displaying application-specific affordances on a dynamically updated touch screen display in accordance with some embodiments. The user interfaces in these figures are used to illustrate the methods and/or processes described below, including the methods in FIGS. 6A-6D, 7A-7C, 8A-8B, 9A-9B, and 10A-10C. One of ordinary skill in the art will appreciate that the following user interfaces are merely examples. Moreover, one of ordinary skill in the art will appreciate that additional affordances and/or user interface elements, or that fewer affordances and/or user interface elements may be used in practice.

Figure 5A:
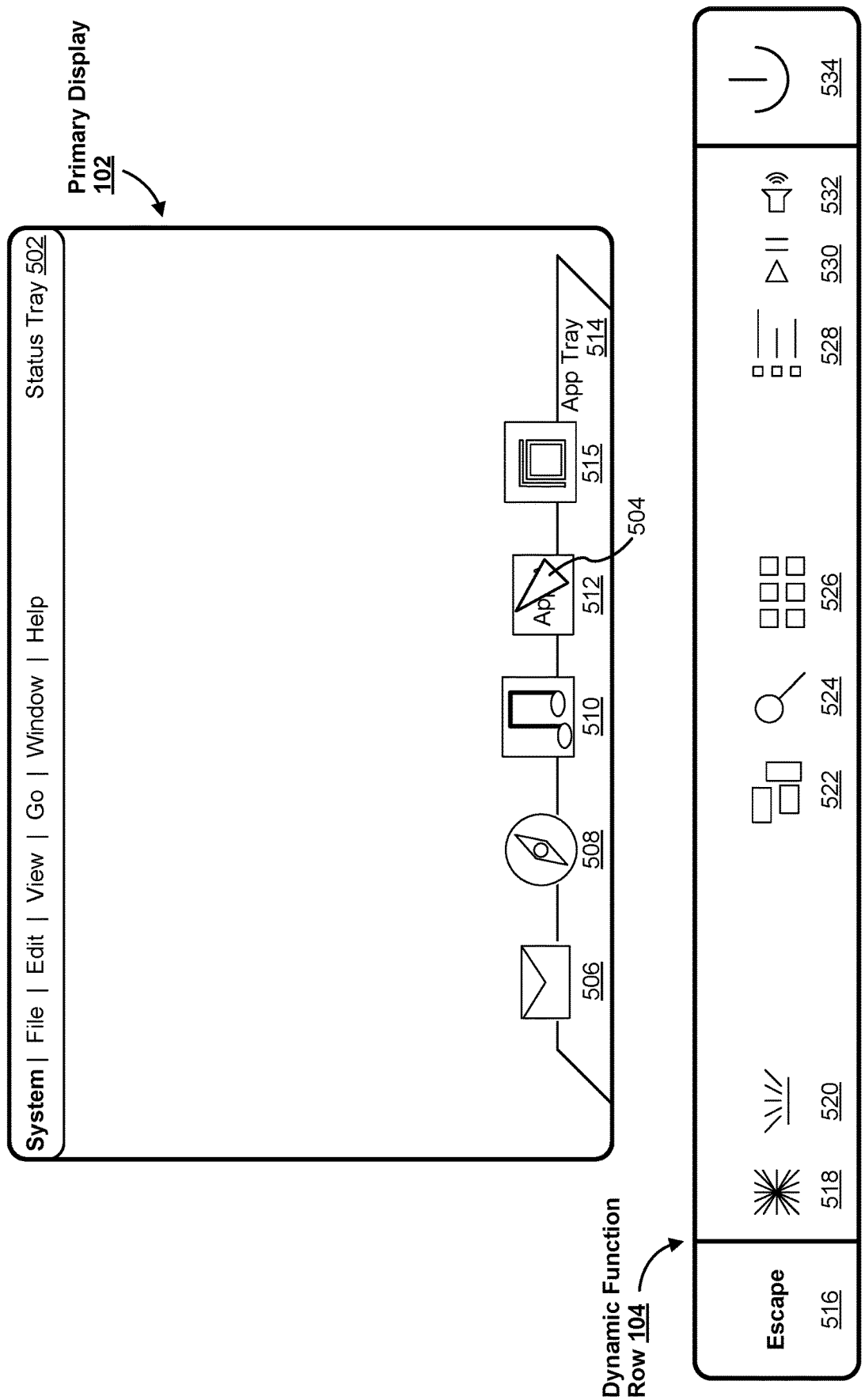
FIGS. 5A-5DDD illustrate example user interfaces for updating a dynamic input and output device, in accordance with some embodiments.

FIG. 5A illustrates primary display 102 displaying a status tray 502 indicating that the system (i.e., the operating system) is currently in focus, and an application (app) tray 514 with a plurality of executable/selectable application icons including: a mail application icon 506 (e.g., corresponding to e-mail client module 341, FIG. 3A), a web browser application icon 508 (e.g., corresponding to web browsing module 345, FIG. 3A), a media player application icon 510 (e.g., corresponding to media player module 344, FIG. 3A), an application A icon 512 (e.g., corresponding to a game), and a photo application icon 515 (e.g., corresponding to image management module 343, FIG. 3A). In some embodiments, status tray 502 indicates an application that is currently running in the foreground and also includes a plurality of menus (e.g., the file, edit, view, go, window, and help menus in FIG. 5A) each including a set of corresponding controls for the application. FIG. 5A also illustrates primary display 102 displaying cursor 504 at a location corresponding to application A icon 512. In some embodiments, cursor 504 is controlled by touch pad 108 of portable computing system 100 (FIGS. 1A-1B), peripheral mouse 208 of desktop computing system 200 (FIGS. 2A and 2D), touch-pad 108 of peripheral keyboard 206 (FIG. 2B), touch-pad 108 of first input mechanism 212 (FIG. 2C), or the like.

FIG. 5A further illustrates dynamic function row 104 (e.g., a touch-sensitive display) displaying a plurality of affordances based on the current focus of primary display 102 (i.e., the operating system because no application windows are open). For example, in FIG. 5A, the system/operating system is currently in focus on primary display 102. In FIG. 5A, dynamic function row 104 includes persistent controls implemented as physical and/or soft keys, including: escape affordance 516, which, when activated (e.g., via a tap contact), invokes a corresponding function (e.g., exiting an application which is currently in focus on primary display 102 or pausing a game); and power control 534, which, when activated (e.g., via a tap contact), causes display of a modal alert (e.g., modal alert 5308, FIG. 5DDD) on dynamic function row 104 and/or primary display 102 for logging out, restarting, or powering-off portable computing system 100 or desktop computing system 200.

In FIG. 5A, dynamic function row 104 also includes a plurality of system-level affordances, including: brightness affordance 518 for adjusting the brightness of primary display 102, FIGS. 1A and 2A-2B; brightness affordance 520 for adjusting the brightness of the set of physical keys 106, FIGS. 1A-1B and 2A-2B (when applicable) and/or the brightness of dynamic function row 104; exposé affordance 522, which, when activated (e.g., via a tap contact), causes display of preview windows for active applications on primary display 102, FIGS. 1A and 2A-2B; search affordance 524 for performing a local search (e.g., for an electronic document) and/or an Internet search; launchpad affordance 526, which, when activated (e.g., via a tap contact), causes display of default or user-selected widgets and tools on primary display 102, FIGS. 1A and 2A-2B; notifications affordance 528, which, when activated (e.g., via a tap contact), causes display of a notification center on primary display 102, FIGS. 1A and 2A-2B including recent messages, notifications, calendar events, and/or the like; play/pause affordance 530 for initiating playback or pausing playback of media items (e.g., songs, podcasts, videos, and the like); and volume control affordance 532 for adjusting the volume of a media item being played. For example, when a tap is detected on brightness affordance 520, dynamic function row 104 displays a brightness slider for adjusting the brightness of the set of physical keys 106 and/or the brightness of dynamic function row 104 (e.g., similar to the volume slider 5100 in FIG. 5K). In some embodiments, the plurality of system-level affordances also include a settings affordance (not shown) for accessing adjusting settings associated with the dynamic function row 104 such as symbol/icon size, touch detection sensitivity, haptic feedback, audible feedback, animations for change in focus, power modes, and the like.

Figure 5B:
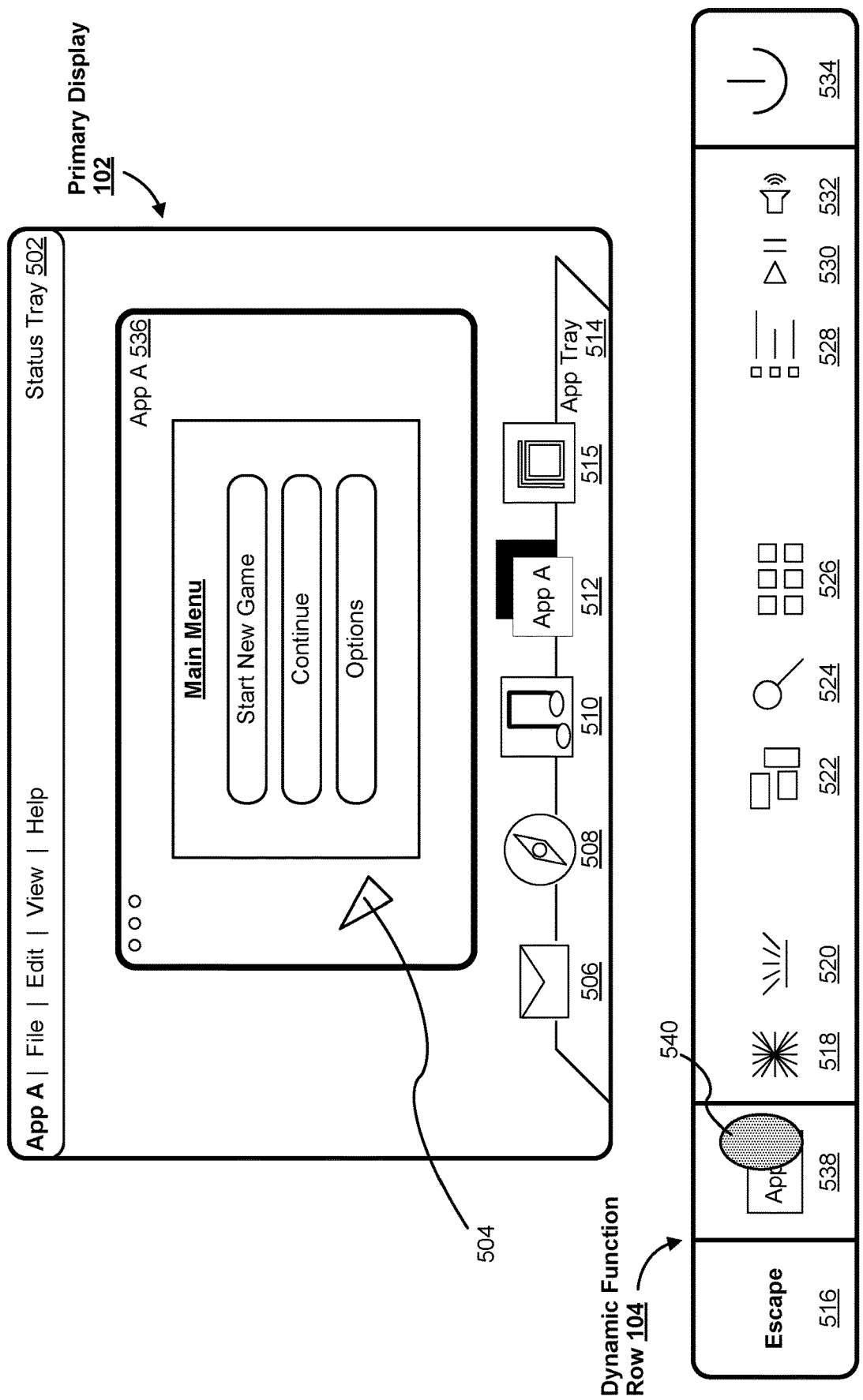

FIG. 5B illustrates primary display 102 displaying a window 536 for application A (e.g., a fantasy RPG game) in response to detecting selection of application A icon 512 with cursor 504 in FIG. 5A. In FIG. 5B, application A is in a main menu mode (e.g., the fantasy RPG game is paused), and window 536 displays a main menu for application A. Window 536 for application A is in focus on primary display 102. In FIG. 5B, status tray 502 indicates that application A is running in the foreground, and app tray 514 also indicates that application A is running in the foreground based on the shadow behind application A icon 512. In FIG. 5B, window 536 for application A includes three selectable affordances in the upper left-hand corner for closing window 536, maximizing the size of window 536, and minimizing window 536 (from left-to-right, respectively).

FIG. 5B also illustrates dynamic function row 104 displaying affordance 538 in addition to the persistent controls (i.e., affordances 516 and 534) and the plurality of system-level affordances (i.e., affordances 518, 520, 522, 524, 526, 528, 530, and 532) in response to detecting selection of application A icon 512 with cursor 504 in FIG. 5A. When activated (e.g., via a tap contact), affordance 538 causes dynamic function row 104 to display a first set of affordances and/or indicators corresponding to application A (e.g., control set A in FIG. 5C). FIG. 5B further illustrates dynamic function row 104 receiving and detecting contact 540 (e.g., a tap contact) at a location corresponding to affordance 538.

Figure 5C:
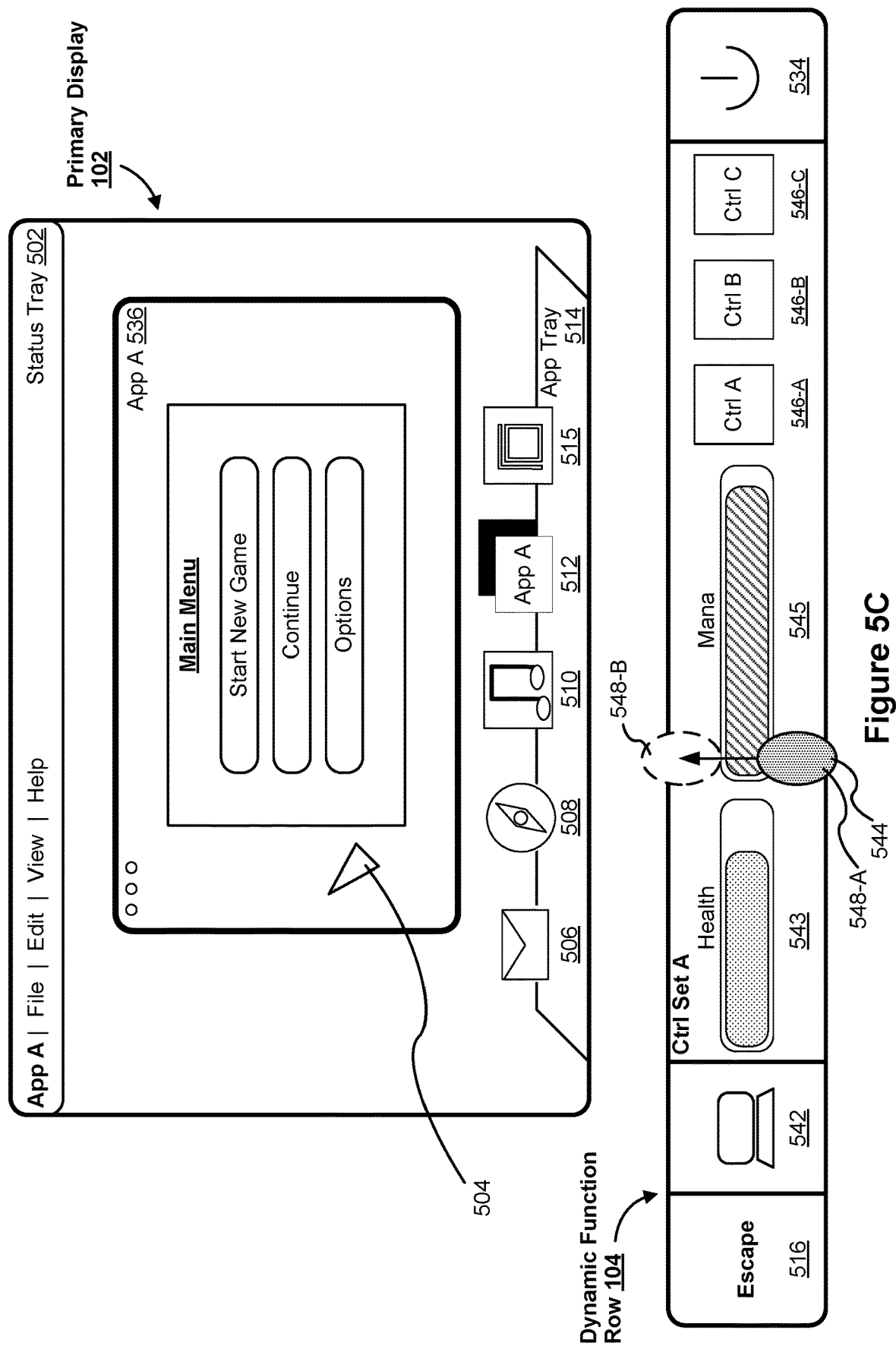

FIG. 5C illustrates dynamic function row 104 displaying a first set of affordances and/or indicators (e.g., control set A) corresponding to application A and at least one system-level affordance (e.g., affordance 542) in response to detecting selection of affordance 538 in FIG. 5B. In FIG. 5C, the first set of affordances and/or indicators (e.g., control set A) corresponding to application A (e.g., the fantasy RPG game) includes a health indicator 543 and a mana indicator 545 related to an in-game character/avatar controlled by the user of portable computing system 100 or desktop computing system 200 while playing application A. In FIG. 5C, the first set of affordances and/or indicators (e.g., control set A) corresponding to application A also includes control affordances 546-A, 546-B, and 546-C for controlling the in-game character/avatar. When activated (e.g., via a tap contact), affordance 542 causes dynamic function row 104 to display the plurality of system-level affordances (e.g., affordances 518, 520, 522, 524, 526, 528, 530, and 532 shown in FIG. 5A). FIG. 5C also illustrates dynamic function row 104 receiving and detecting an upward swipe gesture with contact 544 moving from a first location 548-A to a second location 548-B.

Figure 5D:
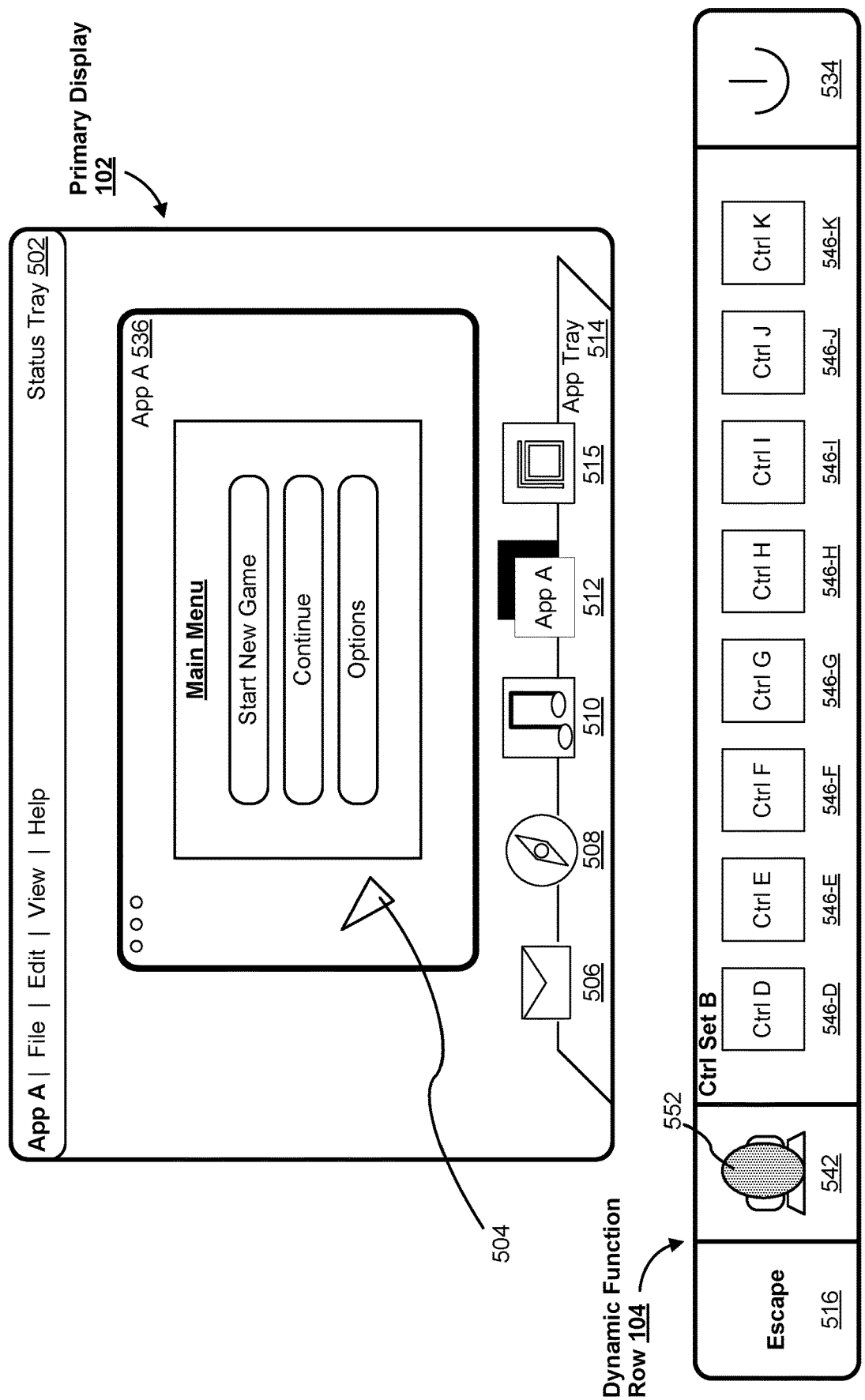

FIG. 5D illustrates dynamic function row 104 displaying a second set of affordances and/or indicators (e.g., control set B) corresponding to application A and the at least one system-level affordance (e.g., affordance 542) in response to detecting the upward swipe gesture in FIG. 5C. In FIG. 5D, the second set of affordances and/or indicators (e.g., control set B) corresponding to application A includes control affordances 546-D, 546-E, 546-F, 546-G, 546-H, 546-I, 546-J, and 546-K for controlling the in-game character/avatar controlled by the user of portable computing system 100 or desktop computing system 200 while playing application A. FIG. 5D also illustrates dynamic function row 104 receiving and detecting contact 552 (e.g., a tap contact) at a location corresponding to affordance 542.

Figure 5E:
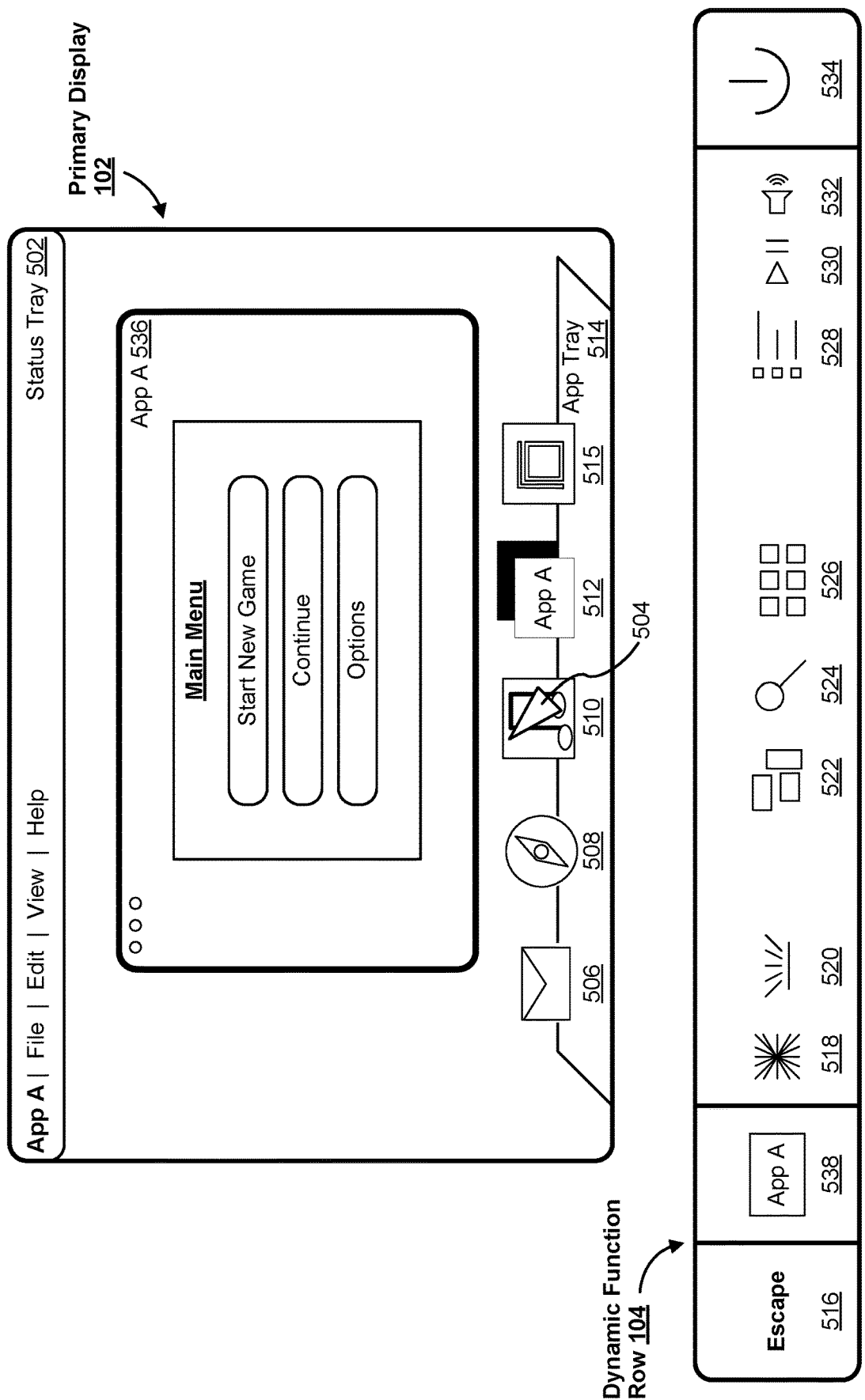

FIG. 5E illustrates dynamic function row 104 displaying persistent controls (i.e., affordances 516 and 534), the plurality of system-level affordances (i.e., affordances 518, 520, 522, 524, 526, 528, 530, and 532), and affordance 538 corresponding to application A in response to detecting selection of affordance 542 in FIG. 5D. FIG. 5E also illustrates primary display 102 displaying cursor 504 at a new location corresponding to media player application icon 510.

Figure 5F:
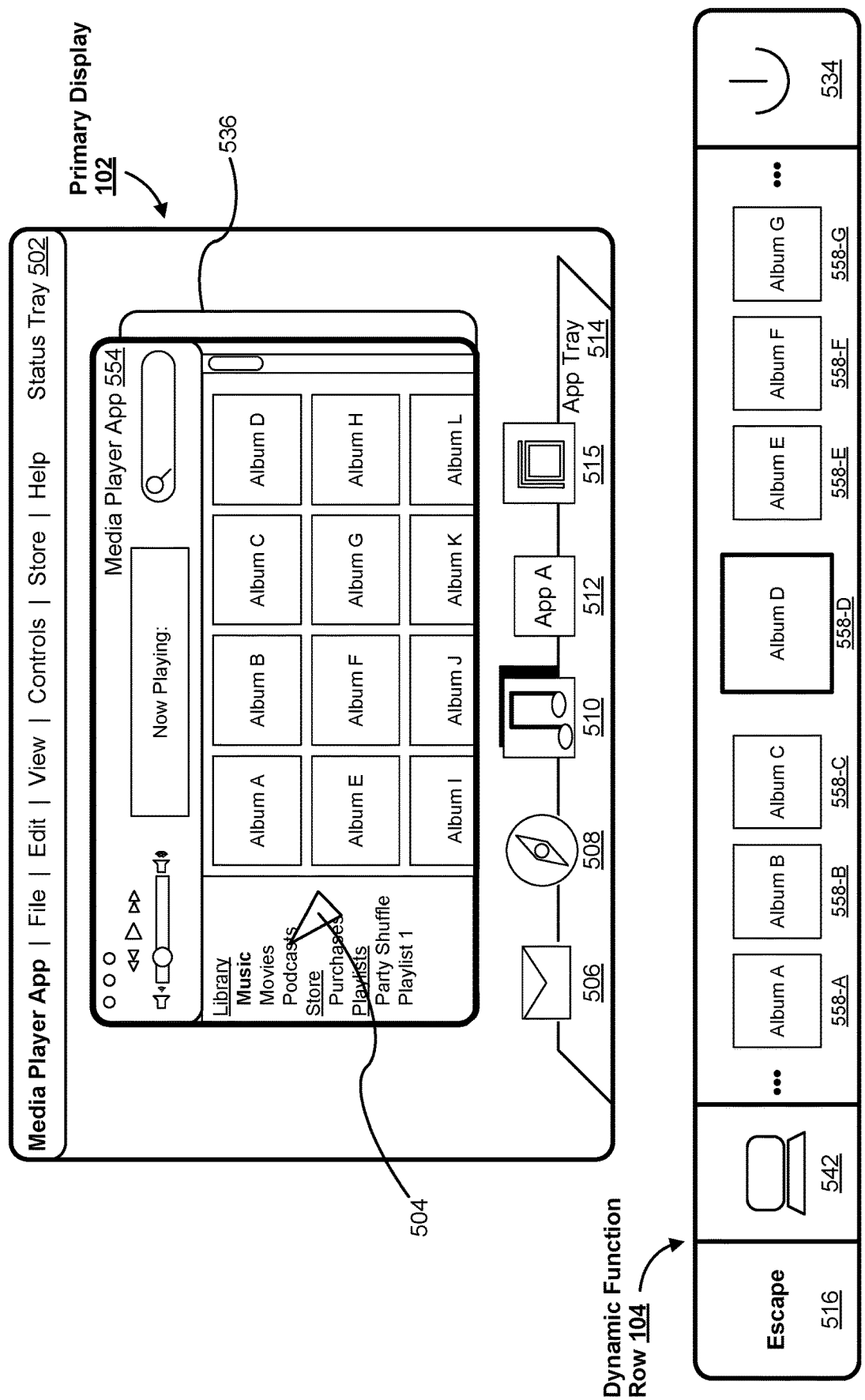

FIG. 5F illustrates primary display 102 displaying a window 554 for the media player application in response to detecting selection of media player application icon 510 with cursor 504 in FIG. 5E. For example, window 554 is overlaid on window 536. In FIG. 5F, window 554 displays a plurality of albums associated with a music sub-section of a user's media library. In FIG. 5F, the music sub-section of the user's media library is in focus on primary display 102 as shown by "Music" displayed in bold and albums A-L at least partially displayed in window 554. In FIG. 5F, status tray 502 indicates that the media player application is running in the foreground, and app tray 514 also indicates that the media player application is running in the foreground based on the shadow behind media player application icon 510. FIG. 5F also illustrates primary display 102 displaying cursor 504 at a location corresponding to the podcasts sub-section of the user's media library.

FIG. 5F further illustrates dynamic function row 104 displaying a plurality of album affordances 558 (e.g., album affordances 558-A to 558-G) and the at least one system-level affordance (e.g., affordance 542) in response to detecting selection of media player application icon 510 with cursor 504 in FIG. 5E. In FIG. 5F, the plurality of album affordances 558 correspond to a subset of the albums currently displayed in window 554. In some embodiments, the plurality of album affordances 558 mirror the albums currently displayed in window 554. For example, in response to selection of album affordance 558-D (e.g., via a tap contact), portable computing device 100 or computing device 200 causes playback of album D by audio circuitry 310 (FIG. 3A) and also causes primary display 102 to display album D in the now playing region of window 554.

Figure 5G:
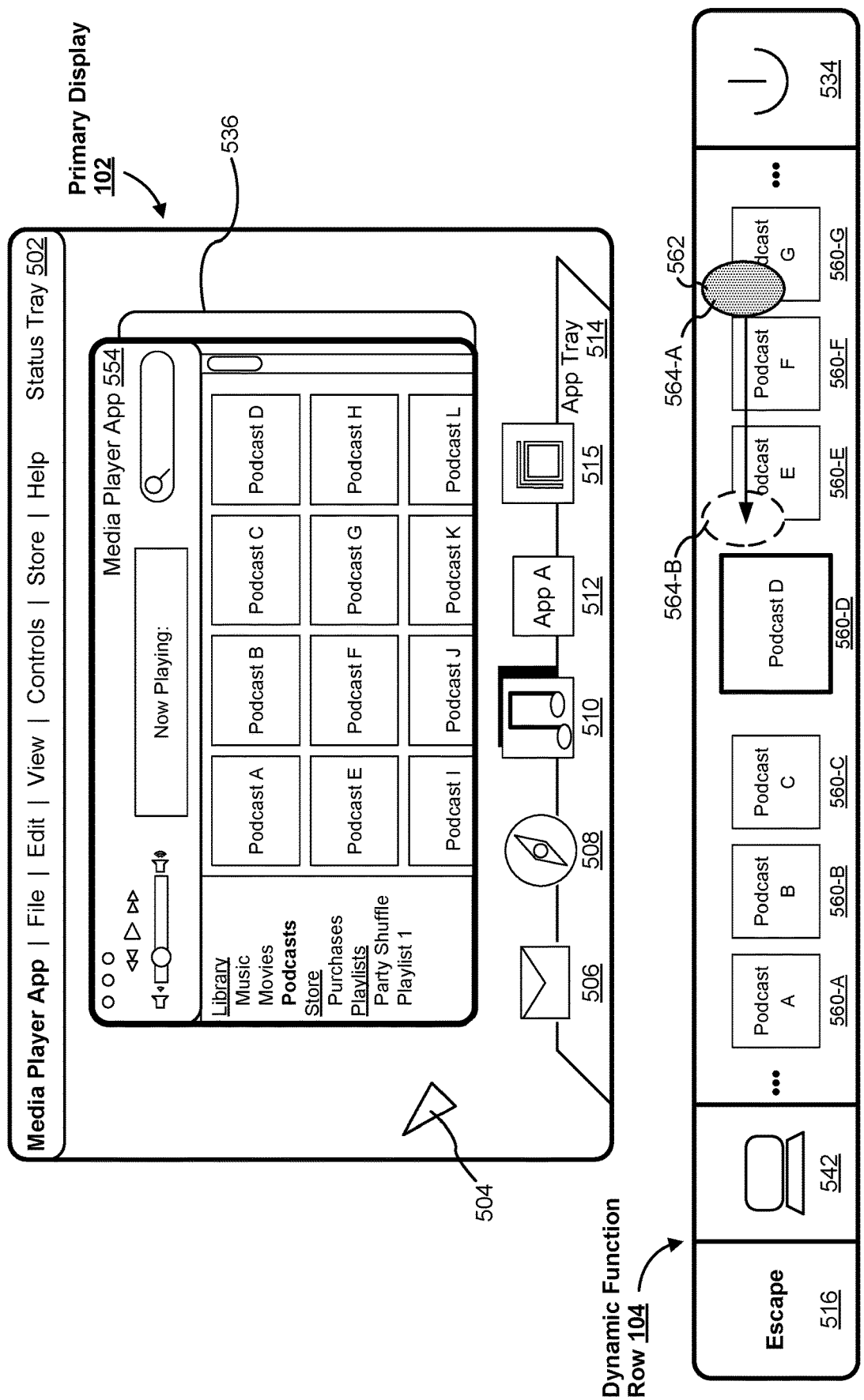

FIG. 5G illustrates primary display 102 displaying a first plurality of podcasts in window 554 in response to detecting selection of the podcasts sub-section with cursor 504 in FIG. 5F. In FIG. 5G, window 554 displays a plurality of podcasts associated with a podcasts sub-section of the user's media library. In FIG. 5G, the podcasts sub-section of the user's media library is in focus on primary display 102 as shown by "Podcasts" displayed in bold in the menu and podcasts A-L at least partially displayed in window 554.

FIG. 5G also illustrates dynamic function row 104 displaying a first plurality of podcast affordances 560 (e.g., podcast affordances 560-A to 560-G) and the at least one system-level affordance (e.g., affordance 542) in response to detecting selection of the podcasts sub-section with cursor 504 in FIG. 5F. In FIG. 5G, the plurality of podcast affordances 560 correspond to a subset of the podcasts currently displayed in window 554. For example, in response to selection of podcast affordance 560-D (e.g., via a tap contact), portable computing device 100 or computing device 200 causes playback of podcast D by audio circuitry 310 (FIG. 3A) and also causes primary display 102 to display podcast D in the now playing region of window 554. FIG. 5G further illustrates dynamic function row 104 detecting a right-to-left swipe gesture with contact 562 moving from a first location 564-A to a second location 564-B.

Figure 5H:
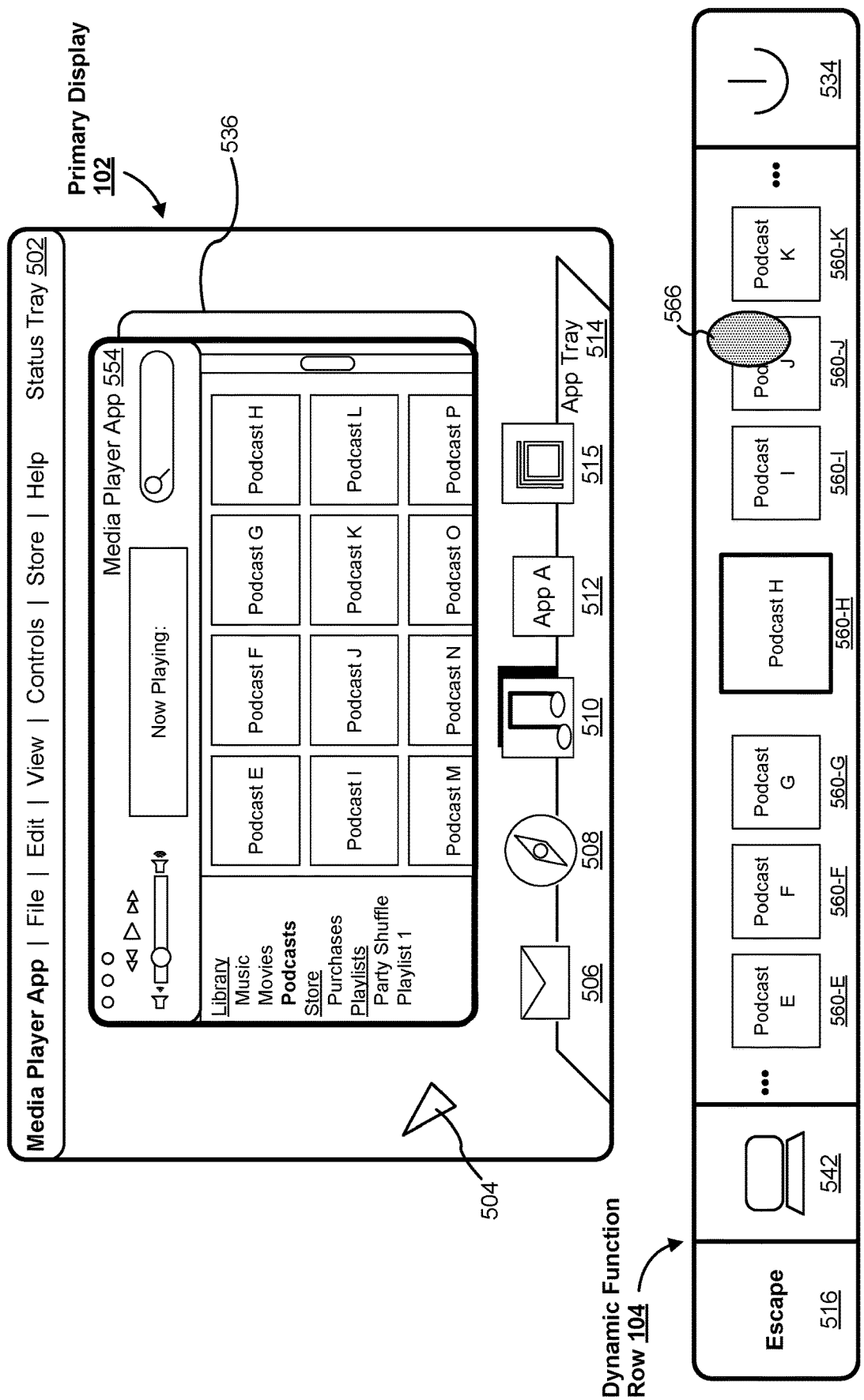

FIG. 5H illustrates primary display 102 displaying a second plurality of podcast affordances 560 (e.g., podcast affordances 560-E to 560-P) in window 554 in response to detecting the right-to-left swipe gesture in 5G. FIG. 5H also illustrates dynamic function row 104 displaying a second plurality of podcast affordances 560 (e.g., podcast affordances 560-E to 560-K) and the at least one system-level affordance (e.g., affordance 542) in response to detecting the right-to-left swipe gesture in 5G. FIG. 5H further illustrates dynamic function row 104 receiving and detecting contact 566 (e.g., a tap contact) at a location corresponding to podcast affordance 560-J.

Figure 5I:
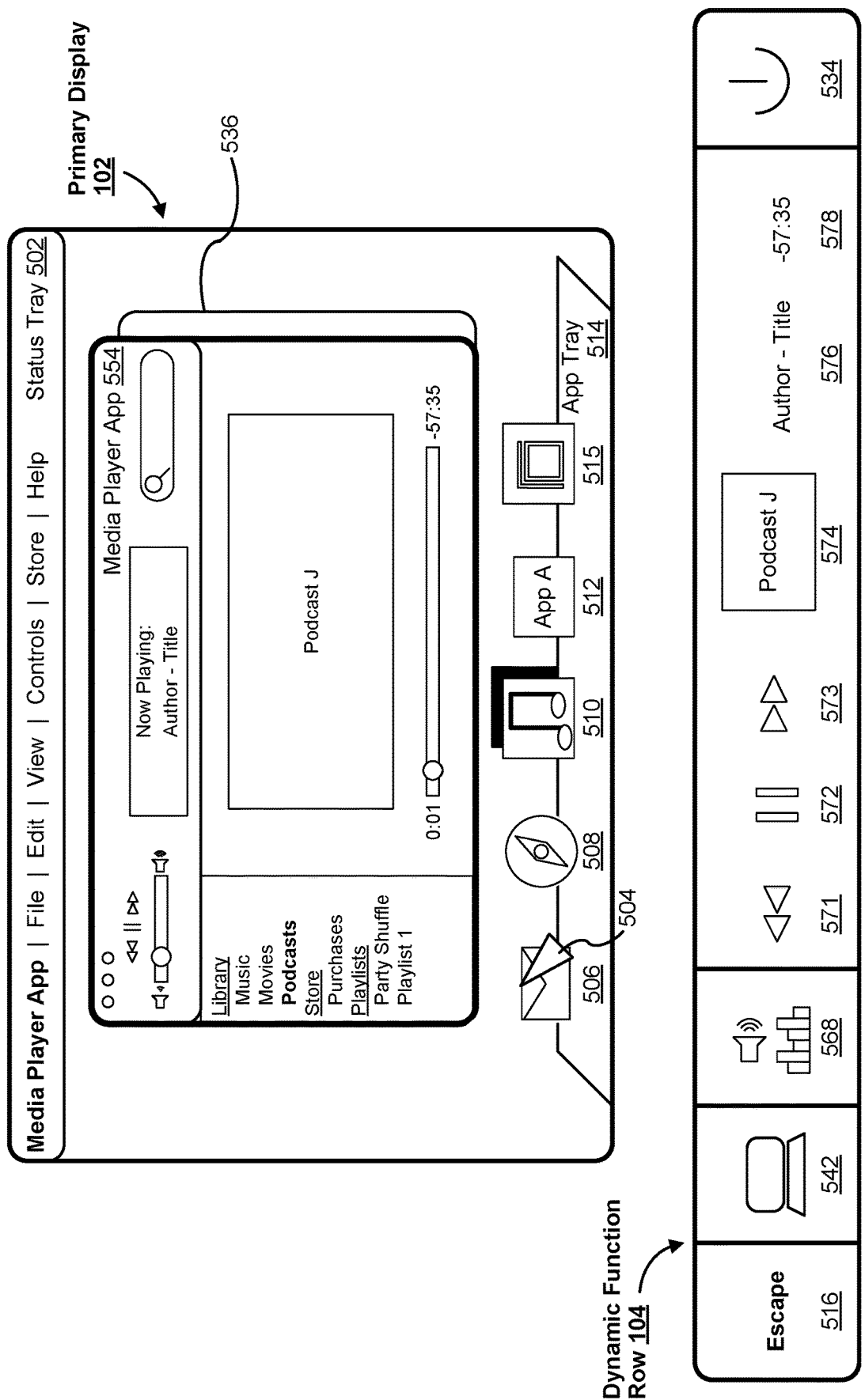

FIG. 5I illustrates primary display 102 displaying playback of podcast J in window 554 in response to detecting selection of podcast affordance 560-J in FIG. 5H. Figure 5I also illustrates primary display 102 displaying cursor 504 at a location corresponding to mail application icon 506.

FIG. 5I further illustrates dynamic function row 104 displaying persistent volume control 568 along with playback controls and indicators in response to detecting selection of podcast affordance 560-J in FIG. 5H. In FIG. 5I, persistent volume control 568 indicates that podcast J is not muted and also displays equalizer feedback for podcast J. In FIG. 5I, the playback controls include a rewind control 571, pause control 572, and fast-forward control 573 for controlling the playback of podcast J. In FIG. 5I, the playback indicators include an image 574 corresponding podcast J (e.g., cover art or an associated image), indicator 576 displaying the author and title of podcast J, and a time remaining indicator 578.

Figure 5J:
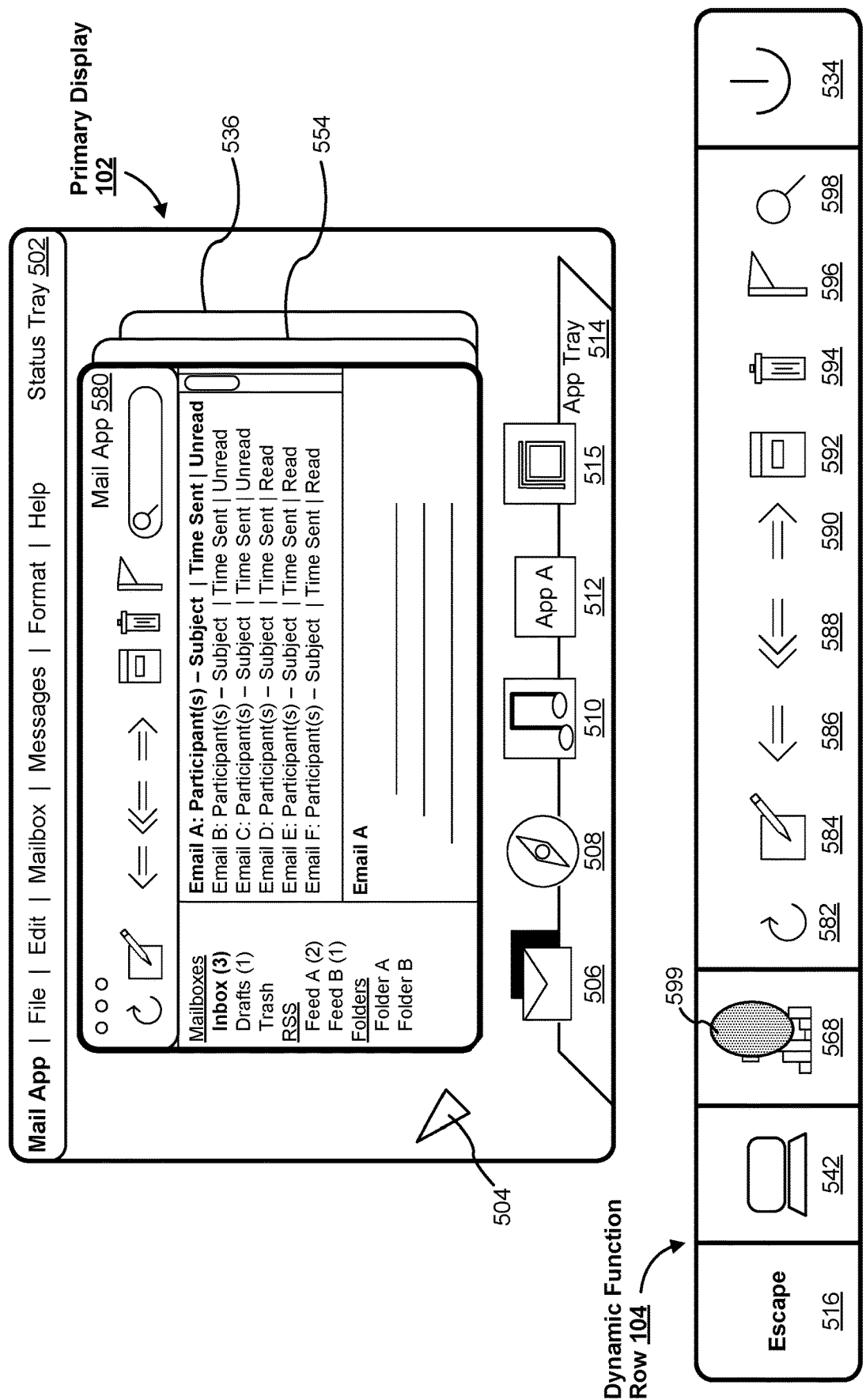

FIG. 5J illustrates primary display 102 displaying a window 580 for the mail application in response to detecting selection of mail application icon 506 with cursor 504 in FIG. 5I. For example, window 580 is overlaid on windows 554 and 536. In FIG. 5J, window 580 displays a list of a plurality of emails (e.g., emails A-F) in a user's inbox and the contents of selected email A. In some embodiments, a newest or the most urgent email is displayed at the top of the list of the plurality of emails in the user's inbox and the email at the top of the list is automatically selected. In FIG. 5J, email A is in focus on primary display 102 as email is displayed in bold within the list of the plurality of emails and email A's contents are displayed in window 580 below the list. In FIG. 5J, status tray 502 indicates that the mail application is running in the foreground, and app tray 514 also indicates that the mail application is running in the foreground based on the shadow behind mail application icon 506.

FIG. 5J also illustrates dynamic function row 104 displaying a plurality of affordances corresponding to email A (e.g., affordances 582, 584, 586, 588, 590, 592, 594, 596, and 598) and the at least one system-level affordance (e.g., affordance 542) in response to detecting selection of mail application icon 506 with cursor 504 in FIG. 5I. In FIG. 5J, the plurality of affordances corresponding to email A include: affordance 582, which, when activated (e.g., via a tap contact), refreshes the inbox; affordance 584, which, when activated (e.g., via a tap contact), causes primary display 102 to display a sub-window for composing a new email (e.g., shown in FIG. 5M); affordance 586, which, when activated (e.g., via a tap contact), causes primary display 102 to display a sub-window for replying to the sender of email A; affordance 588, which, when activated (e.g., via a tap contact), causes primary display 102 to display a sub-window for replying to all recipients of email A; affordance 590, which, when activated (e.g., via a tap contact), causes primary display 102 to display a sub-window for forwarding email A; affordance 592, which, when activated (e.g., via a tap contact), causes email A to be archived to a default mailbox or folder; affordance 594, which, when activated (e.g., via a tap contact), causes email A to be deleted; affordance 596, which, when activated (e.g., via a tap contact), causes dynamic function row 104 to display a set of affordances for selecting different flags, which optionally correspond to pre-existing folders, to be applied to email A (e.g., as shown in FIG. 5L); and affordance 598, which, when activated (e.g., via a tap contact), causes primary display 102 or dynamic function row 104 to display a search dialogue for searching the user's inbox. FIG. 5J further illustrates dynamic function row 104 receiving and detecting contact 599 (e.g., a long press gesture) at a location corresponding to persistent volume control 568.

Figure 5K:
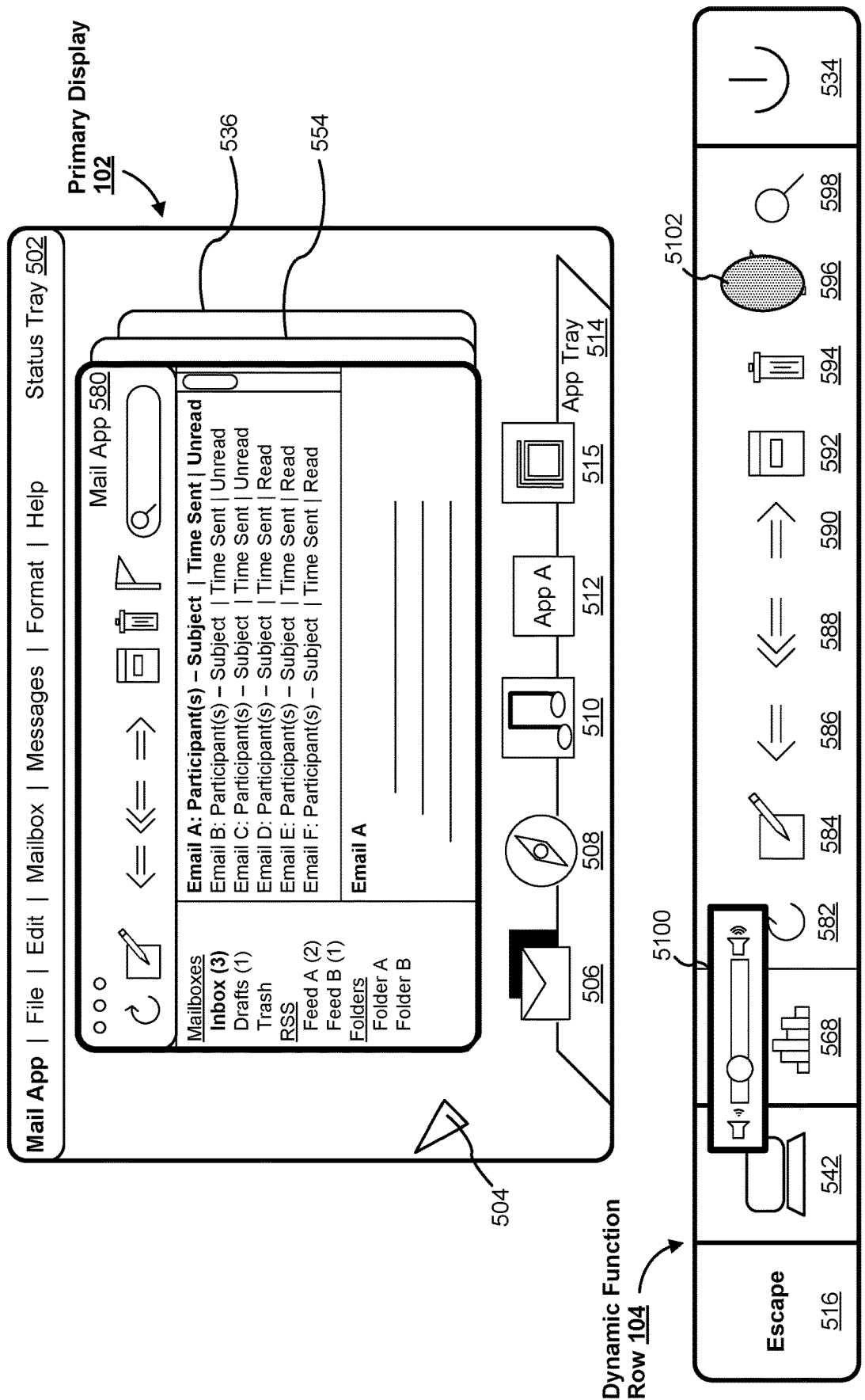
Figure 5L:
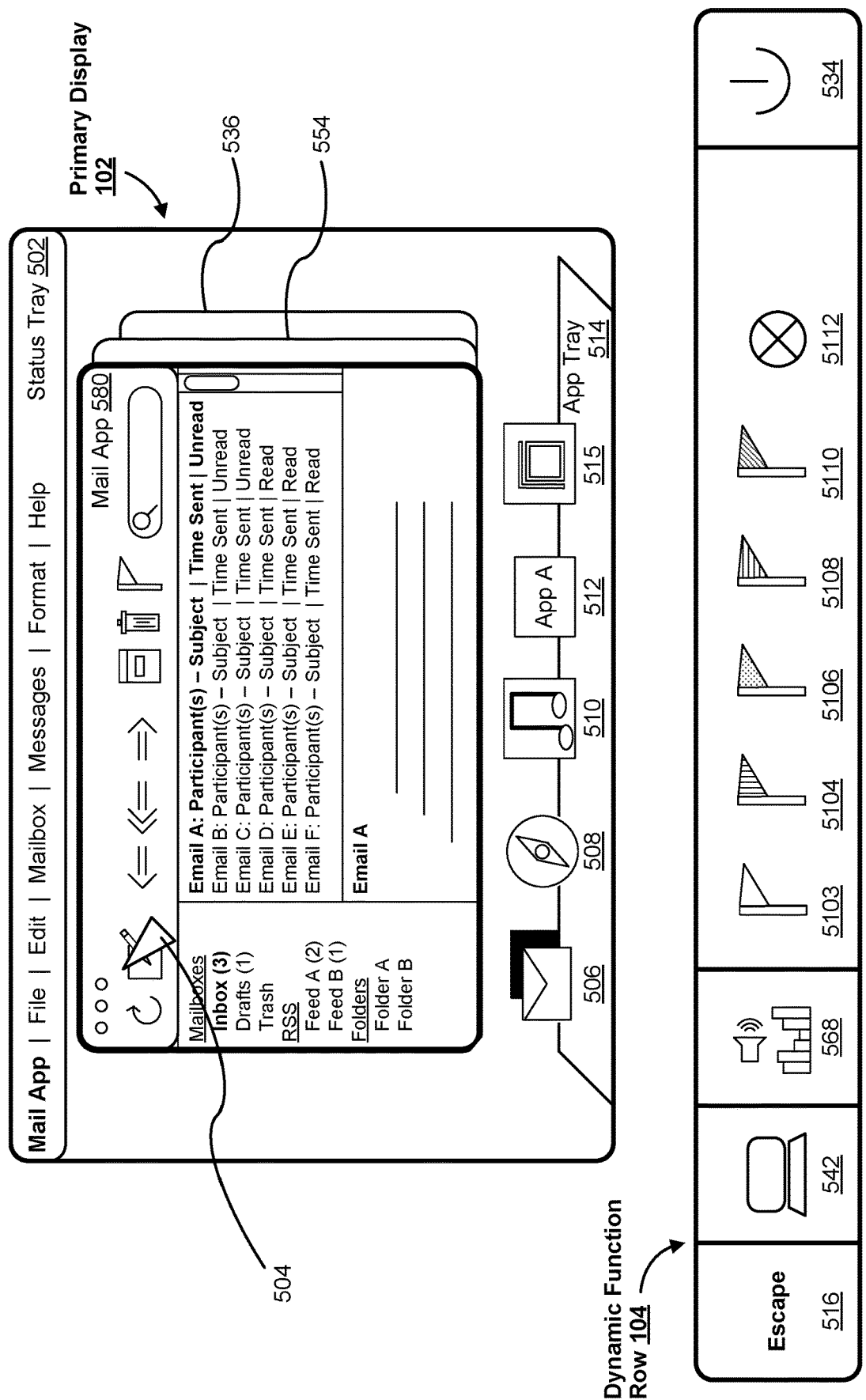

FIG. 5K illustrates dynamic function row 104 displaying volume slider 5100 for adjusting the playback volume of podcast J, which was initiated in FIG. 5H, in response to detecting the long press gesture at the location corresponding to persistent volume control 568 in FIG. 5J. The circle/thumb in volume slider 5100 can be dragged by the user of portable computing system 100 or desktop computing system 200 to adjust the volume. Alternatively, in some embodiments, dynamic function row 104 displays playback controls (e.g., pause, fast forward, rewind, next track, previous track, and the like) for controlling the playback of podcast J, which was initiated in FIG. 5H, in response to detecting the long press gesture at the location corresponding to persistent volume control 568 in FIG. 5J. In FIG. 5K, volume slider 5100 is overlaid on the plurality of affordances corresponding to email A. FIG. 5K also illustrates dynamic function row 104 receiving and detecting contact 5102 (e.g., a tap contact) at a location corresponding to affordance 596.

In other embodiments, volume slider 5100 is displayed in a separate region from the plurality of affordances corresponding to email A. As such, while volume slider 5100 is activated, the plurality of affordances corresponding to email A (e.g., affordances 582, 584, 586, 588, 590, 592, 594, 596, and 598) are animatedly scrolled or shrunken to ensure enough display space is available to display volume slider 5100. In some embodiments, the circle/thumb is displayed under the user's finger in response to the long press gesture to allow the user to slide the circle/thumb without having to remove the contact from the affordance.

FIG. 5L illustrates dynamic function row 104 displaying a set of affordances 5103, 5104, 5106, 5108, and 5110 for selecting different flags, which optionally correspond to pre-existing folders, to be applied to email A in response to detecting selection of affordance 596 in FIG. 5K. In FIG. 5L, dynamic function row 104 also displays exit affordance 5112 for ceasing to display the set of affordances 5103, 5104, 5106, 5108, and 5110 on dynamic function row 104 and displaying the plurality of affordances corresponding to email A on dynamic function row 104 (e.g., as shown in FIG. 5J). FIG. 5L also illustrates primary display 102 displaying cursor 504 at a location corresponding to an email composition affordance in window 580.

Figure 5M:
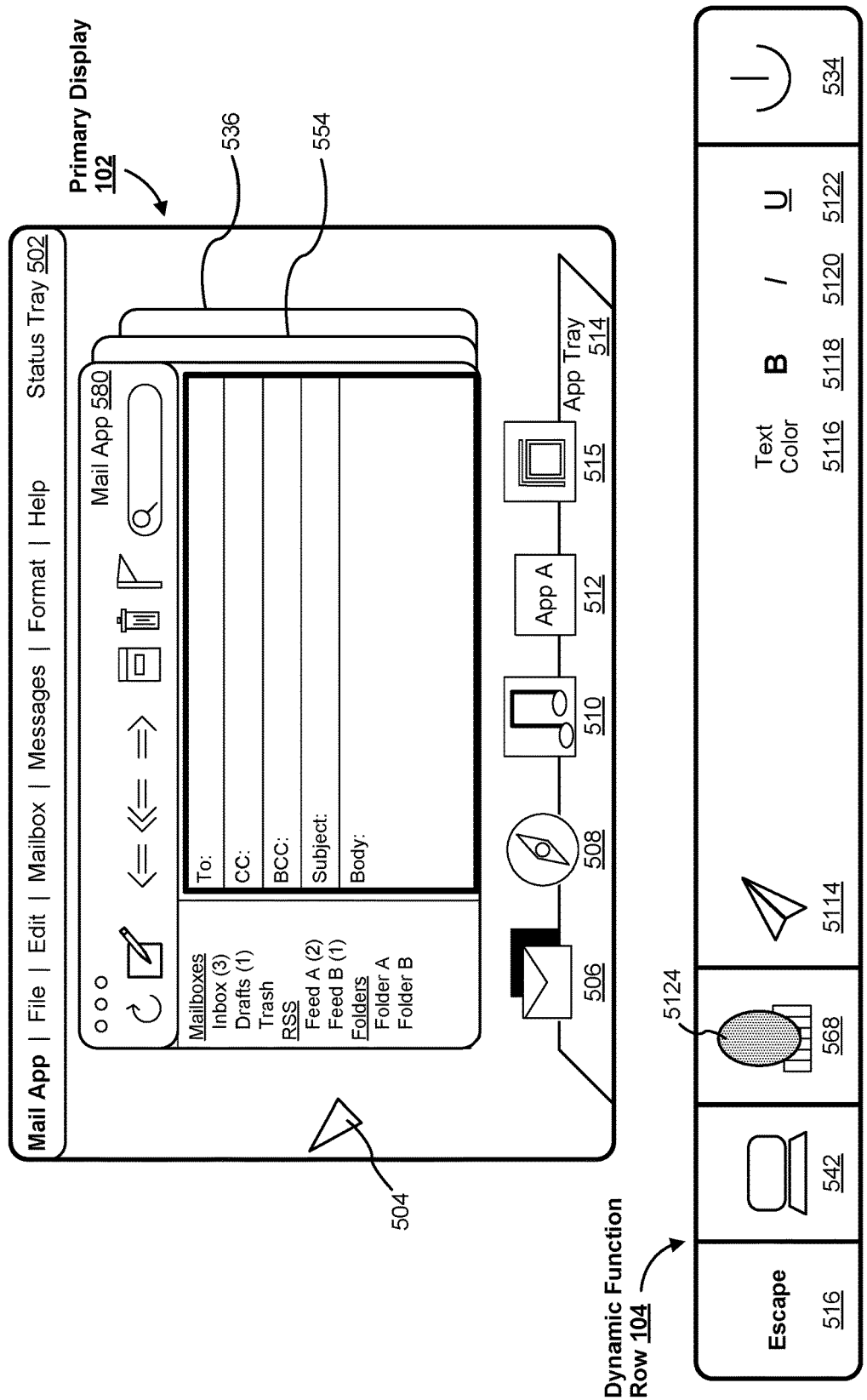

FIG. 5M illustrates primary display 102 displaying a sub-window for composing a new email within window 580 in response to detecting selection of the email composition affordance with cursor 504 in FIG. 5L. In FIG. 5M, the sub-window for composing a new email is in focus on primary display 102 as the email composition affordance is displayed with thicker lines and also as indicated by the thick lines surrounding the sub-window for composing a new email.

FIG. 5M also illustrates dynamic function row 104 displaying a set of affordances corresponding to composing a new email in response to detecting selection of the email composition affordance with cursor 504 in FIG. 5L. In FIG. 5M, the set of affordances corresponding to composing a new email includes an affordance 5114, which, when activated (e.g., via a tap contact), causes portable computing system 100 or desktop computing system 200 to send the newly composed email; affordance 5116 for changing the text color of selected the text of the new email; affordance 5118 for emboldening selected text of the new email; affordance 5120 for italicizing selected text of the new email; and affordance 5122 for underlining selected text of the new email. FIG. 5M further illustrates dynamic function row 104 receiving and detecting contact 5124 (e.g., a tap contact) at a location corresponding to persistent volume control 568.

Figure 5N:
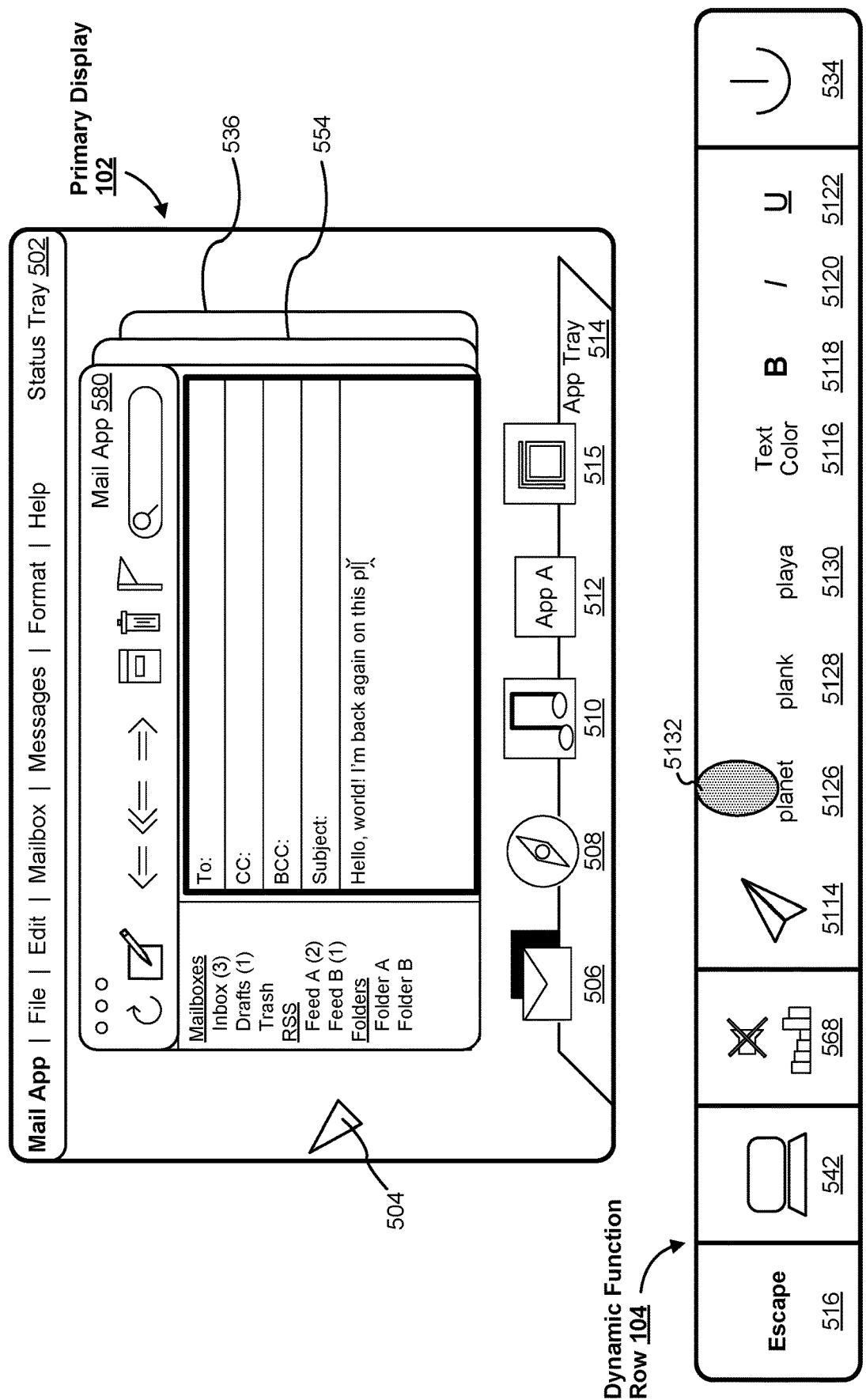

FIG. 5N illustrates primary display 102 displaying text in the body of the new email in the sub-window for composing a new email within window 580 and an indicator of the current insertion position located after the characters "pl."

FIG. 5N also illustrates dynamic function row 104 displaying persistent volume control 568 indicating that podcast J is muted in response to detecting the tap contact at the location corresponding to persistent volume control 568 in FIG. 5M. In FIG. 5N, persistent volume control 568 displays equalizer feedback for podcast J even while podcast J, whose playback was initiated in FIG. 5H, is muted (i.e., shows that podcast J is still playing but is muted). In FIG. 5N, dynamic function row 104 displays predictive words 5126, 5128, and 5130 for completing the word beginning with "pl" that is being typed in the body of the new email based on the insertion point in the sub-window within window 580. FIG. 5N further illustrates dynamic function row 104 receiving and detecting contact 5132 (e.g., a tap contact) at a location corresponding to predictive word 5126 (i.e., "planet").

Figure 5O:
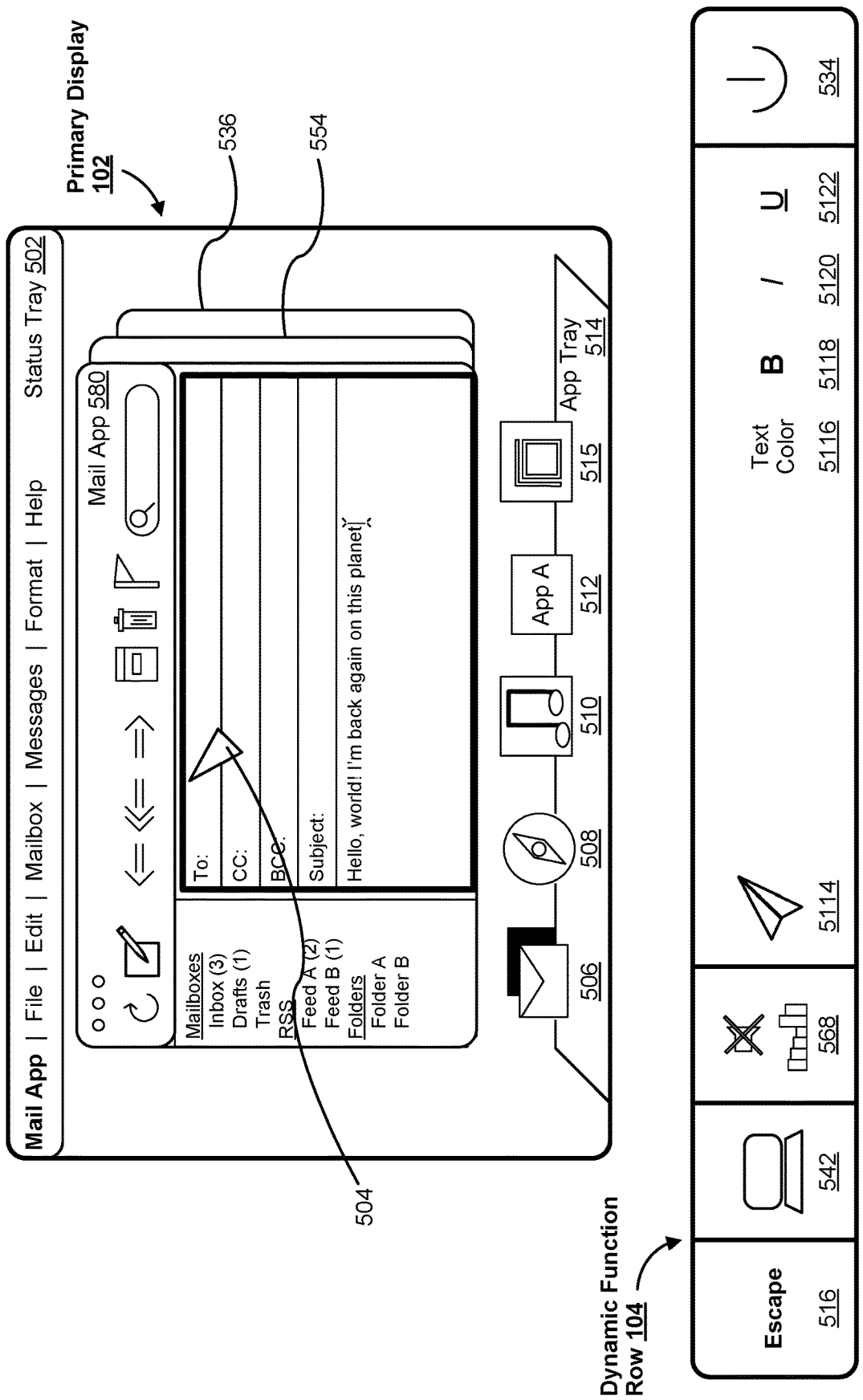

FIG. 5O illustrates primary display 102 displaying the word "planet" in the body of the new email in the sub-window for composing a new email within window 580 in response to detecting the selection of predictive word 5126 (i.e., "planet") in FIG. 5N. FIG. 5O also illustrates primary display 102 displaying cursor 504 at a location corresponding to the "To:" field of the sub-window for composing a new email.

Figure 5P:
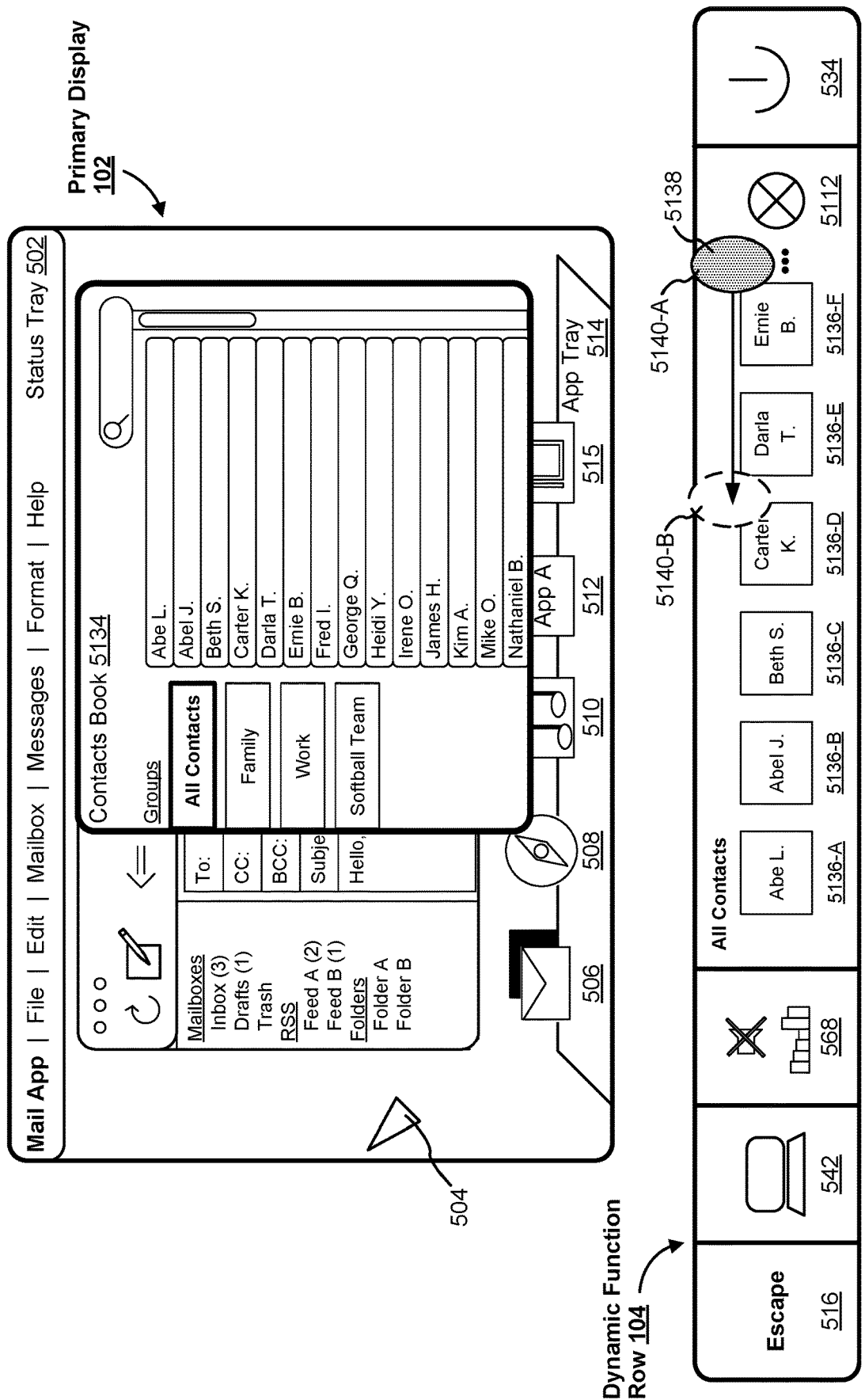

FIG. 5P illustrates primary display 102 displaying menu 5134 corresponding to the user's contact book in response to detecting selection of the "To:" field with cursor 504 in FIG. 5O. In FIG. 5P, menu 5134 includes a list of a plurality of contacts corresponding the "All Contacts" group of the user's contact book (e.g., a list of pre-existing or automatically populated contacts). In FIG. 5P, the "All Contacts"

group of the user's contact book is in focus on primary display 102 as indicated by the thick lines surrounding the "All Contacts" group in menu 5134.

FIG. 5P also illustrates dynamic function row 104 displaying a first plurality of contact affordances 5136 (e.g., contact affordances 5136-A to 5136-F) corresponding to the "All Contacts" group of the user's contact book and the at least one system-level affordance (e.g., affordance 542) in response to detecting selection of the "To:" field with cursor 504 in FIG. 5O. In FIG. 5P, dynamic function row 104 also displays exit affordance 5112, which, when activated (e.g., via a tap contact), causes primary display 102 to cease displaying menu 5134 on primary display 102 and also causes dynamic function row 104 to cease displaying the first plurality of contact affordances 5136. FIG. 5P further illustrates dynamic function row 104 detecting a right-to-left swipe gesture with contact 5138 moving from a first location 5140-A to a second location 5140-B (e.g., the user scrolls right-to-left through All Contacts).

Figure 5Q:
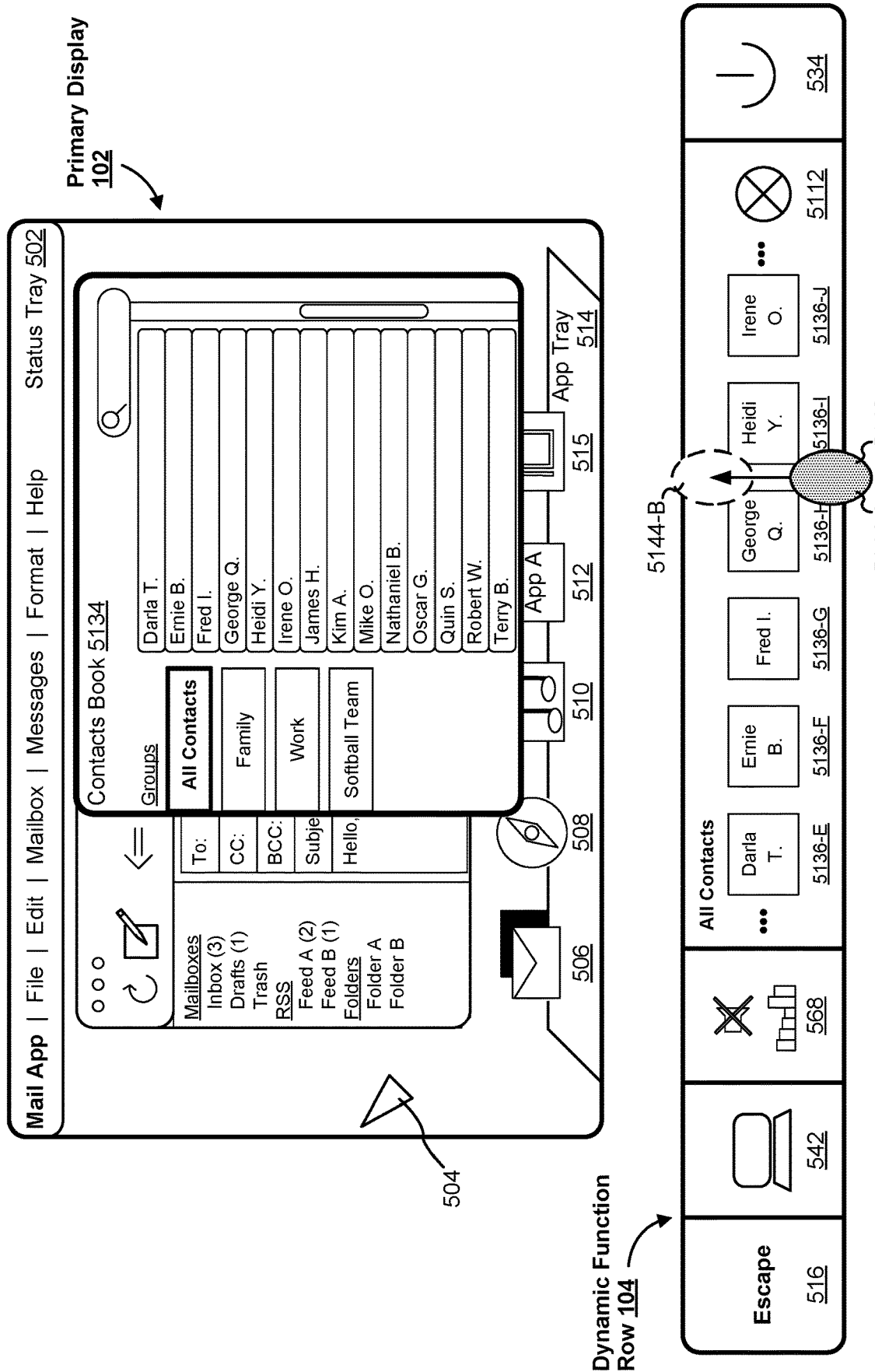

FIG. 5Q illustrates dynamic function row 104 displaying a second plurality of contact affordances 5136 (e.g., contact affordances 5136-E to 5136-J) corresponding to the "All Contacts" group of the user's contact book and the at least one system-level affordance (e.g., affordance 542) in response to detecting the right-to-left swipe gesture in 5P. FIG. 5Q also illustrates dynamic function row 104 detecting an upward swipe gesture with contact 5142 moving from a first location 5144-A to a second location 5144-B.

Figure 5R:
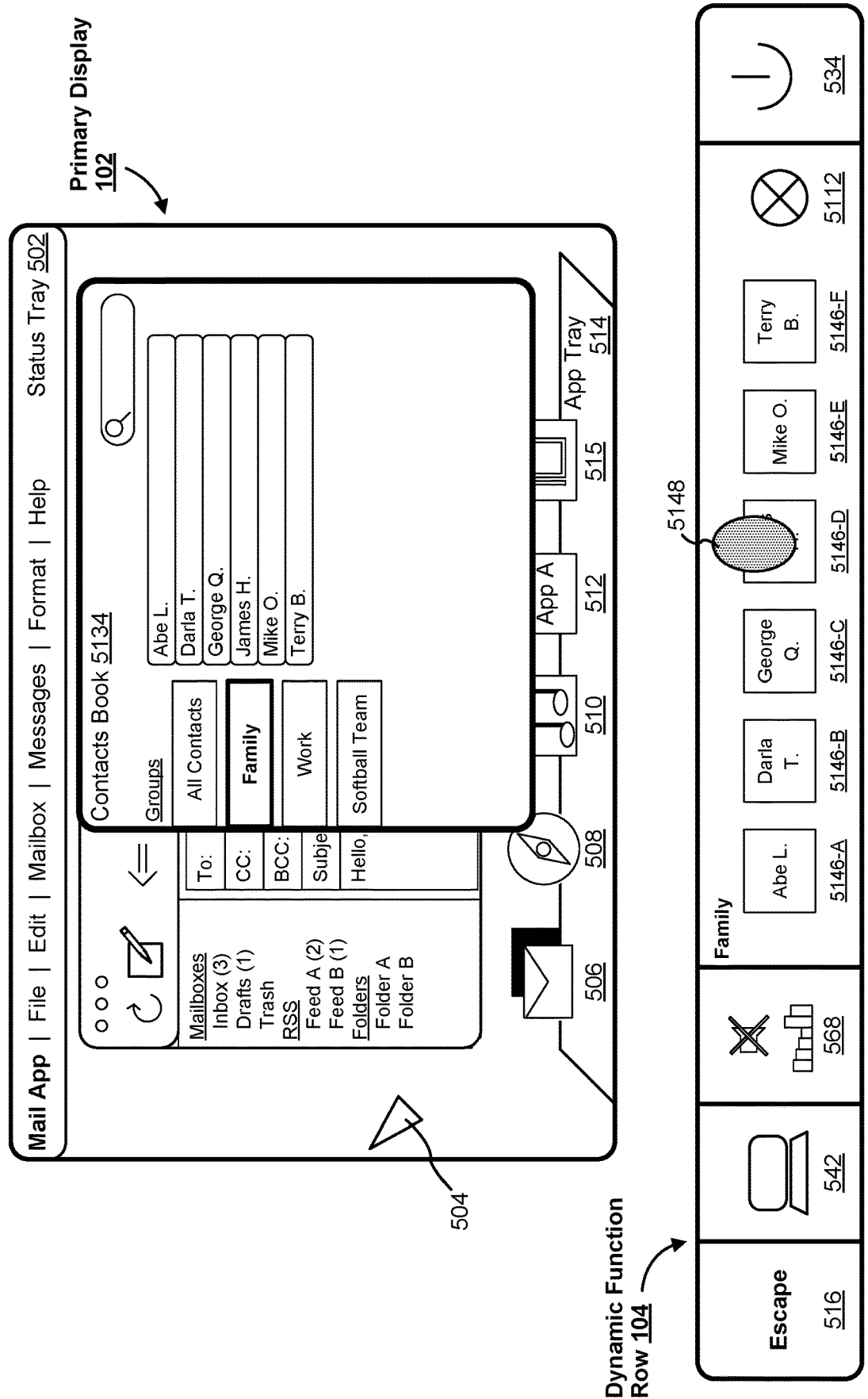

FIG. 5R illustrates primary display 102 displaying a list of a plurality of contacts corresponding the "Family" group of the user's contact book in response to detecting the upward swipe gesture in FIG. 5Q. In FIG. 5R, the "Family" group of the user's contact book is in focus on primary display 102 as indicated by the thick lines surrounding the "Family" group in menu 5134.

FIG. 5R also illustrates dynamic function row 104 displaying a plurality of contact affordances 5146 (e.g., contact affordances 5146-A to 5146-F) corresponding to the "Family" group of the user's contact book and the at least one system-level affordance (e.g., affordance 542) in response to detecting upward swipe gesture in FIG. 5Q. FIG. 5R further illustrates dynamic function row 104 receiving and detecting contact 5148 (e.g., a tap contact) at a location corresponding to contact affordance 5146-D, which is associated with a contact named "James H." within the "Family" group of the user's contact book.

Figure 5S:
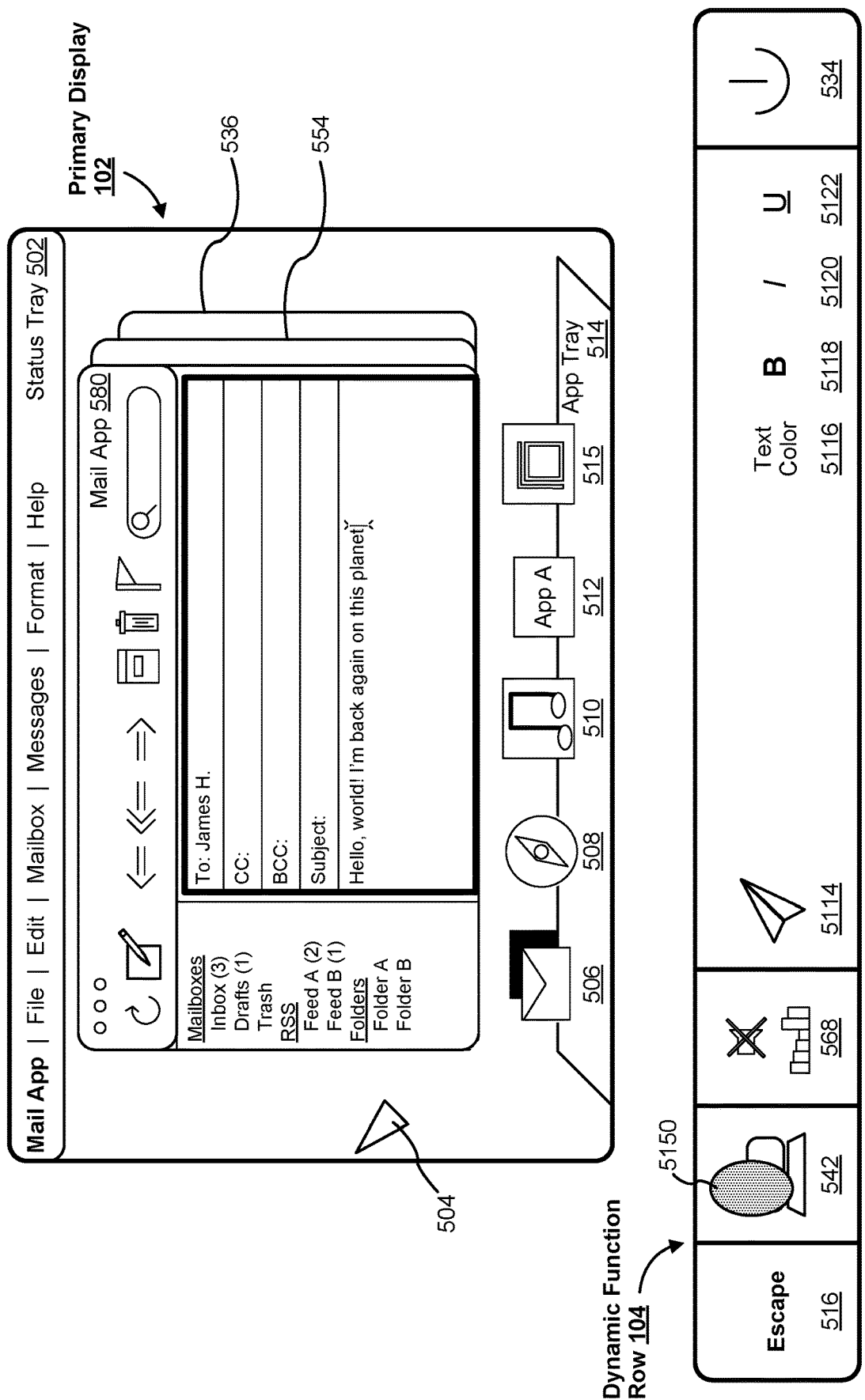

FIG. 5S illustrates primary display 102 displaying "James H." in the "To:" field of the sub-window for composing a new email within window 580 in response to detecting selection of contact affordance 5146-D in FIG. 5R. FIG. 5S also illustrates dynamic function row 104 replacing display of the plurality of contact affordances 5146 (e.g., contact affordances 5146-A to 5146-F) corresponding to the "Family" group of the user's contact book with the set of affordances (e.g., affordances 5114, 5116, 5118, 5120, and 5122) corresponding to composing a new email in response to detecting selection of contact affordance 5146-D in FIG. 5R. FIG. 5S further illustrates dynamic function row 104 receiving and detecting contact 5150 (e.g., a tap contact) at a location corresponding to the at least one system-level affordance 542.

Figure 5T:
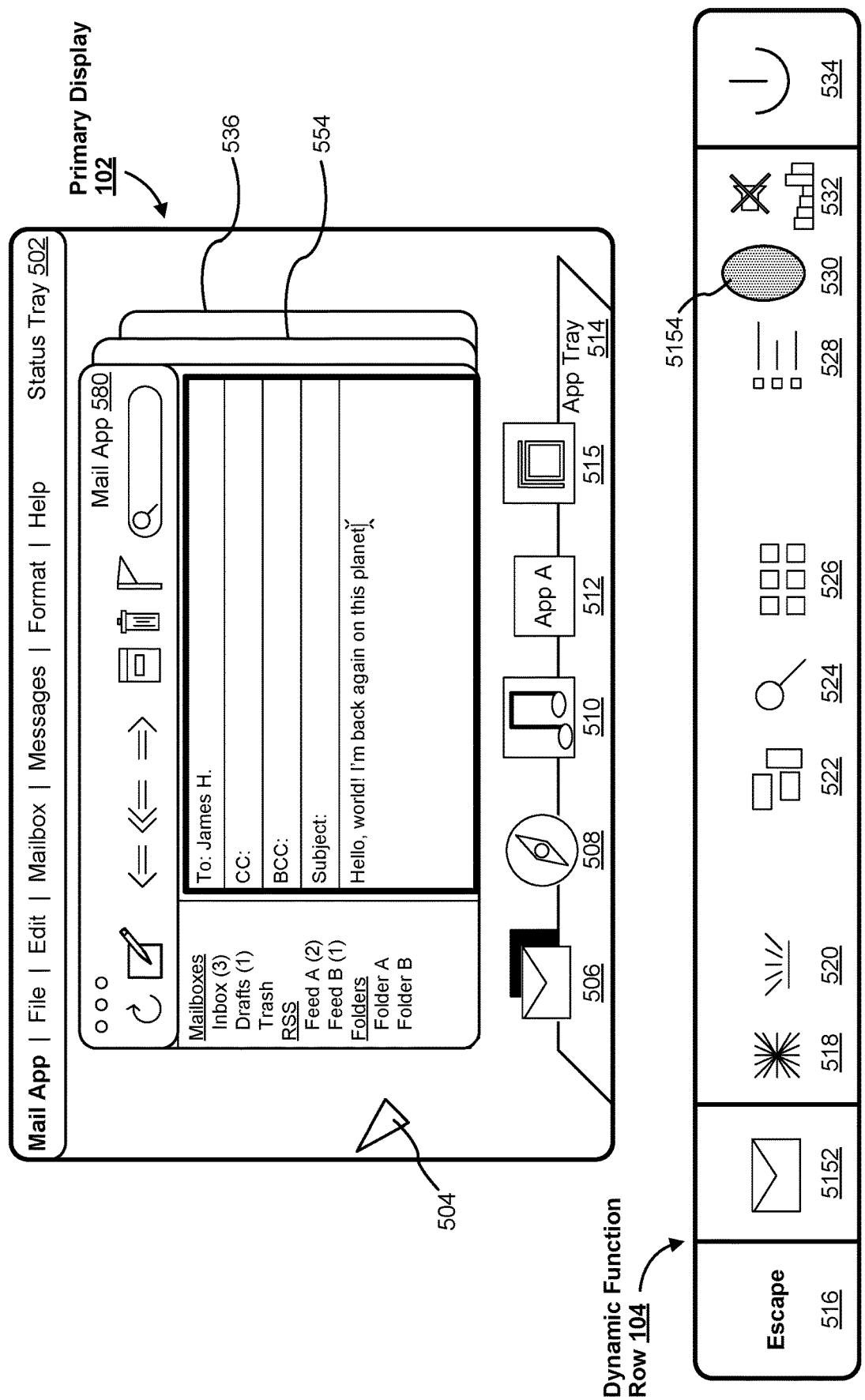

FIG. 5T illustrates dynamic function row 104 displaying persistent controls (i.e., affordances 516 and 534), the plurality of system-level affordances (i.e., affordances 518, 520, 522, 524, 526, 528, 530, and 532), and affordance 5152 corresponding to the mail application in response to detecting selection of affordance 542 in FIG. 5S. FIG. 5T also illustrates dynamic function row 104 receiving and detecting contact 5154 (e.g., a tap contact) at a location corresponding to play/pause affordance 530. For example, in response to detecting selection of play/pause affordance 530, portable computing system 100 or desktop computing system 200 pauses playback of podcast J, which was initiated in FIG. 5H and muted in FIG. 5M. Playback of podcast J may be re-initiated by a subsequent selection of play/pause affordance 530 in FIG. 5U.

Figure 5U:
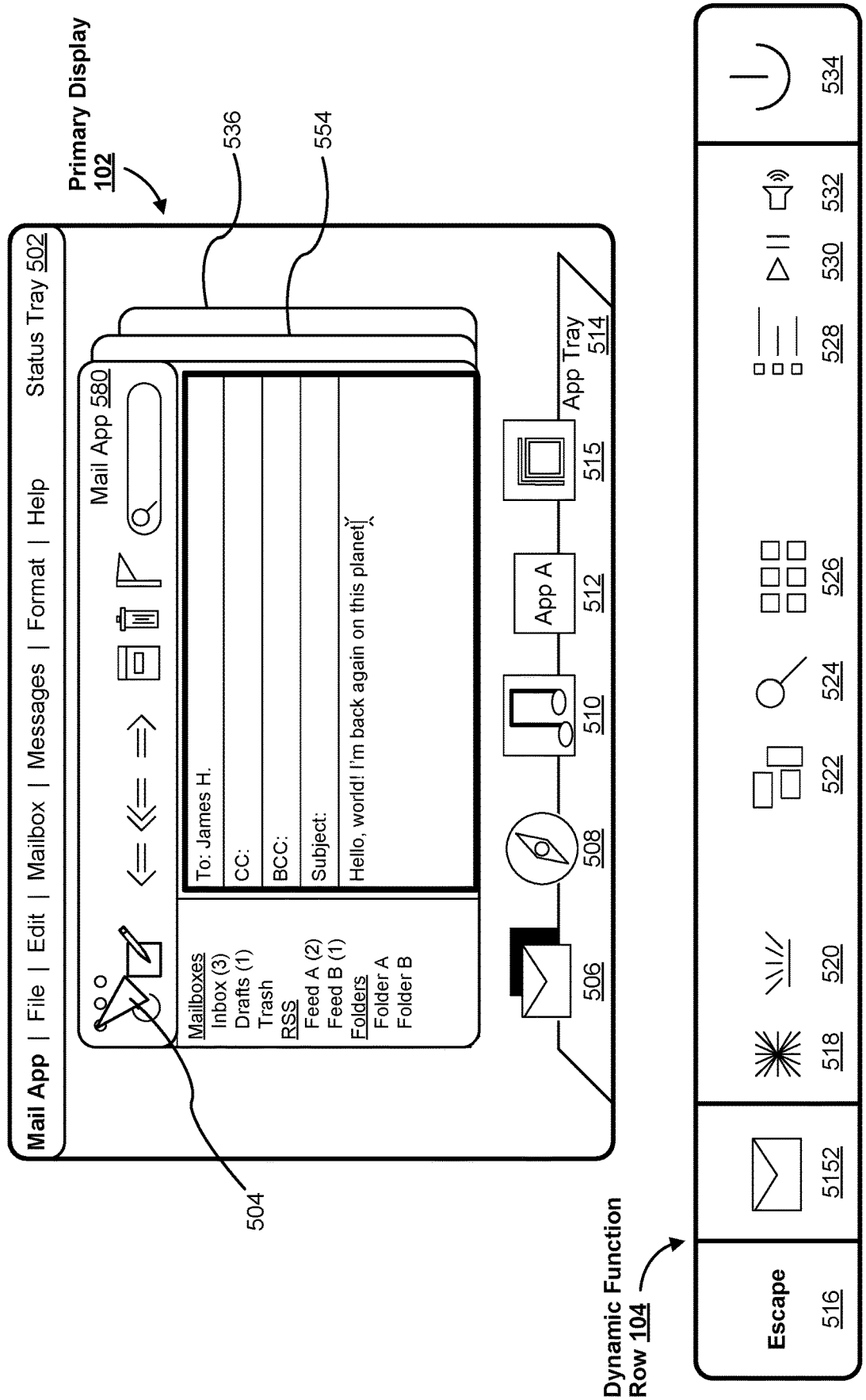
Figure 5V:
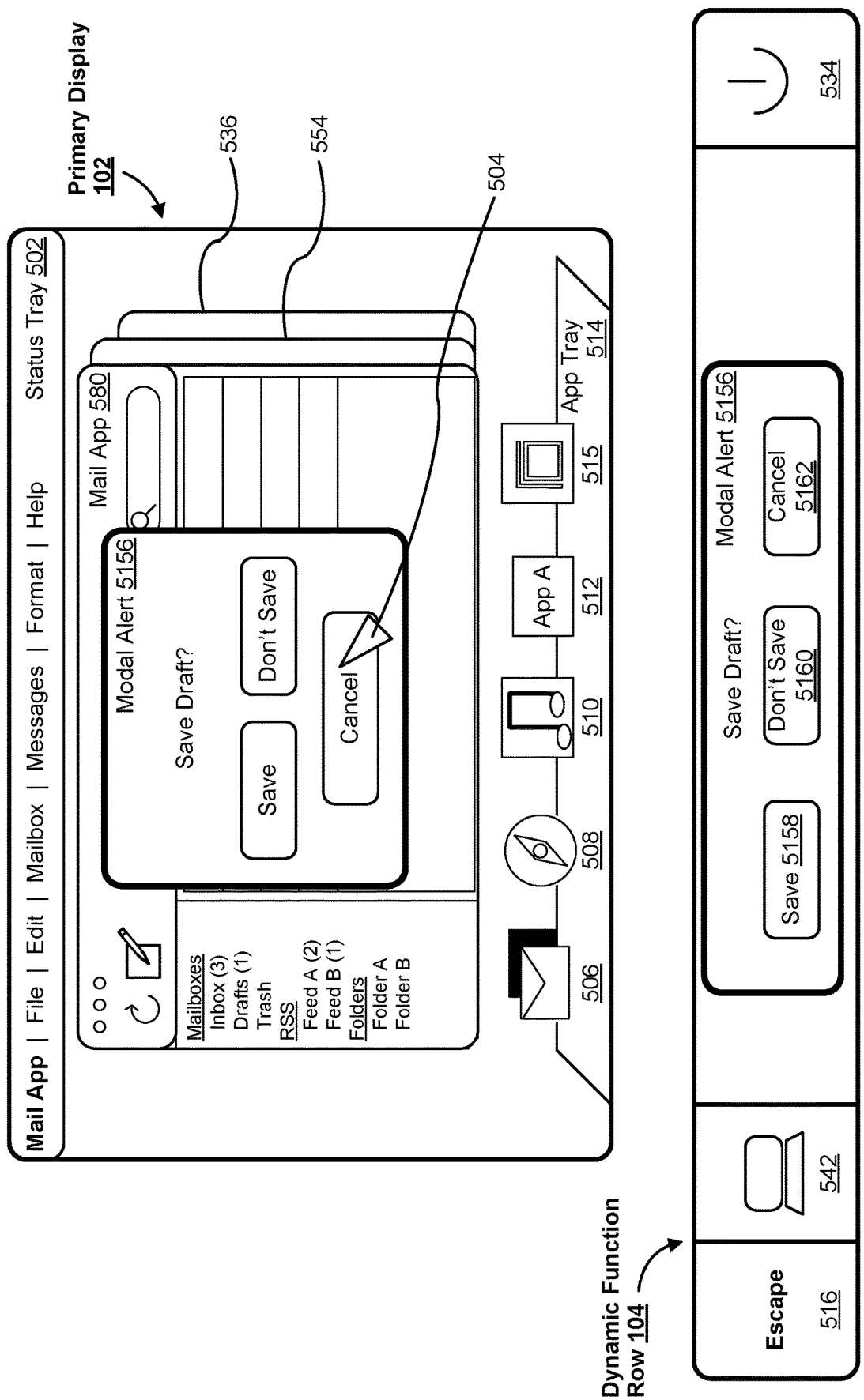

FIG. 5U illustrates primary display 102 displaying cursor 504 at a location corresponding to an exit affordance for closing window 580. FIG. 5V illustrates primary display 102 displaying modal alert 5156 in response to detecting selection of the exit affordance with cursor 504 in FIG. 5U. In FIG. 5V, modal alert 5156 is in focus on primary display 102. In FIG. 5V, modal alert 5156 displayed on primary display 102 prompts the user to save the draft email prior to closing window 580 and includes a "Save" affordance, a "Don't Save" affordance, and a "Cancel" affordance. FIG. 5V also illustrates primary display 102 displaying cursor 504 at a location corresponding to "Cancel" affordance. The display of modal alerts on the dynamic function row increasing efficiency and provides a better user experience because it removes the need for the user to move their eyes between the keyboard and the screen and also removes the need for the user to move their hands from the keyboard to another input device such as a mouse.

FIG. 5V further illustrates dynamic function row 104 displaying modal alert 5156 and the at least one system-level affordance (e.g., affordance 542) in response to detecting selection of the exit affordance with cursor 504 in FIG. 5U. In some embodiments, a modal alert is a notification corresponding to an email, SMS, or the like received by portable computing system 100 or desktop computing system 200, an alert associated with an application (e.g., as a save dialog, an exit confirmation dialog, or a send email confirmation dialog), or the like. In FIG. 5V, modal alert 5156 displayed on dynamic function row 104 prompts the user to save the draft email prior to closing window 580 and includes a "Save" affordance 5158, a "Don't Save" affordance 5160, and a "Cancel" affordance 5162. Affordances 5158, 5160, and 5162 are merely examples, and other affordances may be used to control or respond to modal alerts.

Figure 5W:
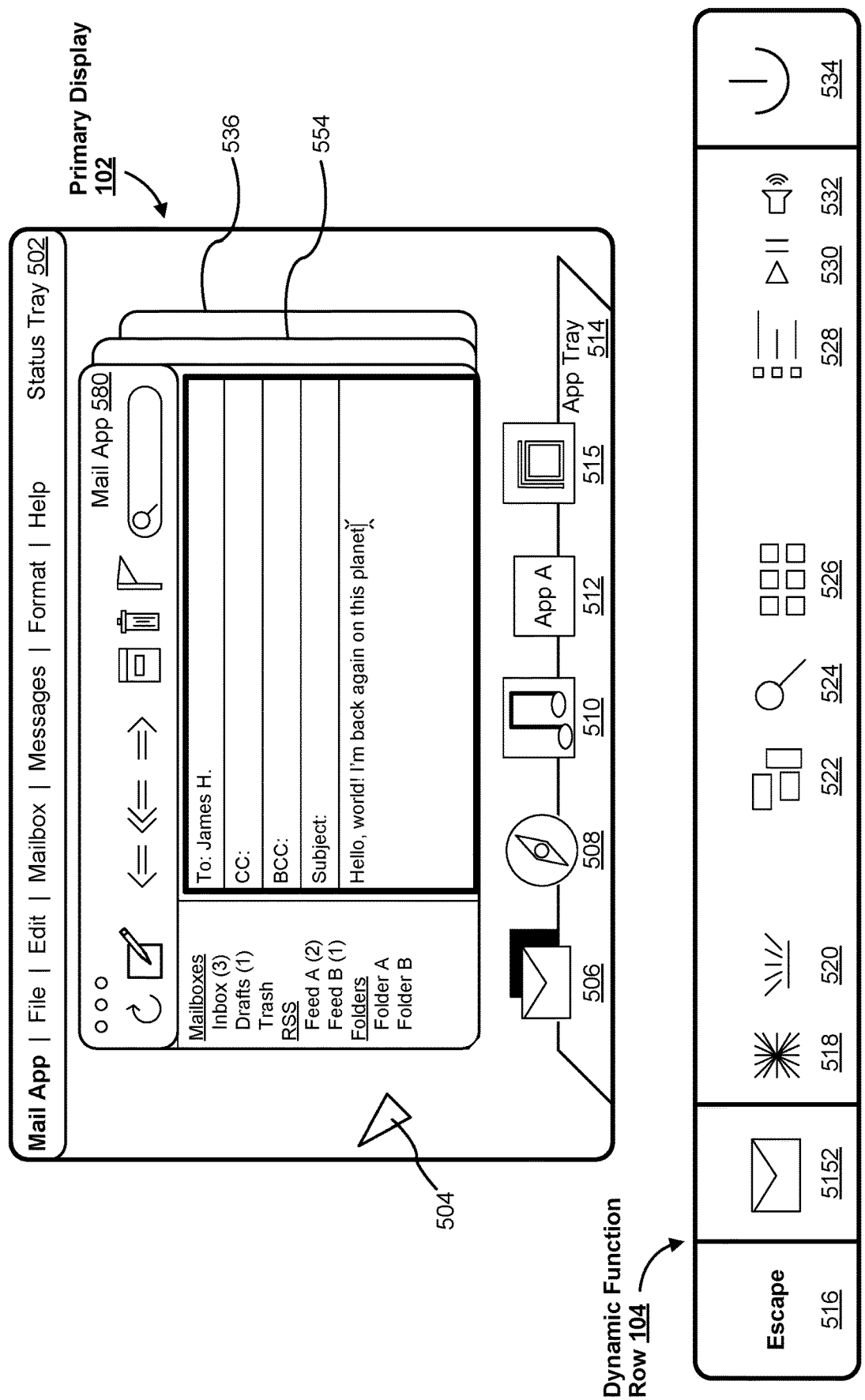

FIG. 5W illustrates primary display 102 ceasing to display modal alert 5156 and maintaining display of the sub-window for composing a new email (as in FIG. 5U) in response to detecting selection of "Cancel" affordance with cursor 504 in FIG. 5V. FIG. 5W also illustrates dynamic function row 104 ceasing to display modal alert 5156 and displaying persistent controls (i.e., affordances 516 and 534), the plurality of system-level affordances (i.e., affordances 518, 520, 522, 524, 526, 528, 530, and 532), and affordance 5152 corresponding to the mail application (as in FIG. 5U) in response to detecting selection of "Cancel" affordance with cursor 504 in FIG. 5V.

Figure 5X:
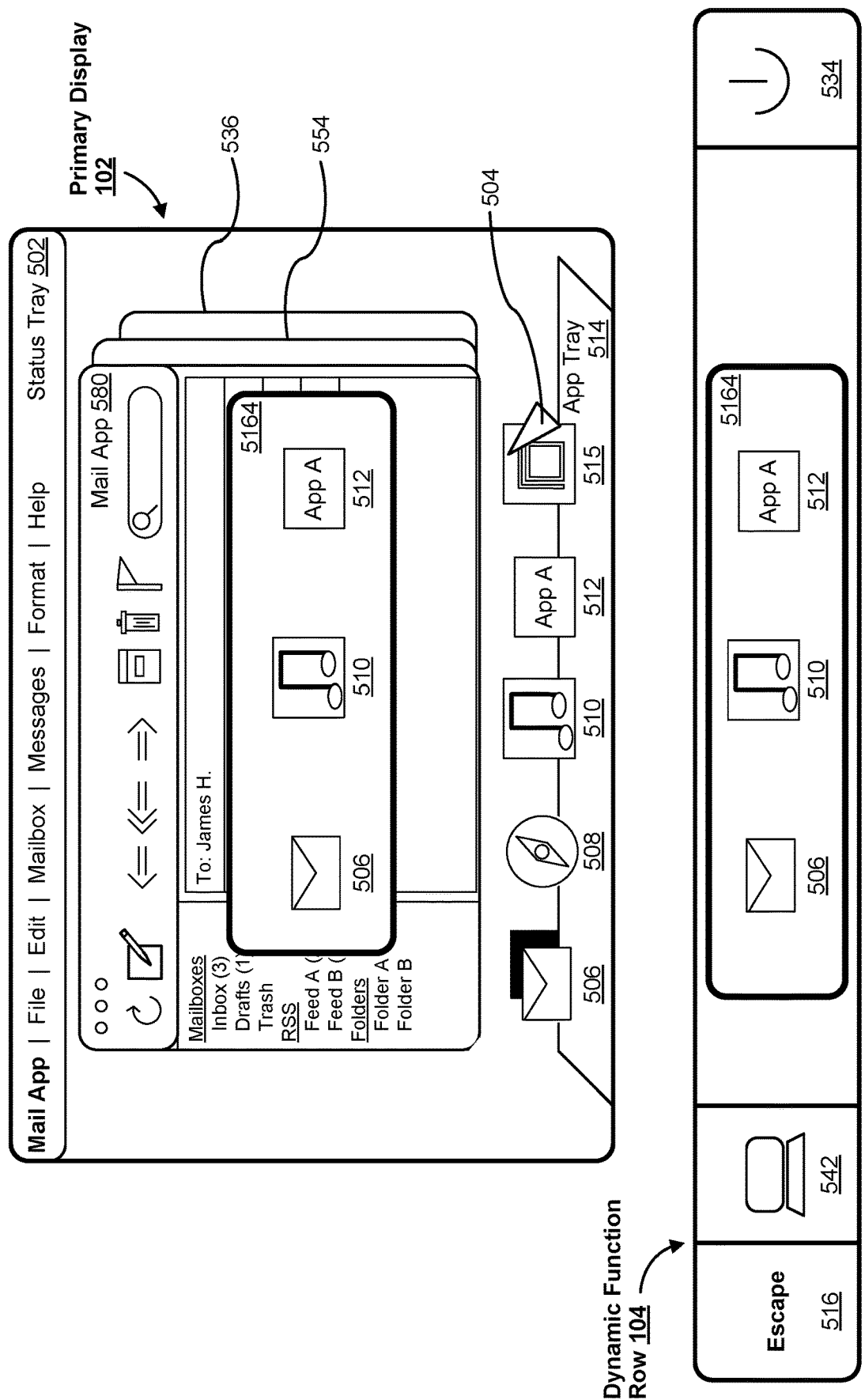

FIG. 5X illustrates primary display 102 displaying an application selection window 5164 in response to receiving a signal corresponding to a specified physical key combination (e.g., alt+tab) from the set of physical keys 106 of portable computing system 100 (FIGS. 1A-1B) or from the set of physical keys 106 of peripheral keyboard 206 of desktop computing system 200 (FIGS. 2A-2D). In FIG. 5X, application selection window 5164 displayed on primary display 102 includes: mail application icon 506, which, when activated (e.g., via selection by cursor 504) causes primary display 102 to display window 580 corresponding to the mail application in the foreground; media player application icon 510, which, when activated (e.g., via selection by cursor 504) causes primary display 102 to display window 554 corresponding to the media player application in the foreground; and application A icon 512, which, when activated (e.g., via selection by cursor 504) causes primary display 102 to display window 536 corresponding to application A in the foreground. FIG. 5X also illustrates primary display 102 displaying cursor 504 at a location corresponding to photo application icon 515.

FIG. 5X further illustrates dynamic function row 104 displaying application selection window 5164 and the at least one system-level affordance (e.g., affordance 542) in response to receiving a signal corresponding to a specified physical key combination (e.g., alt+tab) from the set of physical keys 106 of portable computing system 100 (FIGS. 1A-1B) or from the set of physical keys 106 of peripheral keyboard 206 of desktop computing system 200 (FIGS. 2A-2D). In FIG. 5X, application selection window 5164 displayed on dynamic function row 104 includes: mail application icon 506, which, when activated (e.g., via a tap contact) causes primary display 102 to display window 580 corresponding to the mail application in the foreground; media player application icon 510, which, when activated (e.g., via a tap contact) causes primary display 102 to display window 554 corresponding to the media player application in the foreground; and application A icon 512, which, when activated (e.g., via a tap contact) causes primary display 102 to display window 536 corresponding to application A in the foreground.

Figure 5Y:
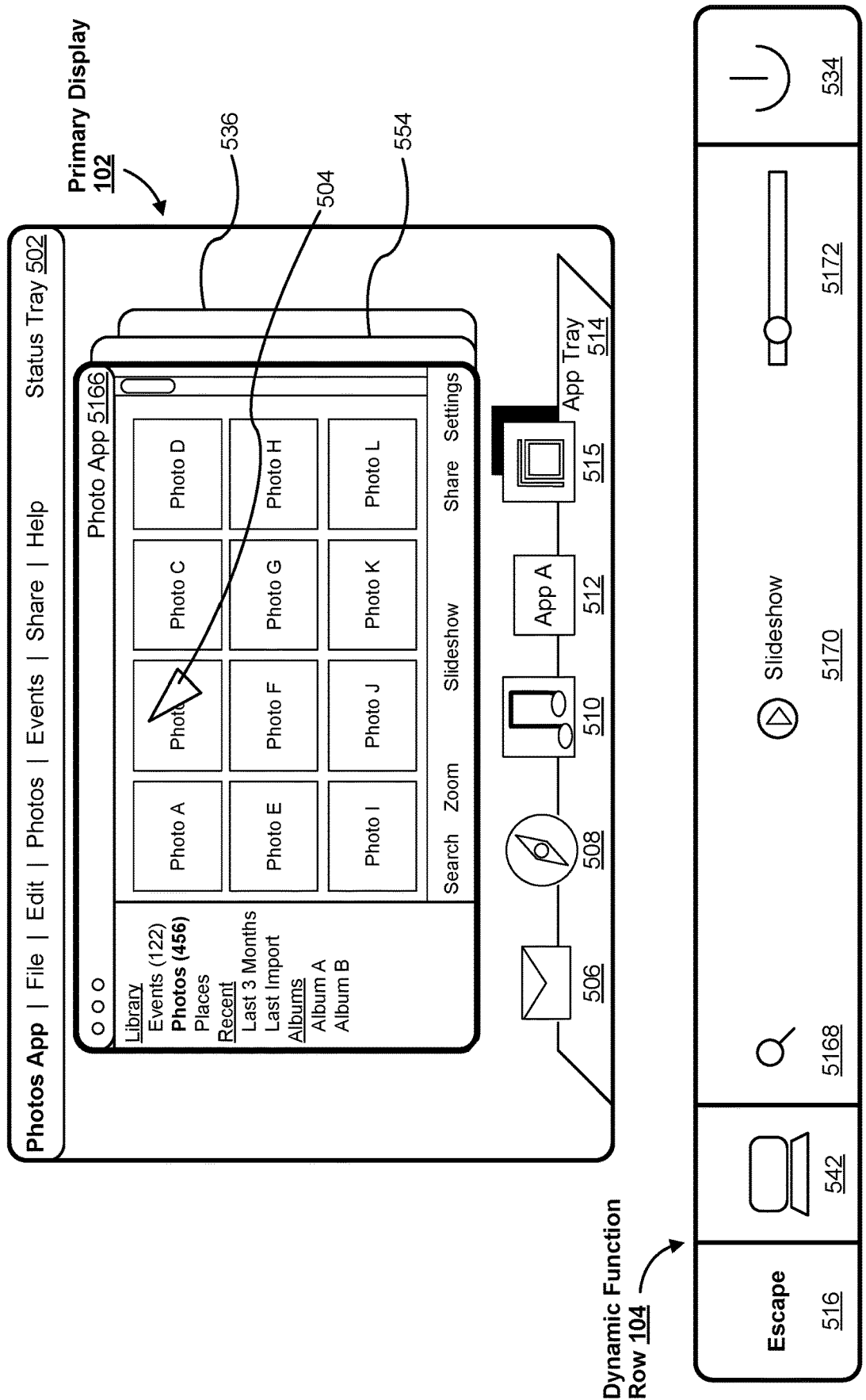

FIG. 5Y illustrates primary display 102 displaying a window 5166 for the photo application in response to detecting selection of photo application icon 515 with cursor 504 in FIG. 5X. For example, window 5166 is overlaid on windows 580, 554, and 536. In FIG. 5Y, window 5166 displays a plurality of photos associated with an all photos sub-section of a user's photo library. In FIG. 5Y, the all photos sub-section of a user's photo library is in focus on primary display 102 as shown by "Photos" displayed in bold and photos A-L at least partially displayed in window 5166. In FIG. 5Y, status tray 502 indicates that the photo application is running in the foreground, and app tray 514 also indicates that the photo application is running in the foreground based on the shadow behind photo application icon 515. FIG. 5Y also illustrates primary display 102 displaying cursor 504 at a location corresponding to photo B within window 5166.

FIG. 5Y further illustrates dynamic function row 104 displaying a plurality of affordances corresponding to the all photos sub-section of the user's photo library (e.g., affordances 5168, 5170, and 5172) and the at least one system-level affordance (e.g., affordance 542) in response to detecting selection of photo application icon 515 with cursor 504 in FIG. 5X. In FIG. 5Y, dynamic function row 104 includes: search affordance 5168, for searching the user's photo library; slideshow affordance 5170, which, when activated (e.g., via a tap contact), initiates a slideshow of the selected photos or all photos in the all photos sub-section of the user's photo library in a full-screen mode (e.g., shown in FIG. 5AA); and slider affordance 5172 for scrolling the photos displayed from the all photos sub-section of the user's photo library that are displayed in window 5166.

Figure 5Z:
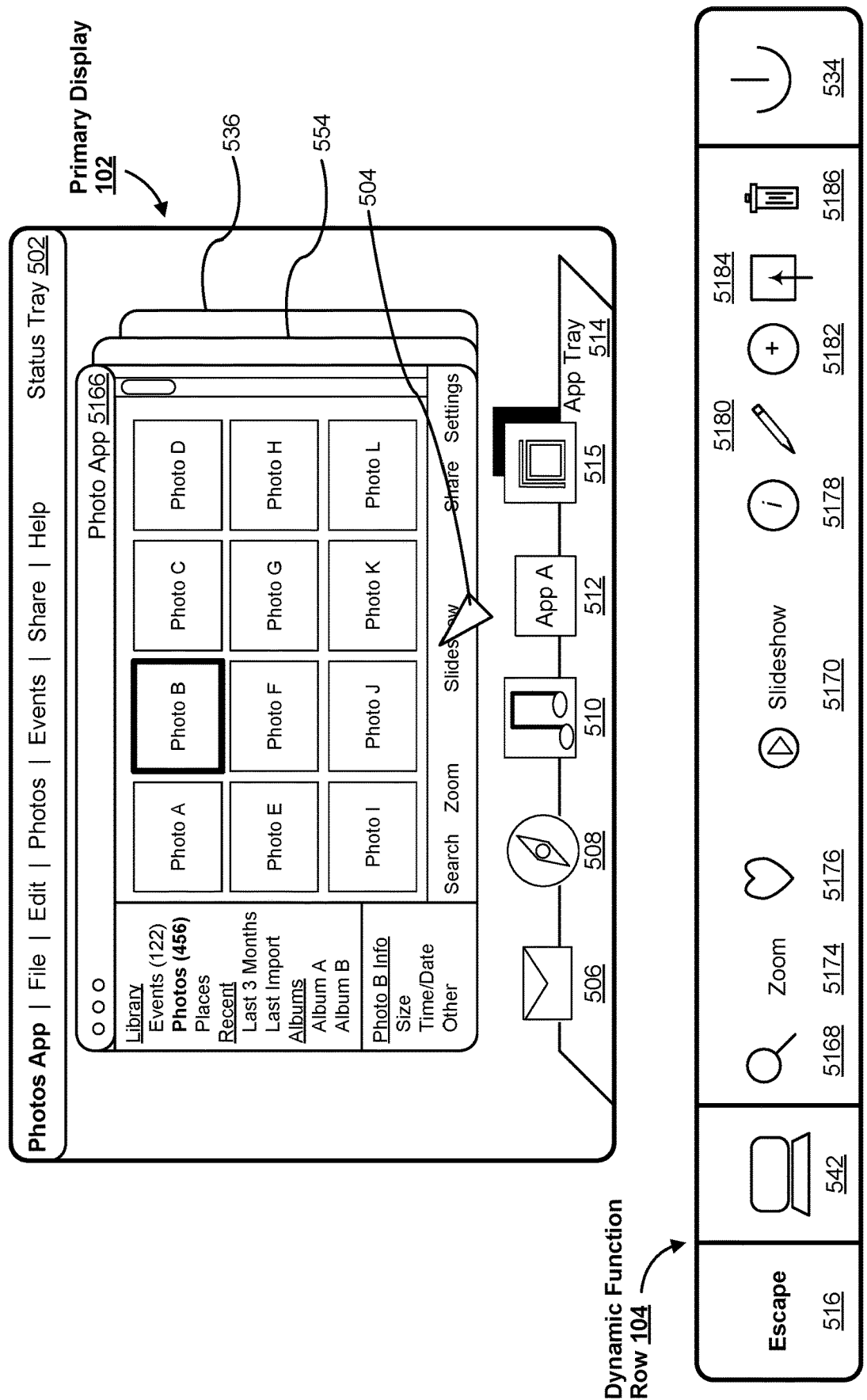
Figure 5B:
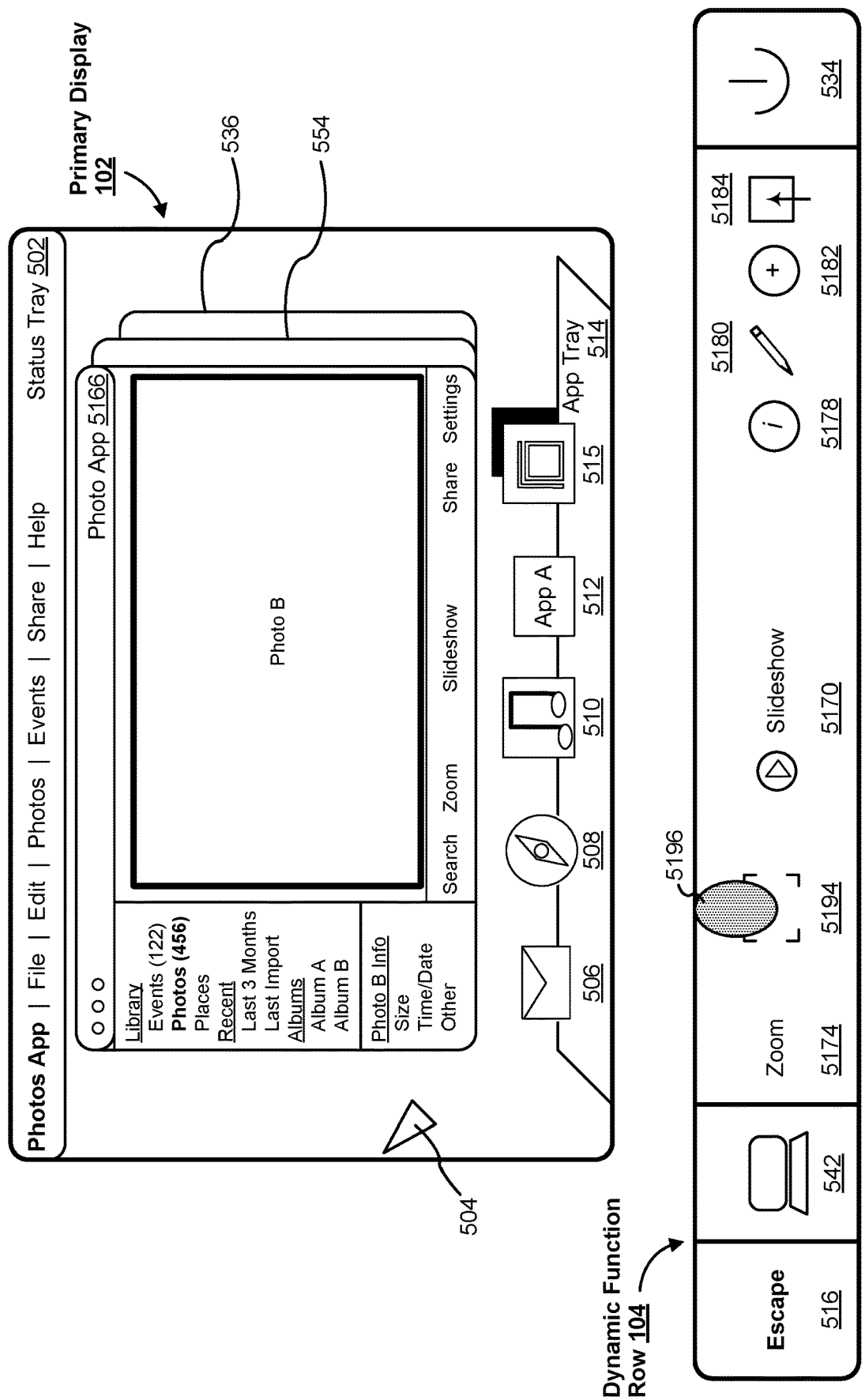
Figure 5C:
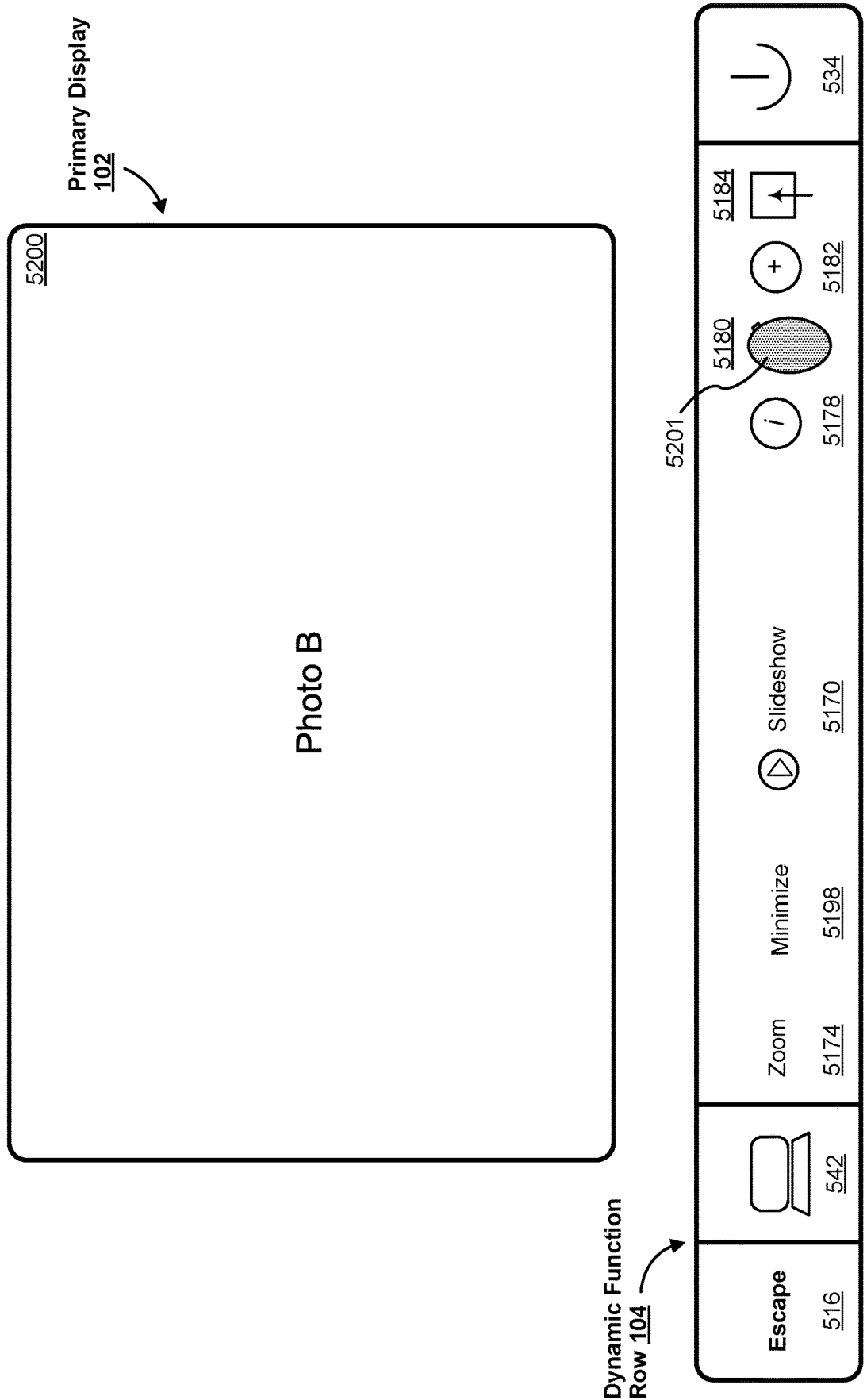
Figure 5D:
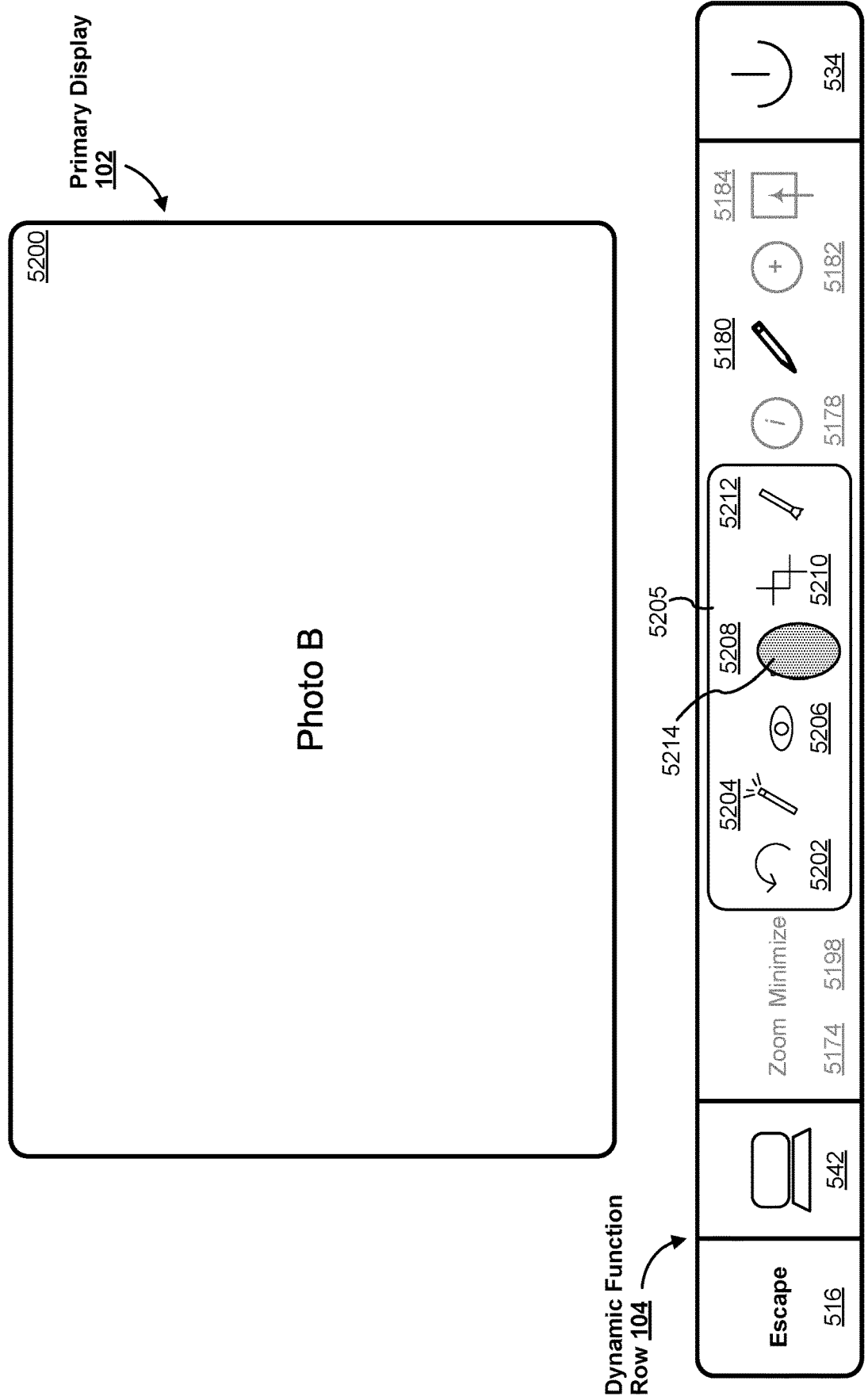
Figure 5F:
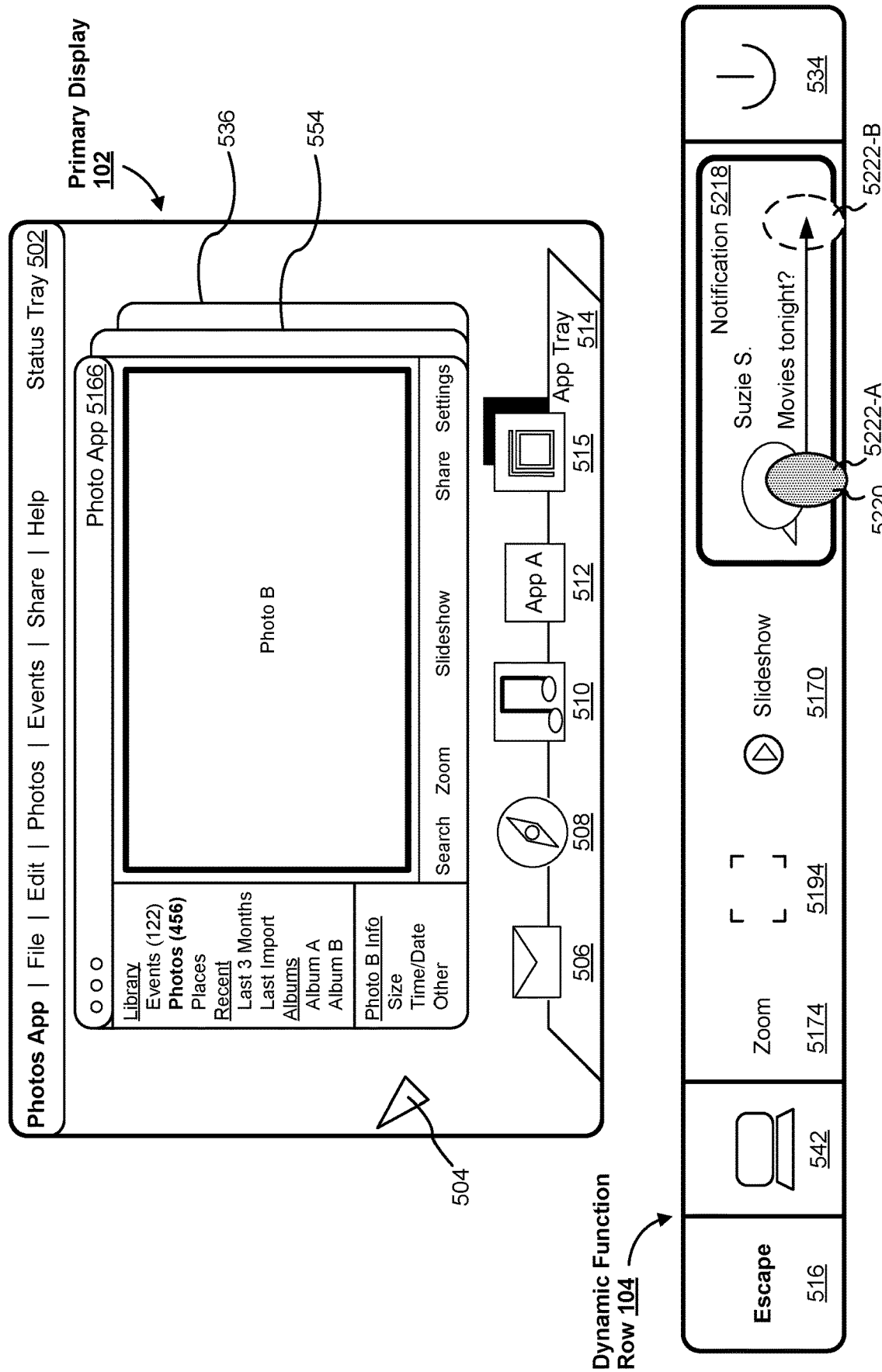
Figure 5G:
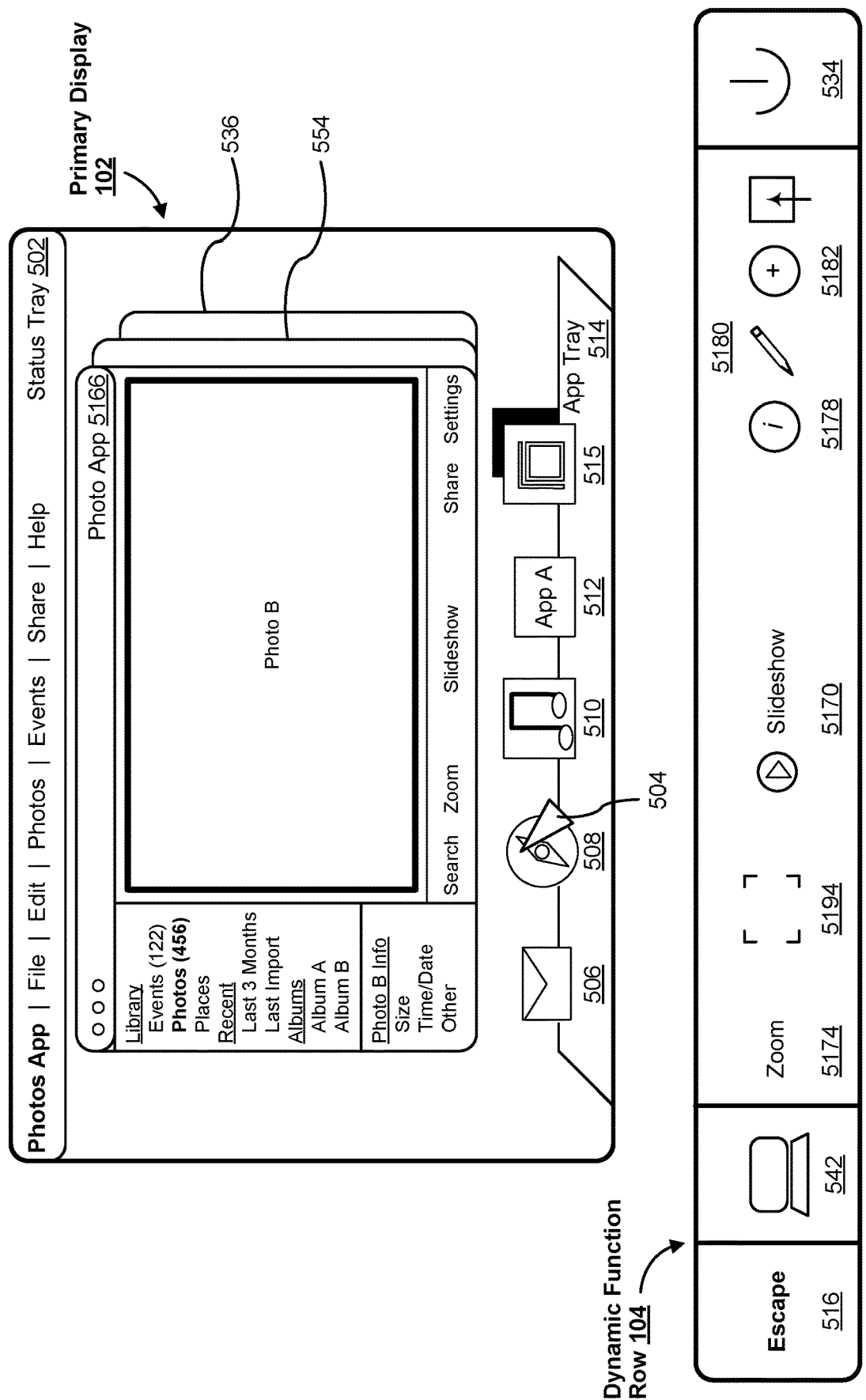
Figure 5H:
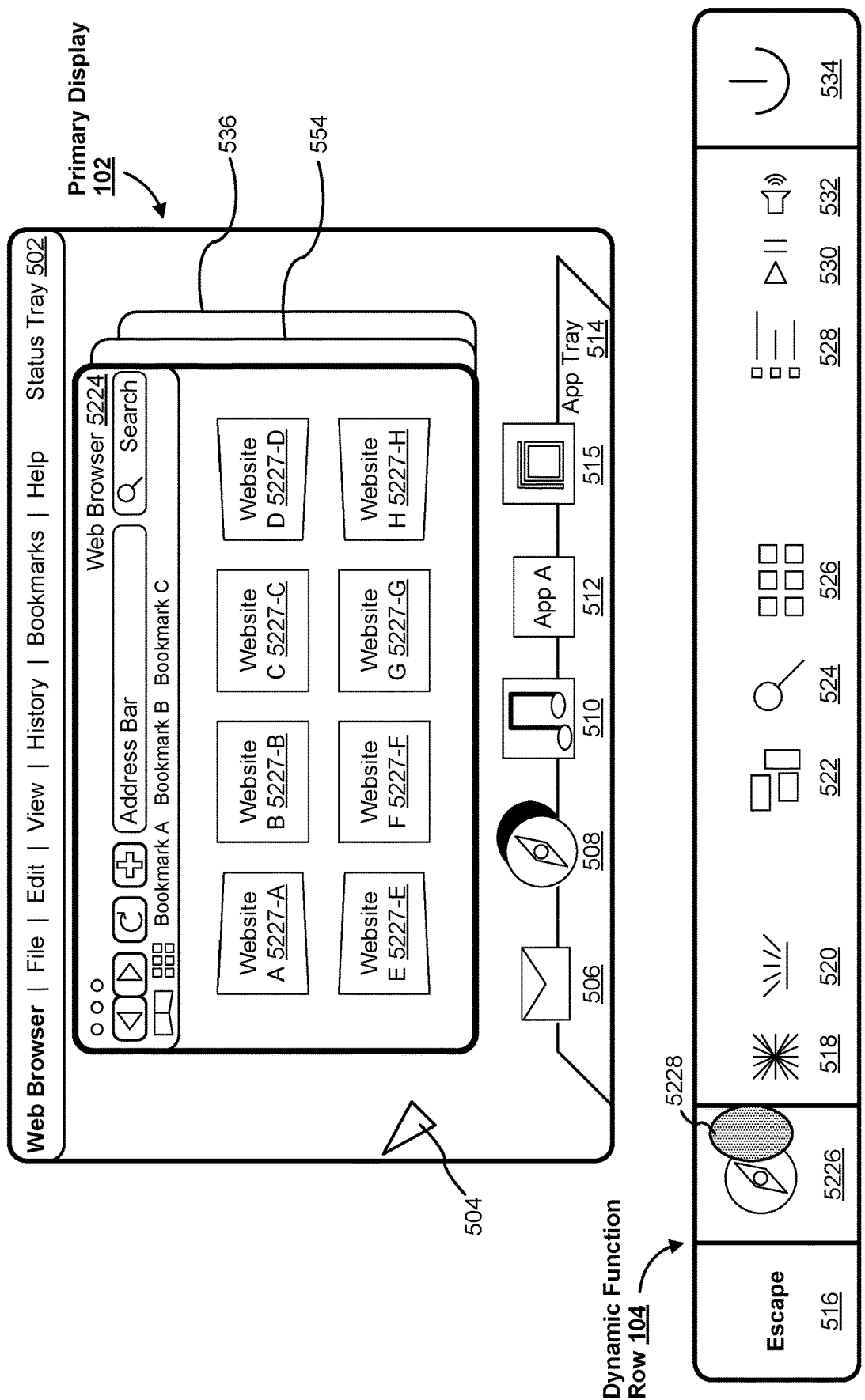
Figure 5I:
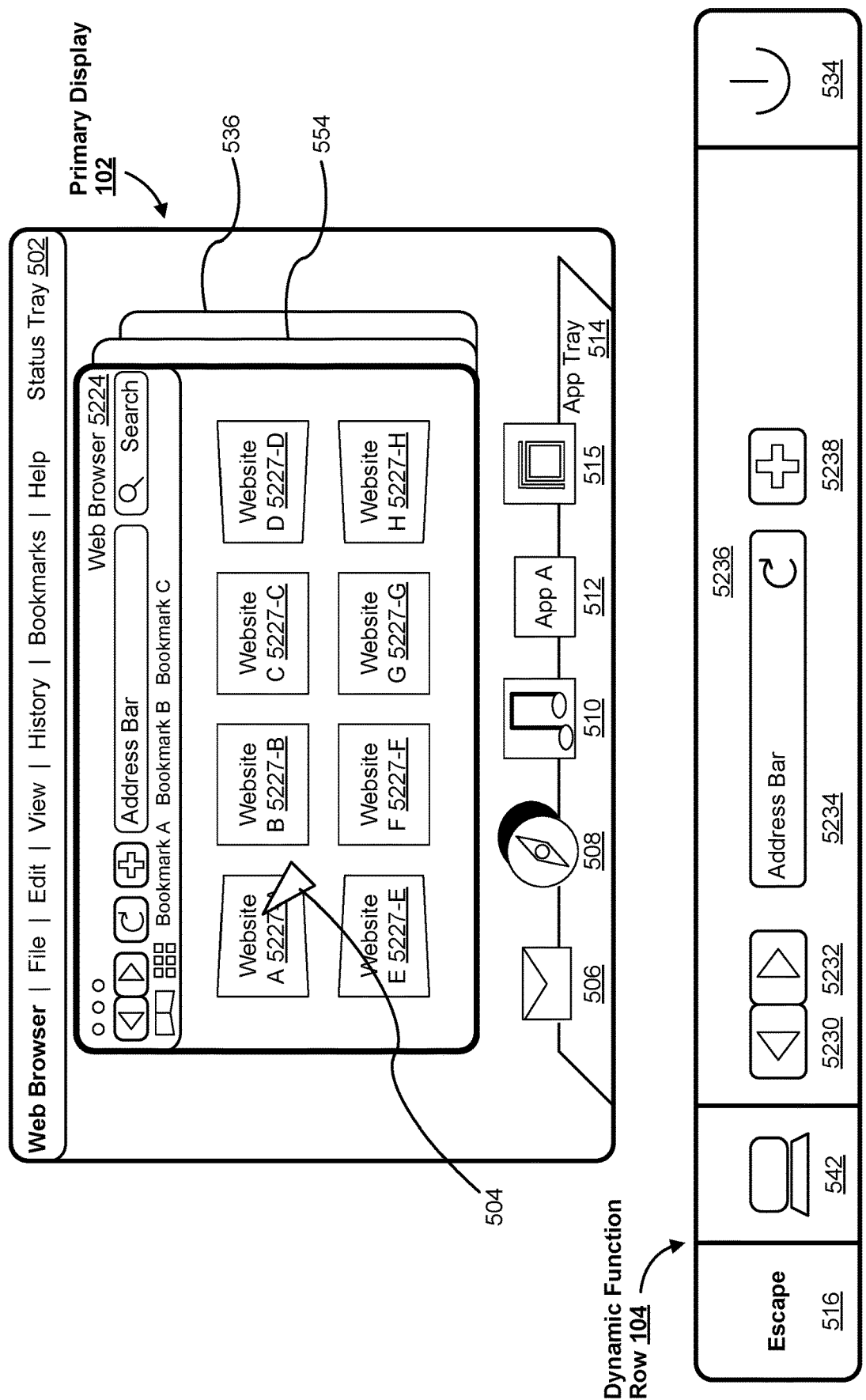
Figure 5J:
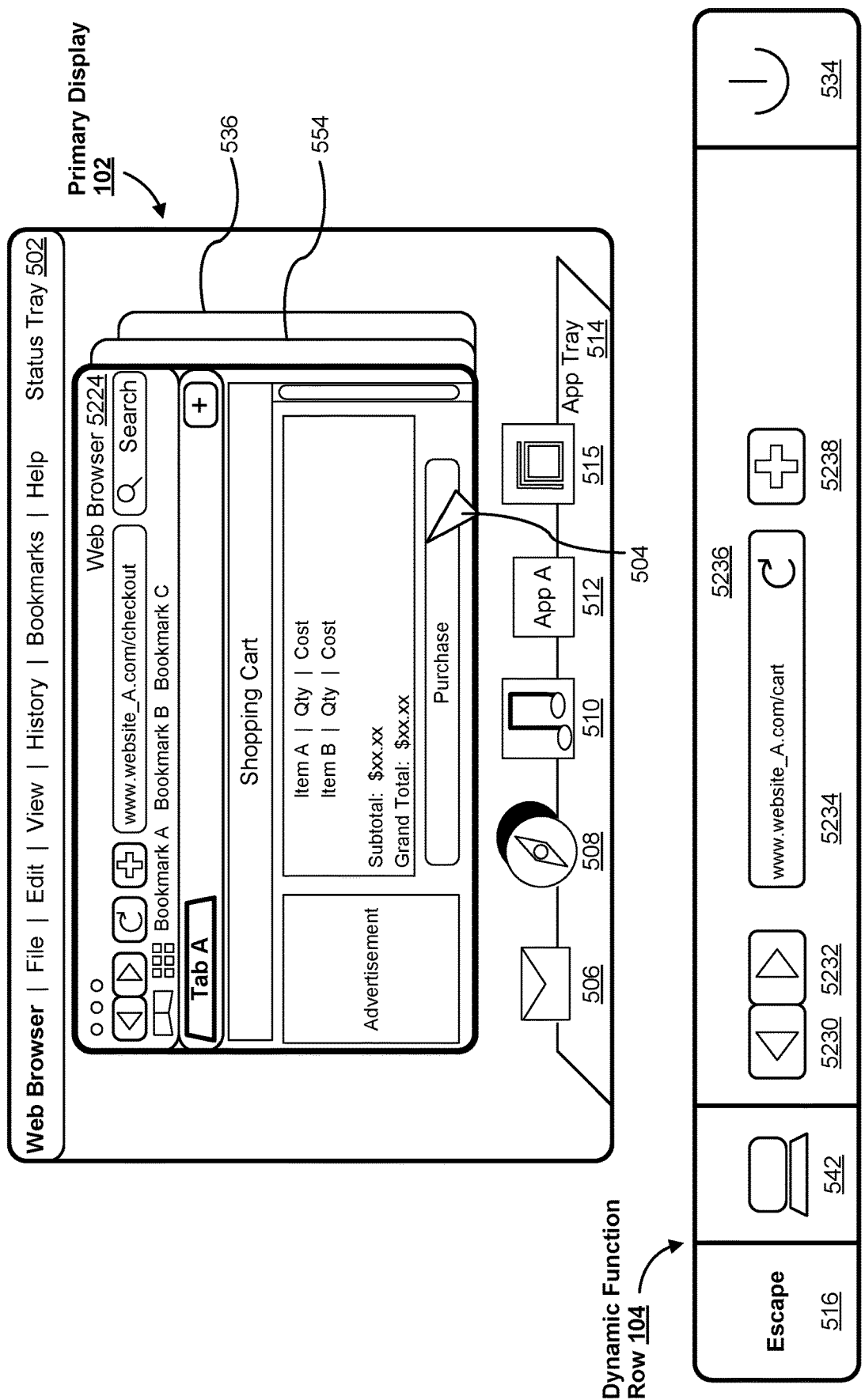
Figure 5K:
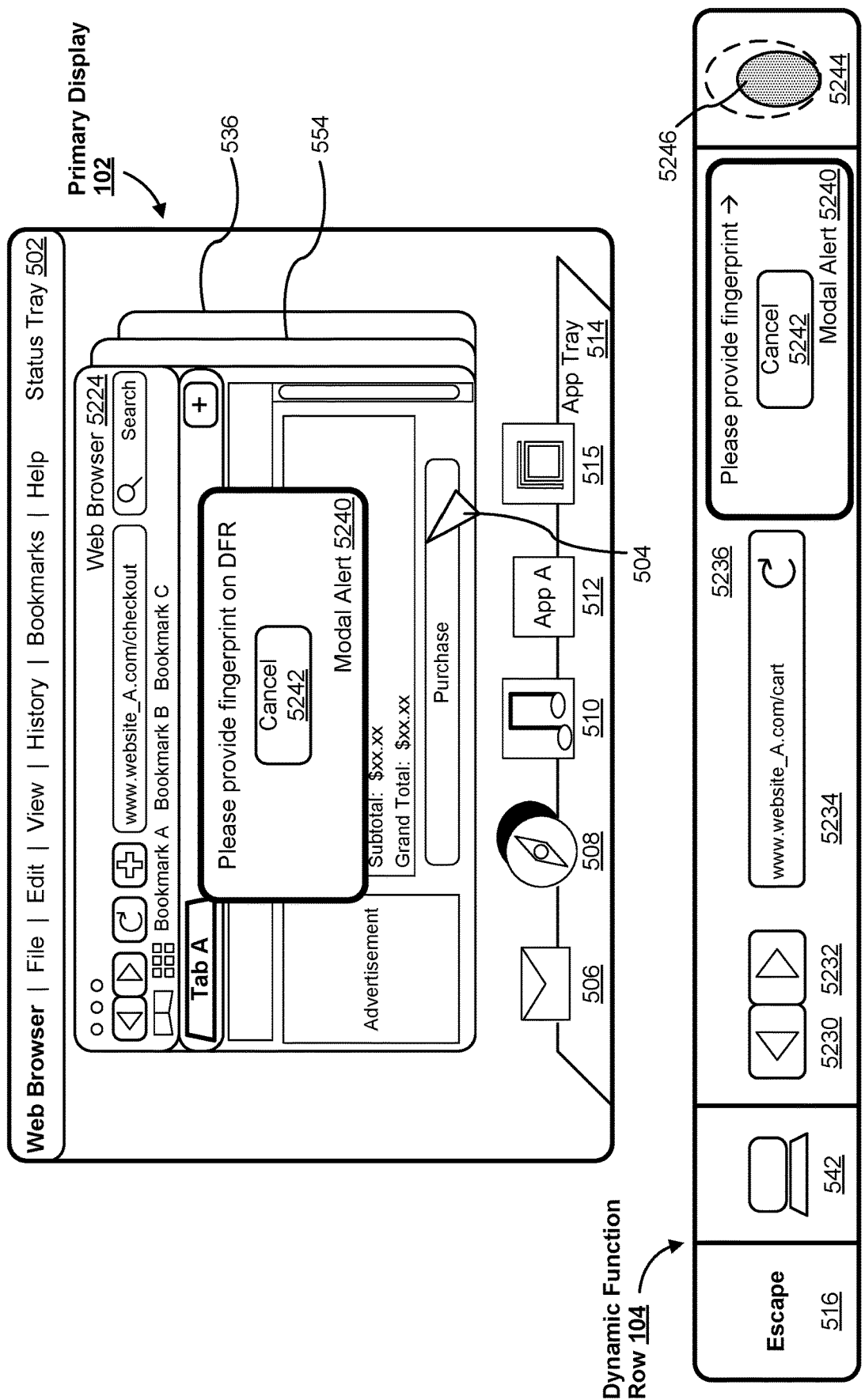
Figure 5L:
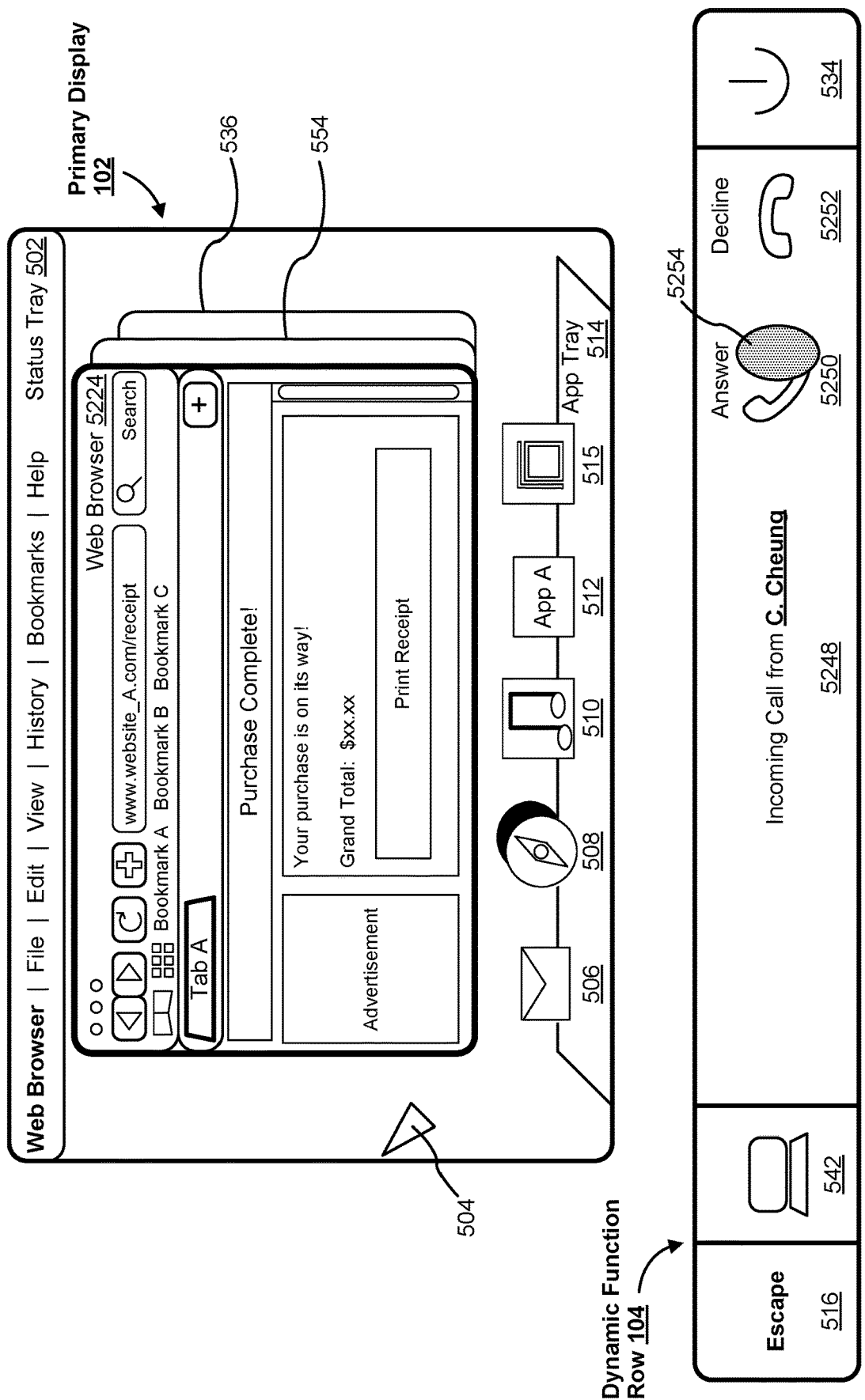
Figure 5M:
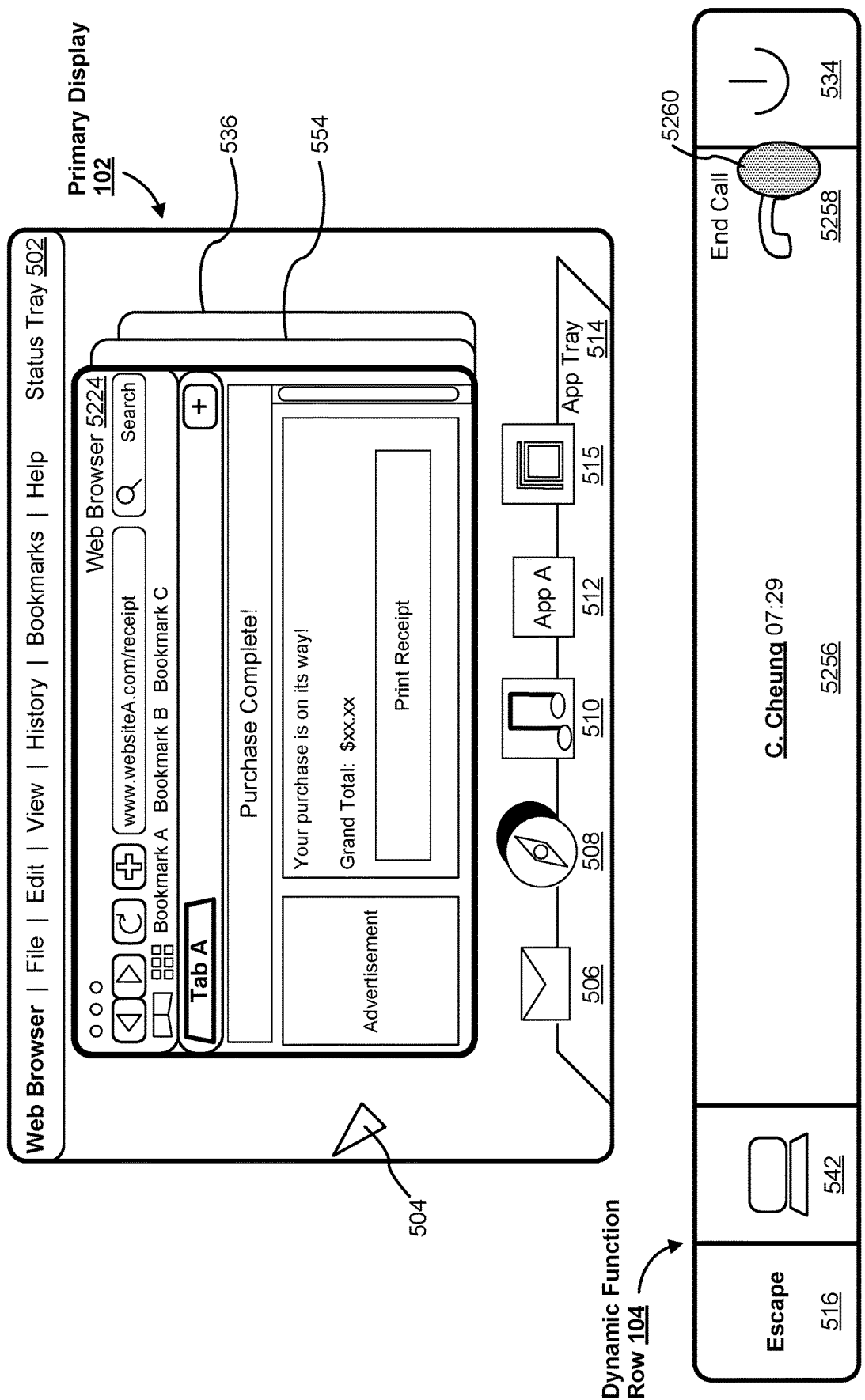
Figure 5N:
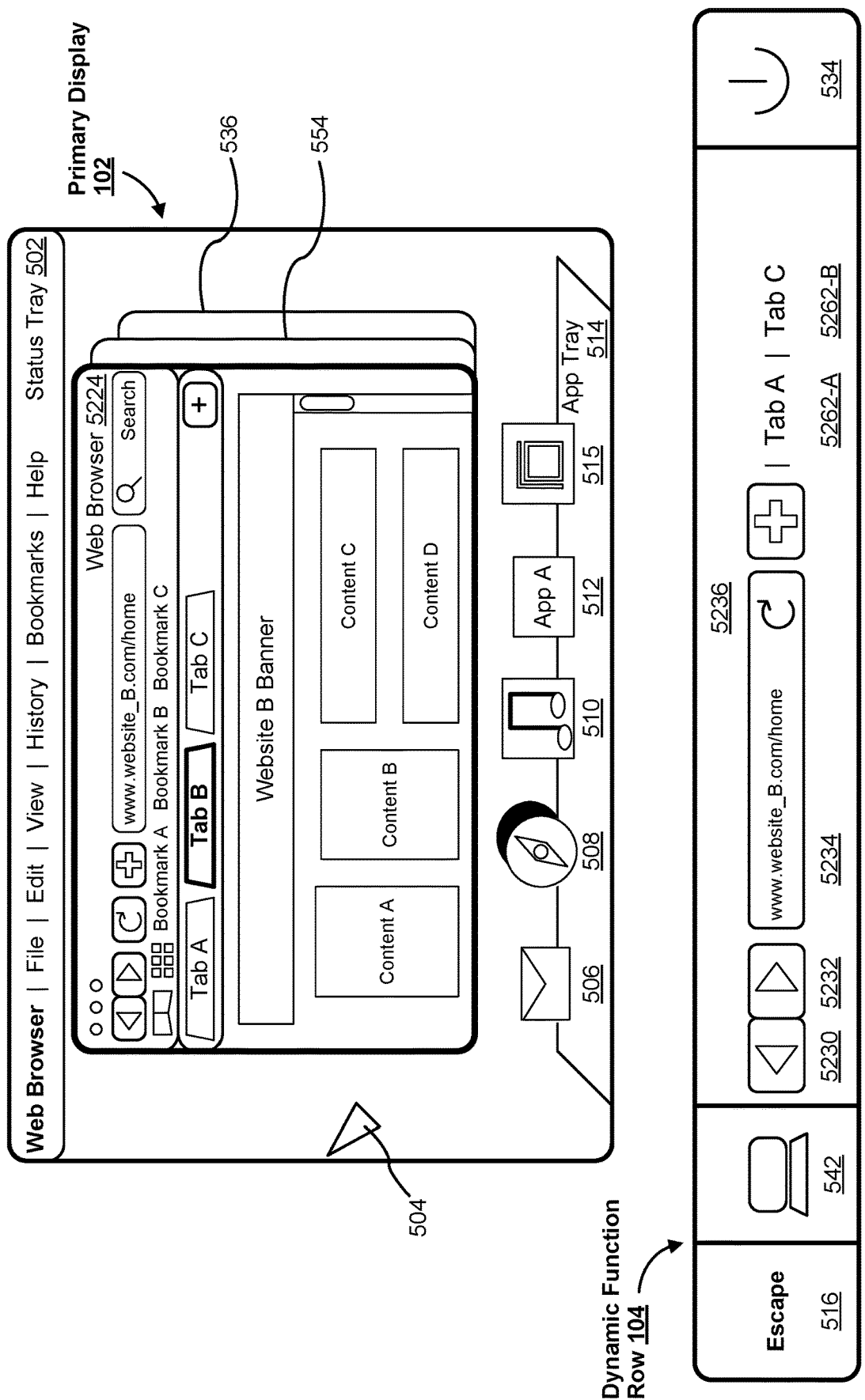
Figure 5O:
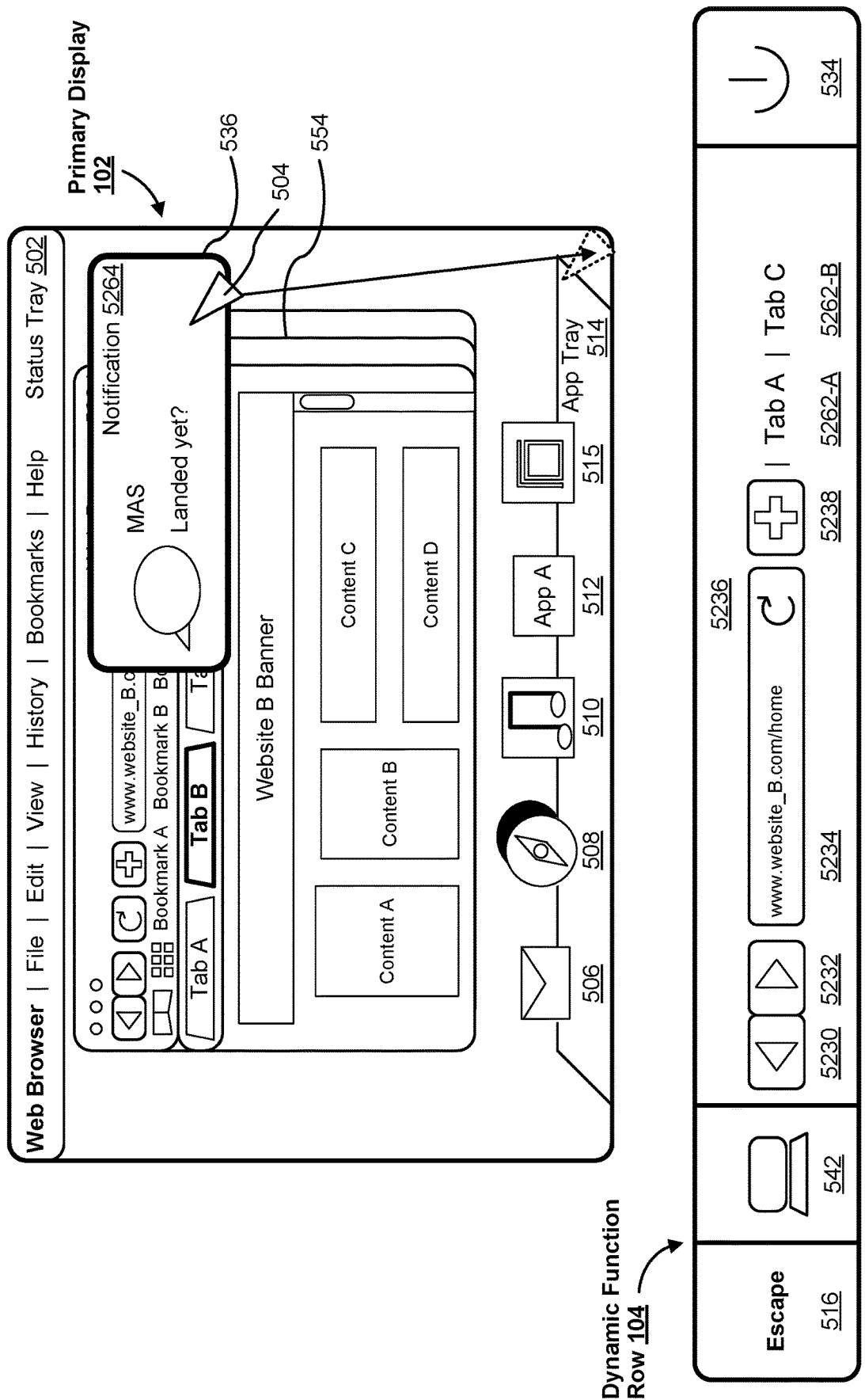
Figure 5P:
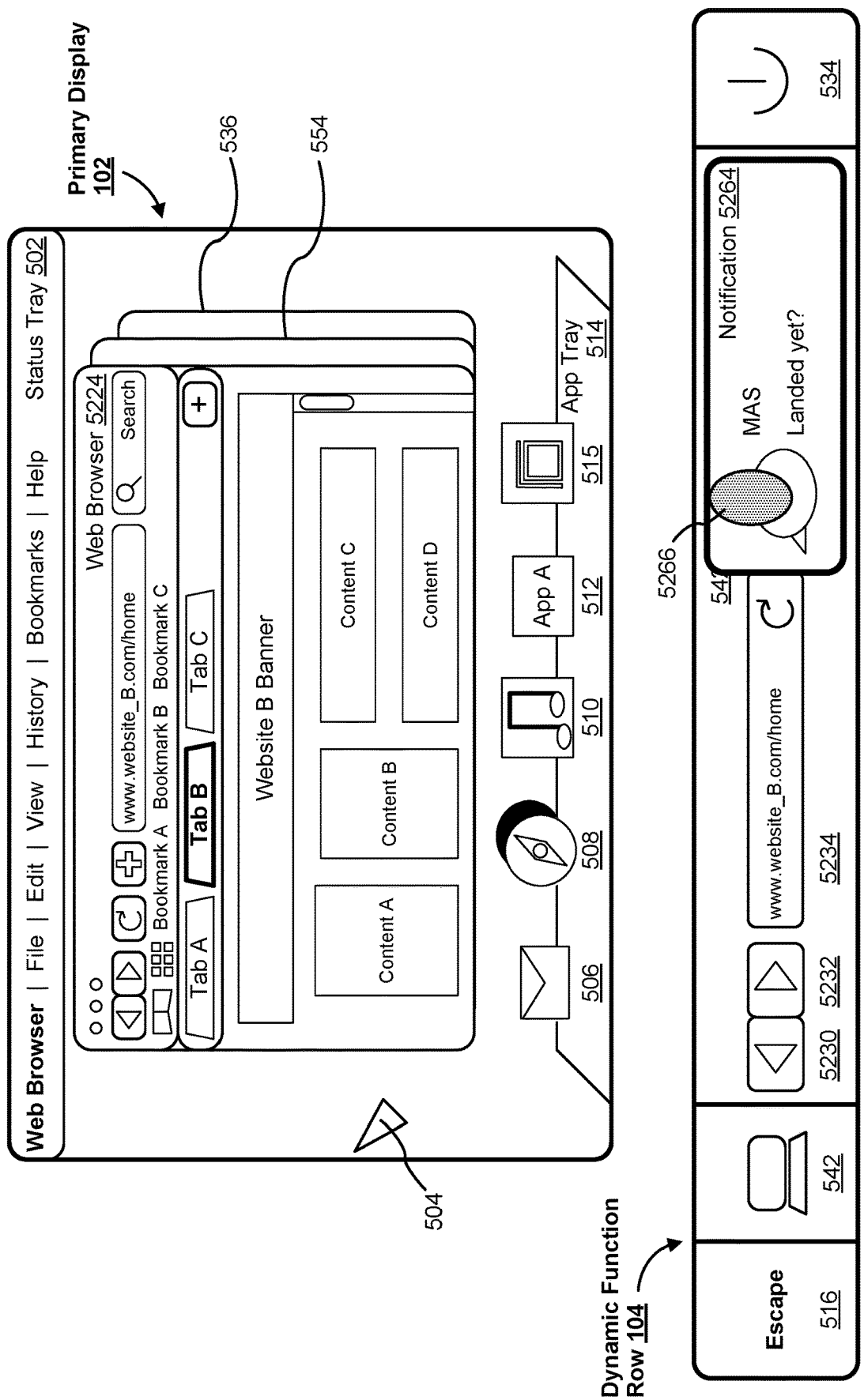
Figure 5Q:
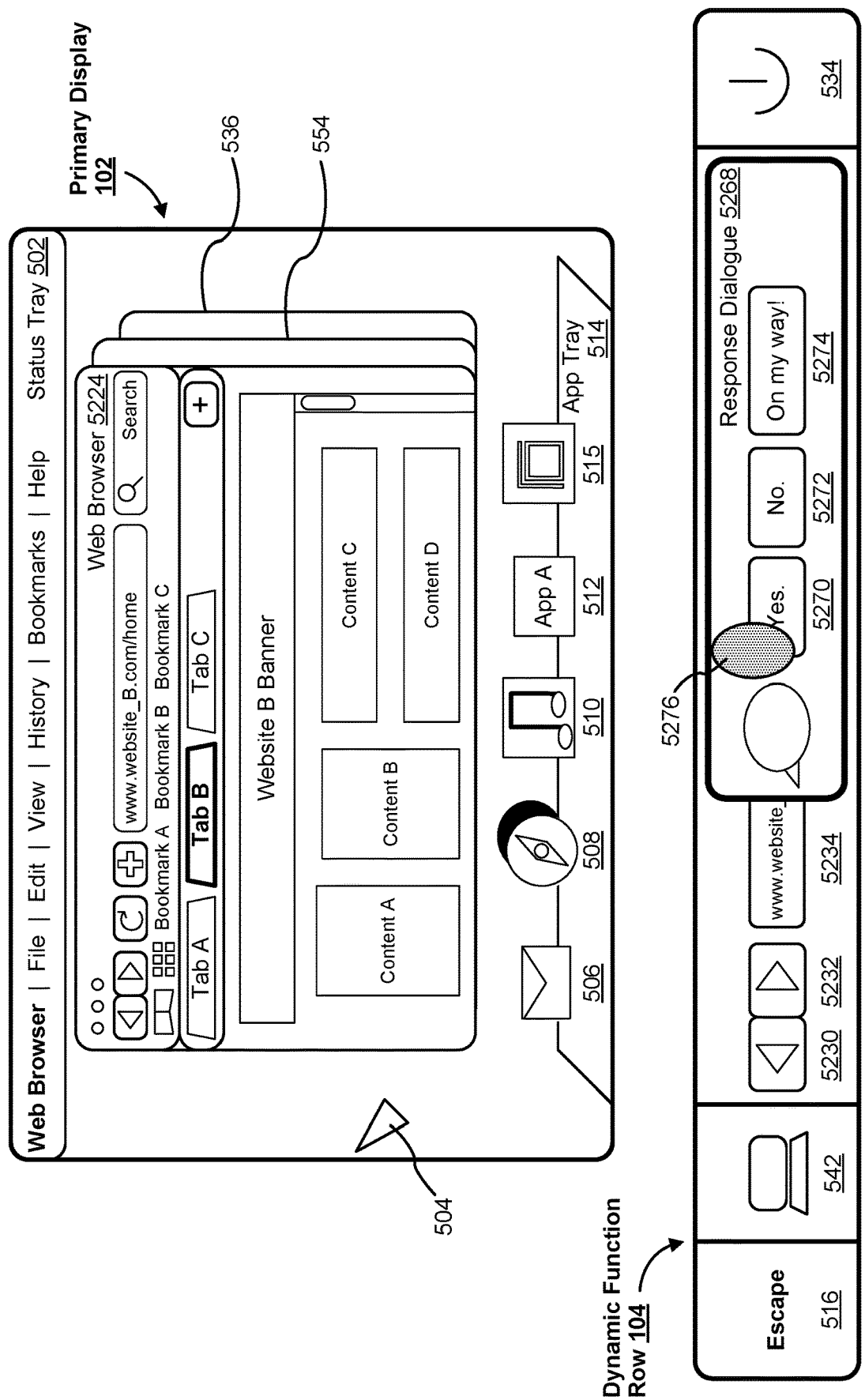
Figure 5R:
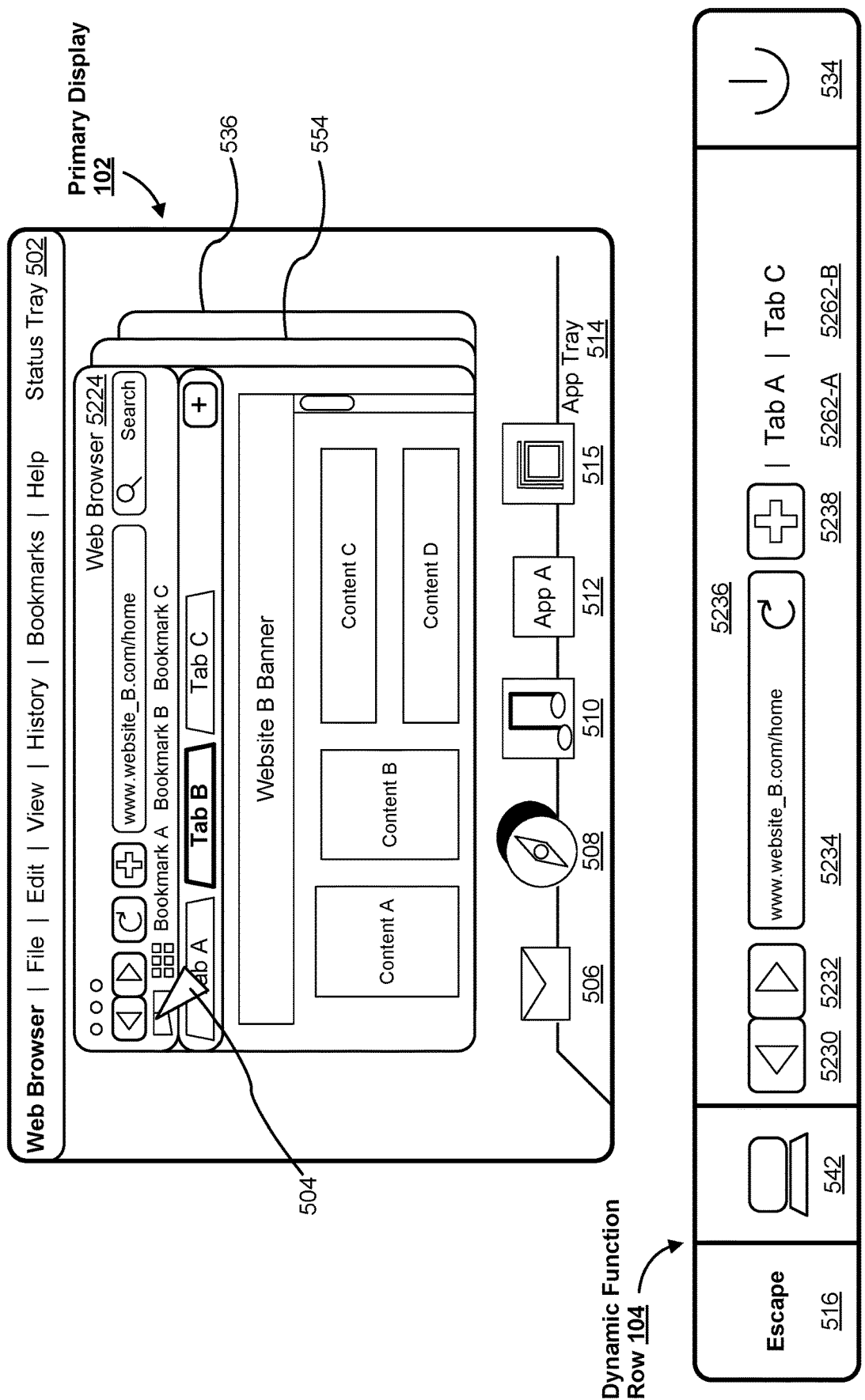
Figure 5S:
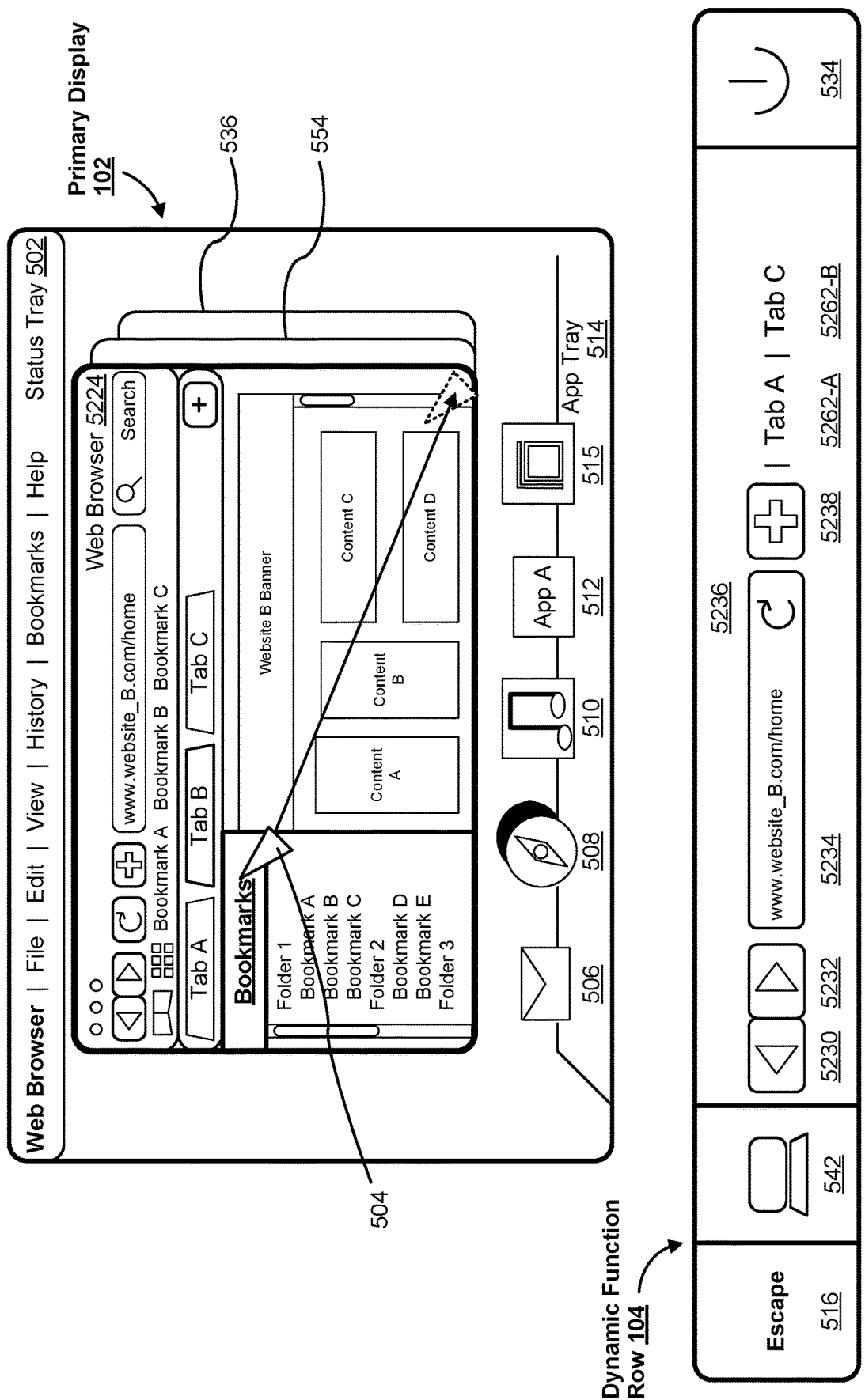
Figure 5T:
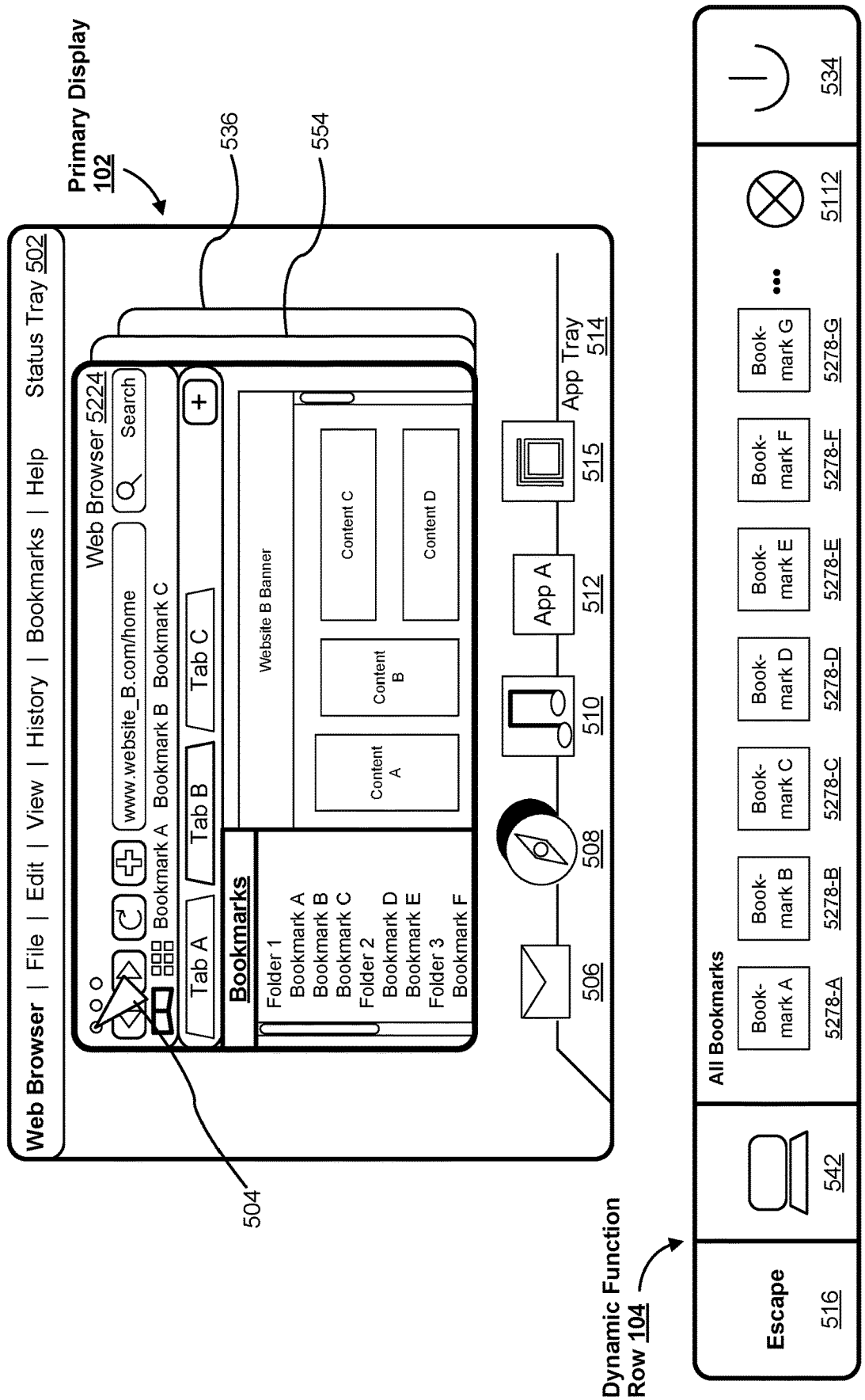
Figure 5U:
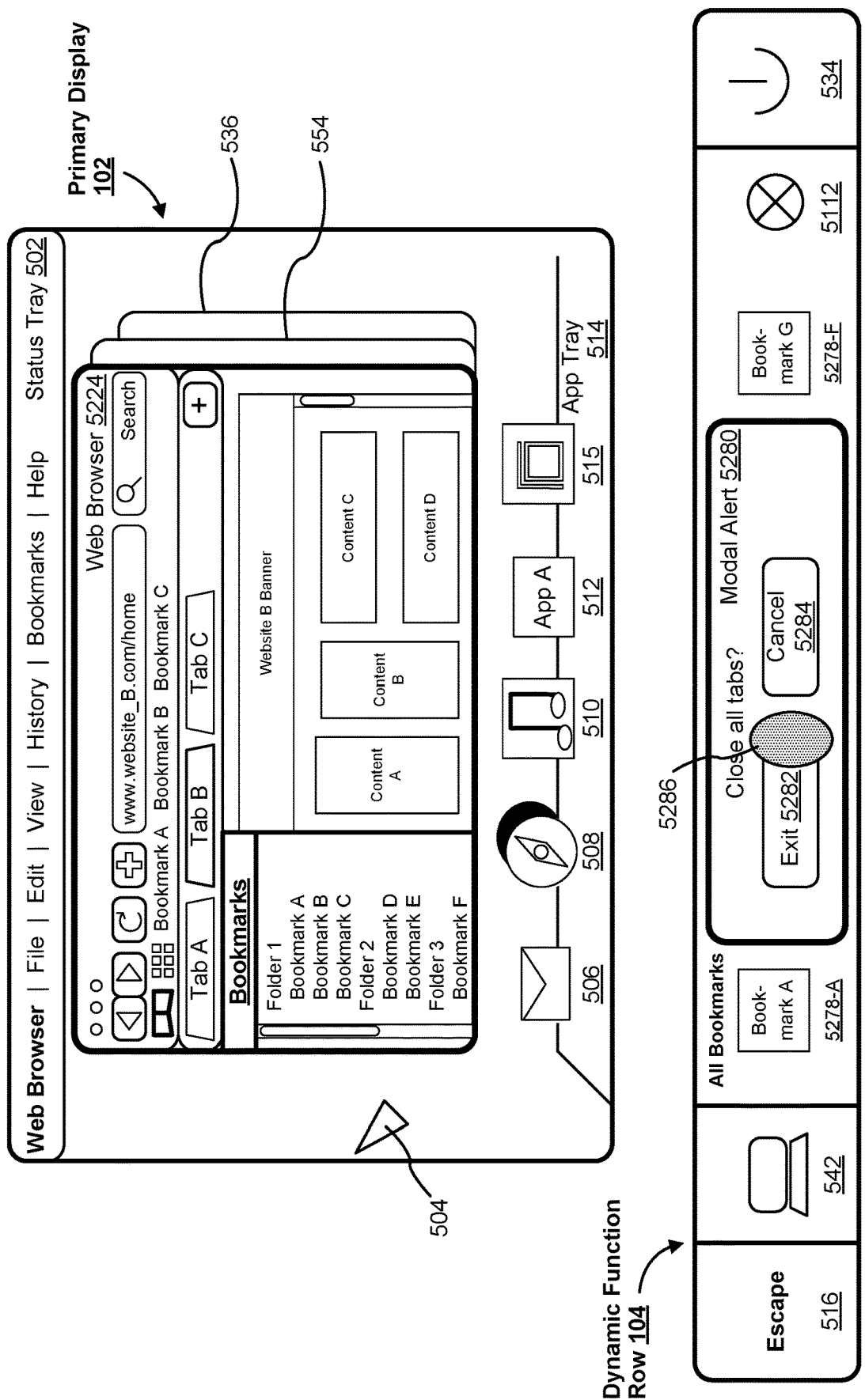
Figure 5V:
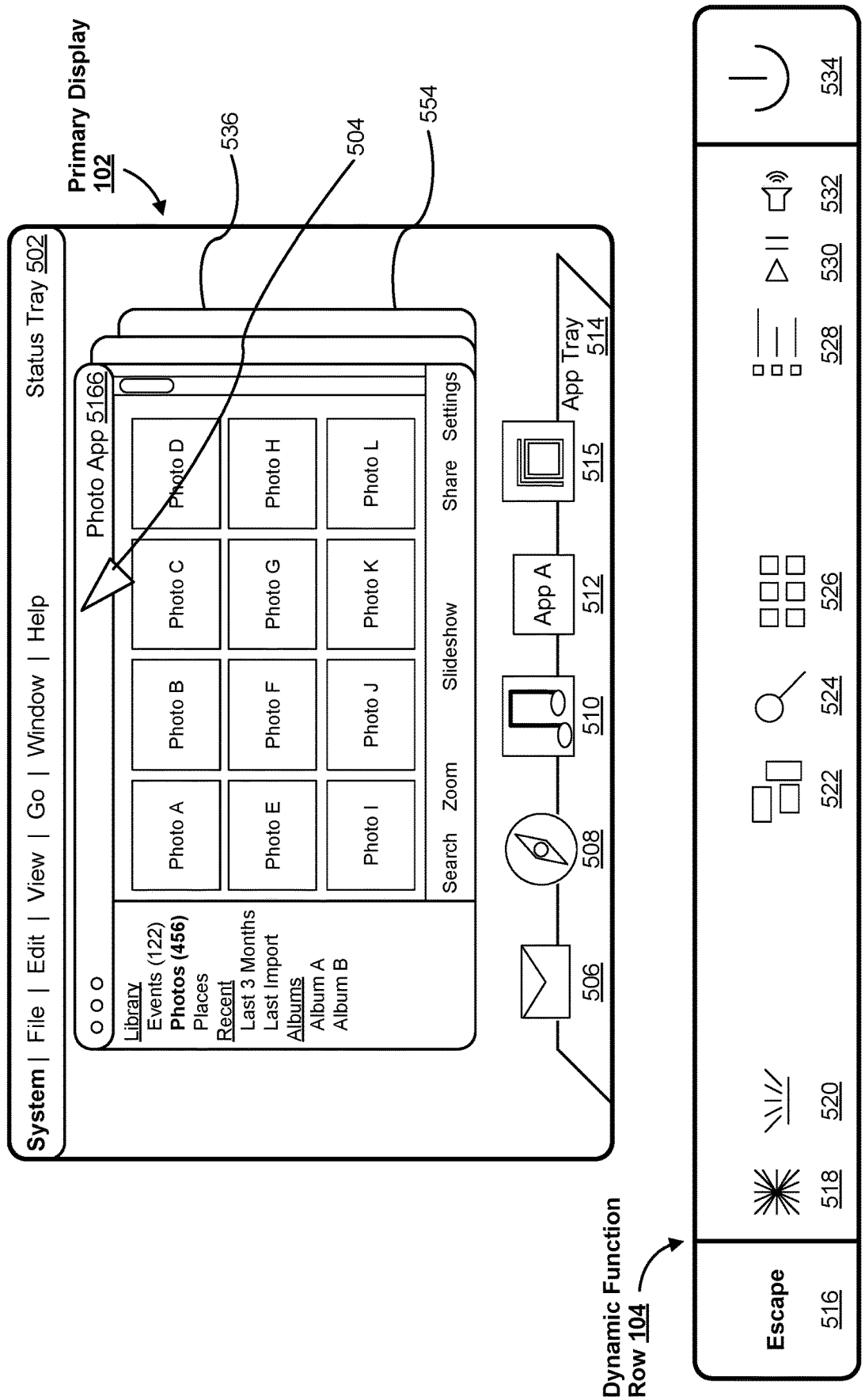
Figure 5W:
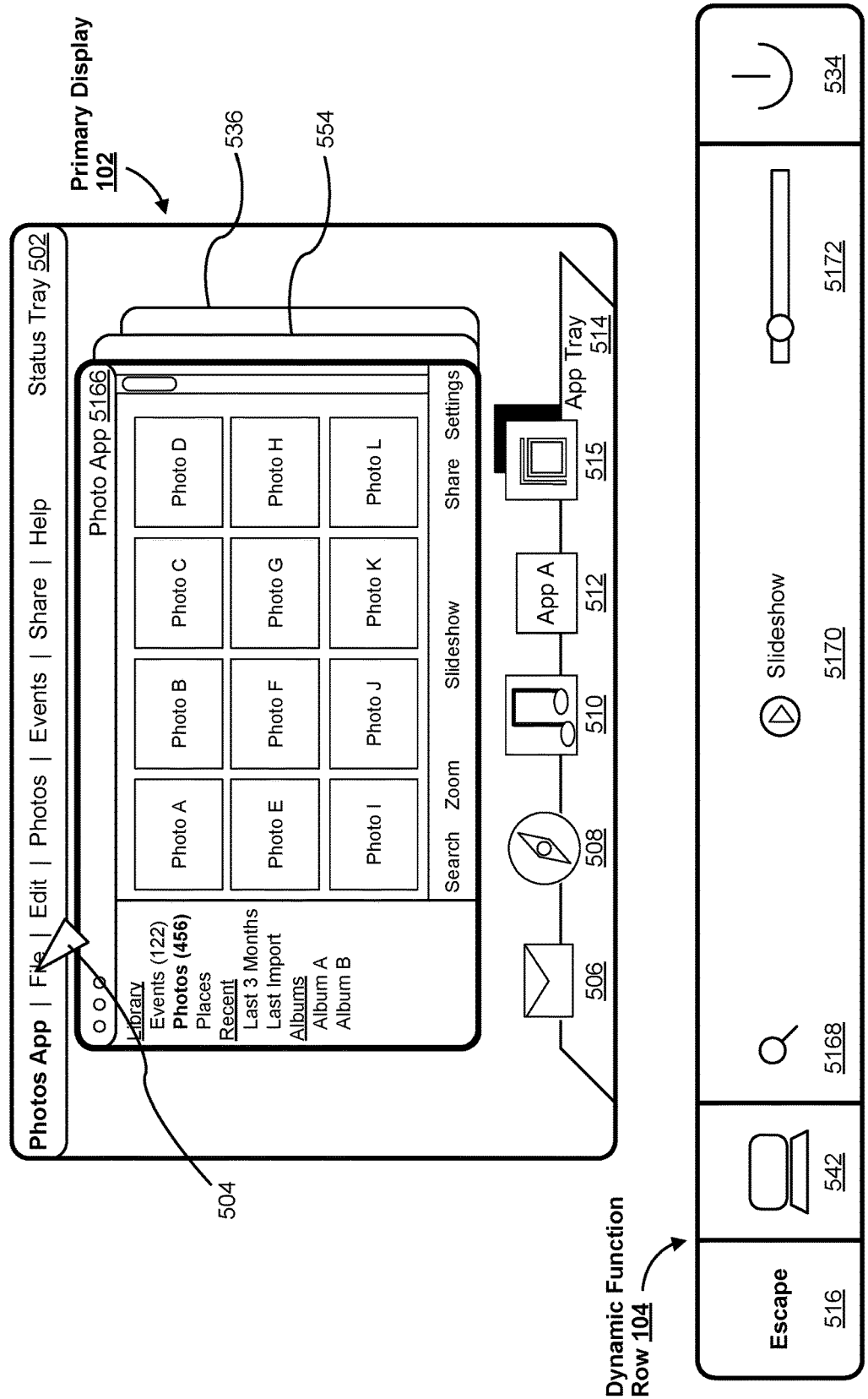
Figure 5X:
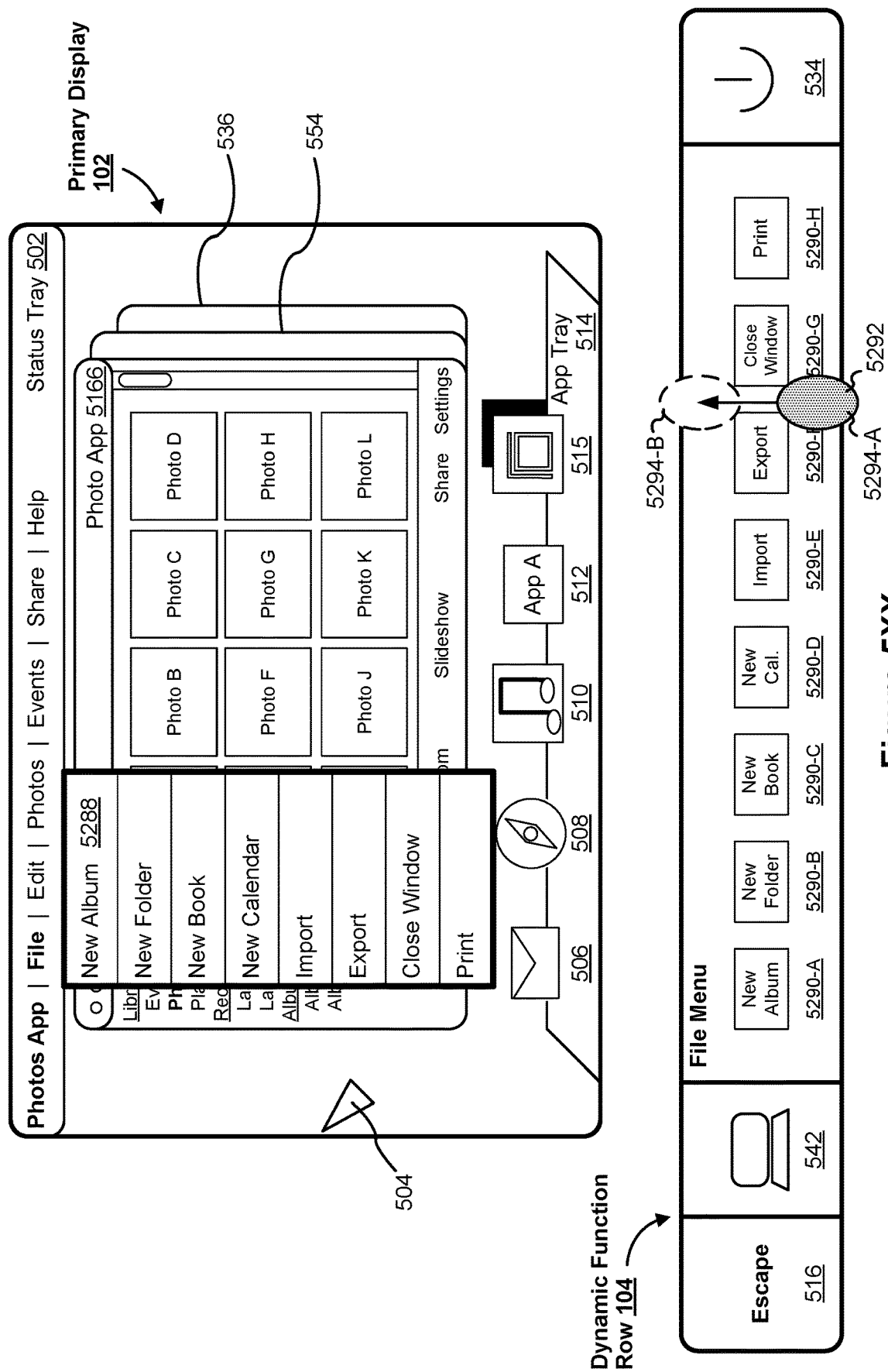
Figure 5Y:
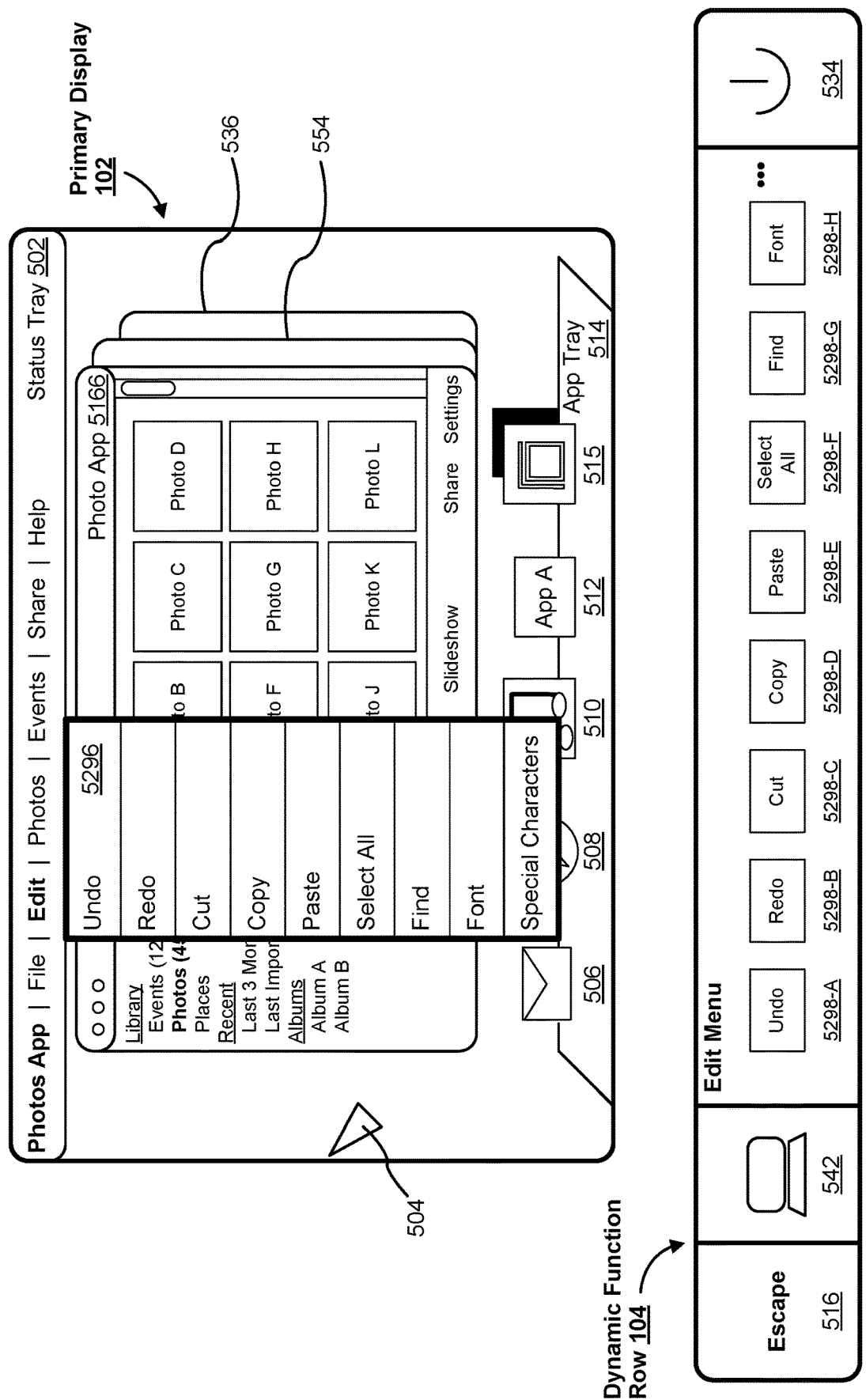
Figure 5Z:
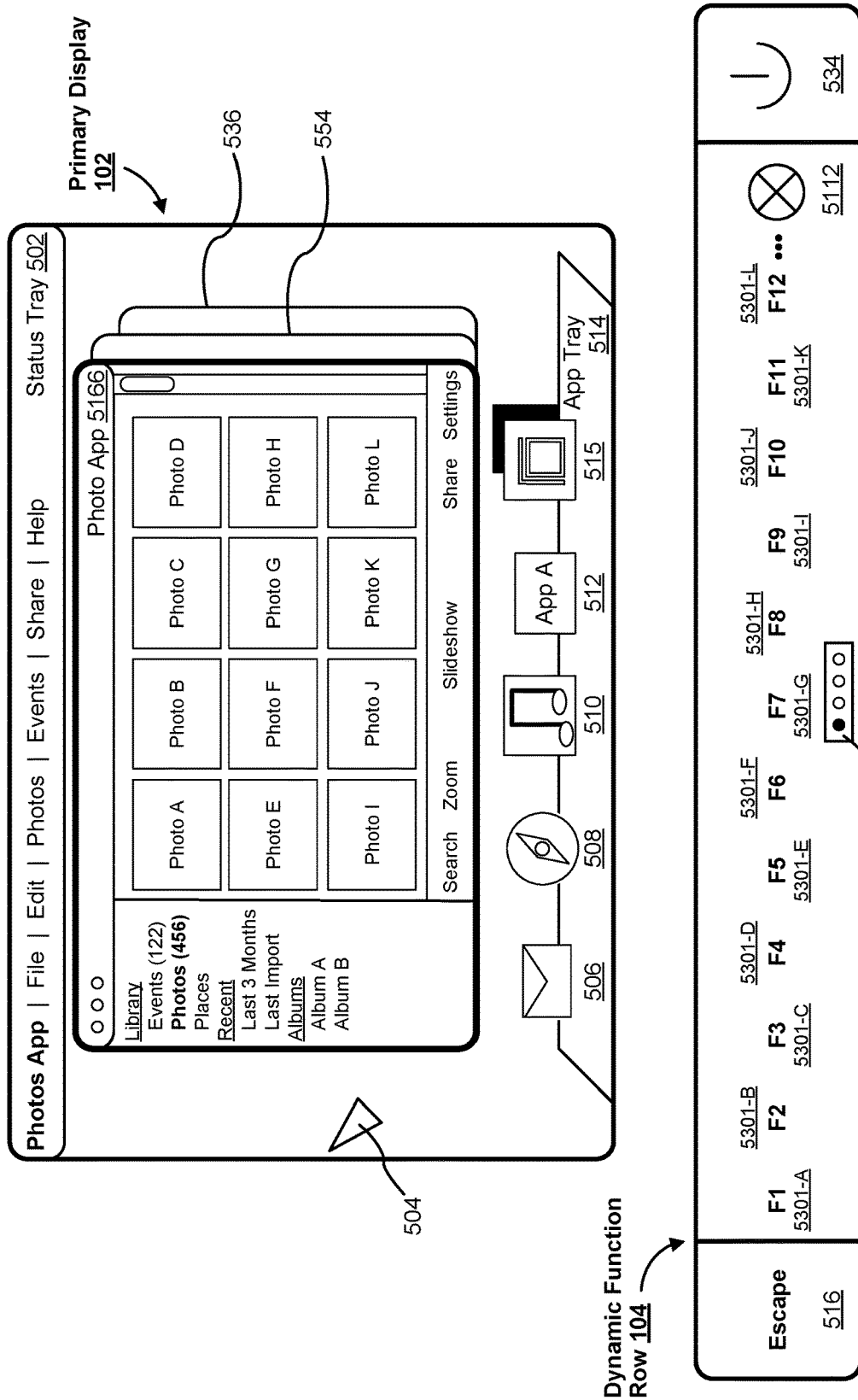
Figure 6B:
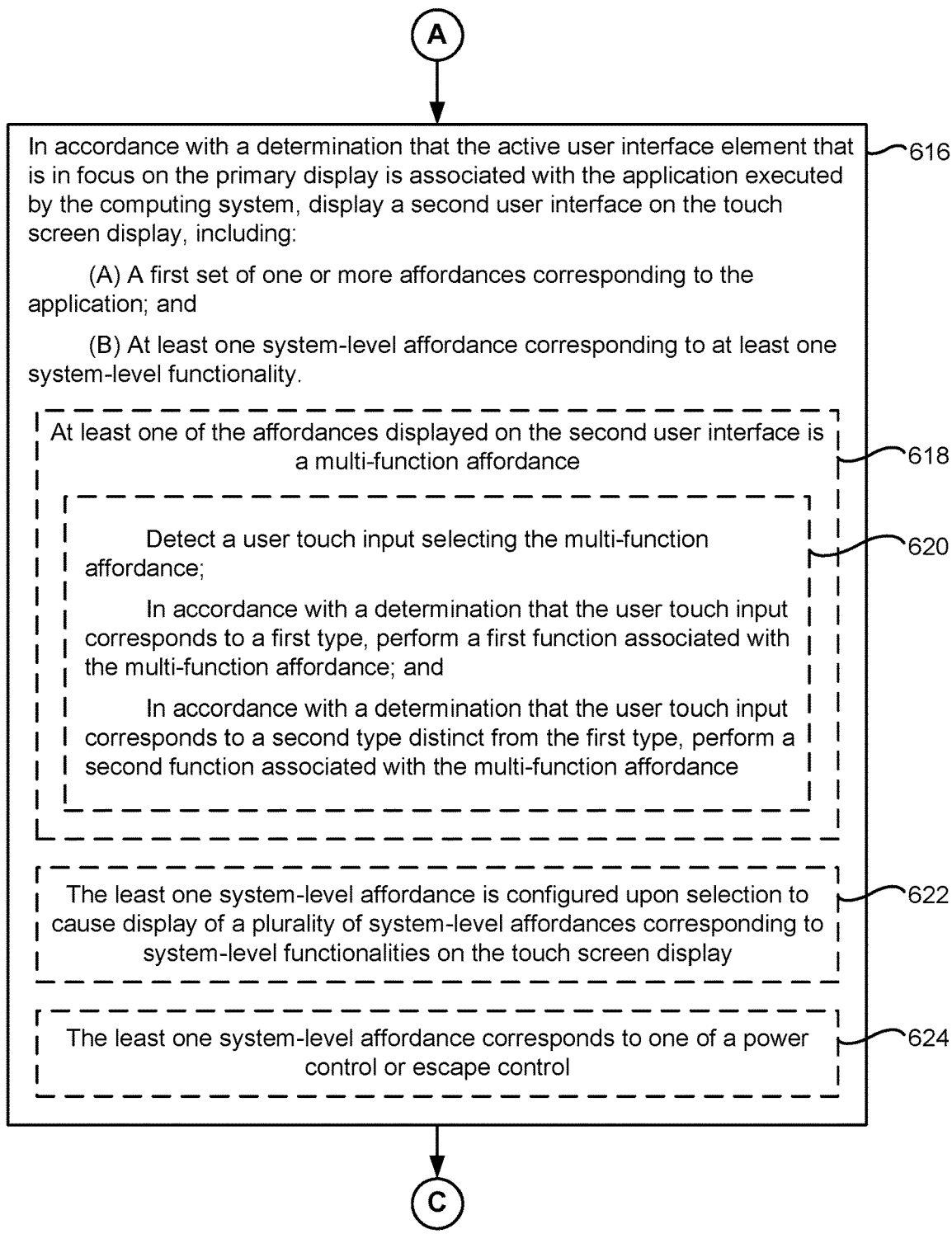
Figure 6C:
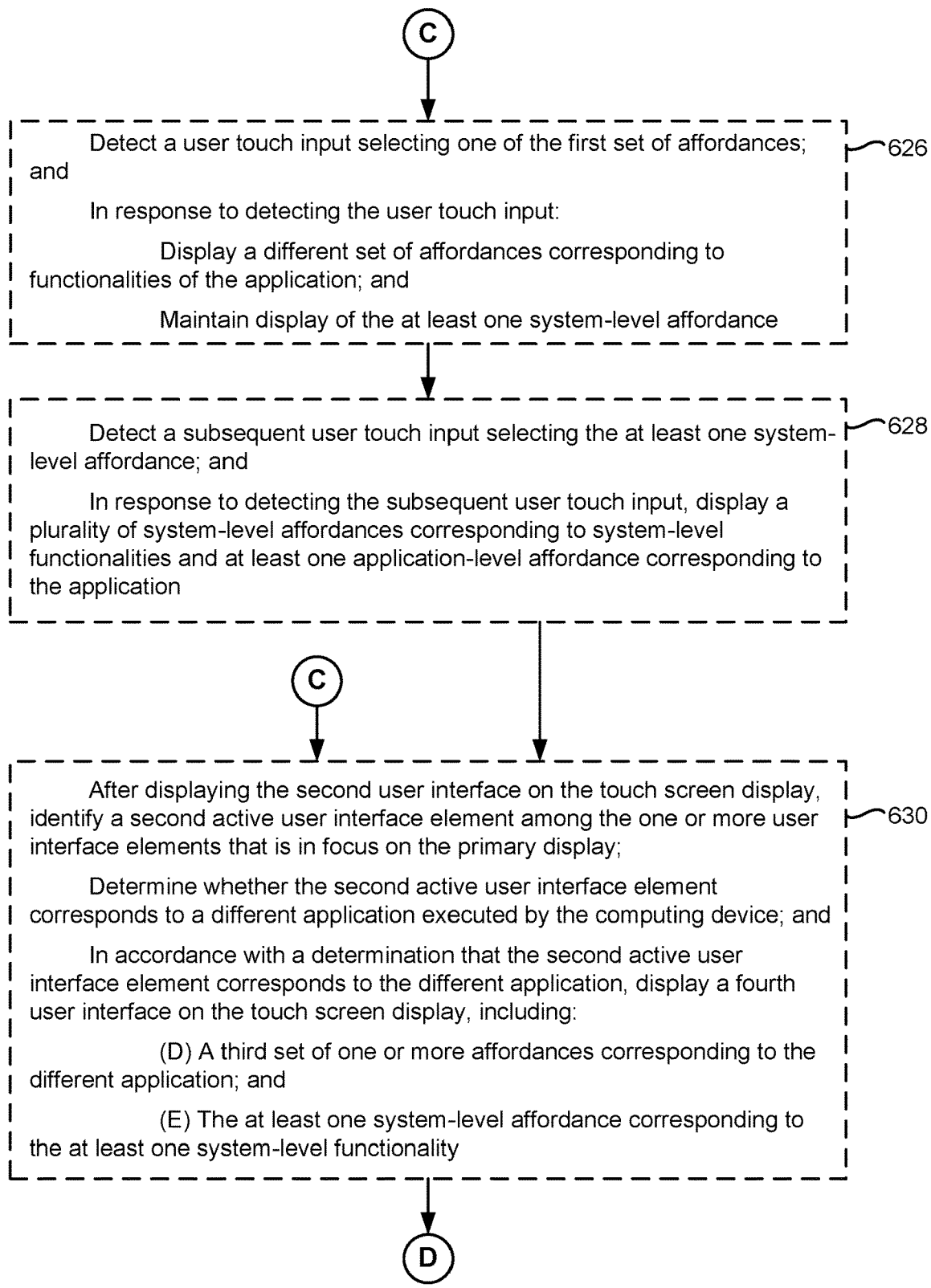
Figure 6D:
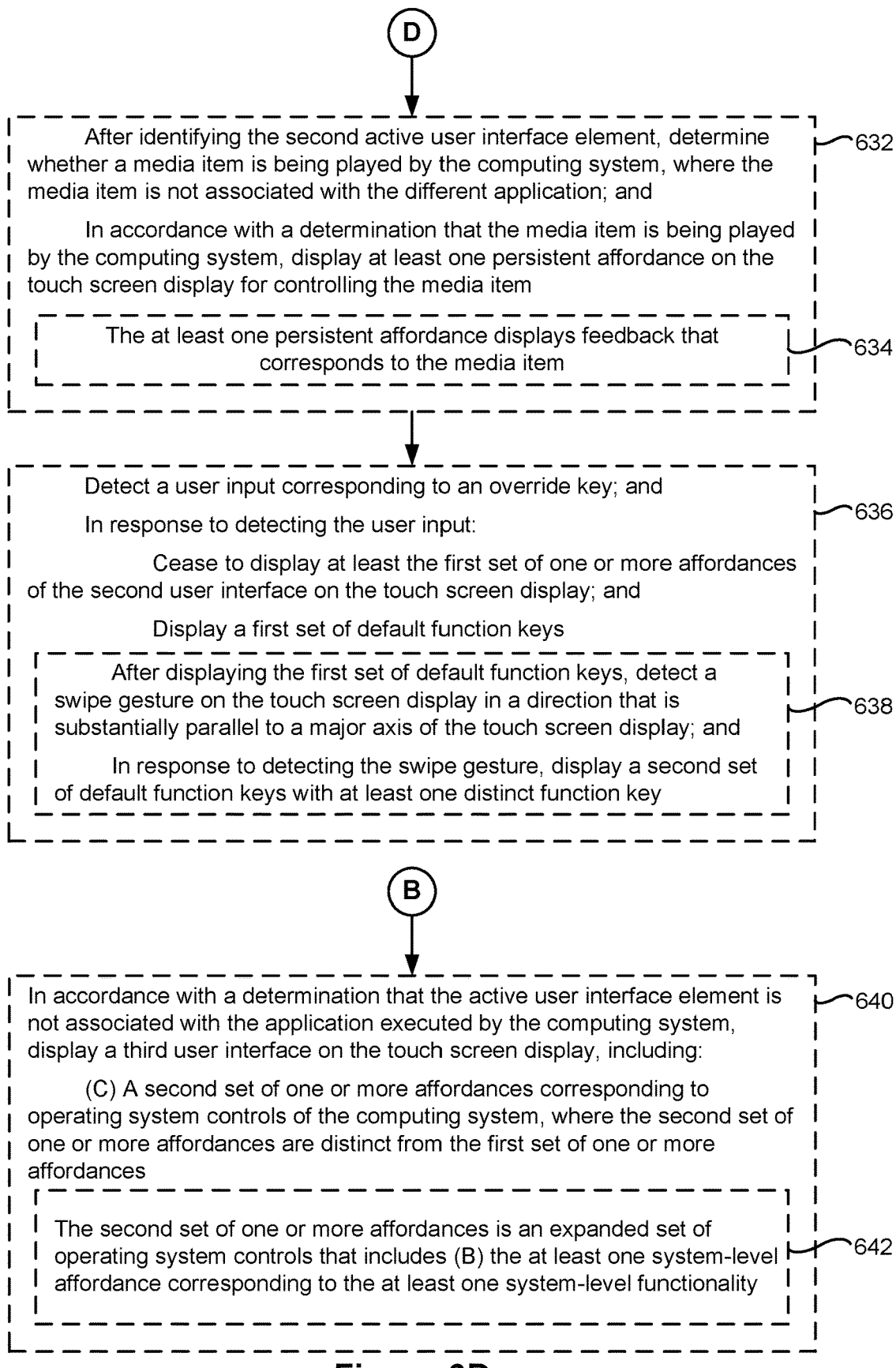

FIG. 5Z illustrates primary display 102 displaying selected photo B in window 5166 in response to detecting selection of photo B with cursor 504 in FIG. 5Y. In FIG. 5Z, selected photo B is in focus on primary display 102 as shown by the thick lines surrounding photo B in window 5166. FIG. 5Z also illustrates primary display 102 displaying cursor 504 at a location corresponding to a slideshow affordance.

FIG. 5Z further illustrates dynamic function row 104 displaying a set of affordances corresponding to selected photo B in response to detecting selection of photo B with cursor 504 in FIG. 5Y. In FIG. 5Z, the set of affordance corresponding to selected photo B include: search affordance 5168 for searching the user's photo library; zoom affordance 5174 for zooming into selected photo B; like affordance 5176 for liking selected photo B; slideshow affordance 5170, which, when activated (e.g., via a tap contact), initiates a slideshow of the selected photos or all photos in the all photos sub-section of the user's photo library in a full-screen mode (e.g., shown in FIG. 5AA); information affordance 5178 for displaying information corresponding to selected photo B, such as size, location, time/date, and the like, on dynamic function row 104 and/or primary display 102; editing affordance 5180, which, when activated (e.g., via a tap contact), causes dynamic function row 104 to display tools for editing selected photo B (e.g., shown in FIG. 5DD) and/or causes primary display 102 to display an editing interface for editing selected photo B; photo adding affordance 5182 for adding selected photo B to a photo album; sharing affordance 5184 for sharing selected photo B via one or more communication modes (e.g., social media networks, SMS, email, and the like); and deletion affordance 5186 for deleting selected photo B from the user's photo library.

FIG. 5AA illustrates primary display 102 displaying a slideshow of photos from the all photos sub-section of the user's photo library in window 5188 in response to detecting selection of the slideshow affordance with cursor 504 in FIG. 5Z. In FIG. 5AA, primary display 102 displays window 5188 with photo B in full-screen mode.

FIG. 5AA also illustrates dynamic function row 104 displaying a plurality of thumbnail images (e.g., thumbnail images 5192-Y, 5192-Z, 5192-A, 5192-B, 5192-C, 5192-D, and 5192-E) corresponding to the photos in the all photos sub-section of the user's photo library in response to detecting selection of the slideshow affordance with cursor 504 in FIG. 5Z. In FIG. 5AA, the thick lines surrounding thumbnail image 5192-B indicate that photo B is currently displayed by primary display 102. In FIG. 5AA, dynamic function row 104 also displays a pause affordance 5190, which, when activated (e.g., via a tap contact), causes the slideshow to be paused and also causes primary display 102 to exit the full-screen mode. FIG. 5AA further illustrates dynamic function row 104 receiving and detecting contact 5194 (e.g., a tap contact) at a location corresponding to pause affordance 5190.

FIG. 5BB illustrates primary display 102 displaying photo B in an expanded view within window 5166 in response to detecting selection of pause affordance 5190 in FIG. 5AA. In FIG. 5BB, the expanded view of photo B is in focus on primary display 102 as shown by the thick lines surrounding the expanded view of photo B in window 5166.

FIG. 5BB also illustrates dynamic function row 104 displaying a set of affordances corresponding to photo B in response to detecting selection of pause affordance 5190 in FIG. 5AA. In FIG. 5BB, the set of affordance corresponding to photo B include: zoom affordance 5174, which, when activated (e.g., via a tap contact), causes dynamic function row 104 and/or primary display 102 to display zoom controls that enable the user of portable computing system 100 or desktop computing system 200 to zoom into or zoom out from photo B; full-screen affordance 5194, which, when activated (e.g., via a tap contact), causes primary display 102 to display photo B in full-screen mode; slideshow affordance 5170, which, when activated (e.g., via a tap contact), initiates a slideshow of the selected photos or all photos in the all photos sub-section of the user's photo library in a full-screen mode; information affordance 5178 for displaying information corresponding to selected photo B, such as size, location, time/date, and the like, on dynamic function row 104 and/or primary display 102; editing affordance 5180, which, when activated (e.g., via a tap contact), causes dynamic function row 104 to display tools for editing selected photo B and/or causes primary display 102 to display an editing interface for editing selected photo B; photo adding affordance 5182 for adding selected photo B to a photo album; and sharing affordance 5184 for sharing selected photo B via one or more communication modes (e.g., social media networks, SMS, email, and the like). FIG. 5BB further illustrates dynamic function row 104 receiving and detecting contact 5196 (e.g., a tap contact) at a location corresponding to full-screen affordance 5196.

FIG. 5CC illustrates primary display 102 displaying photo B in full-screen mode within window 5200 in response to detecting selection of full-screen affordance 5196 in FIG. 5BB. FIG. 5CC also illustrates dynamic function row 104 displaying minimize affordance 5198 in response to detecting selection of full-screen affordance 5196 in FIG. 5BB. When activated (e.g., via a tap contact), minimize affordance 5198 causes primary display 102 to display photo B in the expanded view within window 5166 (as shown in FIG. 5BB). FIG. 5CC further illustrates dynamic function row 104 receiving and detecting contact 5201 (e.g., a tap contact) at a location corresponding to editing affordance 5180.

FIG. 5DD illustrates dynamic function row 104 displaying a set of editing tools 5205 in response to detecting selection of editing affordance 5180 in FIG. 5CC.

FIG. 5DD also illustrates dynamic function row 104 displaying editing affordance 5180 with a thickened/bold outline and all other affordances displayed in FIG. 5CC (e.g., zoom affordance 5174, minimize affordance 5198, information affordance 5178, photo adding affordance 5182, and sharing affordance 5184) with increased translucency in response to detecting selection of editing affordance 5180 in FIG. 5CC.

In FIG. 5DD, the set of editing tools 5205 includes: a rotate tool 5202, which, when activated (e.g., via a tap contact) causes dynamic function row 104 to display controls for rotating photo B clockwise or counter-clockwise within window 5200; an enhance tool 5204, which, when activated (e.g., via a tap contact) causes dynamic function row 104 to display controls for enhancing photo B such as applying filters to photo B, adjusting the brightness of photo B, adjusting the saturation of photo B, and/or the like; a red-eye reduction tool 5206, which, when activated (e.g., via a tap contact) causes dynamic function row 104 to display controls for reducing the red-eye of persons in photo B; a straighten tool 5208, which, when activated (e.g., via a tap contact) causes dynamic function row 104 to display controls for straightening the orientation of photo B within window 5200; a crop tool 5210, which, when activated (e.g., via a tap contact) causes dynamic function row 104 to display controls for cropping photo B within window 5200; and a retouching tool 5212, which, when activated (e.g., via a tap contact) causes dynamic function row 104 to display controls for re-touching photo B such as removal and airbrush effects. FIG. 5DD further illustrates dynamic function row 104 receiving and detecting contact 5214 (e.g., a tap contact) at a location corresponding to straighten tool 5208.

FIG. 5EE illustrates dynamic function row 104 displaying a set of controls 5209 for straightening the orientation of photo B within window 5200 in response to detecting selection of straighten tool 5208 in FIG. 5DD. In FIG. 5EE, the set of controls 5209 corresponding to the straightening tool 2208 includes a slider 5210 for adjusting the orientation of photo B within window 5200 and done affordance 5212, which, when activated (e.g., via a tap contact), causes dynamic function row 104 to cease displaying the set of controls 5209 and to display the set of editing tools 5205 (as shown in FIG. 5DD). FIG. 5EE also illustrates dynamic function row 104 receiving and detecting contact 5216 (e.g., a tap contact) at a location corresponding to escape affordance 516.

For example, the user of portable computing system 100 or desktop computing system 200 is able to adjust the orientation of photo B within window 5200 by performing a left-to-right swipe/drag gesture or a right-to-left swipe/drag gesture at a location originating on slider 5210 or within the set of controls 5209. For example, in response to detecting an upward swipe gesture on dynamic function row 104, dynamic function row 104 displays a set of controls corresponding to crop tool 5210. In another example, in response to detecting a downward swipe gesture on dynamic function row 104, dynamic function row 104 displays a set of controls corresponding to red-eye reduction tool 5206.

FIG. 5FF illustrates primary display 102 displaying photo B in the expanded view within window 5166 in response to detecting selection of escape affordance 516 in FIG. 5EE. FIG. 5FF illustrates dynamic function row 104 displaying a set of affordances corresponding to photo B (as shown in FIG. 5BB) in response to detecting selection of escape affordance 516 in FIG. 5EE. In FIG. 5FF, the set of affordance corresponding to photo B include: zoom affordance 5174, which, when activated (e.g., via a tap contact), causes dynamic function row 104 and/or primary display 102 to display zoom controls that enable the user of portable computing system 100 or desktop computing system 200 to zoom into or zoom out from photo B; full-screen affordance 5194, which, when activated (e.g., via a tap contact), causes primary display 102 to display photo B in full-screen mode; slideshow affordance 5170, which, when activated (e.g., via a tap contact), initiates a slideshow of the selected photos or all photos in the all photos sub-section of the user's photo library in a full-screen mode; information affordance 5178 for displaying information corresponding to selected photo B, such as size, location, time/date, and the like, on dynamic function row 104 and/or primary display 102; editing affordance 5180, which, when activated (e.g., via a tap contact), causes dynamic function row 104 to display tools for editing selected photo B and/or causes primary display 102 to display an editing interface for editing selected photo B; photo adding affordance 5182 for adding selected photo B to a photo album; and sharing affordance 5184 for sharing selected photo B via one or more communication modes (e.g., social media networks, SMS, email, and the like).

FIG. 5FF also illustrates dynamic function row 104 displaying notification 5218 overlaid on affordances 5178, 5180, 5182, and 5184 in response to reception of notification 5218 by portable computing system 100 or desktop computing system 200. In FIG. 5FF, notification 5218 corresponds to an SMS, instant message, or the like sent by Suzie S. to the user of portable computing system 100 or desktop computing system 200, where the notification's content inquiries "Movies tonight?" FIG. 5FF further illustrates dynamic function row 104 detecting a left-to-right swipe gesture with contact 5220 from a first location 5222-A within notification 5128 to a second location 5222-B.

FIG. 5GG illustrates dynamic function row 104 ceasing to display notification 5128 in response to detecting the left-to-right swipe gesture in FIG. 5FF. FIG. 5GG also illustrates primary display 102 displaying cursor 504 at a location corresponding to web browser application icon 508.

FIG. 5HH illustrates primary display 102 displaying a window 5224 for the web browser application in response to detecting selection of web browser application icon 508 with cursor 504 in FIG. 5GG. For example, window 5224 is overlaid on window 5166. In FIG. 5HH, window 5224 includes controls for the web browser application including browsing controls (e.g., last web page, next web page, refresh, and add to favorites), an address bar, a search bar, a show-all bookmarks affordance (e.g., resembling an open book), a show-all open tabs affordance (e.g., a grid of six squares), and affordances for particular bookmarks A, B, and C. In FIG. 5HH, window 5224 shows a home interface for the web browser application including a plurality of affordances 5227 linking to favorited or most frequently visited websites A-H. In FIG. 5HH, window 5224 for application A is in focus on primary display 102. In FIG. 5HH, status tray 502 indicates that the web browser application is running in the foreground, and app tray 514 also indicates that the web browser application is running in the foreground based on the shadow behind the web browser application icon 508.

FIG. 5HH also illustrates dynamic function row 104 displaying affordance 5226 in addition to the persistent controls (i.e., affordances 516 and 534) and the plurality of system-level affordances (i.e., affordances 518, 520, 522, 524, 526, 528, 530, and 532) in response to detecting selection of web browser application icon 508 with cursor 504 in FIG. 5GG. When activated (e.g., via a tap contact), affordance 5226 causes dynamic function row 104 to display a set of controls for the web browser application (e.g., affordances 5230, 5232, and 5238, and address bar 5234 as shown in FIG. 5II). FIG. 5HH further illustrates dynamic function row 104 receiving and detecting contact 5228 (e.g., a tap contact) at a location corresponding to affordance 5226.

FIG. 5II illustrates dynamic function row 104 displaying a set of controls for the web browser application in response to detecting selection of affordance 5226 in FIG. 5HH. In FIG. 5II, the set of controls for the web browser application includes: affordance 5230 for displaying a web page visited before the one currently displayed by the web browser application within window 5224; affordance 5232 for displaying a web page visited after the one currently displayed by the web browser application within window 5224; affordance 5238 for adding the web page currently displayed by the web browser application to a favorites list or a bookmarks folder; and address bar 5234 for displaying the URL of the web page currently displayed by the web browser application. In FIG. 5II, address bar 5234 also includes a refresh affordance 5236 for refreshing the web page currently displayed by the web browser application. FIG. 5II also illustrates primary display 102 displaying cursor 504 at a location corresponding to affordance 5227-A, which links to website A.

FIG. 5JJ illustrates primary display 102 displaying an interface for tab A within window 5224 after detecting selection of affordance 5227-A corresponding to website A with cursor 504 in FIG. 5II. In FIG. 5JJ, the interface for tab A is in focus on primary display 102 as indicated by the thick lines surrounding tab A and the bold text for tab A. In FIG. 5JJ, the interface for tab A shows a checkout web page of website A (e.g., associated with the URL: www.website_A.com/checkout). The checkout web page corresponds to the user's virtual shopping cart, which includes Items A and B for purchase. FIG. 5JJ also illustrates primary display 102 displaying cursor 504 at a location corresponding to a purchase affordance within window 5224. FIG. 5II further illustrates dynamic function row 104 displaying the URL (e.g., www.website_A.com/checkout) for the checkout web page of website A in address bar 5234.

FIG. 5KK illustrates primary display 102 displaying modal alert 5240 overlaid on window 5224 in response to detecting selection of the purchase affordance with cursor 504 in FIG. 5JJ. In FIG. 5KK, modal alert 5240 displayed on primary display 102 prompts the user of portable computing system 100 or desktop computing system 200 to provide their fingerprint on dynamic function row 104 and also includes cancel affordance 5242, which, when activated (e.g., via selection by cursor 504) causes cancelation of the purchase. For example, modal alert 5240 is displayed in accordance with security settings (e.g., default or user-specified) that requires a fingerprint to validate purchases initiated by portable computing system 100 or desktop computing system 200. For example, in some embodiments, primary display 102 and/or dynamic function row 104 displays the modal alert prompting the user of portable computing system 100 or desktop computing system 200 to provide their fingerprint on dynamic function row 104 upon logging into portable computing system 100 or desktop computing system 200, when entering a password to access an application or website, when entering a password to decrypt the data stored by portable computing system 100 or desktop computing system 200, when deleting folders and/or data from portable computing system 100 or desktop computing system 200, when taking other destructive actions, and/or the like.

FIG. 5KK also illustrates dynamic function row 104 displaying modal alert 5240 in response to detecting selection of the purchase affordance with cursor 504 in FIG. 5JJ. In FIG. 5KK, modal alert 5240 displayed on dynamic function row 104 prompts the user of portable computing system 100 or desktop computing system 200 to provide their fingerprint in fingerprint region 5244 of dynamic function row 104 and also includes cancel affordance 5242, which, when activated (e.g., via a tap contact) causes cancelation of the purchase. In some embodiments, dynamic function row 104 is configured to detect a fingerprint within fingerprint region 5244 of dynamic function row 104, which also corresponds to power control 534 in FIGS. 5A-5JJ. In some embodiments, dynamic function row 104 is configured to detect a fingerprint at any location within its touch-sensitive area. FIG. 5KK further illustrates dynamic function row 104 receiving and detecting contact 5246 (e.g., a press and hold gesture) within fingerprint region 5244.

FIG. 5LL illustrates primary display 102 displaying an interface for tab A within window 5224 after detecting contact 5246 within fingerprint region 5244 in FIG. 5KK. In FIG. 5LL, the interface for tab A shows a receipt web page of website A (e.g., associated with the URL: www.website_A.com/receipt) indicating that the purchase was completed after validation of the fingerprint provided by the user of portable computing system 100 or desktop computing system 200 in FIG. 5KK.

FIG. 5LL also illustrates dynamic function row 104 displaying an interface 5248 associated with an incoming voice call from C. Cheung along with the at least one system-level affordance (e.g., affordance 542) in response to reception of the incoming voice call by portable computing system 100 or desktop computing system 200. In FIG. 5LL, interface 5248 includes a first affordance 5250 for answering the incoming call and a second affordance 5252 for declining the incoming call. FIG. 5LL further illustrates dynamic function row 104 receiving and detecting contact 5254 (e.g., a tap contact) at a location corresponding to first affordance 5250. For example, after detecting selection of first affordance 5250, a communication connection (e.g., VoIP) between C. Cheung and the user of portable computing system 100 or desktop computing system 200 is established for the voice call.

FIG. 5MM illustrates dynamic function row 104 displaying an interface 5256 associated with an ongoing voice call between C. Cheung and the user of portable computing system 100 or desktop computing system 200 along with the at least one system-level affordance (e.g., affordance 542) after detecting selection of first affordance 5250 in FIG. 5LL. In FIG. 5MM, interface 5256 includes affordance 5258 for ending the voice call and an indicator of the total voice call time (e.g., 7 minutes and 29 seconds). In some embodiments, during the ongoing voice call, affordances associated with the focus of primary display 102 are not displayed on dynamic function row 104. In some embodiments, after the voice call has lasted a predefined amount of time, interface 5256 is displayed in a compact mode and affordances associated with the focus of primary display 102 may be displayed on dynamic function row 104. FIG. 5MM also illustrates dynamic function row 104 receiving and detecting contact 5260 at a location corresponding to affordance 5258.

FIG. 5NN illustrates primary display 102 displaying an interface for tab B within window 5224, where tabs A, B, and C are open within the web browser application. In FIG. 5NN, the interface for tab B shows the home web page of website B (e.g., associated with the URL: www.website_B.com/home). In FIG. 5NN, the interface for tab B is in focus on primary display 102 as indicated by the thick lines surrounding tab B and the bold text for tab B.

FIG. 5NN also illustrates dynamic function row 104 ceasing to display interface 5256 after detecting selection of affordance 5258 in FIG. 5MM. In FIG. 5NN, dynamic function row 104 includes the URL for the home web page of website B in address bar 5234 (e.g., www.website_B.com/home). In FIG. 5NN, dynamic function row 104 also includes: affordance 5262-A, which, when activated (e.g., by a tap contact), causes primary display 102 to display an interface for tab A and also causes dynamic function row 104 to show the URL corresponding to tab B in address bar 5234; and affordance 5262-B, which, activated (e.g., by a tap contact), causes primary display 102 to display an interface for tab C and also causes dynamic function row 104 to show the URL corresponding to tab C in address bar 5234.

FIG. 5OO illustrates primary display 102 displaying notification 5264 overlaid on window 5264 in response to reception of notification 5264 by portable computing system 100 or desktop computing system 200. In FIG. 5OO, notification 5264 corresponds to an SMS, instant message, or the like sent by MAS to the user of portable computing system 100 or desktop computing system 200, where the notification's content inquiries "Landed yet?" FIG. 5OO illustrates primary display 102 displaying the user of portable computing system 100 or desktop computing system 200 dragging notification 5264 with cursor 504 to a predefined location in the bottom right-hand corner of primary display 102. For example, the user portable computing system 100 or desktop computing system 200 is able to cause display of a respective menu, notification, modal alert, or the like on dynamic function row 104 in response to dragging the respective menu, notification, modal alert, or the like from its origin location on primary display 102 to a predefined location (e.g., the bottom right-hand corner or another similar location). In some embodiments, the predefined location is one of a plurality of predefined locations that operate in a similar manner, where the plurality of predefined locations are default or user-specific locations.

FIG. 5PP illustrates primary display 102 ceasing to display notification 5264 overlaid on window 5264 in response to the user of portable computing system 100 or desktop computing system 200 dragging notification 5264 with cursor 504 to the predefined location in the bottom right-hand corner of primary display 102 in FIG. 5OO. FIG. 5PP also illustrates dynamic function row 104 displaying notification 5264 overlaid on affordances 5262-A and 5262-B in response to the user of portable computing system 100 or desktop computing system 200 dragging notification 5264 with cursor 504 to the predefined location in the bottom right-hand corner of primary display 102 in FIG. 5OO. FIG. 5PP further illustrates dynamic function row 104 receiving and detecting contact 5266 (e.g., a tap contact) at a location within notification 5264.

FIG. 5QQ illustrates dynamic function row 104 displaying response dialogue box 5268 in response to detecting contact 5266 at the location within notification 5264 in FIG. 5PP. Alternatively, in some embodiments, an application corresponding to notification 5264 is opened in response to detecting contact 5266 at the location within notification 5264 in FIG. 5PP. In FIG. 5QQ, response dialogue box 5268 includes a plurality of predictive responses to the content of notification 5264 shown in FIGS. 5OO-5PP. In FIG. 5QQ, response dialogue box 5268 includes a first predictive response 5270 ("Yes."), a second predictive response 5272 ("No."), and a third predictive response 5274 ("On my way!"). FIG. 5QQ also illustrates dynamic function row 104 receiving and detecting contact 5276 (e.g., a tap contact) at a location corresponding to the first predictive response 5270. For example, in response to selection of the first predictive response 5270, portable computing system 100 or desktop computing system 200 causes the first predictive response 5270 ("Yes.") to be sent to MAS via a default communication mode (e.g., SMS, instant message, or the like) or a same communication mode as the one by which notification 5264 was sent to the user of portable computing system 100 or desktop computing system 200.

FIG. 5RR illustrates primary display 102 displaying cursor 504 at a location corresponding to the show-all bookmarks affordance (e.g., resembling an open book) within window 5224. FIG. 5SS illustrates primary display 102 displaying a bookmarks sidebar within window 5224 in response to detecting selection of the show-all bookmarks affordance with cursor 504 in FIG. 5RR. In FIG. 5SS, the bookmarks sidebar is in focus on primary display 102 as indicated by the thick lines surrounding the bookmarks sidebar. FIG. 5SS also illustrates primary display 102 displaying the user of portable computing system 100 or desktop computing system 200 dragging the bookmarks sidebar with cursor 504 to the predefined location in the bottom right-hand corner of primary display 102.

FIG. 5TT illustrates dynamic function row 104 displaying a set of bookmark affordances 5278 (e.g., bookmark affordances 5278-A to 5278-G) corresponding to all pre-existing bookmarks in response to the user of portable computing system 100 or desktop computing system 200 dragging the bookmarks sidebar with cursor 504 to the predefined location in the bottom right-hand corner of primary display 102 in FIG. 5SS. For example, when a respective one of the set of bookmark affordances 5278 is activated (e.g., via a tap contact), primary display 102 displays a website corresponding to the respective one of the set of bookmark affordances 5278 in a new tab within window 5224. Continuing with this example, when the respective one of the set of bookmark affordances 5278 is activated (e.g., via a tap contact), dynamic function row 104 ceases to display the set of bookmark affordances 5278 and displays the set of controls for the web browser application and the URL for the website corresponding to the respective one of the set of bookmark affordances 5278 in address bar 5234 (e.g., as shown in FIG. 5SS). In FIG. 5TT, dynamic function row 104 also displays exit affordance 5112, which, when activated (e.g., via a tap contact), causes dynamic function row 104 to cease displaying the set of bookmark affordances 5278 and display the set of controls for the web browser application as shown in FIG. 5SS. FIG. 5TT also illustrates primary display 102 displaying cursor 504 at a location corresponding to an exit affordance for closing window 5224.

FIG. 5UU illustrates dynamic function row 104 displaying modal alert 5280 overlaid on the set of bookmark affordances 5278 in response to detecting selection of the exit affordance with cursor 504 in FIG. 5TT. In FIG. 5UU, modal alert 5280 prompts the user of portable computing system 100 or desktop computing system 200 to confirm that they intend to close all open tabs within the web browser application. In FIG. 5UU, modal alert 5280 includes: exit affordance 5282, which, when activated (e.g., via a tap contact), causes primary display 102 to cease display of window 5224; and cancel affordance 5284, which, when activated (e.g., via a tap contact), dismisses modal alert 5280 and causes primary display 102 to maintain display of window 5224. FIG. 5UU also illustrates dynamic function row 104 receiving and detecting contact 5286 (e.g., a tap contact) at a location corresponding to exit affordance 5282.

FIG. 5VV illustrates primary display 102 ceasing to display window 5224 and displaying window 5166 for the photo application in response to detecting selection of exit affordance 5282 in FIG. 5UU. In FIG. 5VV, status tray 502 indicates that the system/operating system is currently in focus on primary display 102. FIG. 5VV also illustrates primary display 102 displaying cursor 504 at a location corresponding to window 5166. FIG. 5VV further illustrates dynamic function row 104 displaying the persistent controls (i.e., affordances 516 and 534) and the plurality of system-level affordances (i.e., affordances 518, 520, 522, 524, 526, 528, 530, and 532) in response to detecting selection of exit affordance 5282 in FIG. 5UU and based on the current focus (e.g., the system/operating system) of primary display 102.

In FIG. 5WW, the focus of primary display 102 is the photo application in response to detecting selection of window 5166 with cursor 504 in FIG. 5VV. More specifically, the all photos sub-section of a user's photo library is in focus on primary display 102 as shown by "Photos" displayed in bold and photos A-L at least partially displayed in window 5166. In FIG. 5WW, status tray 502 indicates that the photo application is running in the foreground, and app tray 514 also indicates that the photo application is running in the foreground based on the shadow behind photo application icon 515. FIG. 5WW also illustrates primary display 102 displaying cursor 504 at a location corresponding to the file menu within status tray 502. FIG. 5WW further illustrates dynamic function row 104 displaying a plurality of affordances corresponding to the all photos sub-section of the user's photo library (e.g., affordances 5168, 5170, and 5172) and the at least one system-level affordance (e.g., affordance 542) in response to detecting selection of window 5166 with cursor 504 in FIG. 5VV.

FIG. 5XX illustrates primary display 102 displaying a menu of file controls 5288 in response to detecting selection of the file menu with cursor 504 in FIG. 5WW. In FIG. 5XX, the menu of file controls 5288 is in focus on primary display 102. In FIG. 5XX, the menu of file controls 5288 includes a new album control, a new folder control, a new calendar control, an import control, an export control, a close window control, and a print control.

FIG. 5XX also illustrates dynamic function row 104 displaying a first plurality of affordances 5290 in response to detecting selection of the file menu with cursor 504 in FIG. 5WW. In FIG. 5XX, the first plurality of affordances 5290 correspond to the file controls shown in the menu of file controls 5288 displayed by primary display 102. For example, when activated (e.g., via a tap contact), affordance 5290-G (e.g., corresponding to a close window file control) causes primary display 102 to cease display of window 5166 and also causes dynamic function row 104 to cease display of the first plurality of affordances 5290. FIG. 5XX further illustrates dynamic function row 104 receiving and detecting an upward swipe gesture with contact 5292 moving from a first location 5294-A to a second location 5294-B.

FIG. 5YY illustrates primary display 102 displaying a menu of edit controls 5296 in response to detecting the upward swipe gesture in FIG. 5XX. For example, primary display 102 displays a menu of help controls in response to detecting a downward swipe on dynamic function row in FIG. 5XX. In FIG. 5YY, the menu of edit controls 5296 is in focus on primary display 102. In FIG. 5XX, the menu of edit controls 5296 includes an undo control, a redo control, a cut control, a copy control, a paste control, a select all control, a find control, a font control, and a special characters control.

FIG. 5YY also illustrates dynamic function row 104 displaying a second plurality of affordances 5298 in response to detecting the upward swipe gesture in FIG. 5XX. In FIG. 5YY, the second plurality of affordances 5298 correspond to the edit controls shown in the menu of edit controls 5296 displayed by primary display 102. For example, the user of portable computing system 100 or desktop computing system 200 is able to view the balance of the plurality of affordances 5298 (e.g., the special characters affordance 5289-I) on dynamic function row 104 by performing a left-to-right swipe gesture on dynamic function row 104.

FIG. 5ZZ illustrates dynamic function row 104 displaying a first plurality of affordances 5301 along with the persistent controls (e.g., affordances 516 and 534) in response to receiving a signal from the set of physical keys 106 of portable computing system 100 (FIGS. 1A-1B) or from the set of physical keys 106 of peripheral keyboard 206 of desktop computing system 200 (FIGS. 2A-2D) corresponding to a specified physical key (e.g., a function key) or a specified physical key combination for overriding the current affordances displayed by dynamic function row 104. In FIG. 5ZZ, dynamic function row 104 displays the first plurality of affordances 5301 (e.g., corresponding to F1-F12) and an exit affordance 5112 for ceasing to display the first plurality of affordances 5301 on dynamic function row 104. In FIG. 5ZZ, dynamic function row 104 also navigation aid 5302 indicating that the first plurality of affordances 5301 is the first of four sets of affordances. For example, the user of portable computing system 100 or desktop computing system 200 is able to reveal additional affordances within the first plurality of affordances 5301

(e.g., corresponding to F13, . . . ) by performing a left-to-right or right-to-left swipe gesture on dynamic function row 104. In some embodiments, the first plurality of affordances 5301 includes a customized symbol row set by the user of the computing system or a set of most frequently used symbols and/or special characters.

FIG. 5AAA illustrates dynamic function row 104 displaying a second plurality of affordances 5303 along with the persistent controls (e.g., affordances 516 and 534) in response to receiving a second signal from the set of physical keys 106 of portable computing system 100 (FIGS. 1A-1B) or from the set of physical keys 106 of peripheral keyboard 206 of desktop computing system 200 (FIGS. 2A-2D) corresponding to a specified physical key (e.g., a function key) or a specified physical key combination for overriding the current affordances displayed by dynamic function row 104. Alternatively, in some embodiments, dynamic function row 104 displays the second plurality of affordances 5303 in response to detecting an upward swipe gesture on dynamic function row 104 in FIG. 5ZZ. In FIG. 5AAA, dynamic function row 104 displays the second plurality of affordances 5301 (e.g., corresponding to ', 1, 2, 3, . . . ) and an exit affordance 5112 for ceasing to display the second plurality of affordances 5303 on dynamic function row 104. In FIG. 5AAA, navigation aid 5302 indicates that the second plurality of affordances 5302 is the second of four sets of affordances. For example, the user of portable computing system 100 or desktop computing system 200 is able to reveal additional affordances within the second plurality of affordances 5302 by performing a left-to-right or right-to-left swipe gesture on dynamic function row 104.

FIG. 5BBB illustrates dynamic function row 104 displaying a third plurality of affordances 5304 along with the persistent controls (e.g., affordances 516 and 534) in response to receiving a third signal from the set of physical keys 106 of portable computing system 100 (FIGS. 1A-1B) or from the set of physical keys 106 of peripheral keyboard 206 of desktop computing system 200 (FIGS. 2A-2D) corresponding to a specified physical key (e.g., a function key) or a specified physical key combination for overriding the current affordances displayed by dynamic function row 104. Alternatively, in some embodiments, dynamic function row 104 displays the third plurality of affordances 5304 in response to detecting an upward swipe gesture on dynamic function row 104 in FIG. 5AAA. In FIG. 5BBB, dynamic function row 104 displays the third plurality of affordances 5304 (e.g., corresponding to ~, !, @, #, . . . ) and an exit affordance 5112 for ceasing to display the third plurality of affordances 5304 on dynamic function row 104. In FIG. 5BBB, navigation aid 5302 indicates that the third plurality of affordances 5302 is the third of four sets of affordances. For example, the user of portable computing system 100 or desktop computing system 200 is able to reveal additional affordances within the third plurality of affordances 5304 by performing a left-to-right or right-to-left swipe gesture on dynamic function row 104.

FIG. 5CCC illustrates dynamic function row 104 displaying a fourth plurality of affordances 5305 along with the persistent controls (e.g., affordances 516 and 534) in response to receiving a fourth signal from the set of physical keys 106 of portable computing system 100 (FIGS. 1A-1B) or from the set of physical keys 106 of peripheral keyboard 206 of desktop computing system 200 (FIGS. 2A-2D) corresponding to a specified physical key (e.g., a function key) or a specified physical key combination for overriding the current affordances displayed by dynamic function row 104. Alternatively, in some embodiments, dynamic function row 104 displays the fourth plurality of affordances 5305 in response to detecting an upward swipe gesture on dynamic function row 104 in FIG. 5BBB. In FIG. 5CCC, dynamic function row 104 displays the fourth plurality of affordances 5305 (e.g., corresponding to [,], {,}, . . . ) and an exit affordance 5112 for ceasing to display the fourth plurality of affordances 5305 on dynamic function row 104. In FIG. 5CCC, navigation aid 5302 indicates that the fourth plurality of affordances 5305 is the fourth of four sets of affordances. For example, the user of portable computing system 100 or desktop computing system 200 is able to reveal additional affordances within the fourth plurality of affordances 5305 by performing a left-to-right or right-to-left swipe gesture on dynamic function row 104. FIG. 5CCC further illustrates dynamic function row 104 receiving and detecting contact 5306 (e.g., a tap contact) at a location corresponding to power control 534.

FIG. 5DDD illustrates dynamic function row 104 displaying modal alert 5308 in response to detecting selection of power control 534 in FIG. 5CCC. For example, modal alert 5308 is overlaid on the fourth plurality of functions affordance 5305. In FIG. 5DDD, modal alert 5308 prompts the user of portable computing system 100 or desktop computing system 200 to select one of a plurality of options, including: logout affordance 5310, which, when activated (e.g., via a tap contact), causes the current user of the user of portable computing system 100 or desktop computing system 200 to be logged out from portable computing system 100 or desktop computing system 200 (i.e., computing device 202, FIGS. 2A-2D); restart affordance 5312, which, when activated (e.g., via a tap contact), causes restart of portable computing system 100 or desktop computing system 200 (i.e., computing device 202, FIGS. 2A-2D); power-off affordance 5314, which, when activated (e.g., via a tap contact), causes portable computing system 100 or desktop computing system 200 (i.e., computing device 202, FIGS. 2A-2D) to power-off; and cancel affordance 5316, which, when activated (e.g., via a tap contact), causes dynamic function row 104 to cease display of modal alert 5308.

FIGS. 6A-6D are a flowchart of a method of updating a dynamic input and output device (e.g., including dynamic function row 104, FIGS. 1A-1B and 2A-2D), in accordance with some embodiments. The method 600 is performed at a computing system including a processor, a primary display, memory, and a housing at least partially containing a physical input mechanism and a touch screen display adjacent to the physical input mechanism. Some operations in method 600 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 of portable computing system 100 (FIG. 1A). Alternatively, in some embodiments, the primary display is primary display 102 (FIGS. 2A-2D) which is implemented in peripheral display device 204 (FIGS. 2A-2D). In some embodiments, the housing is body portion 120 of portable computing system 100 (FIGS. 1A-1B), which at least partially contains the touch screen display (e.g., dynamic function row 104, FIGS. 1A-1B) and the input mechanism (e.g., the set of physical keys 106, FIGS. 1A-1B). Alternatively, in some embodiments, the housing is peripheral keyboard 206 (FIGS. 2A-2B) of desktop computing system 200, which at least partially contains the touch screen display (e.g., dynamic function row 104, FIGS. 2A-2B) and the input mechanism (e.g., the set of physical keys 106, FIGS. 2A-2B). Alternatively, in some embodiments, the housing is first input mechanism 212 (FIG. 2C) of desktop computing system 200, which at least partially contains the touch screen display (e.g., dynamic function row 104, FIG. 2C) and the input mechanism (e.g., touch pad 108, FIG. 2C).

The computing system displays (602) a first user interface on the primary display, the first user interface comprising one or more user interface elements. FIG. 5B, for example, shows primary display 102 displaying a first user interface with a status tray 502 indicating that application A is currently in focus, and an application (app) tray 514 with a plurality of executable/selectable application icons, including: a mail application icon 506, a web browser application icon 508, a media player application icon 510, an application A icon 512, and a photo application icon 515. The first user interface displayed on primary display 102, in FIG. 5B, also includes a window 536 for application A (e.g., a fantasy RPG game). In FIG. 5B, for example, window 536 includes a main menu for application A with a plurality of affordances including a start new game affordance, a continue affordance, and an options affordance. FIG. 5F, for example, shows primary display 102 displaying a first user interface with window 554 for the media player application.

In some embodiments, the computing system further comprises (604): (i) a primary computing device comprising the primary display, the processor, the memory, and primary computing device communication circuitry; and (ii) a input device comprising the housing, the touch screen display, the physical input mechanism, and input device communication circuitry for communicating with the primary computing device communication circuitry, where the input device is distinct and separate from the primary computing device. In some embodiments, the computing system is not a laptop, such as portable computing system 100 (FIGS. 1A-1B), but instead the computing system is desktop computing system 200 (FIGS. 2A-2D) with a computing device 202, a peripheral display device 204 (which is optionally integrated with computing device 202), and an input device (e.g., peripheral keyboard 206, FIGS. 2A-2B) with a plurality of physical keys (e.g., the set of physical keys 106, FIGS. 2A-2B) adjacent to a touch screen display (e.g., dynamic function row 104, FIGS. 2A-2B). Alternatively, in some embodiments, the input device (e.g., first input mechanism 212, FIG. 2C) includes a touch pad or a numpad (e.g., touch pad 108, FIG. 2C) adjacent to a touch screen display (e.g., dynamic function row 104, FIG. 2C). In some embodiments, the input device is in communication with the primary computing device (e.g., computing device 202, FIGS. 2A-2D) via a wired connection (e.g., USB, PS/2, etc.) or a wireless connection (e.g., Bluetooth, Wi-Fi, etc.).

In some embodiments, the physical input mechanism comprises (606) a plurality of physical keys. In FIGS. 1A-1B, body portion 120 of portable computing system 100 at least partially contains the touch screen display (e.g., dynamic function row 104) adjacent to the set of physical keys 106.

In some embodiments, the physical input mechanism comprises (608) a touch pad. In FIGS. 1A-1B, body portion 120 of portable computing system 100 at least partially contains the touch screen display (e.g., dynamic function row 104) and touch pad 108 in addition to the set of physical keys 106.

The computing system identifies (610) an active user interface element among the one or more user interface elements that is in focus on the primary display. In some embodiments, the term "in focus" can refer to the active element of the user interface (e.g., a window associated with an application, a particular toolbar or menu associated with an application, or the operating system) that is currently in the foreground and actively running or is controllable by input received from a user of the computing system such as a key press, mouse click, voice command, gestural motion, or the like.

In some embodiments, the computing system or a component thereof (e.g., focus determining module 351, FIG. 3A) identifies a user interface element of the first user interface displayed on the primary display that is in focus. In some embodiments, the user interface element that is in focus is a window that corresponds to an application, a user interface element that corresponds to the application that is within or outside of the application's window (e.g., a field, sub-window, menu, tool, toolbar, tool set, or the like), or a portion of a desktop/operating system-related interface (e.g., a volume control, a portion of a file explorer interface or a controls/settings panel). In some embodiments, the active user interface element is highlighted on the primary display or displayed in a foreground position on the primary display to indicate that it is in focus. In some embodiments, a display characteristic of the active user interface element is changed or emphasized (e.g., colored text, bold text, thick border, and the like) to indicate that it is in focus. Alternatively and/or additionally, in some embodiments, visual and/or aural cues are provided to indicate active user interface element that is in focus (e.g., a chime is played when the focus changes, a bouncing star is displayed above the active user interface element that is in focus, or a display characteristic of the active user interface element that is in focus is different from the balance of the first user interface displayed on the primary display).

In FIG. 5B, for example, window 536 for application A is in focus on primary display 102. In FIG. 5B, status tray 502 indicates that application A is running in the foreground, and app tray 514 also indicates that application A is running in the foreground based on the shadow behind application A icon 512. In FIG. 5F, for example, the music sub-section of the user's media library shown within window 554 is in focus on primary display 102 as indicated by "Music" displayed in bold and albums A-L at least partially displayed within window 554. In contrast, in FIG. 5G, for example, the podcasts sub-section of the user's media library shown within window 554 is in focus on primary display 102 as shown by "Podcasts" displayed in bold and podcasts A-L at least partially displayed within window 554. In FIG. 5M, for example, the sub-window for composing a new email within window 580 is in focus on primary display 102 as indicated by the thick lines surrounding the sub-window. In FIG. 5R, for example, the "Family" group tab of the user's contact book within menu 5134 is in focus on primary display 102 as indicated by the thick lines surrounding the "Family" group tab of menu 5134. In FIG. 5NN, for example, the interface for tab B within window 5224 is in focus on primary display 102 as indicated by the thick lines surrounding tab B and the bold text for tab B. In FIG. 5SS, for example, the bookmarks sidebar within window 5224 is in focus on primary display 102 as indicated by the thick lines surrounding the bookmarks sidebar. In FIG. 5YY, for example, the menu of edit controls 5296 is in focus on primary display 102.

The computing system determines (612) whether the active user interface element that is in focus on the primary display is associated with an application executed by the computing system. In some embodiments, the active user interface element is associated with either an application or the operating system. In some embodiments, the computing system or a component thereof (e.g., DFR determining module 352, FIG. 3A) determines a set of affordances for display on dynamic function row 104 based on the active user interface element that is in focus on primary display 102 and also whether the active user interface element is associated with a specific application or the operating system.

In some embodiments, the application is executed (614) by the processor in the foreground of the first user interface. For example, the application is one of an email application, a word processing application, a presentation application, a photo editing application, a music application, a game application, a spreadsheet application, or the like. FIGS. 5B-5E, for example, show the first user interface displayed by primary display 102 including window 536 corresponding to application A (e.g., a fantasy RPG game) executed in the foreground by the computing system. FIGS. 5F-5I, for example, show the first user interface displayed by primary display 102 including window 554 corresponding to a media player application executed in the foreground by the computing system. FIGS. 5J-5X, for example, show the first user interface displayed by primary display 102 including window 580 corresponding to a mail application executed in the foreground by the computing system. FIGS. 5Y-5GG, for example, show the first user interface displayed by primary display 102 including window 5166 corresponding to a photos application executed in the foreground by the computing system. FIGS. 5HH-5UU, for example, show the first user interface displayed by primary display 102 including window 5224 corresponding to a web browser application executed in the foreground by the computing system.

In accordance with a determination that the active user interface element that is in focus on the primary display is associated with the application executed by the computing system, the computing system displays (616) a second user interface on the touch screen display, including: (A) a first set of one or more affordances corresponding to the application; and (B) at least one system-level affordance corresponding to at least one system-level functionality. In some embodiments, the first set of one or more affordances includes user selectable symbols/icons and/or indicators and information that may or may not be selectable. In some embodiments, the first set of one or more affordances correspond to basic controls for the application. In some embodiments, at least one system-level affordance is displayed along with the first set of one or more affordances. In one example, in FIGS. 5A-5DDD, the at least one system-level affordance includes persistent affordances 516 and 534. In another example, in FIG. 5C, the at least one system-level affordance includes affordance 542, which, when activated (e.g., with a tap contact), causes display of a plurality of system-level affordances (e.g., affordances 518, 520, 522, 524, 526, 528, 530, and 532 shown in FIG. 5A).

FIG. 5II, for example, shows dynamic function row 104 displaying a set of basic controls and indicators (e.g., affordances 5230, 5232, and 5238, and address bar 5234) for the web browser application, which is in focus on primary display 102, along with the at least one system-level affordance 542, in response to detecting selection of affordance 5226 in FIG. 5HH. In some embodiments, the first set of one or more affordances corresponds to controls associated with the active user interface element that is in focus. As such, the user of the computing system is able to select controls from the first set of one or more affordances for providing input to, and controlling the functions of, the application without shifting his/her hands away from the set of physical keys to another input device (e.g., a mouse) when such selectable controls are displayed on the primary display. This reduction in mode switching, for example, between keyboard and mouse for the user's hands and between keyboard and display for the user's eyes, provides a more intuitive user experience and a more efficient human-machine interface. FIG. 5J, for example, shows dynamic function row 104 displaying a plurality of affordances corresponding to email A (e.g., affordances 582, 584, 586, 588, 590, 592, 594, 596, and 598), which is in focus on primary display 102, along with the at least one system-level affordance 542, in response to detecting selection of mail application icon 506 with cursor 504 in FIG. 5I.

In some embodiments, the user of the computing system is able to modify or customize the affordances included in the first set of one or more affordances. In some embodiments, prior to identifying the active user interface element that is in focus on primary display 102 and displaying the first set of one or more affordances, dynamic function row 104 displays a default interface set by the user of the computing system or set in software. For example, the default interface includes one of: a plurality of function keys (e.g., F1, F2, F3, . . . , F12), a stock ticker, scrolling sports scores, scrolling weather forecasts and information, and/or the like.

In some embodiments, after displaying the first set of one or more affordances for a first predetermined period of time (e.g., 30, 60, 90, etc. seconds), dynamic function row 104 re-displays the default interface set by the user of the computing system or set in software. In some embodiments, after displaying the first set of one or more affordances for a first predetermined period of time (e.g., 30, 60, 90, etc. seconds), dynamic function row 104 turns off until a contact is detected by dynamic function row 104 or a keyboard or touch pad associated with the computing system. In some embodiments, after displaying the first set of one or more affordances for a first predetermined period of time (e.g., 30, 60, 90, etc. seconds), dynamic function row 104 turns off until connected to a power source (e.g., when dynamic function row is implemented in battery powered peripheral keyboard 206, FIGS. 2A-2B). In some embodiments, after displaying the first set of one or more affordances and not detecting user input with regard to the first set of one or more affordances for a second predetermined period of time (e.g., 30, 60, 90, etc. seconds), dynamic function row 104 re-displays the default interface set by the user of the computing system or set in software. In some embodiments, when the operating system is in focus or the active user interface element is not associated with an application running in the foreground, dynamic function row 104 re-displays the default interface set by the user of the computing system or set in software.

In some embodiments, after displaying the first set of one or more affordances for the first predetermined period of time (e.g., 30, 60, 90, etc. seconds) and when the computing system is set in a low-power mode, dynamic function row 104 displays a limited set of affordances including, for example, the time, the battery life remaining, the Wi-Fi signal strength, and/or the like. For example, the limited set of affordances are selected by the user of the computing system or set in software, and the user of computing system is able to set the computing into the low-power mode through a system settings panel.

In some embodiments, at least one of the affordances displayed on the second user interface is (618) a multi-function affordance. In some embodiments, a multi-function affordance is capable of performing two or more functions/operations in response to detecting different inputs performed at a location corresponding to the multi-function affordance. For example, persistent volume control 568, in FIG. 5J, displayed by dynamic function row 104 within the second user interface is a multi-function affordance.

In some embodiments, the computing system detects (620) a user touch input selecting the multi-function affordance. In accordance with a determination that the user touch input corresponds to a first type, the computing system performs a first function associated with the multi-function affordance. In accordance with a determination that the user touch input corresponds to a second type distinct from the first type, the computing system performs a second function associated with the multi-function affordance. For example, a first function/operation (e.g., mute a media item) is performed in response to detecting a first gesture (e.g., a tap contact) at a location corresponding to the multi-function affordance, and a second function/operation (e.g., display a volume slider or playback controls for the media item) is performed in response to detecting a second gesture (e.g., a long press gesture) at a location corresponding to the multi-function affordance. For example, the first gesture type corresponds to a touch input detected for less than a predetermined period of time (e.g., 500 ms, 1 s, etc.) with one or more contacts (e.g., a tap contact), and the second gesture type corresponds to a touch input detected for greater than or equal to the predetermined period of time (e.g., 500 ms, 1 s, etc.) with one or more contacts (e.g., a long press gesture).

FIG. 5J, for example, shows dynamic function row 104 receiving and detecting contact 599 (e.g., a long press contact) at a location corresponding to persistent volume control 568. Continuing with this example, FIG. 5K shows dynamic function row 104 displaying volume slider 5100 for adjusting the playback volume of podcast J, which was initiated in FIG. 5H, in response to detecting the long press gesture at the location corresponding to persistent volume control 568 in FIG. 5J. Alternatively, in some embodiments, dynamic function row 104 displays playback controls (e.g., pause, fast forward, rewind, next track, previous track, and the like) for controlling the playback of podcast J, which was initiated in FIG. 5H, in response to detecting the long press gesture at the location corresponding to persistent volume control 568 in FIG. 5J. FIG. 5M, for example, shows dynamic function row 104 receiving and detecting contact 5124 (e.g., a tap contact) at a location corresponding to persistent volume control 568. Continuing with this example, FIG. 5N shows dynamic function row 104 displaying persistent volume control 568 indicating that podcast J is muted in response to detecting the tap contact at the location corresponding to persistent volume control 568 in FIG. 5M.

In some embodiments, the least one system-level affordance is configured (622) upon selection to cause display of a plurality of system-level affordances corresponding to system-level functionalities on the touch screen display. In some embodiments, the at least one system-level affordance enables access to a plurality of system-level controls/affordances such as volume and brightness controls, and other system-level functionalities. For example, in FIG. 5D, dynamic function row 104 displays a second set of affordances and/or indicators (e.g., control set B) corresponding to application A and at least one system-level affordance (e.g., affordance 542). In FIG. 5C, dynamic function row 104 also detects contact 552 (e.g., a tap contact) at a location corresponding to affordance 542. Continuing with this example, FIG. 5E shows dynamic function row 104 the displaying persistent controls (i.e., affordances 516 and 534), the plurality of system-level affordances (i.e., affordances 518, 520, 522, 524, 526, 528, 530, and 532), and affordance 538 corresponding to application A in response to detecting selection of affordance 542 in FIG. 5D.

In some embodiments, the at least one system-level affordance corresponds to (624) one of a power control or escape control. In some embodiments, the at least one system-level affordance includes persistent controls that are displayed on dynamic control row 104 regardless of the focus of primary display 102 (e.g., escape affordance 516 and power control 534, FIGS. 5A-5DDD). When activated (e.g., via a tap contact), escape affordance 516, causes performance of a corresponding function (e.g., exiting an application which is currently in focus on primary display 102). When activated (e.g., via a tap contact), power control 534 causes display of a modal alert (e.g., modal alert 5308, FIG. 5DDD) on dynamic function row 104 for logging out, restarting, or powering-off the computing system.

In some embodiments, the computing system detects (626) a user touch input selecting one of the first set of affordances, and, in response to detecting the user touch input, the computing system: displays a different set of affordances corresponding to functionalities of the application; and maintains display of the at least one system-level affordance. In some embodiments, the first set of one or more affordances corresponding to the application includes a single affordance for accessing a set of tools or functions associated with the application. FIG. 5B, for example, shows dynamic function row 104 displaying affordance 538 corresponding to application A, which is in focus on primary display 102, in addition to the persistent controls (i.e., affordances 516 and 534) and the plurality of system-level affordances (i.e., affordances 518, 520, 522, 524, 526, 528, 530, and 532) in response to detecting selection of application A icon 512 with cursor 504 in FIG. 5A. Continuing with the example, FIG. 5C shows dynamic function row 104 displaying a first set of affordances and/or indicators (e.g., control set A) corresponding to application A in response to detecting selection of affordance 538 in FIG. 5B.

In some embodiments, the computing system detects (628) a subsequent user touch input selecting the at least one system-level affordance, and, in response to detecting the subsequent user touch input, the computing system displays a plurality of system-level affordances corresponding to system-level functionalities and at least one application-level affordance corresponding to the application. FIG. 5D, for example, shows dynamic function row 104 displaying a second set of affordances and/or indicators (e.g., control set B) corresponding to application A, which is in focus on primary display 102, and the at least one system-level affordance (e.g., affordance 542). Continuing with this example, in response to detecting selection of affordance 542 in FIG. 5D, FIG. 5E shows dynamic function row 104 displaying persistent controls (i.e., affordances 516 and 534), the plurality of system-level affordances (i.e., affordances 518, 520, 522, 524, 526, 528, 530, and 532), and affordance 538 corresponding to application A.

In some embodiments, after displaying the second user interface on the touch screen display, the computing system identifies (630) a second active user interface element among the one or more user interface elements that is in focus on the primary display and determines whether the second active user interface element corresponds to a different application executed by the computing device. In accordance with a determination that the second active user interface element corresponds to the different application, the computing system displays a fourth user interface on the touch screen display, including: (D) a third set of one or more affordances corresponding to the different application; and (E) the at least one system-level affordance corresponding to the at least one system-level functionality. FIG. 5F, for example, shows dynamic function row 104 displaying a plurality of album affordances 558 (e.g., album affordances 558-A to 558-G) corresponding to the sub-section of the user's media library that is in focus on primary display 102 and the at least one system-level affordance (e.g., affordance 542). FIG. 5F also shows primary display 102 displaying cursor 504 at a location corresponding to the podcasts sub-section of the user's media library. Continuing with the example, in response to detecting selection of the podcasts sub-section with cursor 504 in FIG. 5F, FIG. 5G shows dynamic function row 104 displaying a first plurality of podcast affordances 560 (e.g., podcast affordances 560-A to 560-G) corresponding to the podcasts sub-section of the user's media library that is now in focus on primary display 102 and the at least one system-level affordance (e.g., affordance 542).

In some embodiments, the computing system provides audible cues indicating the different user interface element that is in focus. In some embodiments, primary display 102 displays a visual cue indicating the different user interface element that is in focus. For example, with respect to FIG. 5G, primary display 102 displays a star indicator (not shown) above the "podcasts" text in the left-hand column within window 554, makes the "podcasts" text bold in the left-hand column within window 554, flashes the "podcasts" text in the left-hand column within window 554 in a different color or the same color, or otherwise indicates that the podcasts sub-section is now in focus on primary display 102. In some embodiments, dynamic function row 104 displays a transition animation whereby the plurality of album affordances 558 (shown in FIG. 5F) are rolled over or slid out of the way to so as to display the first plurality of podcast affordances 560 (shown in FIG. 5G).

In some embodiments, after identifying that the second active user interface element, the computing system determines (632) whether a media (e.g., audio or video) item is being played by the computing system, where the media item is not associated with the different application, and, in accordance with a determination that the media item is being played by the computing system, the computing system displays at least one persistent affordance on the touch screen display for controlling the media item (e.g., volume and/or playback controls). In some embodiments, the at least one affordance is a persistent control that enables the user of the computing system to mute/unmute the media item from the touch screen display even if the focus changes or the media is muted and/or being played in the background. Figure SI, for example, shows dynamic function row 104 displaying persistent volume control 568 in response to detecting selection of podcast affordance 560-J in FIG. 5H, which initiates playback of podcast J. FIG. 5L, for example, shows dynamic function row 104 displaying persistent volume control 568 even while email A of the application is in focus on primary display 102.

In some embodiments, the at least one persistent affordance displays (634) feedback that corresponds to the media item (e.g., an equalizer (EQ) bar, a run-time indicator, or the like) FIG. 5I, for example, shows dynamic function row 104 displaying persistent volume control 568 with an equalizer bar corresponding to playback of podcast J. Similarly, FIG. 5N, for example, shows dynamic function row 104 displaying persistent volume control 568 with the equalizer bar even while playback of podcast J is muted. In some embodiments, dynamic function row 104 includes an affordance that is continuously updated based on a media item being played or some other real-time information such as a weather indicator, a microphone capture indicator, or a Wi-Fi signal strength indicator.

In some embodiments, the computing device detects (636) a user input corresponding to an override key, and, in response to detecting the user input, the computing system: ceases to display at least the first set of one or more affordances of the second user interface on the touch screen display; and displays a first set of default function keys. In some embodiments, the user input corresponding to the override key is detected in response to receiving a signal from the input mechanism (e.g., actuation of a specified physical key such as a function key) or from the dynamic function row (e.g., selection of a virtual key such as "escape" affordance 516). For example, the user actuates an "fn" key to dismiss current affordances displayed by dynamic function row 104 and to display the default F1, F2, F3, ..., F12 row. FIG. 5ZZ, for example, shows dynamic function row 104 displaying interface 5300 with affordances 5301 (e.g., corresponding to F1, F2, F3, ..., F12) along with the persistent controls (e.g., affordances 516 and 534) in response to receiving a signal from the set of physical keys 106 of portable computing system 100 (FIGS. 1A-1B) or from the set of physical keys 106 of peripheral keyboard 206 of desktop computing system 200 (FIGS. 2A-2D) corresponding to a specified physical key (e.g., a function key) for overriding dynamic function row 104.

In some embodiments, in response to detecting the user input corresponding to the override key, dynamic function row 104 displays a default interface set by the user of the computing system or set in software. For example, the default interface includes one of: a plurality of function keys (e.g., F1, F2, F3, ..., F12), a stock ticker, scrolling sports scores, scrolling weather forecasts, or the like.

In some embodiments, after displaying the first set of default function keys, the computing system detects (638) a gesture in a direction substantially parallel to a major dimension of on the touch screen display, and in response to detecting the swipe gesture, displays a second set of default function keys with at least one distinct function key (e.g., a previously undisplayed function key). For example, with respect to FIG. 5ZZ, the user of the computing system is able to reveal additional function keys (e.g., F13, F14, F15, ...) within interface 5300 on dynamic function row 104 by performing a substantially horizontal swipe gesture on dynamic function row 104 (e.g., one of a right-to-left or left-to-right swipe gesture).

In some embodiments, in accordance with a determination that the active user interface element is not associated with the application executed by the computing system, the computing system displays (640) a third user interface on the touch screen display, including: (C) a second set of one or more affordances corresponding to operating system controls of the computing system, where the second set of one or more affordances are distinct from the first set of one or more affordances. In FIG. 5A, for example, the system/operating system is currently in focus on primary display 102. For example, the active user interface element that is in focus on the primary display is associated with the operating system such as volume controls, system controls (e.g., brightness or volume controls), system settings, a start menu, file explorer, system search, or the like. FIG. 5A shows dynamic function row 104 displaying a plurality of system-level affordances (e.g., affordances 518, 520, 522, 524, 526, 528, 530, and 532) along with the persistent affordances (e.g., affordances 516 and 534).

In some embodiments, the second set of one or more affordances is (642) an expanded set of operating system controls that includes (B) the at least one system-level affordance corresponding to the at least one system-level functionality. FIG. 5T, for example, shows dynamic function row 104 displaying a plurality of system-level affordances (e.g., the expanded set of operating system controls, including affordances 518, 520, 522, 524, 526, 528, 530, and 532) along with the persistent affordances (e.g., affordances 516 and 534) in response to detecting selection of affordance 542 in FIG. 5S.

It should be understood that the particular order in which the operations in FIGS. 6A-6D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, and 1000) are also applicable in an analogous manner to method 600 described above with respect to FIGS. 6A-6D.

FIGS. 7A-7C are a flowchart of a method of updating a dynamic input and output device (e.g., including dynamic function row 104, FIGS. 1A-1B and 2A-2D), in accordance with some embodiments. The method 700 is performed at a computing system including a processor, a primary display, a memory, and a housing at least partially containing a physical input mechanism and a touch screen display adjacent to the physical input mechanism. Some operations in method 700 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 of portable computing system 100 (FIG. 1A). Alternatively, in some embodiments, the primary display is primary display 102 (FIGS. 2A-2D) which is implemented in peripheral display device 204 (FIGS. 2A-2D). In some embodiments, the housing is body portion 120 of portable computing system 100 (FIGS. 1A-1B), which at least partially contains the touch screen display (e.g., dynamic function row 104, FIGS. 1A-1B) and the input mechanism (e.g., the set of physical keys 106, FIGS. 1A-1B). Alternatively, in some embodiments, the housing is peripheral keyboard 206 (FIGS. 2A-2B) of desktop computing system 200, which at least partially contains the touch screen display (e.g., dynamic function row 104, FIGS. 2A-2B) and the input mechanism (e.g., the set of physical keys 106, FIGS. 2A-2B). Alternatively, in some embodiments, the housing is first input mechanism 212 (FIG. 2C) of desktop computing system 200, which at least partially contains the touch screen display (e.g., dynamic function row 104, FIG. 2C) and the input mechanism (e.g., touch pad 108, FIG. 2C).

The computing system displays (702) a first user interface for an application executed by the computing system on the primary display. FIG. 5P, for example, shows primary display 102 displaying a first user interface with menu 5134 corresponding to the user's contact book. In FIG. 5P, menu 5134 includes a list of a plurality of contacts corresponding the "All Contacts" group of the user's contact book (e.g., a list of pre-existing or automatically populated contacts), which is in focus on primary display 102 as indicated by the thick lines surrounding the "All Contacts" group in menu 5134. FIG. 5XX, for example, shows primary display 102 displaying a first user interface with a menu of file controls 5288 overlaid on window 5166, where the menu of file controls 5288 is in focus on primary display 102.

The computing system displays (704) a second user interface on the touch screen display, the second user interface comprising a first set of one or more affordances corresponding to the application, where the first set of one or more affordances corresponds to a first portion of the application. In some embodiments, the first set of one or more affordances associated with a top menu or a file menu (i.e., the first portion or sub-section) of the application. FIG. 5P, for example, shows dynamic function row 104 displaying a second user interface with a first plurality of contact affordances 5136-A to 5136-F (i.e., the first set of affordances) corresponding to the "All Contacts" group of the user's contact book that is in focus on primary display 102. FIG. 5XX, for example, shows dynamic function row 104 displaying a second user interface with a first plurality of affordances 5290 (i.e., the first set of affordances) that correspond to the menu of file controls 5288 that is in focus on primary display 102.

The computing system detects (706) a swipe gesture on the touch screen display. In a first example, FIG. 5P shows dynamic function row 104 detecting a right-to-left swipe gesture with contact 5138 moving from a first location 5140-A to a second location 5140-B. In another example, FIG. 5XX shows dynamic function row 104 detecting an upward swipe gesture with contact 5292 moving from a first location 5294-A to a second location 5294-B.

In accordance with a determination that the swipe gesture was performed in a first direction (e.g., horizontal), the computing system displays (708) a second set of one or more affordances corresponding to the application on the touch screen display, where at least one affordance in the second set of one or more affordances is distinct from the first set of one or more affordances, and where the second set of one or more affordances also corresponds to the first portion of the application. In some embodiments, in response to detecting a swipe gesture in the first direction, the dynamic function row displays different a second set of affordances corresponding to the first portion of the application (e.g., a toolset or menu) with at least one different affordance (e.g., a tool or item), as compared to the first set of affordances that also correspond to the first portion of the application. For example, in response to detecting the right-to-left swipe gesture in FIG. 5P, FIG. 5Q shows dynamic function row 104 displaying a second plurality of contact affordances 5136-E to 5136-J (i.e., the second set of affordances) corresponding to the "All Contacts" group of the user's contact book.

In some embodiments, the first direction is (710) substantially parallel to a major dimension of the touch screen display. For example, with reference to portable computing system 100 (FIGS. 1A-1B), the first direction is substantially perpendicular (e.g., vertical) relative to the major dimension of dynamic function row 104 and/or the set of physical keys 106.

In some embodiments, the first direction is (712) substantially perpendicular to a major dimension of the touch screen display. For example, with reference to portable computing system 100 (FIGS. 1A-1B), the first direction is substantially parallel (e.g., horizontal) relative to the major dimension of dynamic function row 104 and/or the set of physical keys 106.

In accordance with a determination that the swipe gesture was performed in a second direction substantially perpendicular to the first direction (e.g., vertical), the computing system displays (714) a third set of one or more affordances corresponding to the application on the touch screen display, where the third set of one or more affordances is distinct from the second set of one or more affordances, and where the third set of one or more affordances corresponds to a second portion of the application that is distinct from the first portion of the application. In some embodiments, in response to detecting a swipe gesture in the second direction, the dynamic function row displays different a third set of affordances corresponding to the second portion of the application (e.g., a different toolset or menu), as compared to the first portion of the application associated with the first set of affordances. For example, in response to detecting the upward swipe gesture in FIG. 5XX, FIG. 5YY shows dynamic function row 104 displaying a second plurality of affordances 5298 (i.e., the third set of affordances) that correspond to the menu of edit controls 5296 that is in focus on primary display 102. In some embodiments, dynamic function row 104 displays an transition animation whereby the first plurality of affordances 5290 (shown in FIG. 5XX) are rolled over or slid out of the way to so as to display the second plurality of podcast affordances 598 (shown in FIG. 5YY).

As such, in one embodiment, a horizontal swipe detected on the dynamic function row 104 moves or scrubs within a group or category and a vertical swipe changes the category/filter. As a result, the user of the computing system is able to move easily navigate tools and menus without moving his/her hands away from the keyboard to a mouse. This also enables more efficient display of information and allows for a more efficient man-machine interaction.

In some embodiments, the second portion is displayed (716) on the primary display in a compact view within the first user interface prior to detecting the swipe gesture, and the system displays the second portion on the primary display in an expanded view within the first user interface in accordance with the determination that the swipe gesture was performed in the second direction substantially perpendicular to the first direction. For example, in FIG. 5XX, the first portion of status tray 502 for the photos application (e.g., the menu of file controls 5288) is displayed by primary display 102 in an expanded mode, and the second portion of status tray 502 for the photos application (e.g., the menu of edit controls 5296) is displayed by primary display 102 in a compact mode. Continuing with this example, in response to detecting the swipe gesture performed in the second direction in FIG. 5XX (e.g., the upward swipe gesture with contact 5292), the second portion of status tray 502 for the photos application is displayed by primary display 102 in the expanded mode in FIG. 5YY, and the first portion of status tray 502 for the photos application is displayed by primary display 102 in the compact mode.

In another example, in FIG. 5Q, the first portion of menu 5134 of the mail application (e.g., the "All Contacts" group of the user's contact book within menu 5134) is displayed by primary display 102 in an expanded mode, and the second portion of menu 5134 of the mail application (e.g., the "Family" group of the user's contact book within menu 5134) is displayed by primary display 102 in a compact mode. Continuing with this example, in response to detecting the swipe gesture performed in the second direction in FIG. 5Q (e.g., the upward swipe gesture with contact 5142), the second portion of menu 5134 of the mail application is displayed by primary display 102 in the expanded mode in FIG. 5R, and the first portion of menu 5134 of the mail application is displayed by primary display 102 in the compact mode.

In some embodiments, the first portion is (718) one of a menu, tab, folder, tool set, or toolbar of the application, and the second portion is one of a menu, tab, folder, tool set, or toolbar of the application. In FIGS. 5P-5R, for example, the first portion of menu 5134 of the mail application corresponds to the "All Contacts" group of the user's contact book within menu 5134, and the second portion of menu 5134 of the mail application corresponds to the "Family" group of the user's contact book within menu 5134. In FIGS. 5XX-5YY, for example, the first portion of status tray 502 for the photos application corresponds to the menu of file controls 5288, and the second portion of status tray 502 for the photos application corresponds to the menu of edit controls 5296.

In some embodiments, after displaying the third set of one or more affordances on the touch screen display, the computing system (720): detects a user input selecting the first portion on the first user interface; and, in response to detecting the user input: ceases to display the third set of one or more affordances on the touch screen display, where the third set of one or more affordances corresponds to the second portion of the application; and displays the second set of one or more affordances, where the second set of one or more affordances corresponds to the first portion of the application. For example, with respect to FIG. 5YY, after displaying the second plurality of affordances 5298 (i.e., the third set of affordances) on dynamic function row 104 that correspond to the menu of edit controls 5296 that is in focus on primary display 102, primary display 102 displays cursor 504 at a location corresponding to the file menu within status tray 502 (not shown). Continuing with example, in response to detecting selection of the file menu within status tray 502 with cursor 504, dynamic function row 104 ceases to display the second plurality of affordances 5298 (i.e., the third set of affordances) and, instead, displays the menu of file controls 5288 (i.e., the second set of affordances).

In some embodiments, the second set of one or more affordances and the third set of one or more affordances includes (722) at least one system-level affordance corresponding to at least one system-level functionality. For example, in FIG. 5Q, dynamic function row 104 displays the second plurality of contact affordances 5136-E to 5136-J (i.e., the second set of affordances) corresponding to the "All Contacts" group of the user's contact book along with the at least one system-level affordance (e.g., affordance 542). In FIG. 5YY, for example, dynamic function row 104 displays a second plurality of affordances 5298 (i.e., the third set of affordances) that correspond to the menu of edit controls 5296 that is in focus on primary display 102 along with the at least one system-level affordance (e.g., affordance 542).

In some embodiments, the first user interface for the application executed by the computing system is displayed (724) on the primary display in a full-screen mode, and the first set of one or more affordances displayed on the touch screen display includes controls corresponding to the full-screen mode. FIG. 5EE, for example, shows primary display 102 displaying photo B in full-screen mode within window 5200, and also shows dynamic function row 104 displaying a set of controls 5209 for straightening the orientation of photo B within window 5200. For example, in response to detecting a swipe gesture in the second direction (e.g., vertical relative to the major dimension of dynamic function row 104), dynamic function row 104 displays a set of controls corresponding to crop tool 5210 (e.g., if the swipe gesture is an upward swipe gesture) or a set of controls corresponding to red-eye reduction tool 5206 (e.g., if the swipe gesture is a downward swipe gesture). Continuing with this example, in response to detecting a swipe gesture in the first direction (e.g., horizontal relative to the major dimension of dynamic function row 104), dynamic function row 104 adjusts the orientation of photo B within window 5200.

In another example, with respect to FIG. 5EE, in response to detecting a swipe gesture in the second direction (e.g., vertical relative to the major dimension of dynamic function row 104), dynamic function row 104 displays a set of controls associated with information affordance 5178 (e.g., if the swipe gesture is an upward swipe gesture) or a set of controls associated with photo adding affordance 5182 (e.g., if the swipe gesture is a downward swipe gesture). Continuing with this example, in response to detecting a swipe gesture in the first direction (e.g., horizontal relative to the major dimension of dynamic function row 104), dynamic function row 104 displays a set of controls corresponding to crop tool 5210 (e.g., if the swipe gesture is an right-to-left swipe gesture) or a set of controls corresponding to red-eye reduction tool 5206 (e.g., if the swipe gesture is a left-to-right swipe gesture).

It should be understood that the particular order in which the operations in FIGS. 7A-7C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, and 1000) are also applicable in an analogous manner to method 700 described above with respect to FIGS. 7A-7C.

FIGS. 8A-8B are a flowchart of a method of maintaining functionality of an application while in full-screen mode, in accordance with some embodiments. The method 800 is performed at a computing system including a processor, a primary display, memory, and a housing at least partially containing a physical input mechanism and a touch screen display adjacent to the physical input mechanism. Some operations in method 800 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 of portable computing system 100 (FIG. 1A). Alternatively, in some embodiments, the primary display is primary display 102 (FIGS. 2A-2D) which is implemented in peripheral display device 204 (FIGS. 2A-2D). In some embodiments, the housing is body portion 120 of portable computing system 100 (FIGS. 1A-1B), which at least partially contains the touch screen display (e.g., dynamic function row 104, FIGS. 1A-1B) and the input mechanism (e.g., the set of physical keys 106, FIGS. 1A-1B). Alternatively, in some embodiments, the housing is peripheral keyboard 206 (FIGS. 2A-2B) of desktop computing system 200, which at least partially contains the touch screen display (e.g., dynamic function row 104, FIGS. 2A-2B) and the input mechanism (e.g., the set of physical keys 106, FIGS. 2A-2B). Alternatively, in some embodiments, the housing is first input mechanism 212 (FIG. 2C) of desktop computing system 200, which at least partially contains the touch screen display (e.g., dynamic function row 104, FIG. 2C) and the input mechanism (e.g., touch pad 108, FIG. 2C).

The computing system displays (802), on the primary display in a normal mode, a first user interface for the application executed by the computing system, the first user interface comprising at least a first set of one or more affordances associated with an application. FIG. 5Z, for example, shows primary display 102 displaying a first user interface with window 5166 for the photo application in a normal display mode. In FIG. 5Z, selected photo B within window 5166 is in focus on primary display 102, and window 5166 includes selectable affordances (i.e., the first set of affordances) for performing functions/operations with selected photo B: search, zoom, slideshow, share, and settings.

The computing system detects (804) a user input for displaying at least a portion of the first user interface for the application in a full-screen mode on the primary display. For example, the detected user input corresponds to a selection of a full-screen view affordance or a slideshow affordance displayed on primary display 102 or dynamic function row 104.

In some embodiments, the user input for displaying at least the portion of the first user interface for the application in full-screen mode on the primary display is (806) at least one of a touch input detected on the touch screen display and a control selected within the first user interface on the primary display. In a first example, FIG. 5Z shows primary display 102 displaying cursor 504 at a location corresponding to a slideshow affordance. In a second example, FIG. 5BB shows dynamic function row 104 receiving and detecting contact 5196 (e.g., a tap contact) at a location corresponding to full-screen affordance 5196.

In response to detecting the user input, the computing system (808): ceases to display the first set of one or more affordances associated with the application in the first user interface on the primary display; displays, on the primary display in the full-screen mode, the portion of the first user interface for the application; and automatically, without human intervention, displays, on the touch screen display, a second set of one or more affordances for controlling the application, where the second set of one or more affordances correspond to the first set of one or more affordances. Continuing with the first example above, FIG. 5AA shows primary display 102 displaying a slideshow of photos from the all photos sub-section of the user's photo library in window 5188 in response to detecting selection of slideshow affordance with cursor 504 in FIG. 5Z. FIG. 5AA also shows dynamic function row 104 displaying thumbnail images 5192-Y, 5192-Z, 5192-A, 5192-B, 5192-C, 5192-D, and 5192-E (i.e., the second set of affordances) in response to detecting selection of slideshow affordance with cursor 504 in FIG. 5Z. Thumbnail images 5192-Y, 5192-Z, 5192-A, 5192-B, 5192-C, 5192-D, and 5192-E correspond to the sequence of photos for the slideshow that are associated with the all photos sub-section of the user's photo library. In FIG. 5AA, affordance 5192-B corresponding to photo B is prominently displayed by dynamic function row 104 (e.g., with bold text and a thick border) to indicate that photo B is currently in focus on primary display 102.

Continuing with the second example above, FIG. 5CC shows primary display 102 displaying photo B in full-screen mode within window 5200 in response to detecting selection of full-screen affordance 5196 in FIG. 5BB. FIG. 5DD also shows dynamic function row 104 displaying a set of editing tools 5205 (i.e., the second set of affordances) in response to detecting selection of editing affordance 5180 in FIG. 5CC.

In another example, when the web browser application or a portion of the user interface that corresponds to the web browser application is in focus on primary display 102 and the computing system detects a user input to enter full-screen mode, primary display 102 displays a currently active tab in full-screen mode, and dynamic function row 104 displays thumbnail images corresponds to tabs open within the web browser application along with the at least one system-level affordance. For example, the user of the computing system is able to display a respective tab on primary display 102 in full-screen mode by selecting a thumbnail corresponding to the respective tab on dynamic function row 104.

In some embodiments, the second set of one or more affordances is (810) the first set of one or more affordances. For example, the second set of affordances includes at least a portion of the first set of affordances associated with the application. In another example, the second set of affordances includes the first set of affordances associated with the application. In another example, the second set of affordances is the same as the first set of affordances associated with the application. For example, the second set of affordances includes controls associated with the application executed by the computing system such as photo editing controls, gaming controls, slideshow controls and previews, currently opened web page tabs for a web browser, etc.

In some embodiments, the second set of one or more affordances includes (812) controls corresponding to the full-screen mode. FIG. 5AA, for example, shows dynamic function row 104 displaying thumbnail images 5192-Y, 5192-Z, 5192-A, 5192-B, 5192-C, 5192-D, and 5192-E (i.e., the second set of affordances) corresponding to the sequence of photos for the slideshow that are associated with the all photos sub-section of the user's photo library. For example, the user of the computing system is able to skip ahead to a specific photo or skip back to a specific photo by selecting one of the affordances 5192. Furthermore, for example, the user of the computing system is able to browse ahead by performing a right-to-left swipe gesture on dynamic function row 104 or browse behind in the sequence of photos by performing a left-to-right swipe gesture on dynamic function row 104. Additionally, in FIG. 5AA, dynamic function row 104 displays pause affordance 5190, which, when activated (e.g., via a tap contact), causes the slideshow to be paused and also causes primary display 102 to exit the full-screen mode.

In some embodiments, the second set of one or more affordances includes (814) at least one system-level affordance corresponding to at least one system-level functionality. FIG. 5AA, for example, shows dynamic function row 104 displaying thumbnail images 5192 and pause affordance 5190 along with the at least one system-level affordance (e.g., affordance 542) and the persistent controls (e.g., affordances 516 and 534).

In some embodiments, the computing system detects (816) a user touch input selecting one of the second set of affordances displayed on the touch screen display, and, in response to detecting the user touch input, the computing system changes the portion of the first user interface for the application being displayed in the full-screen mode on the primary display according to the selected one of the second set of affordances. In FIG. 5EE, for example, the user of the computing system is able to adjust the orientation of photo B within window 5200 displayed by primary display 102 by performing a left-to-right swipe/drag gesture or a right-to-left swipe/drag gesture at a location originating on slider 5210 or within the set of controls 5209.

In some embodiments, after displaying the portion of the first user interface for the application in the full-screen mode on the primary display, the computing system (818): detects a subsequent user input for exiting the full-screen mode; and, in response to detecting the subsequent user input: displays, on the primary display in the normal mode, the first user interface for the application executed by the computing system, the first user interface comprising the first set of one or more affordances associated with the application; and maintains display of at least a subset of the second set of one or more affordances for controlling the application on the touch screen display, where the second set of one or more affordances correspond to the first set of one or more affordances. In one example, FIG. 5AA shows dynamic function row 104 receiving and detecting contact 5194 (e.g., a tap contact) at a location corresponding to pause affordance 5190. Continuing with this example, primary display 102 exits the full-screen mode, and FIG. 5BB shows primary display 102 displaying photo B in an expanded view within window 5166 in response to detecting selection of pause affordance 5190 in FIG. 5AA. In another example, FIG. 5EE shows dynamic function row 104 receiving and detecting contact 5216 (e.g., a tap contact) at a location corresponding to escape affordance 516. Continuing with this example, primary display 102 exits the full-screen mode, and FIG. 5FF shows primary display 102 displaying photo B in the expanded view within window 5166 in response to detecting selection of escape affordance 516 in FIG. 5EE. Continuing with this example, FIG. 5FF also shows dynamic function row 104 maintaining display of at least a subset of the second set of affordances displayed FIG. 5EE.

It should be understood that the particular order in which the operations in FIGS. 8A-8B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, and 1000) are also applicable in an analogous manner to method 800 described above with respect to FIGS. 8A-8B.

FIGS. 9A-9B are a flowchart of a method of displaying notifications on a touch screen display, in accordance with some embodiments. The method 900 is performed at a computing system including a processor, a primary display, memory, and a housing at least partially containing a physical input mechanism and a touch screen display adjacent to the physical input mechanism. Some operations in method 900 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 of portable computing system 100 (FIG. 1A). Alternatively, in some embodiments, the primary display is primary display 102 (FIGS. 2A-2D) which is implemented in peripheral display device 204 (FIGS. 2A-2D). In some embodiments, the housing is body portion 120 of portable computing system 100 (FIGS. 1A-1B), which at least partially contains the touch screen display (e.g., dynamic function row 104, FIGS. 1A-1B) and the input mechanism (e.g., the set of physical keys 106, FIGS. 1A-1B). Alternatively, in some embodiments, the housing is peripheral keyboard 206 (FIGS. 2A-2B) of desktop computing system 200, which at least partially contains the touch screen display (e.g., dynamic function row 104, FIGS. 2A-2B) and the input mechanism (e.g., the set of physical keys 106, FIGS. 2A-2B). Alternatively, in some embodiments, the housing is first input mechanism 212 (FIG. 2C) of desktop computing system 200, which at least partially contains the touch screen display (e.g., dynamic function row 104, FIG. 2C) and the input mechanism (e.g., touch pad 108, FIG. 2C).

The computing system displays (902), on the primary display, a first user interface for an application executed by the computing system. FIG. 5TT, for example, shows primary display 102 displaying a first user interface with an interface for tab B (e.g., corresponding to www.website_B.com/home) along with a bookmarks sidebar within window 5224. In FIG. 5TT, the bookmarks sidebar is in focus on primary display 102 as indicated by the thick lines surrounding the bookmarks sidebar.

The computing system displays (904), on the touch screen display, a second user interface, the second user interface comprising a set of one or more affordances corresponding to the application. Continuing with the example above, FIG. 5TT shows dynamic function row 104 displaying a second user interface with a set of bookmark affordances 5278 corresponding to all pre-existing bookmarks as a result of the bookmarks sidebar being in focus on primary display 102.

In some embodiments, prior to detecting the notification, the computing system detects (906) a user input selecting a notification setting so as to display notifications on the touch screen display and to not display notifications on the primary display. In some embodiments, the user of the computing system is able to specify within a settings panel whether received notifications are to be displayed on one or more of primary display 102 and dynamic function row 104. In some embodiments, the computing system displays received notifications on dynamic function row 104 but not on primary display 102 by default.

The computing system detects (908) a notification. In some embodiments, the notification is associated with the application (e.g., the web browser application in FIG. 5TT). In some embodiments, the notification is associated with the application that is currently being executed in the foreground or with a background application. For example, the notification is one of: a modal alert or real-time notification such as an alert associated with a newly received email, instant message, or SMS; a notification associated with a newly detected occurrence within an application such as a post or response within a social media application; a model alert associated with an application executed by the computing system such as a save/exit dialogue box or other prompt; or the like.

In response to detecting the notification, the computing system concurrently displays (910), in the second user interface, the set of one or more affordances corresponding to the application and at least a portion of the detected notification on the touch screen display, where the detected notification is not displayed on the primary display. For example, in some embodiments, based on the notification setting discussed in operation 906, at least a portion of the detected notification is overlaid on the second user interface displayed on dynamic function row 104. Additionally and/or alternatively, in some embodiments, the notification is overlaid on the first user interface displayed by primary display 102. As such, the user of the computing system is able to view and respond to notifications without shifting his/her hands away from the set of physical keys to another input device (e.g., a mouse) when such selectable controls are displayed on the primary display. This reduction in mode switching, for example, between keyboard and mouse for the user's hands and between keyboard and display for the user's eyes, provides for a more intuitive user experience and a more efficient human-machine interface.

For example, FIG. 5V shows primary display 102 and dynamic function row 104 displaying modal alert 5156 in response to detecting selection of the exit affordance with cursor 504 in FIG. 5U. In FIG. 5V, modal alert 5156 prompts the user to save the draft email prior to closing window 580 and includes a "Save" affordance 5158, a "Don't Save" affordance 5160, and a "Cancel" affordance 5162. In another example, FIG. 5X shows primary display 102 and dynamic function row 104 displaying application selection window 5164 in response to receiving a signal corresponding to a specified physical key combination (e.g., alt+tab) from the set of physical keys 106 of portable computing system 100 (FIGS. 1A-1B) or from the set of physical keys 106 of peripheral keyboard 206 of desktop computing system 200 (FIGS. 2A-2D). In FIG. 5X, application selection window 5164 enables the user of the computing system to toggle between currently running applications which may be in the background.

In yet another example, FIG. 5FF shows dynamic function row 104 displaying notification 5218 overlaid on affordances 5178, 5180, 5182, and 5184 in response to reception of notification 5218 by the computing system. In FIG. 5FF, notification 5218 corresponds to an SMS, instant message, or the like sent by Suzie S. to the user of the computing system, where the notification's content inquiries "Movies tonight?" In yet another example, FIG. 5KK shows primary display 102 and dynamic function row 104 displaying modal alert 5240 in response to detecting selection of the purchase affordance with cursor 504 in FIG. 5JJ. In FIG. 5KK, modal alert 5240 displayed on dynamic function row 104 prompts the user of the computing system to provide their fingerprint in fingerprint region 5244 of dynamic function row 104 and also includes cancel affordance 5242, which, when activated (e.g., via a tap contact) causes cancelation of the purchase.

In a yet another example, FIG. 5OO shows primary display 102 displaying notification 5264 overlaid on window 5264 in response to reception of notification 5264 by the computing system. In FIG. 5OO, notification 5264 corresponds to an SMS, instant message, or the like sent by MAS to the user of the computing system, where the notification's content inquiries "Landed yet?" In yet another example, FIG. 5UU shows dynamic function row 104 displaying modal alert 5280 overlaid on the set of bookmark affordances 5278 in response to detecting selection of the exit affordance with cursor 504 in FIG. 5TT. In FIG. 5UU, modal alert 5280 prompts the user of the computing system to confirm that they intend to close all open tabs within the web browser application. In yet another example, FIG. 5AAA shows dynamic function row 104 displaying modal alert 5308 in response to detecting selection of power control 534 in FIG. 5CCC. In FIG. 5DDD, modal alert 5308 prompts the user of the computing system to select a logout/power-off option from one of logout affordance 5310, restart affordance 5312, power-off affordance 5314, and cancel affordance 5316.

In some embodiments, the portion of the notification displayed on the touch screen display prompts (912) a user of the computing system to select one of a plurality of options for responding to the detected notification. For example, modal alert 5156 displayed by primary display 102 and dynamic function row 104, in FIG. 5V, prompts the user to save the draft email prior to closing window 580 and includes a "Save" affordance 5158, a "Don't Save" affordance 5160, and a "Cancel" affordance 5162. In another example, modal alert 5280 displayed by dynamic function row 104, in FIG. 5UU, prompts the user of the computing system to confirm that they intend to close all open tabs within the web browser application. In yet another example, modal alert 5308 displayed by dynamic function row 104, in FIG. 5DDD, prompts the user of the computing system to select a logout/power-off option from one of logout affordance 5310, restart affordance 5312, power-off affordance 5314, and cancel affordance 5316.

In some embodiments, the portion of the notification displayed on the touch screen display includes (914) one or more suggested responses to the detected notification. FIG. 5QQ, for example, shows dynamic function row 104 displaying response dialogue box 5268 in response to detecting contact 5266 at the location within notification 5264 in FIG. 5PP. In FIG. 5QQ, response dialogue box 5268 includes a plurality of predictive responses to the content of notification 5264 shown in FIGS. 5OO-5PP. In FIG. 5QQ, response dialogue box 5268 includes a first predictive response 5270 ("Yes."), a second predictive response 5272 ("No."), and a third predictive response 5274 ("On my way!"). FIG. 5QQ also illustrates dynamic function row 104 receiving and detecting contact 5276 (e.g., a tap contact) at a location corresponding to the first predictive response 5270. For example, in response to selection of the first predictive response 5270, the computing system causes the first predictive response 5270 ("Yes.") to be sent to MAS via a same communication mode (e.g., SMS, instant message, or the like) as the one by which notification 5264 was sent to the user of the computing system. In another example, in response to selection of the first predictive response 5270, the computing system causes the first predictive response 5270 ("Yes.") to be sent to MAS via a default communication mode (e.g., selected by the user or set in software).

In some embodiments, the notification corresponds (916) to an at least one of an incoming instant message, SMS, email, voice call, or video call. In FIG. 5FF, for example, notification 5218 corresponds to an SMS, instant message, or the like sent by Suzie S. to the user of the computing system. In another example, in FIG. 5LL, interface 5248 corresponds to an incoming voice call from C. Cheung, and, in FIG. 5MM, interface 5256 correspond to an ongoing voice call between C. Cheung and the user of the computing system. In yet another example, notification 5264, in FIGS. 5OO-5PP, corresponds to an SMS, instant message, or the like sent by MAS to the user of the computing system.

In some embodiments, the notification corresponds (918) to a modal alert issued by an application being executed by the processor of the computing system in response to a user input closing the application or performing an action within the application. In a first example, FIG. 5V shows modal alert 5156 prompting the user of the computing system to save the draft email prior to closing window 580 in response to detecting selection of the exit affordance with cursor 504 in FIG. 5U. In a second example, FIG. 5KK shows modal alert 5240 prompting the user of the computing system 100 to provide their fingerprint to validate the purchase in response to detecting selection of the purchase affordance with cursor 504 in FIG. 5JJ. In a third example, FIG. 5UU shows modal alert 5280 prompting the user of the computing system to confirm that they intend to close all open tabs within the web browser application in response to detecting selection of the exit affordance with cursor 504 in FIG. 5TT.

In some embodiments, the set of one or more affordances includes (920) at least one a system-level affordance corresponding to at least one system-level functionality, and the notification corresponds to a user input selecting one or more portions of the input mechanism (e.g., alt+tab or another keyboard combination) or the least one of a system-level affordance (e.g., a power control affordance). In one example, FIG. 5X shows dynamic function row 104 displaying application selection window 5164 in response to receiving a signal corresponding to a specified physical key combination (e.g., alt+tab) from the set of physical keys 106 of portable computing system 100 (FIGS. 1A-1B) or from the set of physical keys 106 of peripheral keyboard 206 of desktop computing system 200 (FIGS. 2A-2D). In another example, FIG. 5DDD shows dynamic function row 104 displaying modal alert 5308 in response to detecting selection of power control 534 in FIG. 5CCC.

In some embodiments, the computing system detects (922) a user touch input on the touch screen display corresponding to the portion of the detected notification. In accordance with a determination that the user touch input corresponds to a first type (e.g., swipe to dismiss), the computing system ceases to display in the second user interface the portion of the detected notification on the touch screen display. In accordance with a determination that the user touch input corresponds to a second type (e.g., tap to perform an action) distinct from the first type, the computing system performs an action associated with the detected notification (e.g., open a dialogue for responding to the newly received email, SMS, or IM; save a document; exit a program; or the like). For example, FIG. 5FF shows dynamic function row 104 detecting a left-to-right swipe gesture with contact 5220 from a first location 5222-A within notification 5128 to a second location 5222-B. Continuing with this example, FIG. 5GG shows dynamic function row 104 ceasing to display notification 5218 in response to detecting the left-to-right swipe gesture in FIG. 5FF. In another example, FIG. 5PP shows dynamic function row 104 receiving and detecting contact 5266 (e.g., a tap contact) at a location within notification 5264. Continuing with this example, FIG. 5QQ shows dynamic function row 104 displaying response dialogue box 5268 in response to detecting contact 5266 at the location within notification 5264 in FIG. 5PP.

It should be understood that the particular order in which the operations in FIGS. 9A-9B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 1000) are also applicable in an analogous manner to method 900 described above with respect to FIGS. 9A-9B.

FIGS. 10A-10C are a flowchart of a method of moving user interface portions, in accordance with some embodiments. The method 1000 is performed at a computing system including a processor, a primary display, memory, and a housing at least partially containing a physical input mechanism and a touch screen display adjacent to the physical input mechanism. Some operations in method 1000 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 of portable computing system 100 (FIG. 1A). Alternatively, in some embodiments, the primary display is primary display 102 (FIGS. 2A-2D) which is implemented in peripheral display device 204 (FIGS. 2A-2D). In some embodiments, the housing is body portion 120 of portable computing system 100 (FIGS. 1A-1B), which at least partially contains the touch screen display (e.g., dynamic function row 104, FIGS. 1A-1B) and the input mechanism (e.g., the set of physical keys 106, FIGS. 1A-1B). Alternatively, in some embodiments, the housing is peripheral keyboard 206 (FIGS. 2A-2B) of desktop computing system 200, which at least partially contains the touch screen display (e.g., dynamic function row 104, FIGS. 2A-2B) and the input mechanism (e.g., the set of physical keys 106, FIGS. 2A-2B). Alternatively, in some embodiments, the housing is first input mechanism 212 (FIG. 2C) of desktop computing system 200, which at least partially contains the touch screen display (e.g., dynamic function row 104, FIG. 2C) and the input mechanism (e.g., touch pad 108, FIG. 2C).

The computing system displays (1002), on the primary display, a user interface, the user interface comprising one or more user interface elements. For example, FIG. 5OO shows primary display 102 displaying an interface for tab B within window 5224 and notification 5264 overlaid on window 5224. In FIG. 5OO, the interface for tab B shows the home web page of website B (e.g., associated with the URL: www.website_B.com/home).

The computing system identifies (1004) an active user interface element of the one or more user interface elements that is in focus on the primary display, where the active user interface element is associated with an application executed by the computing system. In FIG. 5OO, for example, the interface for tab B is in focus on primary display 102 as indicated by the thick lines surrounding tab B and the bold text for tab B.

In response to identifying the active user interface element that is in focus on the primary display, the computing system displays (1006), on the touch screen display, a set of one or more affordances corresponding to the application. In FIG. 5OO, for example, dynamic function row 104 displays controls (i.e., the set of one or more affordances) for the web browser application, including: the home web page of website B in address bar 5234 (e.g., www.website_B.com/home), affordances 5230 and 5232 for navigating between recently viewed web pages, affordances 5238 for adding the current web page to a favorites or bookmarks list, and affordances 5262-A and 5262-B for accessing tabs A and C, respectively.

The computing system detects (1008) a user input to move a respective portion of the user interface. In some embodiments, the portion of the user interface is a menu, toolbar, tool set, notification, or the like. For example, the computing system detects a gesture that drags a menu to the bottom (or other user defined location) of primary display 102 or an instruction to move the menu to dynamic function row 104 via a right-click action or other corresponding affordance. In one example, FIG. 5OO shows primary display 102 displaying the user of the computing system dragging notification 5264 with cursor 504 to a predefined location in the bottom right-hand corner of primary display 102. In another example, FIG. 5SS shows primary display 102 displaying the user of the computing system dragging the bookmarks sidebar with cursor 504 to the predefined location in the bottom right-hand corner of primary display 102.

In some embodiments, the respective portion of the user interface is (1010) a menu corresponding to the application executed by the computing system. For example, the respective portion of the user interface is a menu or a toolbar for a word processing application. For example, the respective portion of the respective user interface being drug by cursor 504, in FIG. 5SS, is the bookmarks sidebar within window 5224.

In some embodiments, the respective portion of the user interface is (1012) at least one of a notification or a modal alert. For example, the respective portion of the respective user interface being drug by cursor 504, in FIG. 5OO, is notification 5264.

In response to detecting the user input, and in accordance with a determination that the user input satisfies predefined action criteria, the computing system (1014): ceases to display the respective portion of the user interface on the primary display; ceases to display at least a subset of the set of one or more affordances on the touch screen display; and displays, on the touch screen display, a representation of the respective portion of the user interface. In one example, FIG. 5PP shows primary display ceasing to display notification 5264 and dynamic function row 104 displaying notification 5264 overlaid on affordances 5262-A and 5262-B in response to the user of the computing system dragging notification 5264 with cursor 504 to the predefined location in the bottom right-hand corner of primary display 102 in FIG. 5OO. In another example, FIG. 5TT shows dynamic function row 104 ceasing to display the controls associated with the web browser application as shown in FIG. 5SS and displaying a set of bookmark affordances 5278 corresponding to all pre-existing bookmarks in response to the user of the computing system dragging the bookmarks sidebar with cursor 504 to the predefined location in the bottom right-hand corner of primary display 102 in FIG. 5SS.

In some embodiments, the predefined action criteria are satisfied (1016) when the user input is a dragging gesture that drags the respective portion of the user interface to a predefined location of the primary display. In some embodiments, the predefined location is one of a plurality of predefined location set by the user of the computing system or set by default in software. In one example, in FIG. 5PP, the user of the computing system drags notification 5264 to a predefined location (e.g., the bottom right-hand corner of primary display 102) with cursor 504. In another example, in FIG. 5SS, the user of the computing system drags the bookmarks sidebar to a predefined location (e.g., the bottom right-hand corner of primary display 102) with cursor 504.

In some embodiments, the predefined action criteria are satisfied when the user input is (1018) a predetermined input corresponding to moving the respective portion of the user interface to the touch screen display. For example, primary display 102 displays a window for a word processing application along with a formatting toolbar overlaid on the window for the word processing application. Continuing with this example, in response to selecting a specific display option after right-clicking on the formatting toolbar or selecting the specific display option while the formatting toolbar is in focus on primary display 102, primary display 102 ceases to display the formatting toolbar and dynamic function row displays the formatting toolbar.

In some embodiments, the representation of the respective portion of the user interface is overlaid (1020) on the set of one or more affordances on the touch screen display. For example, FIG. 5PP shows dynamic function row 104 displaying notification 5264 overlaid on affordances 5262-A and 5262-B in response to the user of the computing system dragging notification 5264 with cursor 504 to the predefined location in the bottom right-hand corner of primary display 102 in FIG. 5OO.

In some embodiments, the set of one or more affordances includes (1022) at least one system-level affordance corresponding to at least one system-level functionality, and, after displaying the representation of the respective portion of the user interface on the touch screen display, the computing system maintains display of the at least one system-level affordance on the touch screen display. In FIG. 5PP, for example, dynamic function row 104 displays notification 5264 overlaid on affordances 5262-A and 5262-B along with the at least one system-level affordance (e.g., affordance 542) and the persistent controls (e.g., escape affordance 516 and power control 534). In FIG. 5TT, for example, dynamic function row 104 displays the set of bookmark affordances 5278 along with the at least one system-level affordance (e.g., affordance 542) and the persistent controls (e.g., escape affordance 516 and power control 534).

In some embodiments, in response to detecting the user input, and in accordance with a determination that the user input does not satisfy the predefined action criteria, the computing system (1024): maintains display of the respective portion of the user interface on the primary display; and maintains display of the set of one or more affordances on the touch screen display. For example, with respect to FIG. 5OO, if the user of the computing system drags notification 5264 to the bottom left-hand corner of primary display 102 with cursor 504, notification 5264 will be displayed in the bottom left-hand corner of primary display 102 and dynamic function row 104 will do display notification 5264 as the bottom left-hand corner is not the predefined location (e.g., the bottom right-hand corner is the predefined location).

It should be understood that the particular order in which the operations in FIGS. 10A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 900) are also applicable in an analogous manner to method 1000 described above with respect to FIGS. 10A-10C.

Figure 11:
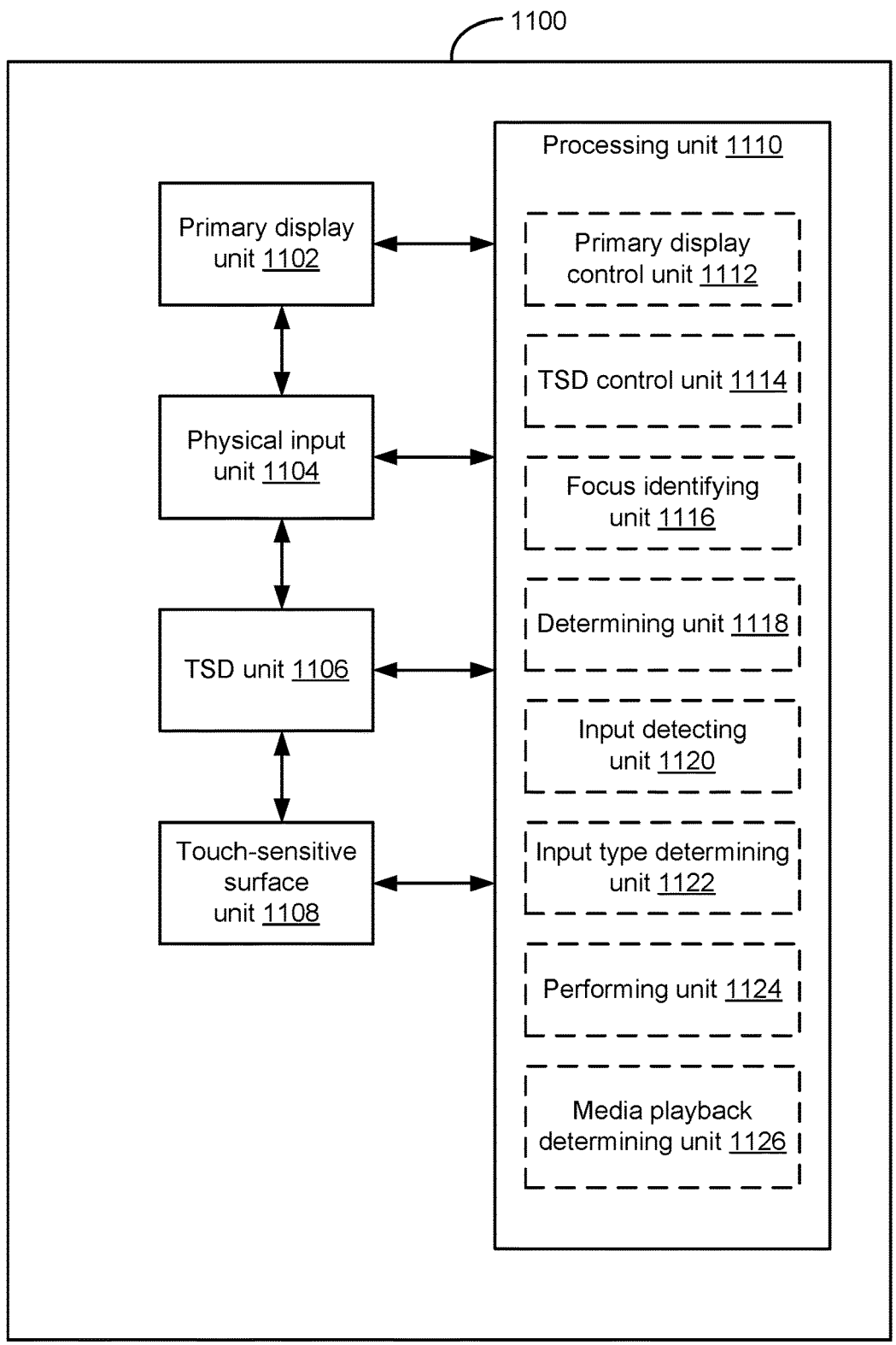
FIGS. 11-15 illustrate functional block diagrams of an electronic device, in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein. For ease of discussion, the electronic device 1100 is implemented as portable computing system 100 (FIGS. 1A-1B) whose components correspond to electronic device 300 (FIG. 3). One of skill in the art will appreciate how the electronic device 1100 may also be implemented within desktop computing system 200 (FIGS. 2A-2D).

As shown in FIG. 11, the electronic device 1100 includes a primary display unit 1102 configured to display information (e.g., primary display 102, FIGS. 1A and 2A-2D), a physical input unit 1104 configured to receive user inputs, a touch screen display (TSD) unit 1106 configured to display information (sometimes also herein called "a touch screen display" or a "touch screen") (e.g., dynamic function row 104, FIGS. 1A-1B and 2A-2D), a touch-sensitive surface unit 1108 configured to receive contacts on the touch screen display unit 1106 with one or more sensors, and a processing unit 1110 coupled to the primary display unit 1102, the physical input unit 1104, the touch screen display unit 1106, and the touch-sensitive surface unit 1108. In some embodiments, the processing unit 1110 includes: a primary display control unit 1112, a touch screen display (TSD) control unit 1114, a focus identifying unit 1116, a determining unit 1118, an input detecting unit 1120, an input type determining unit 1122, a performing unit 1124, and a media playback determining unit 1126.

The processing unit 1110 is configured to: cause display of (e.g., with the primary display control unit 1112) a first user interface on the primary display unit 1102, the first user interface comprising one or more user interface elements; identify (e.g., with the focus identifying unit 1116) an active user interface element among the one or more user interface elements that is in focus on the primary display unit 1102; and determine (e.g., with the determining unit 1118) whether the active user interface element that is in focus on the primary display unit 1102 is associated with an application executed by the processing unit 1110. In accordance with a determination that the active user interface element that is in focus on the primary display unit 1102 is associated with the application, processing unit 1110 is configured to cause display of (e.g., with the touch screen display control unit 1114) a second user interface on the touch screen display unit 1106, including: (A) a first set of one or more affordances corresponding to the application; and (B) at least one system-level affordance corresponding to at least one system-level functionality.

In some embodiments, the electronic device further includes: (i) a primary computing unit comprising the primary display unit 1102, the processing unit 1110, and a first communication circuitry unit; and (ii) an integrated input unit comprising the touch screen display unit 1106, the touch-sensitive surface unit 1108, the physical input unit 1104, and a second communication circuitry unit for communicating with the first communication circuitry unit, where the integrated input device is distinct and separate from the primary computing unit.

In some embodiments, the physical input unit 1104 comprises a plurality of physical keys.

In some embodiments, the physical input unit 1104 comprises a touch pad.

In some embodiments, the processing unit 1110 is configured to execute the application in the foreground of the first user interface.

In some embodiments, the least one system-level affordance is configured upon selection to cause display of a plurality of system-level affordances corresponding to system-level functionalities on the touch screen display unit 1106.

In some embodiments, the least one system-level affordance corresponds to one of a power control or escape control.

In some embodiments, at least one of the affordances displayed on the touch screen display unit 1106 within the second user interface is a multi-function affordance.

In some embodiments, the processing unit 1110 is configured to: detect (e.g., with the input detecting unit 1120) a user touch input selecting the multi-function affordance on the touch-sensitive surface unit 1108; in accordance with a determination (e.g., with the input type determining unit 1122) that the user touch input corresponds to a first type, perform (e.g., with the performing unit 1124) a first function associated with the multi-function affordance; and, in accordance with a determination (e.g., with the input type determining unit 1122) that the user touch input corresponds to a second type distinct from the first type, perform (e.g., with the performing unit 1124) a second function associated with the multi-function affordance.

In some embodiments, in accordance with a determination that the active user interface element is not associated with the application, the processing unit 1110 is configured to cause display of (e.g., with the touch screen display control unit 1114) a third user interface on the touch screen display unit 1106, including: (C) a second set of one or more affordances corresponding to operating system controls of the electronic device 1100, where the second set of one or more affordances are distinct from the first set of one or more affordances.

In some embodiments, the second set of one or more affordances is an expanded set of operating system controls that includes (B) the at least one system-level affordance corresponding to the at least one system-level functionality.

In some embodiments, the processing unit 1110 is configured to: detect (e.g., with the input detecting unit 1120) a user touch input selecting one of the first set of affordances on the touch-sensitive surface unit 1108; and, in response to detecting the user touch input: cause display of (e.g., with the touch screen display control unit 1114) a different set of affordances corresponding to functionalities of the application on the touch screen display unit 1106; and maintain display of (e.g., with the touch screen display control unit 1114) the at least one system-level affordance on the touch screen display unit 1106.

In some embodiments, the processing unit 1110 is configured to: detect (e.g., with the input detecting unit 1120) a subsequent user touch input selecting the at least one system-level affordance on the touch-sensitive surface unit 1108; and, in response to detecting the subsequent user touch input, cause display of (e.g., with the touch screen display control unit 1114) a plurality of system-level affordances corresponding to system-level functionalities and at least one application-level affordance corresponding to the application on the touch screen display unit 1106.

In some embodiments, the processing unit 1110 is configured to: identify (e.g., with the focus identifying unit 1116) a second active user interface element that is in focus on the primary display unit 1102 after displaying the second user interface on the touch screen display unit 1106; and determine (e.g., with the determining unit 1118) whether the second active user interface element corresponds to a different application executed by the processing unit 1110. In accordance with a determination that the second active user interface element corresponds to the different application, the processing unit 1110 is configured to cause display of (e.g., with the touch screen display control unit 1114) a fourth user interface on the touch screen display unit 1106, including: (D) a third set of one or more affordances corresponding to the different application; and (E) the at least one system-level affordance corresponding to the at least one system-level functionality.

In some embodiments, the processing unit 1110 is configured to: determine (e.g., with the media playback determining unit 1126) whether a media item is being played by the electronic device 1100 after identifying (e.g., with the focus identifying unit 1116) that the second active user interface element, where the media item is not associated with the different application; and, in accordance with a determination (e.g., with the media playback determining unit 1126) that media item is being played by the electronic device 1100, cause display of (e.g., with the touch screen display control unit 1114) at least one persistent affordance on the fourth user interface for controlling the media item on the touch screen display unit 1106.

In some embodiments, the at least one persistent affordance displays feedback that corresponds to the media item.

In some embodiments, the processing unit 1110 is configured to: detect (e.g., with the input detecting unit 1120) a user input corresponding to an override key; and, in response to detecting the user input: cease to display (e.g., with the touch screen display control unit 1114) at least the first set of one or more affordances of the second user interface on the touch screen display unit 1106; and cause display of (e.g., with the touch screen display control unit 1114) a first set of default function keys on the touch screen display unit 1106.

In some embodiments, the processing unit 1110 is configured to: detect (e.g., with the input detecting unit 1120) a gesture on the touch-sensitive surface unit 1108 in a direction that is substantially parallel to a major axis of the touch screen display unit 1106 after displaying the first set of default function keys on the touch screen display unit 1106; and, in response to detecting the substantially horizontal swipe gesture, cause display of (e.g., with the touch screen display control unit 1114) a second set of default function keys with at least one distinct function key on the touch screen display unit 1106.

The operations in the information processing methods described above are, optionally implemented by running one or more functional modules in information processing apparatus such as general purpose processors (e.g., as described above with respect to FIGS. 3A and 4) or application specific chips.

The operations described above with reference to FIGS. 6A-6D are, optionally, implemented by components depicted in FIGS. 3A-3B or FIG. 11. For example, detection operations 626 and 628 are, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

Figure 12:
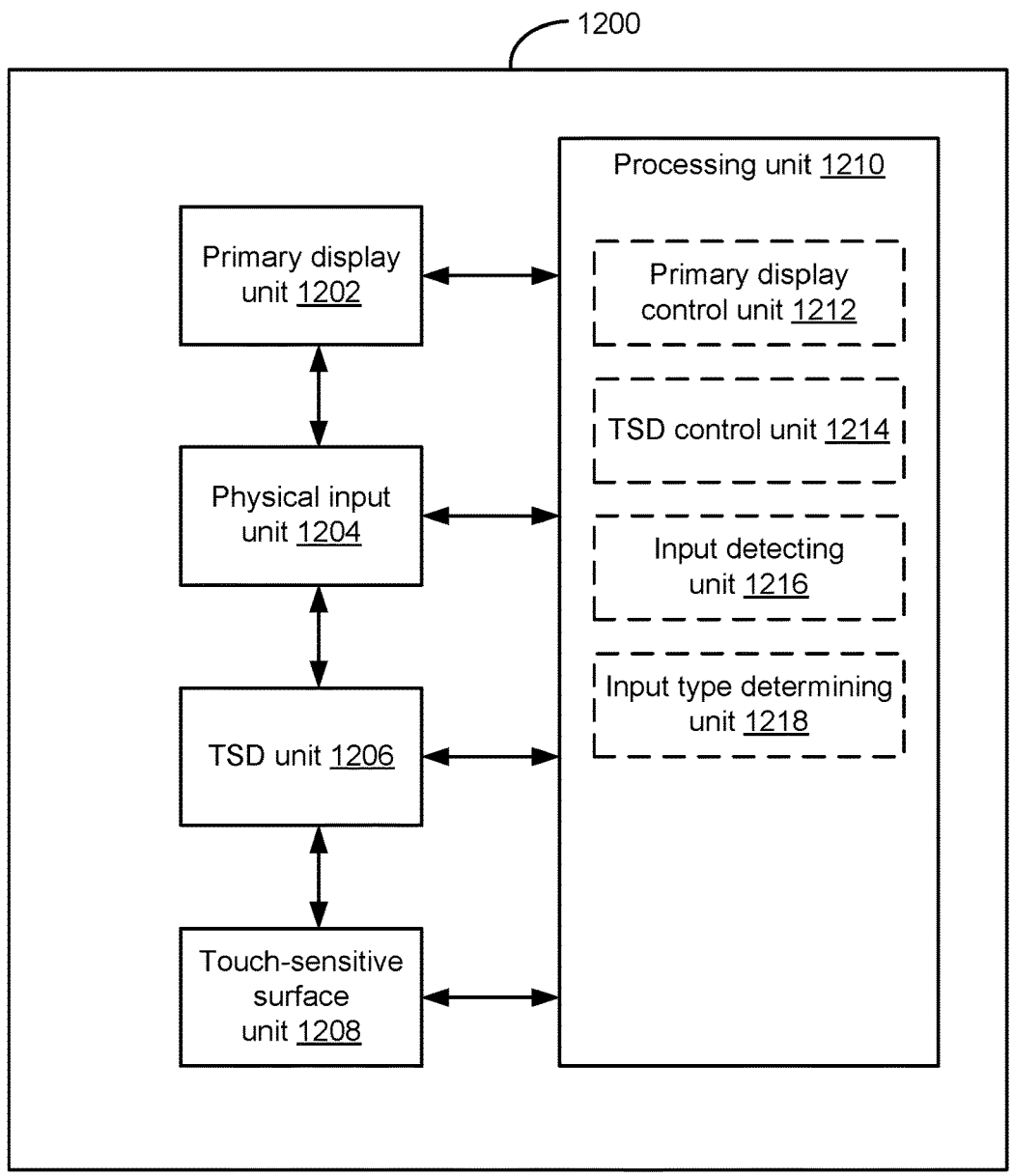

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein. For ease of discussion, the electronic device 1200 is implemented as portable computing system 100 (FIGS. 1A-1B) whose components correspond to electronic device 300 (FIG. 3). One of skill in the art will appreciate how the electronic device 1200 may also be implemented within desktop computing system 200 (FIGS. 2A-2D).

As shown in FIG. 12, the electronic device 1200 includes a primary display unit 1202 configured to display information (e.g., primary display 102, FIGS. 1A and 2A-2D), a physical input unit 1204 configured to receive user inputs, a touch screen display (TSD) unit 1206 configured to display information (sometimes also herein called "a touch screen display" or a "touch screen") (e.g., dynamic function row 104, FIGS. 1A-1B and 2A-2D), a touch-sensitive surface unit 1208 configured to receive contacts on the touch screen display unit 1206 with one or more sensors, and a processing unit 1210 coupled to the primary display unit 1202, the physical input unit 1204, the touch screen display unit 1206, and the touch-sensitive surface unit 1208. In some embodiments, the processing unit 1210 includes: a primary display control unit 1212, a touch screen display (TSD) control unit 1214, an input detecting unit 1216, and an input type determining unit 1218.

The processing unit 1210 is configured to: cause display of (e.g., with the primary display control unit 1212) a first user interface for an application executed by the processing unit 1210 on the primary display unit 1202; cause display of (e.g., with the touch screen display control unit 1214) a second user interface on the touch screen display unit 1206, the second user interface comprising a first set of one or more affordances corresponding to the application, where the first set of one or more affordances corresponds to a first portion of the application; and detect (e.g., with the input detecting unit 1216) a swipe gesture on the touch-sensitive surface unit 1208. In accordance with a determination (e.g., with the input type determining unit 1218) that the swipe gesture was performed in a first direction (e.g., horizontal), the processing unit 1210 is configured to cause display of (e.g., with the touch screen display control unit 1214) a second set of one or more affordances corresponding to the application on the touch screen display unit 1206, where at least one affordance in the second set of one or more affordances is distinct from the first set of one or more affordances, and where the second set of one or more affordances also corresponds to the first portion of the application. In accordance with a determination (e.g., with the input type determining unit 1218) that the swipe gesture was performed in a second direction substantially perpendicular to the first direction (e.g., vertical), the processing unit 1210 is configured to cause display of (e.g., with the touch screen display control unit 1214) a third set of one or more affordances corresponding to the application on the touch screen display unit 1206, where the third set of one or more affordances is distinct from the second set of one or more affordances, and where the third set of one or more affordances corresponds to a second portion of the application that is distinct from the first portion of the application.

In some embodiments, the second portion is displayed on the primary display unit 1202 in a compact view within the first user interface prior to detecting the swipe gesture, and the processing unit 1210 is configured to cause display of (e.g., with the primary display control unit 1212) the second portion on the primary display unit 1202 in an expanded view within the first user interface in accordance with the determination that the swipe gesture was performed in the second direction substantially perpendicular to the first direction.

In some embodiments, the first user interface for the application is displayed on the primary display unit 1202 in a full-screen mode, and the first set of one or more affordances displayed on the touch screen display unit 1206 includes controls corresponding to the full-screen mode.

In some embodiments, the second set of one or more affordances and the third set of one or more affordances includes at least one system-level affordance corresponding to at least one system-level functionality.

In some embodiments, after displaying the third set of one or more affordances on the touch screen display unit 1206, the processing unit 1210 is configured to: detect (e.g., with the input detecting unit 1216) a user input selecting the first portion on the first user interface; and, in response to detecting the user input: cease to display (e.g., with the touch screen display control unit 1214) the third set of one or more affordances on the touch screen display unit 1206, where the third set of one or more affordances corresponds to the second portion of the application; and cause display of (e.g., with the touch screen display control unit 1214) the second set of one or more affordances on the touch screen display unit 1206, where the second set of one or more affordances corresponds to the first portion of the application.

In some embodiments, the first direction is substantially parallel to a major dimension of the touch screen display unit 1206.

In some embodiments, the first direction is substantially perpendicular to a major dimension of the touch screen display unit 1206.

In some embodiments, the first portion is one of a menu, tab, folder, tool set, or toolbar of the application, and the second portion is one of a menu, tab, folder, tool set, or toolbar of the application.

The operations described above with reference to FIGS. 7A-7B are, optionally, implemented by components depicted in FIGS. 3A-3B or FIG. 12. For example, detection operation 710 is, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

Figure 13:
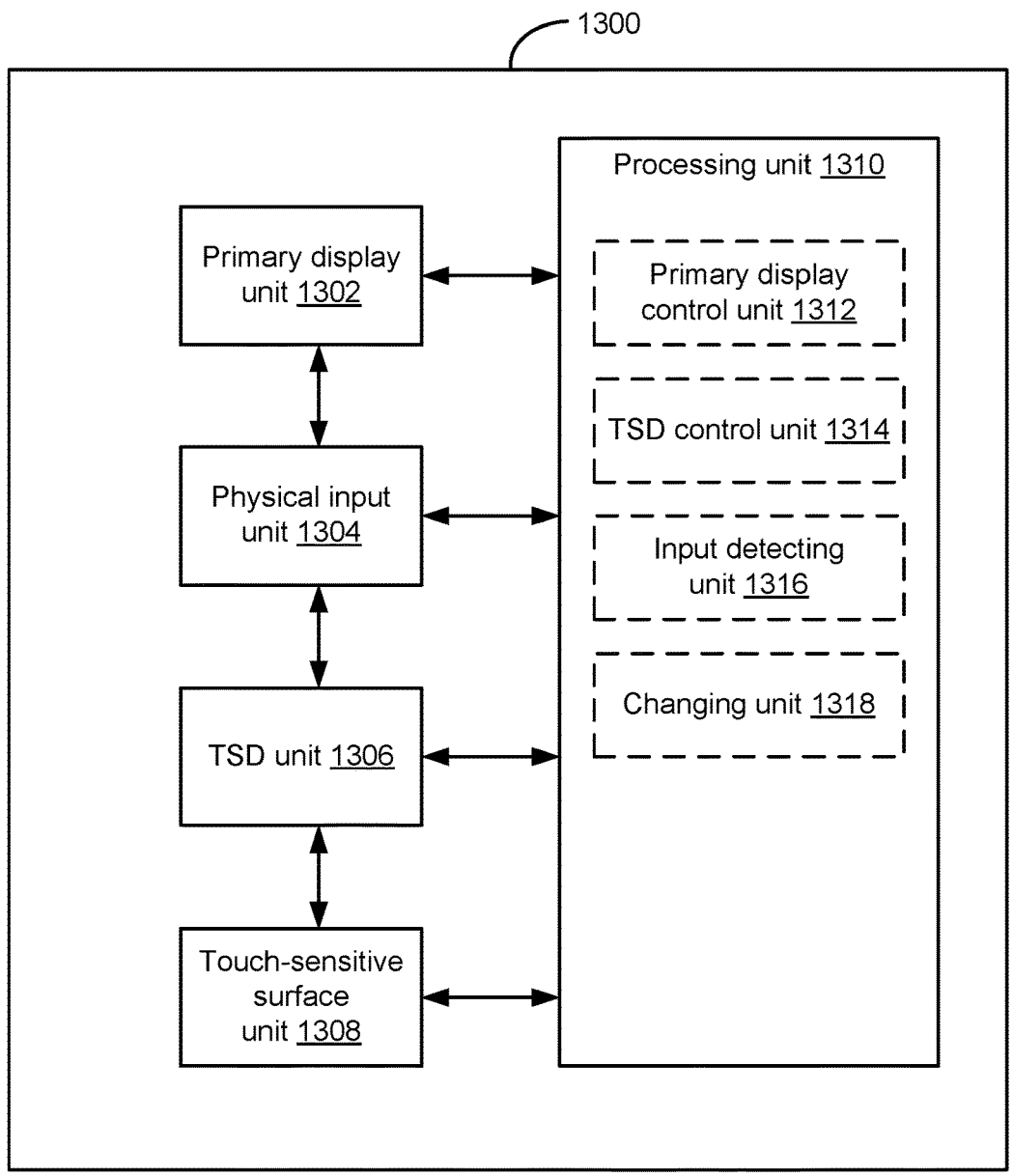

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein. For ease of discussion, the electronic device 1300 is implemented as portable computing system 100 (FIGS. 1A-1B) whose components correspond to electronic device 300 (FIG. 3). One of skill in the art will appreciate how the electronic device 1300 may also be implemented within desktop computing system 200 (FIGS. 2A-2D).

As shown in FIG. 13, the electronic device 1300 includes a primary display unit 1302 configured to display information (e.g., primary display 102, FIGS. 1A and 2A-2D), a physical input unit 1304 configured to receive user inputs, a touch screen display (TSD) unit 1306 configured to display information (sometimes also herein called "a touch screen display" or a "touch screen") (e.g., dynamic function row 104, FIGS. 1A-1B and 2A-2D), a touch-sensitive surface unit 1308 configured to receive contacts on the touch screen display unit 1306 with one or more sensors, and a processing unit 1310 coupled to the primary display unit 1302, the physical input unit 1304, the touch screen display unit 1306, and the touch-sensitive surface unit 1308. In some embodiments, the processing unit 1310 includes: a primary display control unit 1312, a touch screen display (TSD) control unit 1314, an input detecting unit 1316, and a changing unit 1318.

The processing unit 1310 is configured to: cause display of (e.g., with the primary display control unit 1312) a first user interface for the application executed by the processing unit 1310 on the primary display unit 1302 in a normal mode, the first user interface comprising a first set of one or more affordances associated with the application; and detect (e.g., with the input detecting unit 1316) a user input for displaying at least a portion of the first user interface for the application in a full-screen mode on the primary display unit 1302. In response to detecting the user input, the processing unit 1310 is configured to: cease to display (e.g., with the primary display control unit 1312) the first set of one or more affordances associated with the application in the first user interface on the primary display unit 1302; cause display of (e.g., with the primary display control unit 1312) the portion of the first user interface for the application on the primary display unit 1302 in the full-screen mode; and automatically, without human intervention, cause display of (e.g., with the touch screen display control unit 1314) a second set of one or more affordances for controlling the application on the touch screen display unit 1306, where the second set of one or more affordances correspond to the first set of one or more affordances.

In some embodiments, the second set of one or more affordances is the first set of one or more affordances.

In some embodiments, the second set of one or more affordances include controls corresponding to the full-screen mode.

In some embodiments, the processing unit 1310 is configured to detect (e.g., with the input detecting unit 1316) a user touch input selecting one of the second set of affordances on the touch-sensitive surface unit 1308, and, in response to detecting the user touch input, the processing unit 1310 is configured to change (e.g., with the changing unit 1318) the portion of the first user interface for the application being displayed in the full-screen mode on the primary display unit 1302 according to the selected one of the second set of affordances.

In some embodiments, after displaying the portion of the first user interface for the application in the full-screen mode on the primary display unit 1302, the processing unit 1310 is configured to: detect (e.g., with the input detecting unit 1316) a subsequent user input for exiting the full-screen mode; and, in response to detecting the subsequent user input: cause display of (e.g., with the primary display control unit 1312) the first user interface for the application executed by the processing unit 1310 on the primary display unit 1302 in the normal mode, the first user interface comprising the first set of one or more affordances associated with the application; and maintain display of (e.g., with the touch screen display control unit 1314) at least a subset of the second set of one or more affordances for controlling the application on the touch screen display unit 1306, where the second set of one or more affordances correspond to the first set of one or more affordances.

In some embodiments, the user input for displaying at least the portion of the first user interface for the application in full-screen mode on the primary display unit 1302 is at least one of a touch input detected on the touch-sensitive surface unit 1308 and a control selected within the first user interface on the primary display unit 1302.

In some embodiments, the second set of one or more affordances includes at least one system-level affordance corresponding to at least one system-level functionality.

The operations described above with reference to FIGS. 8A-8B are, optionally, implemented by components depicted in FIGS. 3A-3B or FIG. 13. For example, detection operations 804 and 816 are, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

Figure 14:
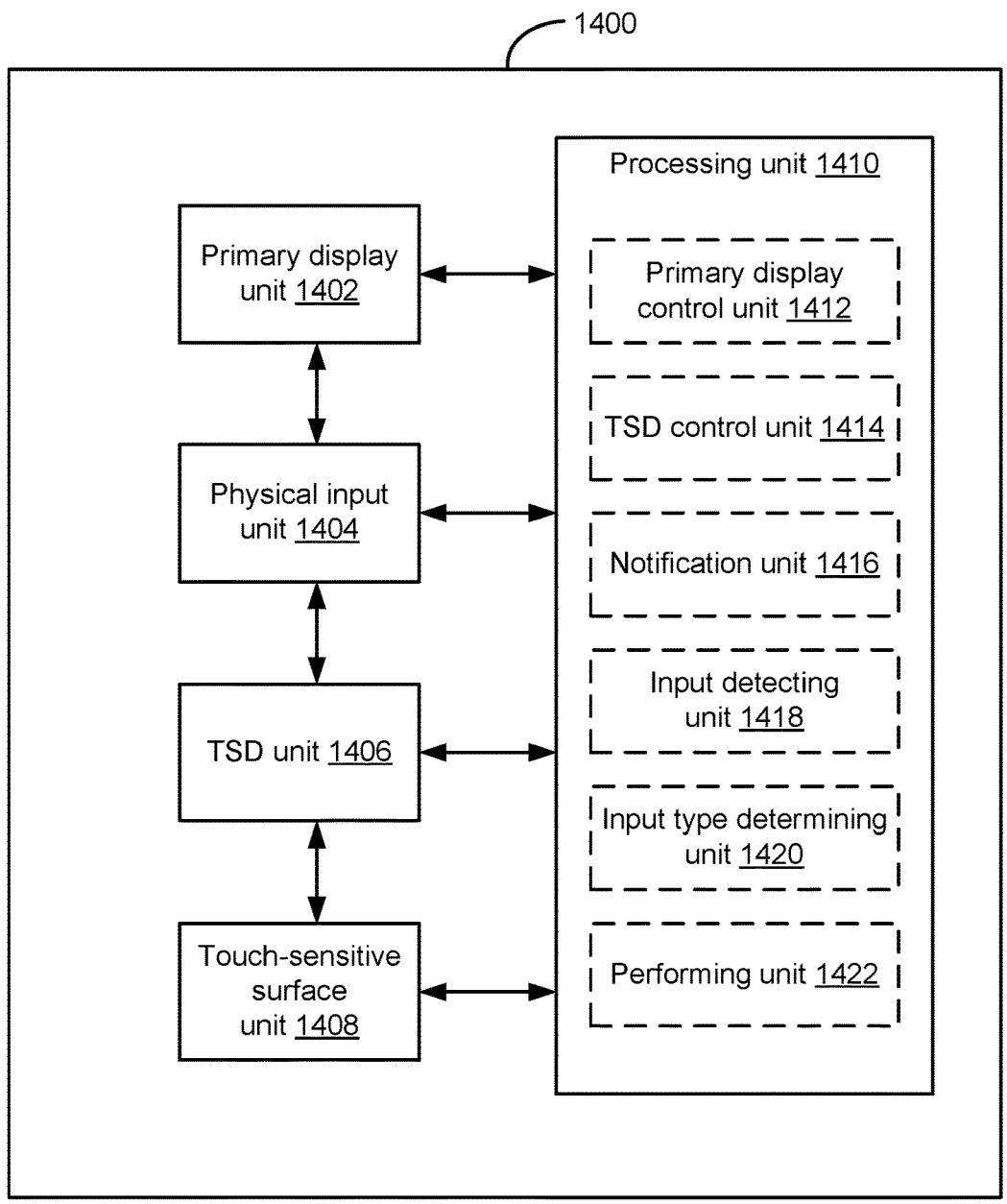

In accordance with some embodiments, FIG. 14 shows a functional block diagram of an electronic device 1400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein. For ease of discussion, the electronic device 1400 is implemented as portable computing system 100 (FIGS. 1A-1B) whose components correspond to electronic device 300 (FIG. 3). One of skill in the art will appreciate how the electronic device 1400 may also be implemented within desktop computing system 200 (FIGS. 2A-2D).

As shown in FIG. 14, the electronic device 1400 includes a primary display unit 1402 configured to display information (e.g., primary display 102, FIGS. 1A and 2A-2D), a physical input unit 1404 configured to receive user inputs, a touch screen display (TSD) unit 1406 configured to display information (sometimes also herein called "a touch screen display" or a "touch screen") (e.g., dynamic function row 104, FIGS. 1A-1B and 2A-2D), a touch-sensitive surface unit 1408 configured to receive contacts on the touch screen display unit 1406 with one or more sensors, and a processing unit 1410 coupled to the primary display unit 1402, the physical input unit 1404, the touch screen display unit 1406, and the touch-sensitive surface unit 1408. In some embodiments, the processing unit 1410 includes: a primary display control unit 1412, a touch screen display (TSD) control unit 1414, a notification unit 1416, an input detecting unit 1418, an input type determining unit 1420, and a performing unit 1422.

The processing unit 1410 is configured to: cause display of (e.g., with the primary display control unit 1412) a first user interface, on the primary display unit 1402, for an application executed by the processing unit 1410; cause display of (e.g., with the touch screen display control unit 1414) a second user interface, on the touch screen display unit 1406, the second user interface comprising a set of one or more affordances corresponding to the application; detect a notification (e.g., with the notification unit 1416); and, in response to detecting the notification, cause concurrent display of (e.g., with the touch screen display control unit 1414), in the second user interface on the touch screen display unit 1406, the set of one or more affordances corresponding to the application and at least a portion of the detected notification, where the detected notification is not displayed on the primary display unit 1402.

In some embodiments, prior to detecting the notification, the processing unit 1410 is configured to detect (e.g., with the input detecting unit 1418) a user input selecting a notification setting so as to display notifications on the touch screen display unit 1406 and to not display notifications on the primary display unit 1402.

In some embodiments, the processing unit 1410 is configured to detect (e.g., with the input detecting unit 1418) a user touch input on the touch-sensitive surface unit 1408 corresponding to the portion of the detected notification. In accordance with a determination (e.g., with the input type determining unit 1420) that the user touch input corresponds to a first type (e.g., a swipe gesture), the processing unit 1410 is configured to cease to display (e.g., with the touch screen display control unit 1414) in the second user interface the portion of the detected notification on the touch screen display unit 1406. In accordance with a determination (e.g., with the input type determining unit 1420) that the user touch input corresponds to a second type (e.g., a tap contact) distinct from the first type, the processing unit 1410 is configured to perform (e.g., with the performing unit 1422) an action associated with the detected notification.

In some embodiments, the portion of the notification displayed on the touch screen display unit 1406 prompts a user of the electronic device 1400 to select one of a plurality of options for responding to the detected notification.

In some embodiments, the portion of the notification displayed on the touch screen display unit 1406 includes one or more suggested responses to the detected notification.

In some embodiments, the notification corresponds to an at least one of an incoming instant message, SMS, email, voice call, or video call.

In some embodiments, the notification corresponds to a modal alert issued by an application being executed by the processing unit 1410 in response to a user input closing the application or performing an action within the application.

In some embodiments, the set of one or more affordances includes at least one a system-level affordance corresponding to at least one system-level functionality, and the notification corresponds to a user input selecting one or more portions of the input mechanism or the least one of a system-level affordance.

The operations described above with reference to FIGS. 9A-9B are, optionally, implemented by components depicted in FIGS. 3A-3B or FIG. 14. For example, detection operation 922 is, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

Figure 15:
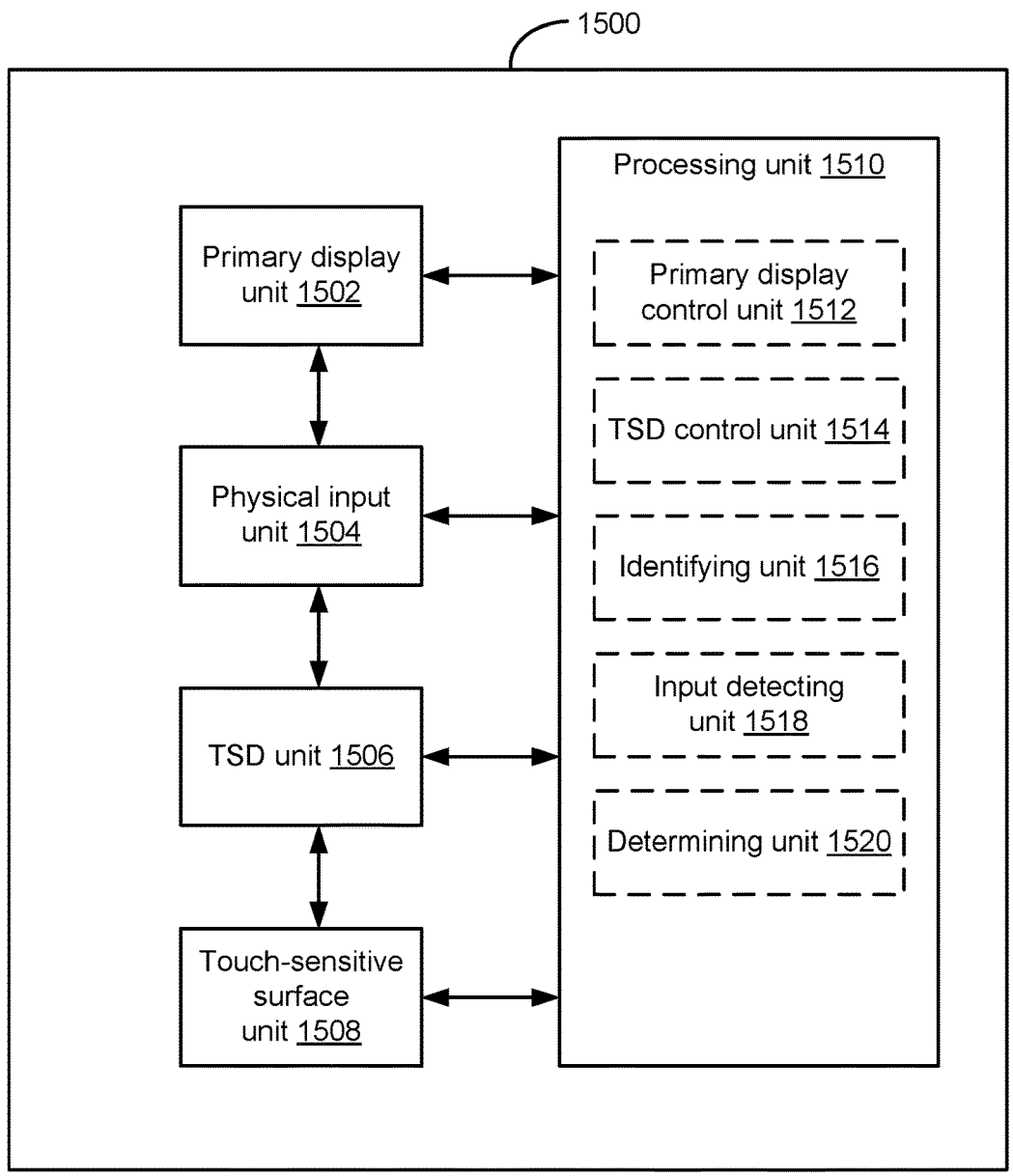

In accordance with some embodiments, FIG. 15 shows a functional block diagram of an electronic device 1500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein. For ease of discussion, the electronic device 1500 is implemented as portable computing system 100 (FIGS. 1A-1B) whose components correspond to electronic device 300 (FIG. 3). One of skill in the art will appreciate how the electronic device 1500 may also be implemented within desktop computing system 200 (FIGS. 2A-2D).

As shown in FIG. 15, the electronic device 1500 includes a primary display unit 1502 configured to display information (e.g., primary display 102, FIGS. 1A and 2A-2D), a physical input unit 1504 configured to receive user inputs, a touch screen display (TSD) unit 1506 configured to display information (sometimes also herein called "a touch screen display" or a "touch screen") (e.g., dynamic function row 104, FIGS. 1A-1B and 2A-2D), a touch-sensitive surface unit 1508 configured to receive contacts on the touch screen display unit 1506 with one or more sensors, and a processing unit 1510 coupled to the primary display unit 1502, the physical input unit 1504, the touch screen display unit 1506, and the touch-sensitive surface unit 1508. In some embodiments, the processing unit 1510 includes: a primary display control unit 1512, a touch screen display (TSD) control unit 1514, an identifying unit 1516, an input detecting unit 1518, and a determining unit 1520.

The processing unit 1510 is configured to: cause display of (e.g., with the primary display control unit 1512) a user interface, on the primary display unit 1502, the user interface comprising one or more user interface elements; identify (e.g., with the identifying unit 1516) an active user interface element of the one or more user interface elements that is in focus on the primary display unit 1502, where the active user interface element is associated with an application executed by the processing unit 1510; and, in response to identifying the active user interface element that is in focus on the primary display unit 1502, cause display of (e.g., with the touch screen display control unit 1514) a set of one or more affordances corresponding to the application on the touch screen display unit 1506. The processing unit 1510 is configured to: detect (e.g., with the input detecting unit 1518) a user input to move a respective portion of the user interface; and, in response to detecting the user input, and in accordance with a determination (e.g., with the determining unit 1520) that the user input satisfies predefined action criteria: cease to display (e.g., with the primary display control unit 1512) the respective portion of the user interface on the primary display unit 1502; cease to display (e.g., with the touch screen display control unit 1514) at least a subset of the set of one or more affordances on the touch screen display unit 1506; and cause display of (e.g., with the touch screen display control unit 1514) a representation of the respective portion of the user interface on the touch screen display unit 1506.

In some embodiments, the respective portion of the user interface is a menu corresponding to the application executed by the processing unit 1510.

In some embodiments, the respective portion of the user interface is at least one of a notification or a modal alert.

In some embodiments, the predefined action criteria are satisfied when the user input is a dragging gesture that drags the respective portion of the user interface to a predefined location of the primary display unit 1502.

In some embodiments, the predefined action criteria are satisfied when the user input is predetermined input corresponding to moving the respective portion of the user interface to the touch screen display unit 1506.

In some embodiments, in response to detecting the user input, and in accordance with a determination (e.g., with the determining unit 1520) that the user input does not satisfy the predefined action criteria, the processing unit 1510 is configured to: maintain display of (e.g., with the primary display control unit 1512) the respective portion of the user interface on the primary display unit 1502; and maintain display of (e.g., with the touch screen display control unit 1514) the set of one or more affordances on the touch screen display unit 1506.

In some embodiments, the set of one or more affordances includes at least one system-level affordance corresponding to at least one system-level functionality, and the processing unit 1510 is configured to maintain display of (e.g., with the touch screen display control unit 1514) the at least one system-level affordance on the touch screen display unit 1506 after displaying the representation of the respective portion of the user interface on the touch screen display unit 1506.

In some embodiments, the representation of the respective portion of the user interface is overlaid on the set of one or more affordances on the touch screen display unit 1506.

The operations described above with reference to FIGS. 10A-10C are, optionally, implemented by components depicted in FIGS. 3A-3B or FIG. 15. For example, detection operation 1008 is, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer-readable storage medium storing one or more programs, the one or more programs comprising instructions that, when executed by one or more processors of a computing system with a first housing that includes a primary display and a second housing at least partially containing (i) a physical keyboard and (ii) a touch-sensitive secondary display that is distinct from the primary display, cause the computing system to:
　display, on the primary display, a first user interface for an application executed by the computing system;
　display a second user interface on the touch-sensitive secondary display, the second user interface comprising a first set of one or more affordances corresponding to the application, wherein the first set of one or more affordances corresponds to a first portion of the application;
　detect a swipe gesture on the touch-sensitive secondary display;
　in accordance with a determination that the swipe gesture was performed in a first direction, display a second set of one or more affordances corresponding to the application on the touch-sensitive secondary display, wherein at least one affordance in the second set of one or more affordances is distinct from the first set of one or more affordances, and wherein the second set of one or more affordances also corresponds to the first portion of the application; and, in accordance with a determination that the swipe gesture was performed in a second direction substantially perpendicular to the first direction, display a third set of one or more affordances corresponding to the application on the touch-sensitive secondary display, wherein the third set of one or more affordances is distinct from the second set of one or more affordances, and wherein the third set of one or more affordances corresponds to a second portion of the application that is distinct from the first portion of the application.

2. The non-transitory computer-readable storage medium of claim 1, wherein the second portion is displayed on the primary display in a compact view within the first user interface prior to detecting the swipe gesture, and the instructions, when executed by the one or more processors, cause the computing system to:

display the second portion on the primary display in an expanded view within the first user interface in accordance with the determination that the swipe gesture was performed in the second direction substantially perpendicular to the first direction.

3. The non-transitory computer-readable storage medium of claim 1, wherein the first user interface for the application executed by the computing system is displayed on the primary display in a full-screen mode, and wherein the first set of one or more affordances displayed on the touch-sensitive secondary display includes controls corresponding to the full-screen mode.

4. The non-transitory computer-readable storage medium of claim 1, wherein the second set of one or more affordances and the third set of one or more affordances includes at least one system-level affordance corresponding to at least one system-level functionality.

5. The non-transitory computer-readable storage medium of claim 1, wherein the instructions, when executed by the one or more processors, cause the computing system to:

after displaying the third set of one or more affordances on the touch-sensitive secondary display:

detect a user input selecting the first portion on the first user interface; and, in response to detecting the user input:

cease to display the third set of one or more affordances on the touch-sensitive secondary display, wherein the third set of one or more affordances corresponds to the second portion of the application; and display the second set of one or more affordances, wherein the second set of one or more affordances corresponds to the first portion of the application.

6. The non-transitory computer-readable storage medium of claim 1, wherein the first direction is substantially parallel to a major dimension of the touch-sensitive secondary display.

7. The non-transitory computer-readable storage medium of claim 1, wherein the first direction is substantially perpendicular to a major dimension of the touch-sensitive secondary display.

8. The non-transitory computer-readable storage medium of claim 1, wherein the first portion is one of a menu, tab, folder, tool set, or toolbar of the application, and wherein the second portion is one of a menu, tab, folder, tool set, or toolbar of the application.

9. The non-transitory computer-readable storage medium of claim 1, wherein the instructions also cause the computing system to:

in accordance with the determination that the swipe gesture was performed in the second direction substantially perpendicular to the first direction, cease to display the second set of one or more affordances on the touch-sensitive secondary display.

10. The non-transitory computer-readable storage medium of claim 9, wherein while the second set of affordances on displayed at the touch-sensitive secondary display, representations of the second set of affordances are displayed within the first user interface for the application, and the instructions also cause the computing system to:

in accordance with the determination that the swipe gesture was performed in the second direction substantially perpendicular to the first direction, cease to display on the primary display the representations of the second set of affordances and display on the primary display representations of the third set of affordances.

11. A method, comprising:

at a computing system comprising one or more processors, memory, a first housing that includes a primary display, and a second housing at least partially containing (i) a physical keyboard and a touch-sensitive secondary display that is distinct from the primary display:

displaying, on the primary display, a first user interface for an application executed by the computing system;

displaying a second user interface on the touch-sensitive secondary display, the second user interface comprising a first set of one or more affordances corresponding to the application, wherein the first set of one or more affordances corresponds to a first portion of the application;

detecting a swipe gesture on the touch-sensitive secondary display;

in accordance with a determination that the swipe gesture was performed in a first direction, displaying a second set of one or more affordances corresponding to the application on the touch-sensitive secondary display, wherein at least one affordance in the second set of one or more affordances is distinct from the first set of one or more affordances, and wherein the second set of one or more affordances also corresponds to the first portion of the application; and, in accordance with a determination that the swipe gesture was performed in a second direction substantially perpendicular to the first direction, displaying a third set of one or more affordances corresponding to the application on the touch-sensitive secondary display, wherein the third set of one or more affordances is distinct from the second set of one or more affordances, and wherein the third set of one or more affordances corresponds to a second portion of the application that is distinct from the first portion of the application.

12. The method of claim 11, wherein the second portion is displayed on the primary display in a compact view within the first user interface prior to detecting the swipe gesture, and the method includes:

displaying the second portion on the primary display in an expanded view within the first user interface in accordance with the determination that the swipe gesture was performed in the second direction substantially perpendicular to the first direction.

13. The method of claim 11, wherein the first user interface for the application executed by the computing system is displayed on the primary display in a full-screen mode, and
wherein the first set of one or more affordances displayed on the touch-sensitive secondary display includes controls corresponding to the full-screen mode.

14. The method of claim 11, wherein the second set of one or more affordances and the third set of one or more affordances includes at least one system-level affordance corresponding to at least one system-level functionality.

15. The method of claim 11, including:
after displaying the third set of one or more affordances on the touch-sensitive secondary display:
detecting a user input selecting the first portion on the first user interface; and, in response to detecting the user input:
ceasing to display the third set of one or more affordances on the touch-sensitive secondary display, wherein the third set of one or more affordances corresponds to the second portion of the application; and
displaying the second set of one or more affordances, wherein the second set of one or more affordances corresponds to the first portion of the application.

16. The method of claim 11, further comprising:
in accordance with the determination that the swipe gesture was performed in the second direction substantially perpendicular to the first direction, ceasing to display the second set of one or more affordances on the touch-sensitive secondary display.

17. The method of claim 16, wherein while the second set of affordances is displayed on the touch-sensitive secondary display, representations of the second set of affordances are displayed within the first user interface for the application, and the method further comprises:
in accordance with the determination that the swipe gesture was performed in the second direction substantially perpendicular to the first direction, ceasing to display on the primary display the representations of the second set of affordances and displaying on the primary display representations of the third set of affordances.

18. The method of claim 11, wherein the first direction is substantially parallel to a major dimension of the touch-sensitive secondary display.

19. The method of claim 11, wherein the first direction is substantially perpendicular to a major dimension of the touch-sensitive secondary display.

20. The method of claim 11, wherein the first portion is one of a menu, tab, folder, tool set, or toolbar of the application, and
wherein the second portion is one of a menu, tab, folder, tool set, or toolbar of the application.

21. A computing system, comprising:
one or more processors;
a first housing that includes a primary display;
a second housing at least partially containing (i) a physical keyboard and (ii) a touch-sensitive secondary display that is distinct from the primary display;
memory; and
one or more programs, wherein the one or more programs are stored in the memory and configured to be executed by the one or more processors, the one or more programs including instructions for:
displaying, on the primary display, a first user interface for an application executed by the computing system;
displaying a second user interface on the touch-sensitive secondary display, the second user interface comprising a first set of one or more affordances corresponding to the application, wherein the first set of one or more affordances corresponds to a first portion of the application;
detecting a swipe gesture on the touch-sensitive secondary display;
in accordance with a determination that the swipe gesture was performed in a first direction, displaying a second set of one or more affordances corresponding to the application on the touch-sensitive secondary display, wherein at least one affordance in the second set of one or more affordances is distinct from the first set of one or more affordances, and wherein the second set of one or more affordances also corresponds to the first portion of the application; and,
in accordance with a determination that the swipe gesture was performed in a second direction substantially perpendicular to the first direction, displaying a third set of one or more affordances corresponding to the application on the touch-sensitive secondary display, wherein the third set of one or more affordances is distinct from the second set of one or more affordances, and wherein the third set of one or more affordances corresponds to a second portion of the application that is distinct from the first portion of the application.

22. The computing system of claim 21, wherein the second portion is displayed on the primary display in a compact view within the first user interface prior to detecting the swipe gesture, and the one or more programs include instructions for:
displaying the second portion on the primary display in an expanded view within the first user interface in accordance with the determination that the swipe gesture was performed in the second direction substantially perpendicular to the first direction.

23. The computing system of claim 21, wherein the first user interface for the application executed by the computing system is displayed on the primary display in a full-screen mode, and
wherein the first set of one or more affordances displayed on the touch-sensitive secondary display includes controls corresponding to the full-screen mode.

24. The computing system of claim 21, wherein the second set of one or more affordances and the third set of one or more affordances includes at least one system-level affordance corresponding to at least one system-level functionality.

25. The computing system of claim 21, wherein the one or more programs include instructions for:
after displaying the third set of one or more affordances on the touch-sensitive secondary display:
detecting a user input selecting the first portion on the first user interface; and,
in response to detecting the user input:
ceasing to display the third set of one or more affordances on the touch-sensitive secondary display, wherein the third set of one or more affordances corresponds to the second portion of the application; and displaying the second set of one or more affordances, wherein the second set of one or more affordances corresponds to the first portion of the application.

26. The computing system of claim 21, wherein the one or more programs also include instructions for:
in accordance with the determination that the swipe gesture was performed in the second direction substantially perpendicular to the first direction, cease to display the second set of one or more affordances on the touch-sensitive secondary display.

27. The computing system of claim 26, wherein while the second set of affordances is displayed on the touch-sensitive secondary display, representations of the second set of affordances are displayed within the first user interface for the application, and the one or more programs also include instructions for:
in accordance with the determination that the swipe gesture was performed in the second direction substantially perpendicular to the first direction, ceasing to display on the primary display the representations of the second set of affordances and displaying on the primary display representations of the third set of affordances.

28. The computing system of claim 21, wherein the first direction is substantially parallel to a major dimension of the touch-sensitive secondary display.

29. The computing system of claim 21, wherein the first direction is substantially perpendicular to a major dimension of the touch-sensitive secondary display.

30. The computing system of claim 21, wherein the first portion is one of a menu, tab, folder, tool set, or toolbar of the application, and
wherein the second portion is one of a menu, tab, folder, tool set, or toolbar of the application.

* * * * *